US009373149B2

(12) United States Patent
Abhyanker

(10) Patent No.: US 9,373,149 B2
(45) Date of Patent: Jun. 21, 2016

(54) AUTONOMOUS NEIGHBORHOOD VEHICLE COMMERCE NETWORK AND COMMUNITY

(71) Applicant: Raj Abhyanker, Cupertino, CA (US)

(72) Inventor: Raj Abhyanker, Cupertino, CA (US)

(73) Assignee: FATDOOR, INC., Palo Alto, CA (US)

(*) Notice: Subject to any disclaimer, the term of this patent is extended or adjusted under 35 U.S.C. 154(b) by 0 days.

(21) Appl. No.: 14/157,540

(22) Filed: Jan. 17, 2014

(65) Prior Publication Data

US 2014/0136414 A1 May 15, 2014

Related U.S. Application Data

(63) Continuation-in-part of application No. 11/603,442, filed on Nov. 22, 2006, now abandoned, and a continuation-in-part of application No. 13/236,964, filed on Sep. 20, 2011, now abandoned, and a (Continued)

(51) Int. Cl.
*G01C 22/00* (2006.01)
*G06Q 50/28* (2012.01)
(Continued)

(52) U.S. Cl.
CPC .......... *G06Q 50/28* (2013.01); *G05B 19/41895* (2013.01); *G05D 1/0011* (2013.01);
(Continued)

(58) Field of Classification Search
CPC ....... H04L 63/10; H04L 63/102; H04L 63/20; H04L 67/18; H04L 67/22; H04L 51/32; H04L 63/105; H04L 9/32; H04L 63/12; H04W 12/06; H04W 12/08; H04W 4/02; H04W 12/12; G06Q 50/01; G06Q 20/4014; G06Q 30/0269; G06Q 30/0609; G06Q 10/08; G06Q 10/0833; G05D 1/0225; G05D 1/0242; G05D 1/0246; G05D 1/0255; G05D 1/0274; G05D 1/028; G05D 1/0238; G05D 1/0251; G05D 1/0272; G05D 1/027; G05D 1/024; G05B 19/41895; A47F 10/06

USPC ............ 701/2, 23, 24, 26, 28, 36, 38, 40, 48, 701/49, 93, 96, 411–415, 420, 422, 423, 701/436, 425, 519, 533, 300, 301; 700/213, 700/214, 216, 219, 228, 231, 233, 226; 707/737; 709/206, 218
See application file for complete search history.

(56) References Cited

U.S. PATENT DOCUMENTS 2,035,218 A 3/1936 Bloom
3,253,806 A 5/1966 Eickmann
(Continued)

FOREIGN PATENT DOCUMENTS

EP 1426876 A1 6/2004
KR 101069834 B1 10/2010
(Continued)

OTHER PUBLICATIONS

Benchmark-Backed Nextdoor Launches as a Private Social Network for Neighborhoods, Techcrunch Article, Oct. 26, 2011 by Leena Rao (6 Pages) http://techcrunch.com/2011/10/26/benchmark-backed-nextdoor-launches-as-a-private-social-network-for-neighborhoods/.
(Continued)

*Primary Examiner* — Thomas G Black
*Assistant Examiner* — Sze-Hon Kong
(74) *Attorney, Agent, or Firm* — Raj Abhyanker, P.C.

(57) ABSTRACT

Disclosed is an autonomous neighborhood vehicle controllable through a neighborhood social network. In one embodiment, an autonomous neighborhood vehicle can autonomously navigate to a destination specified by a user of the neighborhood social network. In one embodiment, a computer system of the autonomous neighborhood vehicle is communicatively coupled to the neighborhood social network through a wireless network to autonomously navigate to a destination specified by the user of the neighborhood social network. A navigation server provides a remote sensing capability to the autonomous neighborhood vehicle. A particular user of a third-party application is authenticated as being a verified user of the neighborhood social network having a verified residential address. An information of the particular user is communicated to the third-party application from the neighborhood social network based on a personal address privacy preference of the particular user.

5 Claims, 72 Drawing Sheets

Related U.S. Application Data continuation-in-part of application No. 13/242,303, filed on Sep. 23, 2011, now abandoned, and a continuation-in-part of application No. 13/272,245, filed on Oct. 13, 2011, now Pat. No. 8,660,897, and a continuation-in-part of application No. 14/079,611, filed on Nov. 13, 2013, and a continuation-in-part of application No. 14/089,779, filed on Nov. 26, 2013, now Pat. No. 9,071,367, and a continuation-in-part of application No. 14/100,034, filed on Dec. 9, 2013, and a continuation-in-part of application No. 14/102,474, filed on Dec. 10, 2013, now Pat. No. 8,874,489, and a continuation-in-part of application No. 14/141,432, filed on Dec. 27, 2013, now abandoned, and a continuation-in-part of application No. 14/142,764, filed on Dec. 28, 2013, and a continuation-in-part of application No. 14/144,612, filed on Dec. 31, 2013, now Pat. No. 8,738,545, and a continuation-in-part of application No. 11/653,194, filed on Jan. 12, 2007, and a continuation-in-part of application No. 11/731,465, filed on Mar. 29, 2007, now abandoned, and a continuation-in-part of application No. 11/827,400, filed on Jul. 10, 2007, now Pat. No. 9,098,545.

(60) Provisional application No. 60/783,226, filed on Mar. 17, 2006, provisional application No. 60/817,470, filed on Jun. 28, 2006, provisional application No. 60/853,499, filed on Oct. 19, 2006, provisional application No. 60/854,230, filed on Oct. 25, 2006, provisional application No. 61/526,693, filed on Aug. 24, 2011, provisional application No. 61/894,443, filed on Oct. 23, 2013.

(51) Int. Cl.

| | |
|---|---|
| *G05D 1/00* | (2006.01) |
| *G06Q 20/32* | (2012.01) |
| *G05D 1/02* | (2006.01) |
| *G05B 19/418* | (2006.01) |
| *G06Q 10/08* | (2012.01) |
| *G06Q 10/10* | (2012.01) |
| *G06Q 30/02* | (2012.01) |

(52) U.S. Cl.
CPC ............ *G05D 1/028* (2013.01); *G05D 1/0225* (2013.01); *G05D 1/0238* (2013.01); *G05D 1/0242* (2013.01); *G05D 1/0251* (2013.01); *G05D 1/0255* (2013.01); *G05D 1/0274* (2013.01); *G06Q 10/087* (2013.01); *G06Q 10/10* (2013.01); *G06Q 20/3224* (2013.01); *G06Q 30/02* (2013.01); *G06Q 30/0241* (2013.01)

(56) References Cited

U.S. PATENT DOCUMENTS

| | | | | |
|---|---|---|---|---|
| 3,556,438 | A | | 1/1971 | Meditz |
| 3,762,669 | A | | 10/1973 | Curci |
| 4,119,163 | A | * | 10/1978 | Ball .................. 180/6.5 |
| 4,161,843 | A | | 7/1979 | Hui |
| 4,375,354 | A | * | 3/1983 | Henriksson ............ 432/239 |
| 4,556,198 | A | | 12/1985 | Tominaga |
| 4,779,203 | A | * | 10/1988 | McClure et al. ............. 701/24 |
| 4,914,605 | A | | 4/1990 | Loughmiller, Jr. et al. |
| 4,996,468 | A | * | 2/1991 | Field et al. ................ 318/587 |
| 5,006,988 | A | | 4/1991 | Borenstein et al. |
| 5,032,989 | A | | 7/1991 | Tornetta |
| 5,050,844 | A | | 9/1991 | Hawk |
| 5,199,686 | A | | 4/1993 | Fletcher |
| 5,208,750 | A | * | 5/1993 | Kurami et al. .............. 701/28 |
| 5,325,294 | A | | 6/1994 | Keene |
| 5,372,211 | A | * | 12/1994 | Wilcox et al. ............. 180/8.2 |
| 5,521,817 | A | | 5/1996 | Burdoin et al. |
| 5,572,449 | A | * | 11/1996 | Tang et al. .............. 700/304 |
| 5,577,567 | A | * | 11/1996 | Johnson et al. ........... 180/9.23 |
| 5,581,630 | A | | 12/1996 | Bonneau, Jr. |
| 5,584,025 | A | | 12/1996 | Keithley et al. |
| 5,590,062 | A | | 12/1996 | Nagamitsu et al. |
| 5,617,319 | A | | 4/1997 | Arakawa et al. |
| 5,630,103 | A | | 5/1997 | Smith et al. |
| 5,671,342 | A | | 9/1997 | Millier et al. |
| 5,720,363 | A | * | 2/1998 | Kipp ........................ 186/55 |
| 5,751,245 | A | * | 5/1998 | Janky et al. .............. 342/357.4 |
| 5,774,133 | A | | 6/1998 | Neave et al. |
| 5,794,207 | A | | 8/1998 | Walker et al. |
| 5,805,810 | A | | 9/1998 | Maxwell |
| 5,819,269 | A | | 10/1998 | Uomini |
| 5,826,244 | A | | 10/1998 | Huberman |
| 5,831,664 | A | | 11/1998 | Wharton et al. |
| 5,835,896 | A | | 11/1998 | Fisher et al. |
| 5,852,810 | A | | 12/1998 | Sotiroff et al. |
| 5,904,214 | A | * | 5/1999 | Lin ......................... 180/15 |
| 5,905,499 | A | | 5/1999 | McDowall et al. |
| 5,907,322 | A | | 5/1999 | Kelly et al. |
| 5,926,765 | A | | 7/1999 | Sasaki |
| 5,930,474 | A | | 7/1999 | Dunworth et al. |
| 5,937,413 | A | | 8/1999 | Hyun et al. |
| 5,940,806 | A | | 8/1999 | Danial |
| 5,991,737 | A | | 11/1999 | Chen |
| 6,024,288 | A | | 2/2000 | Gottlich et al. |
| 6,029,141 | A | | 2/2000 | Bezos et al. |
| 6,029,195 | A | | 2/2000 | Herz |
| 6,034,618 | A | | 3/2000 | Tatebayashi et al. |
| 6,036,601 | A | | 3/2000 | Heckel |
| 6,047,194 | A | | 4/2000 | Andersson |
| 6,047,236 | A | | 4/2000 | Hancock et al. |
| 6,049,778 | A | | 4/2000 | Walker et al. |
| 6,059,263 | A | | 5/2000 | Otema et al. |
| 6,073,138 | A | | 6/2000 | de l'Etraz et al. |
| 6,078,906 | A | | 6/2000 | Huberman |
| 6,088,702 | A | | 7/2000 | Plantz et al. |
| 6,092,076 | A | | 7/2000 | McDonough et al. |
| 6,092,105 | A | | 7/2000 | Goldman |
| 6,101,484 | A | | 8/2000 | Halbert et al. |
| 6,108,639 | A | | 8/2000 | Walker et al. |
| 6,122,592 | A | | 9/2000 | Arakawa et al. |
| 6,134,486 | A | * | 10/2000 | Kanayama ................ 701/23 |
| 6,148,260 | A | | 11/2000 | Musk et al. |
| 6,148,289 | A | | 11/2000 | Virdy |
| 6,175,831 | B1 | | 1/2001 | Weinreich et al. |
| 6,199,076 | B1 | | 3/2001 | Logan et al. |
| 6,229,533 | B1 | | 5/2001 | Farmer et al. |
| 6,236,990 | B1 | | 5/2001 | Geller et al. |
| 6,269,369 | B1 | | 7/2001 | Robertson |
| 6,308,177 | B1 | | 10/2001 | Israni et al. |
| 6,317,718 | B1 | | 11/2001 | Fano |
| 6,336,111 | B1 | | 1/2002 | Ashby et al. |
| 6,339,745 | B1 | | 1/2002 | Novik |
| 6,356,834 | B2 | | 3/2002 | Hancock et al. |
| 6,381,537 | B1 | | 4/2002 | Chenault et al. |
| 6,401,085 | B1 | | 6/2002 | Gershman et al. |
| 6,405,123 | B1 | | 6/2002 | Rennard et al. |
| 6,408,307 | B1 | | 6/2002 | Semple et al. |
| 6,445,983 | B1 | * | 9/2002 | Dickson et al. ............. 701/23 |
| 6,453,339 | B1 | | 9/2002 | Schultz et al. |
| 6,470,268 | B1 | * | 10/2002 | Ashcraft et al. ............ 701/533 |
| 6,480,885 | B1 | | 11/2002 | Olivier |
| 6,487,583 | B1 | | 11/2002 | Harvey et al. |
| 6,498,982 | B2 | | 12/2002 | Bellesfield et al. |
| 6,507,776 | B1 | | 1/2003 | Fox, III |
| 6,513,069 | B1 | | 1/2003 | Abato et al. |
| 6,519,629 | B2 | | 2/2003 | Harvey et al. |
| 6,532,007 | B1 | | 3/2003 | Matsuda |
| 6,542,813 | B1 | | 4/2003 | Kovacs |
| 6,542,817 | B2 | | 4/2003 | Miyaki |
| 6,542,936 | B1 | | 4/2003 | Mayle et al. |
| 6,557,013 | B1 | | 4/2003 | Ziff et al. |
| 6,587,787 | B1 | | 7/2003 | Yokota |

(56) References Cited

U.S. PATENT DOCUMENTS

| | | | |
|---|---|---|---|
| 6,597,983 B2 | 7/2003 | Hancock | |
| 6,600,418 B2 * | 7/2003 | Francis et al. | 340/572.1 |
| 6,611,751 B2 | 8/2003 | Warren | |
| 6,615,039 B1 | 9/2003 | Eldering | |
| 6,622,086 B2 | 9/2003 | Polidi | |
| 6,629,136 B1 | 9/2003 | Naidoo | |
| 6,633,311 B1 | 10/2003 | Douvikas et al. | |
| 6,636,803 B1 | 10/2003 | Hartz, Jr. et al. | |
| 6,640,187 B1 | 10/2003 | Chenault et al. | |
| 6,643,663 B1 | 11/2003 | Dabney et al. | |
| 6,646,568 B2 * | 11/2003 | MacPhail et al. | 340/932.2 |
| 6,647,383 B1 | 11/2003 | August et al. | |
| 6,654,800 B1 | 11/2003 | Rieger, III | |
| 6,658,410 B1 | 12/2003 | Sakamaki et al. | |
| 6,662,016 B1 | 12/2003 | Buckham et al. | |
| 6,672,601 B1 * | 1/2004 | Hofheins et al. | 280/47.34 |
| 6,677,894 B2 | 1/2004 | Sheynblat et al. | |
| 6,684,196 B1 | 1/2004 | Mini et al. | |
| 6,687,878 B1 | 2/2004 | Eintracht et al. | |
| 6,691,105 B1 | 2/2004 | Virdy | |
| 6,691,114 B1 | 2/2004 | Nakamura | |
| 6,711,414 B1 | 3/2004 | Lightman et al. | |
| 6,716,101 B1 | 4/2004 | Meadows et al. | |
| 6,719,570 B2 | 4/2004 | Tsuchioka | |
| 6,721,748 B1 | 4/2004 | Knight et al. | |
| 6,728,635 B2 | 4/2004 | Hamada et al. | |
| 6,745,196 B1 | 6/2004 | Colyer et al. | |
| 6,750,881 B1 | 6/2004 | Appelman | |
| 6,798,407 B1 | 9/2004 | Benman | |
| 6,816,850 B2 | 11/2004 | Culliss | |
| 6,819,267 B1 | 11/2004 | Edmark et al. | |
| 6,834,229 B2 | 12/2004 | Rafiah et al. | |
| 6,847,823 B2 | 1/2005 | Lehikoinen et al. | |
| 6,871,140 B1 | 3/2005 | Florance et al. | |
| 6,882,307 B1 | 4/2005 | Gifford | |
| 6,883,748 B2 | 4/2005 | Yoeli | |
| 6,889,213 B1 | 5/2005 | Douvikas et al. | |
| 6,907,405 B2 | 6/2005 | Brett | |
| 6,918,576 B2 | 7/2005 | Finkbeiner | |
| 6,926,233 B1 | 8/2005 | Corcoran, III | |
| 6,931,419 B1 * | 8/2005 | Lindquist | 707/792 |
| 6,950,791 B1 | 9/2005 | Bray et al. | |
| 6,963,879 B2 | 11/2005 | Colver et al. | |
| 6,968,179 B1 | 11/2005 | De Vries | |
| 6,968,513 B1 | 11/2005 | Rinebold et al. | |
| 6,974,123 B2 | 12/2005 | Latvys | |
| 6,976,031 B1 | 12/2005 | Toupal et al. | |
| 6,978,284 B2 | 12/2005 | McBrearty et al. | |
| 6,983,139 B2 | 1/2006 | Dowling et al. | |
| 6,987,976 B2 | 1/2006 | Kohar et al. | |
| 7,006,881 B1 | 2/2006 | Hoffberg et al. | |
| 7,013,292 B1 | 3/2006 | Hsu et al. | |
| 7,024,397 B1 | 4/2006 | Donahue | |
| 7,024,455 B2 | 4/2006 | Yokobori et al. | |
| 7,038,681 B2 | 5/2006 | Scott et al. | |
| 7,047,202 B2 | 5/2006 | Jaipuria et al. | |
| 7,050,909 B2 * | 5/2006 | Nichols et al. | 701/301 |
| 7,068,309 B2 | 6/2006 | Toyama et al. | |
| 7,069,308 B2 | 6/2006 | Abrams | |
| 7,072,849 B1 | 7/2006 | Filepp et al. | |
| 7,076,409 B2 | 7/2006 | Agrawala et al. | |
| 7,076,741 B2 | 7/2006 | Miyaki | |
| 7,079,943 B2 * | 7/2006 | Flann et al. | 701/423 |
| 7,080,019 B1 | 7/2006 | Hurzeler | |
| 7,080,096 B1 | 7/2006 | Imamura | |
| 7,085,650 B2 | 8/2006 | Anderson | |
| 7,099,745 B2 | 8/2006 | Ebert | |
| 7,099,862 B2 | 8/2006 | Fitzpatrick et al. | |
| 7,117,254 B2 | 10/2006 | Lunt et al. | |
| 7,130,702 B2 * | 10/2006 | Morrell | 700/75 |
| 7,136,915 B2 * | 11/2006 | Rieger, III | 709/223 |
| 7,155,336 B2 | 12/2006 | Dorfman et al. | |
| 7,158,878 B2 | 1/2007 | Rasmussen et al. | |
| 7,174,301 B2 | 2/2007 | Florance et al. | |
| 7,177,872 B2 | 2/2007 | Schwesig et al. | |
| 7,178,720 B1 | 2/2007 | Strubbe et al. | |
| 7,184,990 B2 | 2/2007 | Walker et al. | |
| 7,188,056 B2 * | 3/2007 | Kagarlis | 703/6 |
| 7,188,080 B1 | 3/2007 | Walker et al. | |
| 7,188,153 B2 | 3/2007 | Lunt et al. | |
| 7,209,803 B2 * | 4/2007 | Okamoto et al. | 700/245 |
| 7,218,993 B2 * | 5/2007 | Yasukawa et al. | 700/245 |
| 7,228,232 B2 | 6/2007 | Bodin et al. | |
| 7,233,942 B2 | 6/2007 | Nye | |
| 7,249,123 B2 | 7/2007 | Elder et al. | |
| 7,249,732 B2 | 7/2007 | Sanders, Jr. et al. | |
| 7,251,647 B2 | 7/2007 | Hoblit | |
| 7,254,559 B2 | 8/2007 | Florance et al. | |
| 7,269,590 B2 | 9/2007 | Hull et al. | |
| 7,293,019 B2 | 11/2007 | Dumais et al. | |
| 7,296,026 B2 | 11/2007 | Patrick et al. | |
| 7,306,186 B2 | 12/2007 | Kusic | |
| 7,324,810 B2 | 1/2008 | Nave et al. | |
| 7,343,564 B2 | 3/2008 | Othmer | |
| 7,353,034 B2 | 4/2008 | Haney | |
| 7,353,114 B1 | 4/2008 | Rohlf et al. | |
| 7,353,199 B1 | 4/2008 | DiStefano, III | |
| 7,359,871 B1 | 4/2008 | Paasche et al. | |
| 7,359,894 B1 | 4/2008 | Liebman et al. | |
| 7,373,244 B2 | 5/2008 | Kreft | |
| 7,375,618 B2 * | 5/2008 | Quintos | 340/426.11 |
| 7,383,251 B2 | 6/2008 | Might | |
| 7,386,542 B2 | 6/2008 | Maybury et al. | |
| 7,389,210 B2 * | 6/2008 | Kagarlis | 703/2 |
| 7,424,438 B2 | 9/2008 | Vianello | |
| 7,424,541 B2 | 9/2008 | Bourne | |
| 7,426,970 B2 * | 9/2008 | Olsen | 180/65.1 |
| 7,433,832 B1 | 10/2008 | Bezos et al. | |
| 7,433,868 B1 | 10/2008 | Satomi et al. | |
| 7,437,368 B1 | 10/2008 | Kolluri et al. | |
| 7,441,031 B2 | 10/2008 | Shrinivasan et al. | |
| 7,444,241 B2 * | 10/2008 | Grimm | 701/301 |
| 7,447,509 B2 | 11/2008 | Cossins et al. | |
| 7,447,685 B2 | 11/2008 | Nye | |
| 7,447,771 B1 | 11/2008 | Taylor | |
| 7,454,524 B2 | 11/2008 | Jeong | |
| 7,475,953 B2 * | 1/2009 | Osborn et al. | 303/125 |
| 7,477,285 B1 | 1/2009 | Johnson | |
| 7,478,324 B1 | 1/2009 | Ohtsu | |
| 7,480,867 B1 | 1/2009 | Racine et al. | |
| 7,483,960 B2 | 1/2009 | Kyusojin | |
| 7,487,114 B2 | 2/2009 | Florance et al. | |
| 7,496,603 B2 | 2/2009 | Deguchi et al. | |
| 7,500,258 B1 | 3/2009 | Eldering | |
| 7,505,919 B2 | 3/2009 | Richardson | |
| 7,505,929 B2 | 3/2009 | Angert et al. | |
| 7,520,466 B2 | 4/2009 | Bostan | |
| 7,525,276 B2 * | 4/2009 | Eaton | 318/581 |
| 7,539,557 B2 | 5/2009 | Yamauchi | |
| 7,561,169 B2 | 7/2009 | Carroll | |
| 7,562,023 B2 | 7/2009 | Yamamoto | |
| 7,570,597 B2 | 8/2009 | Remboski et al. | |
| 7,580,862 B1 | 8/2009 | Montelo et al. | |
| 7,581,702 B2 | 9/2009 | Olson et al. | |
| 7,587,276 B2 | 9/2009 | Gold et al. | |
| 7,596,511 B2 | 9/2009 | Hall et al. | |
| 7,599,795 B1 | 10/2009 | Blumberg et al. | |
| 7,599,935 B2 | 10/2009 | La Rotonda et al. | |
| 7,617,048 B2 * | 11/2009 | Simon et al. | 701/301 |
| 7,636,687 B2 | 12/2009 | Foster et al. | |
| 7,640,204 B2 | 12/2009 | Florance et al. | |
| 7,658,346 B2 | 2/2010 | Goossen | |
| 7,668,405 B2 | 2/2010 | Gallagher | |
| 7,669,123 B2 | 2/2010 | Zuckerberg et al. | |
| 7,680,673 B2 | 3/2010 | Wheeler | |
| 7,680,859 B2 | 3/2010 | Schiller | |
| 7,693,953 B2 | 4/2010 | Middleton et al. | |
| 7,702,545 B1 | 4/2010 | Compton et al. | |
| 7,725,492 B2 | 5/2010 | Sittig et al. | |
| 7,734,254 B2 | 6/2010 | Frost et al. | |
| 7,751,971 B2 | 7/2010 | Chang et al. | |
| 7,761,789 B2 | 7/2010 | Erol et al. | |
| 7,792,815 B2 | 9/2010 | Aravamudan et al. | |
| 7,797,256 B2 | 9/2010 | Zuckerberg et al. | |

(56) References Cited

U.S. PATENT DOCUMENTS

| | | |
|---|---|---|
| 7,801,542 B1 | 9/2010 | Stewart |
| 7,802,290 B1 | 9/2010 | Bansal et al. |
| 7,808,378 B2 | 10/2010 | Hayden |
| 7,809,709 B1 | 10/2010 | Harrison, Jr. |
| 7,809,805 B2 | 10/2010 | Stremel et al. |
| 7,810,037 B1 | 10/2010 | Edwards et al. |
| 7,812,717 B1 | 10/2010 | Cona et al. |
| 7,823,073 B2 | 10/2010 | Holmes et al. |
| 7,827,052 B2 | 11/2010 | Scott et al. |
| 7,827,120 B1 | 11/2010 | Evans et al. |
| 7,827,208 B2 | 11/2010 | Bosworth et al. |
| 7,827,265 B2 | 11/2010 | Cheever et al. |
| 7,831,917 B1 | 11/2010 | Karam |
| 7,840,224 B2 | 11/2010 | Vengroff et al. |
| 7,840,319 B2 * | 11/2010 | Zhong ............... 701/25 |
| 7,840,558 B2 | 11/2010 | Wiseman et al. |
| 7,848,765 B2 | 12/2010 | Phillips et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,873,471 B2 * | 1/2011 | Gieseke ............... 701/416 |
| 7,881,864 B2 | 2/2011 | Smith |
| 7,886,024 B2 | 2/2011 | Kelly et al. |
| 7,894,933 B2 * | 2/2011 | Mountz et al. ............... 700/214 |
| 7,894,939 B2 * | 2/2011 | Zini et al. ............... 700/245 |
| 7,894,981 B2 * | 2/2011 | Yamane et al. ............... 701/118 |
| 7,904,366 B2 | 3/2011 | Pogust |
| 7,913,179 B2 | 3/2011 | Sheha et al. |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B1 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,980,808 B2 * | 7/2011 | Chilson et al. ............... 414/809 |
| 7,991,703 B1 | 8/2011 | Watkins |
| 7,996,109 B2 * | 8/2011 | Zini et al. ............... 700/245 |
| 7,996,270 B2 | 8/2011 | Sundaresan |
| 8,010,230 B2 * | 8/2011 | Zini et al. ............... 700/245 |
| 8,027,943 B2 | 9/2011 | Juan et al. |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,064,590 B2 | 11/2011 | Abhyanker |
| 8,065,291 B2 | 11/2011 | Knorr |
| 8,073,907 B2 | 12/2011 | Roumeliotis et al. |
| 8,095,430 B2 | 1/2012 | Abhyanker |
| 8,103,734 B2 | 1/2012 | Galli et al. |
| 8,107,879 B2 | 1/2012 | Pering et al. |
| 8,108,501 B2 | 1/2012 | Birnie et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,139,514 B2 * | 3/2012 | Weber et al. ............... 370/312 |
| 8,145,661 B1 | 3/2012 | Billman et al. |
| 8,145,703 B2 | 3/2012 | Frishert et al. |
| 8,149,113 B2 | 4/2012 | Diem |
| 8,167,234 B1 | 5/2012 | Moore |
| 8,171,128 B2 | 5/2012 | Zuckerberg et al. |
| 8,190,357 B2 | 5/2012 | Abhyanker et al. |
| 8,190,476 B2 | 5/2012 | Urbanski et al. |
| 8,195,601 B2 | 6/2012 | Law et al. |
| 8,195,744 B2 | 6/2012 | Julia et al. |
| 8,204,624 B2 * | 6/2012 | Zini et al. ............... 700/245 |
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,271,057 B2 | 9/2012 | Levine et al. |
| 8,275,546 B2 | 9/2012 | Xiao et al. |
| 8,290,943 B2 | 10/2012 | Carbone et al. |
| 8,292,215 B2 | 10/2012 | Olm et al. |
| 8,296,373 B2 | 10/2012 | Bosworth et al. |
| 8,301,743 B2 | 10/2012 | Curran et al. |
| 8,315,389 B2 | 11/2012 | Qiu et al. |
| 8,326,091 B1 | 12/2012 | Jing et al. |
| 8,326,315 B2 * | 12/2012 | Phillips et al. ............... 455/456.1 |
| 8,328,130 B2 | 12/2012 | Goossen |
| 8,346,677 B1 | 1/2013 | Markarian et al. |
| 8,352,183 B2 * | 1/2013 | Thota et al. ............... 701/454 |
| 8,364,757 B2 | 1/2013 | Scott et al. |
| 8,370,003 B2 | 2/2013 | So et al. |
| 8,380,382 B2 * | 2/2013 | Sung et al. ............... 701/23 |
| 8,380,638 B1 | 2/2013 | Watkins |
| 8,391,789 B2 | 3/2013 | Palin et al. |
| 8,391,909 B2 | 3/2013 | Stewart |
| 8,401,771 B2 | 3/2013 | Krumm et al. |
| 8,402,094 B2 | 3/2013 | Bosworth et al. |
| 8,402,372 B2 | 3/2013 | Gillespie et al. |
| 8,412,576 B2 | 4/2013 | Urbanski et al. |
| 8,412,675 B2 | 4/2013 | Alvarado et al. |
| 8,422,994 B2 | 4/2013 | Rhoads et al. |
| 8,427,308 B1 | 4/2013 | Baron, Sr. et al. |
| 8,428,565 B2 | 4/2013 | Middleton et al. |
| 8,433,609 B2 | 4/2013 | Abhyanker |
| 8,433,650 B1 | 4/2013 | Thomas |
| 8,438,156 B2 | 5/2013 | Redstone et al. |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,295 B1 | 6/2013 | Caralis et al. |
| 8,463,764 B2 | 6/2013 | Fujioka et al. |
| 8,473,199 B2 | 6/2013 | Blumberg et al. |
| 8,493,849 B2 | 7/2013 | Fuste Vilella et al. |
| 8,504,284 B2 * | 8/2013 | Brulle-Drews et al. ............... 701/409 |
| 8,504,512 B2 | 8/2013 | Herzog et al. |
| 8,510,268 B1 | 8/2013 | Laforge et al. |
| 8,521,656 B2 * | 8/2013 | Zimberoff et al. ............... 705/330 |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,560,515 B2 | 10/2013 | Kimchi et al. |
| 8,584,091 B2 | 11/2013 | Champion et al. |
| 8,589,330 B2 | 11/2013 | Petersen et al. |
| 8,594,715 B1 | 11/2013 | Stewart |
| 8,595,292 B2 | 11/2013 | Grayson et al. |
| 8,600,602 B1 | 12/2013 | McAndrew et al. |
| 8,615,565 B2 | 12/2013 | Randall |
| 8,620,532 B2 | 12/2013 | Curtis et al. |
| 8,620,827 B1 | 12/2013 | Watkins, III |
| 8,621,374 B2 | 12/2013 | Sheha et al. |
| 8,626,699 B2 | 1/2014 | Xie et al. |
| 8,627,506 B2 | 1/2014 | Vera et al. |
| 8,635,015 B2 | 1/2014 | Anderson |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,541 B1 | 2/2014 | Beresniewicz et al. |
| 8,660,897 B2 | 2/2014 | Abhyanker |
| 8,666,660 B2 | 3/2014 | Sartipi et al. |
| 8,671,095 B2 | 3/2014 | Gross |
| 8,671,106 B1 | 3/2014 | Lee et al. |
| 8,683,342 B2 | 3/2014 | Van Riel |
| 8,688,594 B2 | 4/2014 | Thomas et al. |
| 8,694,605 B1 | 4/2014 | Burrell et al. |
| 8,695,919 B2 | 4/2014 | Shachor et al. |
| 8,706,297 B2 | 4/2014 | Letsky |
| 8,712,441 B2 | 4/2014 | Haney |
| 8,713,055 B2 | 4/2014 | Callahan et al. |
| 8,713,143 B2 | 4/2014 | Centola et al. |
| 8,718,910 B2 | 5/2014 | Guéziec |
| 8,723,679 B2 | 5/2014 | Whisenant |
| 8,732,091 B1 | 5/2014 | Abhyanker |

(56) References Cited

U.S. PATENT DOCUMENTS

| | | |
|---|---|---|
| 8,732,155 B2 | 5/2014 | Vegnaduzzo et al. |
| 8,732,219 B1 | 5/2014 | Ferries et al. |
| 8,732,846 B2 | 5/2014 | D'Angelo et al. |
| 8,738,545 B2 | 5/2014 | Abhyanker |
| 8,775,405 B2 | 7/2014 | Gross |
| D710,454 S | 8/2014 | Barajas et al. |
| 8,794,566 B2 | 8/2014 | Hutson |
| 8,799,253 B2 | 8/2014 | Valliani et al. |
| 8,825,226 B1 | 9/2014 | Worley, III et al. |
| 8,832,556 B2 | 9/2014 | Steinberg |
| 2001/0005829 A1 | 6/2001 | Raveis |
| 2001/0016795 A1* | 8/2001 | Bellinger .................. 701/53 |
| 2001/0020955 A1 | 9/2001 | Nakagawa et al. |
| 2001/0029426 A1 | 10/2001 | Hancock et al. |
| 2001/0029501 A1 | 10/2001 | Yokobori et al. |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046131 A1 | 4/2002 | Boone et al. |
| 2002/0046243 A1 | 4/2002 | Morris et al. |
| 2002/0049617 A1 | 4/2002 | Lencki et al. |
| 2002/0059201 A1 | 5/2002 | Work |
| 2002/0059379 A1 | 5/2002 | Harvey et al. |
| 2002/0065691 A1 | 5/2002 | Twig et al. |
| 2002/0065739 A1 | 5/2002 | Florance et al. |
| 2002/0070967 A1 | 6/2002 | Tanner et al. |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger |
| 2002/0111988 A1* | 8/2002 | Sato .................. B25J 9/1676 709/202 |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2002/0188522 A1* | 12/2002 | McCall et al. .................. 705/26 |
| 2003/0004802 A1 | 1/2003 | Callegari |
| 2003/0005035 A1 | 1/2003 | Rodgers |
| 2003/0018521 A1 | 1/2003 | Kraft et al. |
| 2003/0023489 A1 | 1/2003 | McGuire et al. |
| 2003/0023586 A1* | 1/2003 | Knorr .................. 707/3 |
| 2003/0033176 A1 | 2/2003 | Hancock |
| 2003/0036958 A1 | 2/2003 | Warmus et al. |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |
| 2003/0064705 A1 | 4/2003 | Desiderio |
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0177019 A1 | 9/2003 | Santos et al. |
| 2003/0177192 A1 | 9/2003 | Umeki et al. |
| 2003/0182222 A1 | 9/2003 | Rotman et al. |
| 2003/0200192 A1 | 10/2003 | Bell et al. |
| 2003/0218253 A1 | 11/2003 | Avanzino et al. |
| 2003/0220807 A1 | 11/2003 | Hoffman et al. |
| 2003/0222918 A1 | 12/2003 | Coulthard |
| 2003/0225632 A1 | 12/2003 | Tong et al. |
| 2003/0225833 A1 | 12/2003 | Pilat et al. |
| 2004/0002871 A1 | 1/2004 | Geranio |
| 2004/0003283 A1 | 1/2004 | Goodman et al. |
| 2004/0021584 A1 | 2/2004 | Hartz, Jr. et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0039581 A1 | 2/2004 | Wheeler |
| 2004/0054428 A1 | 3/2004 | Sheha et al. |
| 2004/0056762 A1* | 3/2004 | Rogers .................. 340/425.5 |
| 2004/0088177 A1 | 5/2004 | Travis et al. |
| 2004/0109012 A1 | 6/2004 | Kraus et al. |
| 2004/0111302 A1 | 6/2004 | Falk et al. |
| 2004/0122570 A1* | 6/2004 | Sonoyama et al. ............. 701/23 |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |
| 2004/0148275 A1 | 7/2004 | Achlioptas |
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0186766 A1 | 9/2004 | Fellenstein et al. |
| 2004/0210661 A1 | 10/2004 | Thompson |
| 2004/0215517 A1 | 10/2004 | Chen et al. |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0230562 A1 | 11/2004 | Wysoczanski et al. |
| 2004/0236771 A1 | 11/2004 | Colver et al. |
| 2004/0243478 A1 | 12/2004 | Walker et al. |
| 2004/0257340 A1 | 12/2004 | Jawerth |
| 2004/0260604 A1 | 12/2004 | Bedingfield, Sr. |
| 2004/0260677 A1 | 12/2004 | Malpani et al. |
| 2004/0267625 A1 | 12/2004 | Feng et al. |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0034075 A1 | 2/2005 | Riegelman et al. |
| 2005/0044061 A1 | 2/2005 | Klemow |
| 2005/0049971 A1 | 3/2005 | Bettinger |
| 2005/0055353 A1 | 3/2005 | Marx et al. |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0094851 A1 | 5/2005 | Bodin et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |

(56) References Cited

U.S. PATENT DOCUMENTS

| | | |
|---|---|---|
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0149432 A1 | 7/2005 | Galey |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1 | 9/2005 | Smith |
| 2005/0197846 A1 | 9/2005 | Pezaris et al. |
| 2005/0197950 A1 | 9/2005 | Moya et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209776 A1* | 9/2005 | Ogino .......................... 701/211 |
| 2005/0209781 A1 | 9/2005 | Anderson |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0240580 A1 | 10/2005 | Zamir et al. |
| 2005/0251331 A1 | 11/2005 | Kreft |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1 | 12/2005 | Eraker et al. |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1 | 2/2006 | Johnson |
| 2006/0023881 A1 | 2/2006 | Akiyama et al. |
| 2006/0025883 A1* | 2/2006 | Reeves .......................... 700/216 |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1* | 3/2006 | Steenstra et al. .............. 709/229 |
| 2006/0048059 A1 | 3/2006 | Etkin |
| 2006/0052091 A1 | 3/2006 | Onyon et al. |
| 2006/0058921 A1* | 3/2006 | Okamoto ...................... 700/255 |
| 2006/0058952 A1 | 3/2006 | Cooper et al. |
| 2006/0059023 A1 | 3/2006 | Mashinsky |
| 2006/0064431 A1 | 3/2006 | Kishore et al. |
| 2006/0074780 A1 | 4/2006 | Taylor et al. |
| 2006/0075335 A1 | 4/2006 | Gloor |
| 2006/0080613 A1 | 4/2006 | Savant |
| 2006/0085419 A1 | 4/2006 | Rosen |
| 2006/0088145 A1 | 4/2006 | Reed et al. |
| 2006/0089882 A1 | 4/2006 | Shimansky |
| 2006/0100892 A1 | 5/2006 | Ellanti |
| 2006/0111811 A1* | 5/2006 | Okamoto ................ B25J 5/007 700/214 |
| 2006/0113425 A1 | 6/2006 | Rader |
| 2006/0123053 A1 | 6/2006 | Scannell |
| 2006/0125616 A1* | 6/2006 | Song .......................... 340/463 |
| 2006/0136127 A1 | 6/2006 | Coch et al. |
| 2006/0136419 A1 | 6/2006 | Brydon et al. |
| 2006/0143066 A1 | 6/2006 | Calabria |
| 2006/0143067 A1 | 6/2006 | Calabria |
| 2006/0143083 A1 | 6/2006 | Wedeen |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1 | 9/2006 | Arutunian et al. |
| 2006/0212407 A1* | 9/2006 | Lyon .............................. 705/71 |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0223518 A1 | 10/2006 | Haney |
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1 | 10/2006 | Kimchi et al. |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293976 A1 | 12/2006 | Nam |
| 2006/0294011 A1 | 12/2006 | Smith |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0005750 A1 | 1/2007 | Lunt et al. |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0027920 A1 | 2/2007 | Alvarado et al. |
| 2007/0032942 A1 | 2/2007 | Thota |
| 2007/0033064 A1 | 2/2007 | Abrahamsohn |
| 2007/0033182 A1 | 2/2007 | Knorr |
| 2007/0038646 A1 | 2/2007 | Thota |
| 2007/0043947 A1 | 2/2007 | Mizikovsky et al. |
| 2007/0050360 A1 | 3/2007 | Hull et al. |
| 2007/0061128 A1 | 3/2007 | Odom et al. |
| 2007/0061405 A1 | 3/2007 | Keohane et al. |
| 2007/0067219 A1 | 3/2007 | Altberg et al. |
| 2007/0078747 A1 | 4/2007 | Baack |
| 2007/0078772 A1 | 4/2007 | Dadd |
| 2007/0099609 A1 | 5/2007 | Cai |
| 2007/0105536 A1 | 5/2007 | Tingo |
| 2007/0106627 A1 | 5/2007 | Srivastava et al. |
| 2007/0112461 A1* | 5/2007 | Zini et al. ...................... 700/245 |
| 2007/0112645 A1 | 5/2007 | Traynor et al. |
| 2007/0112729 A1 | 5/2007 | Wiseman et al. |
| 2007/0118430 A1 | 5/2007 | Wiseman et al. |
| 2007/0118525 A1 | 5/2007 | Svendsen |
| 2007/0150375 A1 | 6/2007 | Yang |
| 2007/0150603 A1 | 6/2007 | Crull et al. |
| 2007/0156429 A1 | 7/2007 | Godar |
| 2007/0159651 A1 | 7/2007 | Disario et al. |
| 2007/0162432 A1 | 7/2007 | Armstrong et al. |
| 2007/0162458 A1 | 7/2007 | Fasciano |
| 2007/0162547 A1 | 7/2007 | Ross |
| 2007/0162942 A1 | 7/2007 | Hamynen et al. |
| 2007/0167204 A1 | 7/2007 | Lyle et al. |
| 2007/0168852 A1 | 7/2007 | Erol et al. |
| 2007/0168888 A1 | 7/2007 | Jawerth |
| 2007/0174389 A1 | 7/2007 | Armstrong et al. |

(56) References Cited

U.S. PATENT DOCUMENTS

| | | |
|---|---|---|
| 2007/0179905 A1 | 8/2007 | Buch et al. |
| 2007/0185906 A1 | 8/2007 | Humphries et al. |
| 2007/0192299 A1 | 8/2007 | Zuckerberg et al. |
| 2007/0203644 A1 | 8/2007 | Thota et al. |
| 2007/0203820 A1 | 8/2007 | Rashid |
| 2007/0207755 A1 | 9/2007 | Julia et al. |
| 2007/0208613 A1 | 9/2007 | Backer |
| 2007/0208802 A1 | 9/2007 | Barman et al. |
| 2007/0208916 A1 | 9/2007 | Tomita |
| 2007/0214141 A1 | 9/2007 | Sittig et al. |
| 2007/0218900 A1 | 9/2007 | Abhyanker |
| 2007/0219659 A1 | 9/2007 | Abhyanker et al. |
| 2007/0219712 A1 | 9/2007 | Abhyanker |
| 2007/0220174 A1 | 9/2007 | Abhyanker |
| 2007/0226314 A1 | 9/2007 | Eick et al. |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0233582 A1 | 10/2007 | Abhyanker |
| 2007/0239352 A1 | 10/2007 | Thota et al. |
| 2007/0239552 A1 | 10/2007 | Sundaresan |
| 2007/0239648 A1 | 10/2007 | Thota |
| 2007/0245002 A1 | 10/2007 | Nguyen et al. |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0258642 A1 | 11/2007 | Thota |
| 2007/0259654 A1 | 11/2007 | Oijer |
| 2007/0260599 A1 | 11/2007 | McGuire et al. |
| 2007/0261071 A1 | 11/2007 | Lunt et al. |
| 2007/0266003 A1 | 11/2007 | Wong et al. |
| 2007/0266097 A1 | 11/2007 | Harik et al. |
| 2007/0266118 A1 | 11/2007 | Wilkins |
| 2007/0268310 A1 | 11/2007 | Dolph et al. |
| 2007/0270163 A1 | 11/2007 | Anupam et al. |
| 2007/0271367 A1 | 11/2007 | Yardeni et al. |
| 2007/0273558 A1 | 11/2007 | Smith et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0282987 A1 | 12/2007 | Fischer et al. |
| 2007/0288164 A1 | 12/2007 | Gordon et al. |
| 2007/0288311 A1 | 12/2007 | Underhill |
| 2007/0288621 A1 | 12/2007 | Gundu et al. |
| 2007/0294357 A1 | 12/2007 | Antoine |
| 2008/0005076 A1 | 1/2008 | Payne et al. |
| 2008/0005231 A1 | 1/2008 | Kelley et al. |
| 2008/0010343 A1 | 1/2008 | Escaffi et al. |
| 2008/0010365 A1 | 1/2008 | Schneider |
| 2008/0016051 A1 | 1/2008 | Schiller |
| 2008/0020814 A1 | 1/2008 | Kernene |
| 2008/0032666 A1 | 2/2008 | Hughes et al. |
| 2008/0032703 A1 | 2/2008 | Krumm et al. |
| 2008/0033641 A1 | 2/2008 | Medalia |
| 2008/0033652 A1 | 2/2008 | Hensley et al. |
| 2008/0033739 A1 | 2/2008 | Zuckerberg et al. |
| 2008/0033776 A1 | 2/2008 | Marchese |
| 2008/0039974 A1 | 2/2008 | Sandin et al. |
| 2008/0040370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0043020 A1 | 2/2008 | Snow et al. |
| 2008/0043037 A1 | 2/2008 | Carroll |
| 2008/0046976 A1 | 2/2008 | Zuckerberg |
| 2008/0048065 A1 | 2/2008 | Kuntz |
| 2008/0051932 A1 | 2/2008 | Jermyn et al. |
| 2008/0059992 A1 | 3/2008 | Amidon et al. |
| 2008/0065321 A1 | 3/2008 | Dacosta |
| 2008/0065611 A1 | 3/2008 | Hepworth et al. |
| 2008/0070593 A1 | 3/2008 | Altman et al. |
| 2008/0070697 A1 | 3/2008 | Robinson et al. |
| 2008/0071929 A1 | 3/2008 | Motte et al. |
| 2008/0077464 A1* | 3/2008 | Gottlieb et al. .................. 705/8 |
| 2008/0077581 A1 | 3/2008 | Drayer et al. |
| 2008/0077642 A1 | 3/2008 | Carbone et al. |
| 2008/0077708 A1 | 3/2008 | Scott et al. |
| 2008/0086368 A1 | 4/2008 | Bauman et al. |
| 2008/0086458 A1 | 4/2008 | Robinson et al. |
| 2008/0091461 A1 | 4/2008 | Evans et al. |
| 2008/0091723 A1 | 4/2008 | Zuckerberg et al. |
| 2008/0091786 A1* | 4/2008 | Jhanji .......................... 709/206 |
| 2008/0097999 A1* | 4/2008 | Horan .......................... 707/10 |
| 2008/0098090 A1 | 4/2008 | Geraci et al. |
| 2008/0098313 A1 | 4/2008 | Pollack |
| 2008/0103959 A1 | 5/2008 | Carroll et al. |
| 2008/0104227 A1 | 5/2008 | Birnie et al. |
| 2008/0109718 A1 | 5/2008 | Narayanaswami |
| 2008/0115082 A1 | 5/2008 | Simmons et al. |
| 2008/0115226 A1 | 5/2008 | Welingkar et al. |
| 2008/0117928 A1 | 5/2008 | Abhyanker |
| 2008/0120308 A1* | 5/2008 | Martinez et al. .............. 707/100 |
| 2008/0125969 A1 | 5/2008 | Chen et al. |
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington et al. |
| 2008/0134035 A1 | 6/2008 | Pennington et al. |
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162027 A1* | 7/2008 | Murphy et al. ................ 701/117 |
| 2008/0162211 A1 | 7/2008 | Addington |
| 2008/0162260 A1 | 7/2008 | Rohan et al. |
| 2008/0167771 A1* | 7/2008 | Whittaker et al. ............... 701/26 |
| 2008/0168068 A1 | 7/2008 | Hutheesing |
| 2008/0168175 A1 | 7/2008 | Tran |
| 2008/0172173 A1 | 7/2008 | Chang et al. |
| 2008/0172244 A1 | 7/2008 | Coupal et al. |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195483 A1 | 8/2008 | Moore |
| 2008/0201156 A1 | 8/2008 | Abhyanker |
| 2008/0208956 A1 | 8/2008 | Spiridellis et al. |
| 2008/0208969 A1 | 8/2008 | Van Riel |
| 2008/0215994 A1 | 9/2008 | Harrison et al. |
| 2008/0221846 A1 | 9/2008 | Aggarwal et al. |
| 2008/0221984 A1 | 9/2008 | Abhyanker |
| 2008/0222140 A1 | 9/2008 | Lagad et al. |
| 2008/0222308 A1 | 9/2008 | Abhyanker |
| 2008/0222719 A1 | 9/2008 | Abhyanker et al. |
| 2008/0228775 A1 | 9/2008 | Abhyanker et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0240397 A1 | 10/2008 | Abhyanker |
| 2008/0242317 A1 | 10/2008 | Abhyanker |
| 2008/0243378 A1* | 10/2008 | Zavoli .......................... 701/209 |
| 2008/0243598 A1 | 10/2008 | Abhyanker |
| 2008/0243667 A1 | 10/2008 | Lecomte |
| 2008/0243830 A1 | 10/2008 | Abhyanker |
| 2008/0250025 A1 | 10/2008 | Abhyanker |
| 2008/0255759 A1 | 10/2008 | Abhyanker |
| 2008/0256230 A1 | 10/2008 | Handley |
| 2008/0263460 A1 | 10/2008 | Altberg et al. |
| 2008/0269992 A1* | 10/2008 | Kawasaki ....................... 701/45 |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman et al. |
| 2008/0294747 A1 | 11/2008 | Abhyanker |
| 2008/0300979 A1 | 12/2008 | Abhyanker |
| 2008/0301565 A1 | 12/2008 | Abhyanker |

(56) References Cited

U.S. PATENT DOCUMENTS

| | | |
|---|---|---|
| 2008/0306754 A1 | 12/2008 | Abhyanker |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0316021 A1 | 12/2008 | Manz et al. |
| 2008/0319778 A1 | 12/2008 | Abhyanker |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0018850 A1* | 1/2009 | Abhyanker ............... 705/1 |
| 2009/0018925 A1 | 1/2009 | Abhyanker |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0024740 A1 | 1/2009 | Abhyanker |
| 2009/0029672 A1 | 1/2009 | Manz |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043650 A1 | 2/2009 | Abhyanker et al. |
| 2009/0044254 A1 | 2/2009 | Tian |
| 2009/0048922 A1 | 2/2009 | Morgenstern et al. |
| 2009/0049018 A1 | 2/2009 | Gross |
| 2009/0049037 A1 | 2/2009 | Gross |
| 2009/0049070 A1 | 2/2009 | Steinberg |
| 2009/0049127 A1 | 2/2009 | Juan et al. |
| 2009/0061883 A1 | 3/2009 | Abhyanker |
| 2009/0063252 A1 | 3/2009 | Abhyanker |
| 2009/0063467 A1 | 3/2009 | Abhyanker |
| 2009/0063500 A1 | 3/2009 | Zhai et al. |
| 2009/0064011 A1 | 3/2009 | Abhyanker |
| 2009/0064144 A1 | 3/2009 | Abhyanker |
| 2009/0069034 A1 | 3/2009 | Abhyanker |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0102644 A1 | 4/2009 | Hayden |
| 2009/0119275 A1 | 5/2009 | Chen et al. |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0177628 A1 | 7/2009 | Yanagisawa et al. |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0271524 A1 | 10/2009 | Davi et al. |
| 2009/0282353 A1 | 11/2009 | Halbherr et al. |
| 2009/0284530 A1 | 11/2009 | Lester et al. |
| 2009/0287682 A1 | 11/2009 | Fujioka et al. |
| 2009/0299551 A1 | 12/2009 | So et al. |
| 2010/0011081 A1 | 1/2010 | Crowley et al. |
| 2010/0023388 A1 | 1/2010 | Blumberg et al. |
| 2010/0024045 A1 | 1/2010 | Sastry et al. |
| 2010/0051740 A1 | 3/2010 | Yoeli |
| 2010/0057555 A1 | 3/2010 | Butterfield et al. |
| 2010/0064007 A1 | 3/2010 | Randall |
| 2010/0070075 A1* | 3/2010 | Chirnomas ............... 700/242 |
| 2010/0076966 A1 | 3/2010 | Strutton et al. |
| 2010/0077316 A1 | 3/2010 | Omansky et al. |
| 2010/0079338 A1 | 4/2010 | Wooden et al. |
| 2010/0082683 A1 | 4/2010 | Law et al. |
| 2010/0083125 A1* | 4/2010 | Zafar et al. ............... 715/739 |
| 2010/0088015 A1 | 4/2010 | Lee |
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0108801 A1 | 5/2010 | Olm et al. |
| 2010/0118025 A1 | 5/2010 | Smith et al. |
| 2010/0120422 A1 | 5/2010 | Cheung et al. |
| 2010/0131589 A1* | 5/2010 | Lawyer et al. ............... 709/203 |
| 2010/0138259 A1 | 6/2010 | Delk |
| 2010/0138318 A1 | 6/2010 | Chun |
| 2010/0191798 A1 | 7/2010 | Seefeld et al. |
| 2010/0198684 A1 | 8/2010 | Eraker et al. |
| 2010/0214250 A1 | 8/2010 | Gillespie et al. |
| 2010/0231383 A1 | 9/2010 | Levine et al. |
| 2010/0243794 A1 | 9/2010 | Jermyn |
| 2010/0255899 A1 | 10/2010 | Paulsen |
| 2010/0275033 A1 | 10/2010 | Gillespie et al. |
| 2010/0306016 A1 | 12/2010 | Solaro et al. |
| 2011/0001020 A1 | 1/2011 | Forgac |
| 2011/0015954 A1 | 1/2011 | Ward |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0066588 A1 | 3/2011 | Xie et al. |
| 2011/0066648 A1 | 3/2011 | Abhyanker et al. |
| 2011/0078012 A1 | 3/2011 | Adamec |
| 2011/0078270 A1 | 3/2011 | Galli et al. |
| 2011/0082747 A1 | 4/2011 | Khan et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0099142 A1 | 4/2011 | Karjalainen et al. |
| 2011/0106658 A1 | 5/2011 | Britt |
| 2011/0112976 A1 | 5/2011 | Ryan et al. |
| 2011/0128144 A1 | 6/2011 | Baron, Sr. et al. |
| 2011/0131172 A1 | 6/2011 | Herzog et al. |
| 2011/0151898 A1 | 6/2011 | Chandra et al. |
| 2011/0163160 A1* | 7/2011 | Zini et al. ............... 235/385 |
| 2011/0174920 A1 | 7/2011 | Yoeli |
| 2011/0181470 A1 | 7/2011 | Qiu et al. |
| 2011/0184643 A1 | 7/2011 | Abhyanker |
| 2011/0202426 A1 | 8/2011 | Cretney et al. |
| 2011/0219318 A1 | 9/2011 | Abhyanker |
| 2011/0231268 A1 | 9/2011 | Ungos |
| 2011/0246258 A1 | 10/2011 | Cragun et al. |
| 2011/0256895 A1 | 10/2011 | Palin et al. |
| 2011/0258028 A1 | 10/2011 | Satyavolu et al. |
| 2011/0264692 A1 | 10/2011 | Kardell |
| 2011/0291851 A1 | 12/2011 | Whisenant |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Guéziec |
| 2012/0126974 A1* | 5/2012 | Phillips et al. ............... 340/539.13 |
| 2012/0138732 A1 | 6/2012 | Olm et al. |
| 2012/0151569 A1* | 6/2012 | Farsedakis ............... 726/8 |
| 2012/0163206 A1 | 6/2012 | Leung et al. |
| 2012/0166935 A1 | 6/2012 | Abhyanker |
| 2012/0179552 A1* | 7/2012 | Tishkevich ............... 705/14.66 |
| 2012/0191606 A1 | 7/2012 | Milne |
| 2012/0191797 A1* | 7/2012 | Masonis et al. ............... 709/206 |
| 2012/0209775 A1 | 8/2012 | Milne |
| 2012/0221470 A1* | 8/2012 | Lyon ............... 705/44 |
| 2012/0224076 A1 | 9/2012 | Niedermeyer et al. |
| 2012/0232958 A1 | 9/2012 | Silbert |
| 2012/0239483 A1 | 9/2012 | Yankovich et al. |
| 2012/0239520 A1 | 9/2012 | Lee |
| 2012/0246024 A1 | 9/2012 | Thomas et al. |
| 2012/0254774 A1 | 10/2012 | Patton |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0324018 A1 | 12/2012 | Metcalf et al. |
| 2012/0331002 A1 | 12/2012 | Carrington |
| 2013/0005307 A1 | 1/2013 | Kim et al. |
| 2013/0024108 A1 | 1/2013 | Grün |
| 2013/0036458 A1* | 2/2013 | Liberman et al. ............... 726/6 |
| 2013/0041761 A1 | 2/2013 | Voda |
| 2013/0041862 A1 | 2/2013 | Yang et al. |
| 2013/0054317 A1 | 2/2013 | Abhyanker |

(56) References Cited

U.S. PATENT DOCUMENTS

| | | | |
|---|---|---|---|
| 2013/0055163 A1 | 2/2013 | Matas et al. | |
| 2013/0068876 A1 | 3/2013 | Radu | |
| 2013/0072114 A1 | 3/2013 | Abhyanker | |
| 2013/0073375 A1 | 3/2013 | Abhyanker | |
| 2013/0073474 A1 | 3/2013 | Young et al. | |
| 2013/0080217 A1 | 3/2013 | Abhyanker | |
| 2013/0103437 A1 | 4/2013 | Nelson | |
| 2013/0105635 A1 | 5/2013 | Alzu'Bi et al. | |
| 2013/0110631 A1 | 5/2013 | Mitchell et al. | |
| 2013/0151455 A1 | 6/2013 | Odom et al. | |
| 2013/0159127 A1 | 6/2013 | Myslinski | |
| 2013/0204437 A1* | 8/2013 | Koselka et al. | 700/259 |
| 2013/0254670 A1 | 9/2013 | Eraker et al. | |
| 2013/0282842 A1 | 10/2013 | Blecon et al. | |
| 2013/0297589 A1 | 11/2013 | Work et al. | |
| 2013/0301405 A1 | 11/2013 | Fuste Vilella et al. | |
| 2013/0303197 A1 | 11/2013 | Chandra et al. | |
| 2013/0317999 A1* | 11/2013 | Zimberoff et al. | 705/330 |
| 2013/0325325 A1 | 12/2013 | Djugash | |
| 2014/0032034 A1* | 1/2014 | Raptopoulos | G08G 5/0069 701/25 |
| 2014/0040179 A1 | 2/2014 | Herzog et al. | |
| 2014/0067167 A1* | 3/2014 | Levien et al. | 701/3 |
| 2014/0067704 A1 | 3/2014 | Abhyanker | |
| 2014/0067938 A1* | 3/2014 | Boldyrev et al. | 709/204 |
| 2014/0074736 A1 | 3/2014 | Carrington | |
| 2014/0076642 A1* | 3/2014 | Gettings | B25J 5/005 180/9.1 |
| 2014/0081450 A1* | 3/2014 | Kuehnrich et al. | 700/232 |
| 2014/0087780 A1 | 3/2014 | Abhyanker et al. | |
| 2014/0095293 A1 | 4/2014 | Abhyanker | |
| 2014/0100900 A1 | 4/2014 | Abhyanker | |
| 2014/0108540 A1 | 4/2014 | Crawford | |
| 2014/0108556 A1 | 4/2014 | Abhyanker | |
| 2014/0108613 A1 | 4/2014 | Randall | |
| 2014/0114866 A1 | 4/2014 | Abhyanker | |
| 2014/0115671 A1 | 4/2014 | Abhyanker | |
| 2014/0122295 A1* | 5/2014 | Calmus et al. | 705/26.35 |
| 2014/0123246 A1 | 5/2014 | Abhyanker | |
| 2014/0123247 A1 | 5/2014 | Abhyanker | |
| 2014/0130140 A1 | 5/2014 | Abhyanker | |
| 2014/0135039 A1 | 5/2014 | Sartipi et al. | |
| 2014/0136328 A1 | 5/2014 | Abhyanker | |
| 2014/0136414 A1 | 5/2014 | Abhyanker | |
| 2014/0136624 A1 | 5/2014 | Abhyanker | |
| 2014/0142848 A1 | 5/2014 | Chen et al. | |
| 2014/0143061 A1 | 5/2014 | Abhyanker | |
| 2014/0149244 A1 | 5/2014 | Abhyanker | |
| 2014/0149508 A1 | 5/2014 | Middleton et al. | |
| 2014/0164126 A1 | 6/2014 | Nicholas et al. | |
| 2014/0165091 A1 | 6/2014 | Abhyanker | |
| 2014/0172727 A1 | 6/2014 | Abhyanker et al. | |
| 2014/0204360 A1 | 7/2014 | Dowski, Jr. et al. | |
| 2014/0222298 A1* | 8/2014 | Gurin | G08G 1/20 701/49 |
| 2014/0222908 A1 | 8/2014 | Park et al. | |
| 2014/0254896 A1 | 9/2014 | Zhou et al. | |
| 2014/0277834 A1 | 9/2014 | Levien et al. | |
| 2014/0316243 A1 | 10/2014 | Niedermeyer | |
| 2014/0337160 A1* | 11/2014 | Jin et al. | 705/26.7 |

FOREIGN PATENT DOCUMENTS

| | | | |
|---|---|---|---|
| KR | 1020120121376 A | 7/2012 | |
| WO | 9808055 A1 | 2/1998 | |
| WO | 9956143 A1 | 11/1999 | |
| WO | 0054170 A2 | 9/2000 | |
| WO | 0163423 A1 | 8/2001 | |
| WO | 0201455 A2 | 1/2002 | |
| WO | 0219236 A1 | 3/2002 | |
| WO | 0241115 A2 | 5/2002 | |
| WO | 03058540 A1 | 7/2003 | |
| WO | 2004112332 A1 | 12/2004 | |
| WO | 2005103624 A2 | 11/2005 | |
| WO | 2006020471 A1 | 2/2006 | |
| WO | 2007108927 A2 | 9/2007 | |
| WO | 2007108928 A2 | 9/2007 | |
| WO | 2007113844 A1 | 10/2007 | |
| WO | 2008103149 A1 | 8/2008 | |
| WO | 2008105766 A1 | 9/2008 | |
| WO | 2008108772 A1 | 9/2008 | |
| WO | 2008118119 A1 | 10/2008 | |
| WO | 2008123851 A1 | 10/2008 | |
| WO | 2008111929 A3 | 11/2008 | |
| WO | 2009138559 A1 | 11/2009 | |
| WO | 2010103163 A1 | 9/2010 | |
| WO | 2013188762 A1 | 12/2013 | |
| WO | 2014121145 A1 | 8/2014 | |

OTHER PUBLICATIONS

Fatdoor Founder Sues Benchmark Capital, Saying it Stole His Idea for Nextdoor, All Things Digital Article, Nov. 11, 2011, by Liz Gannes (7 Pages) http://allthingsd.com/20111111/fatdoor-founder-sues-benchmark-capital-saying-it-stole-his-idea-for-nextdoor/.

Fatdoor CEO Talks About Balancing Security with Community, Wired Magazine, May 31, 2007, by Terrence Russell (2 Pages) http://www.wired.com/2007/05/fatdoor_ceo_tal/.

Fatdoor Launches Social Network for Your Neighborhood, Mashable Article, May 28, 2007, by Kristen Nicole (3 Pages) http://mashable.com/2007/05/28/fatdoor/.

Screenshots of Nextdoor website and its features—as submitted in Case5:14-cv-02335-BLF on Jul. 15, 2014 (pp. 19) http://www.nextdoor.com/.

Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.

Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.

Helping Neighbors Connect, Screenshot from FrontPorchForum website—screenshots of Aug. 21, 2014 (3 Pages) http://frontporchforum.com/.

Advocacy Strategy for the Age of Connectivity, Netcentric Advocacy: fatdoor.com (alpha), Jun. 23, 2007 (p. 1) http://www.network-centricadvocacy.net/2007/06/fatdoorcom-alph.html.

Silicon Valley venture capital and legal globalization Blog, WayBack Machine Blogs Apr. 8, 2008, by Raj V. Abhyanker (pp. 2) https://web.archive.org/web/20080706001509/http:/abhyanker.blogspot.com/.

Frontporchforum. screenshots. Jul. 19, 2006 webarchive.org 1-15 (herein FrontPorch) (pp. 15).

Fatdoor where 2.0 Launch Coverage Report, Jun. 21, 2007, by Sterling Communications (pp. 24).

Screenshot of Fatdoor on Wikipedia, Apr. 12, 2007 (p. 1).

Case No. 5-14-cv-02335-BLF Complaint *Fatdoor* v. *Nextdoor*, Northern District of California, with Exhibits A, B and C {Part 1 (pp. 258)} and Exhibits D, E, F, G and H {Part 2 (pp. 222)}, Jul. 15, 2014.

Expert Report—Forensics of Jon Berryhill, Report, *Nextdoor* v. *Abhyanker*, Aug. 8, 2014, by Berryhill Computer forensics Inc. (pp. 23).

Case No. 3:12-cv-05667-EMC Complaint *Nextdoor* v. *Abhyanker*, Northern District of California, Nov. 5, 2012 (pp. 46).

Expert Report—Patent of Jeffrey G. Sheldon, *Nextdoor* v. *Abhyanker*, Aug. 8, 2014 (pp. 7).

Exhibits of Expert Report—Patent of Jeffrey G. Sheldon, *Nextdoor* v. *Abhyanker*, with Attachments A, B, C, D and E (1/2) {Part 1 (pp. 46)} and Attachments E (2/2) and F {Part 2 (pp. 41)}.

Case No. 111-CV-212924 *Abhyanker* v. *Benchmark Capital Partners L.P.*, Superior Court of California, County of Santa Clara, Nov. 10, 2011 (pp. 78) http://www.scribd.com/doc/72441873/Stamped-COMPLAINT-Abhyanker-v-Benchmark-Capital-Et-Al-FILED-PUBLIC.

Neighbors Stop Diaper and Formula Thief in his Tracks, Nextdoor Blog, Aug. 15, 2014, by Anne Dreshfield (pp. 12) http://blog.nextdoor.com/.

(56) References Cited

OTHER PUBLICATIONS

Screenshot of Fatdoor website with its features—Aug. 21, 2014 (pp. 6) http://www.fatdoor.com/.
Screenshot of AirBnB website with its features—Aug. 21, 2014 (pp. 4) http://www.airbnb.com/.
Wikipedia entry AirBnB website—Aug. 21, 2014 (pp. 16) http://en.wikipedia.org/wiki/Airbnb.
AirBed&Breakfast for Connecting '07—Oct. 10, 2007 (1 Page) http://www.core77.com/blog/events/airbed_breakfast_for_connecting_07_7715.asp.
Case No. 5:14-cv-03844-PSG, Complaint *Fatdoor, Inc.* v. *IP Analytics LLC and Google Inc.*,Northern District of California, Aug. 25, 2014, (pp. 16).
Screenshot of Meetey on CrunchBase, Aug. 27, 2014, (pp. 3) http://www.crunchbase.com/organization/meetey.
Wikipedia entry Patch Media website—Aug. 27, 2014 (pp. 2) http://en.wikipedia.org/wiki/Patch_Media.
Wikipedia entry Yahoo! Groups website—Aug. 27, 2014 (pp. 7) http://en.wikipedia.org/wiki/Yahoo_groups.
Palo Alto News on Topix, Aug. 27, 2014, (pp. 3) http://www.topix.com/palo-alto.
Screenshot of My Neighbourhoods on CrunchBase, Aug. 27, 2014 (pp. 2) http://www.crunchbase.com/organization/my-neighbourhoods.
Screenshot of Dehood website, Aug. 27, 2014, (p. 1) http://www.dehood.com/home.
Wikipedia entry the Freecycle Network website—Aug. 27, 2014 (pp. 3) http://en.wikipedia.org/wiki/The_Freecycle_Network.
eDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Wikipedia entry Meetup website—Aug. 27, 2014 (p. 1) http://en.wikipedia.org/wiki/Meetup_(website).
Wikipedia entry Google Maps website—Aug. 27, 2014 (p. 18) http://en.wikipedia.org/wiki/Google_Maps.
Screenshot of Facebook website for groups, Aug. 27, 2014, (p. 1) https://www.facebook.com/about/groups.
Facebook Engineers bring Google+ Circles to Facebook, Article on ZDNet by Emil Protalinski, Jul. 3, 2011, (pp. 2) http://www.zdnet.com/blog/facebook/facebook-engineers-bring-google-circles-to-facebook/1885.
Screenshot of Uber website, Aug. 27, 2014, (pp. 5) https://www.uber.com/.
Screenshot of Lyft website, Aug. 27, 2014, (pp. 5) https://www.lyft.com/.
Wikipedia entry Google driverless car—Aug. 27, 2014 (pp. 4) http://en.wikipedia.org/wiki/Google_driverless_car.
Wikipedia entry Uber (company)—Aug. 27, 2014 (pp. 7) http://en.wikipedia.org/wiki/Uber_(company).
Wikipedia entry Autonomous car—Aug. 27, 2014 (pp. 15) http://en.wikipedia.org/wiki/Autonomous_car.
Screenshot of sidecar website, Aug. 27, 2014 (p. 1) http://www.sidecar.com/.
Screenshot of patch media website, Aug. 27, 2014 (pp. 6) http://patch.com/.
Screenshot of i-neighbors website, Aug. 27, 2014 (pp. 3) https://www.i-neighbors.org/howitworks.php.
http://www.zdnetcom/news/perspective-social-networking-for-all/149441.
http://www.remax.com/advancedsearch/.
http://global.remax.com/AdvancedListingSearch.aspx.
http://www.magicbricks.com/property-requirement-to-buy-rent/residential-commercial.
http://www.mapmyindia.com/solutions/tracking-lbs/vehicle-tracking.
http://www.mapmyindia.com/solutions/tracking-lbs/asset-tracking.
http://www.mapmyindia.com/solutions/enterprises/geo-tagging.
http://www.zillow.com/.
http://www.zillow.com/homes/for_rent/.
http://www.zillow.com/homes/for_sale/days_sort/53.409532,-64.072266,19.352611,-129.550781_rect/3_zm/.
http://www.trulia.com/home_prices/.
http://www.trulia.com/for_rent/New_York,NY.
http://www.realtor.com/rentals.
http://www.realtor.com/realestateforsale.
http://www.househunt.com/.
http://www.coldwellbanker.com/real_estate_search;jsessionid=S8ok3kaZtBh5GKHoo-Yzo28Z.sky-node04.
http://www.switchboard.com/.
http://www.anywho.com/whitepages.
http://wp.superpages.com/.
http://www.whitepages.com/.
http://www-personal.umich.edu/~ladamic/papers/socialsearch/adamicsocialsearch.pdf.
http://cs.wellesley.edu/~cs315/315_PPTs/L19-SocialNetworks/Stuff/wellesley.pdf.
http://citeseerx.ist.psu.edu/viewdoc/download?doi=10.1.1.98.5230&rep=rep1&type=pdf.
http://www.ece.lsu.edu/xinli/Research/HeatMap_TVCG06.pdf.
http://www.usa-people-search.com/.
https://www.i-neighbors.org/.
"Crowdsourcing: Those that are willing to test & learn will be those that will win", Newsline, Mar. 1, 2011 by Neil Perkin http://mediatel.co.uk/newsline/2011/03/01/crowdsourcing-those-that-are-willing-to-test-learn-will-be-those-that-will-win/.
"Friends and Neighbors on the Web", 2001 by Lada A. Adamic et al. (pp. 9) http://www.hpl.hp.com/research/idl/papers/web10/fnn2.pdf.
"A social influence model of consumer participation in network- and small-group-based virtual communities", International Journal of Research in Marketing, 2004 by Utpal M, Dholakia et al. (pp. 23) http://www-bcf.usc.edu/~douglast/620/bettina1.pdf.
"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.
"Direct Annotation: A Drag-and-Drop Strategy for Labeling Photos", University of Maryland, 2000 by Ben Shneiderman et al. (pp. 8) http://hcil2.cs.umd.edu/trs/2000-06/2000-06.pdf.
"Notification for Shared Annotation of Digital Documents", Technical Report MSR—TR-2001-87, Sep. 19, 2001 by A. J. Bernheim Brush et al. (pp. 9) http://research.microsoft.com/pubs/69880/tr-2001-87.pdf.
"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.
"Computer Systems and the Design of Organizational Interaction", by Fernando Flores et al. (pp. 20) http://cpe.njit.edu/dlnotes/CIS/CIS735/ComputerSystemsandDesign.pdf.
"ChipIn—the easy way to collect money", Louis' Really Useful Finds, Mar. 12. (p. 1) http://reallyusefulthings.tumblr.com/post/28688782/chipin-the-easy-way-to-collect-money.

* cited by examiner

FUNCTIONAL BLOCK DIAGRAM 250

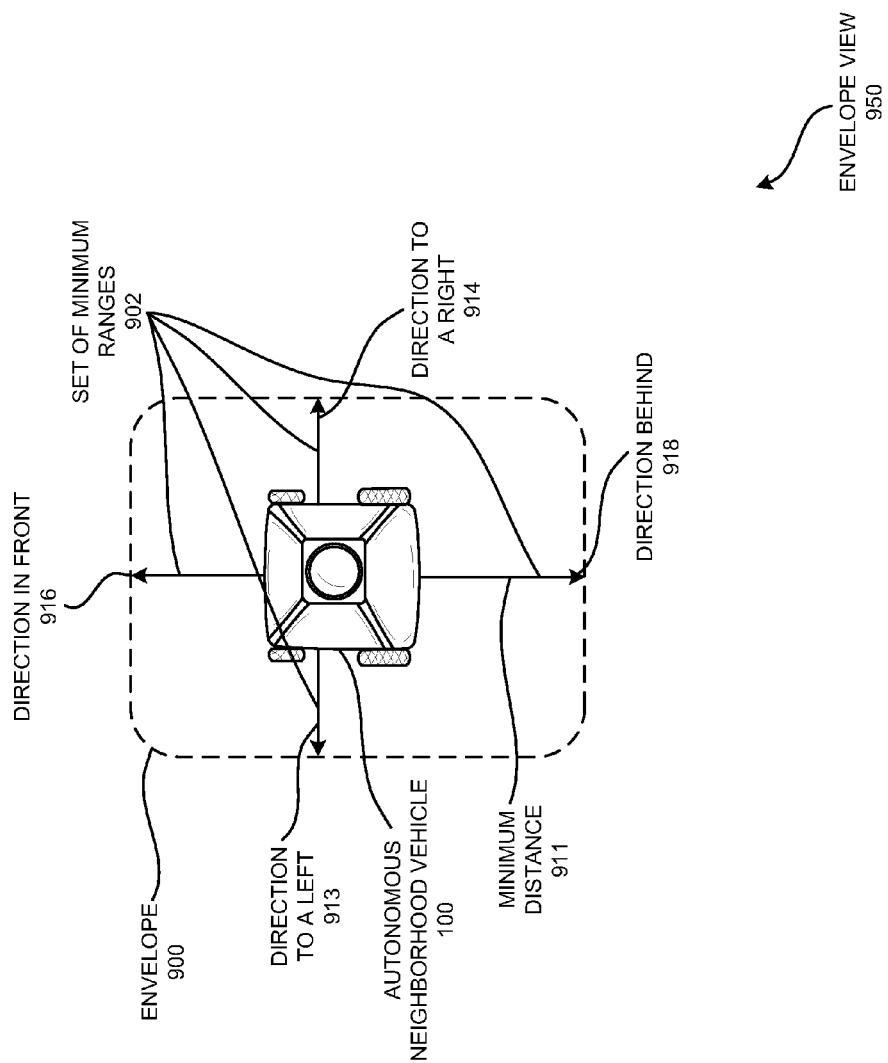

| EMAIL ADDRESS: | | |
|---|---|---|
| REPEAT EMAIL ADDRESS: | | |
| FIRST NAME: | | |
| LAST NAME: | | |
| PASSWORD: | | |
| REPEAT PASSWORD: | | |
| GENDER: | ○ MALE   ○ FEMALE | |
| INTERESTED IN MEETING PEOPLE FOR: ☑ HOBBIES        ○ FAMILIES ○ SINGLES ☑ NEIGHBORHOOD WATCH ○ STUDENTS ☑ FRIENDS ☑ HELP ☐ JUST HERE FOR HELP | | |
| DID A NEIGHBOR REFER YOU TO FATDOOR? NEIGHBORS EMAIL ADDRESS: (TO AUTOMATICALLY CONNECT TO YOUR NEIGHBOR AND YOUR NEIGHBOR'S FRIENDS.) | | |
| GROUPS: | ○ SCRAPBOOK CLUB ○ BIBLE STUDY GROUP ○ LONE STAR GROUP ○ NEIGHBORHOOD PROTECTORS CLUB | |
| DATE OF BIRTH: | ▼  ▼  ▼ | |
| COUNTRY: | ▼ | |
| ZIP/POSTAL CODE: | | (U.S. & CANADA ONLY) |
| HOME TOWN: | | (WHERE YOU GREW UP) |
| OCCUPATION: | | |
| INTERESTS: | (SEPARATE INTERESTS WITH COMMAS) | |

FIGURE 20

| USER 3500 | VERIFIED? 3502 | RANGE 3504 | PRINCIPAL ADDRESS 3506 | LINKS 3508 | CONTRIBUTED? 3510 | OTHERS 3512 |
|---|---|---|---|---|---|---|
| JOE | YES | 5 MILES | 500 CLIFFORD, CUPERTINO CA | 858, BETTE, 854 BETTE | 858, BETTE, 10954 FARALLONE | CITY, STATE, ZIP, OTHER |
| JANE | NO | NOT ENABLED | 500 JOHNSON, CUPERTINO CA | 851 BETTE, 100 STEVEN'S ROAD | 500 HAMILTON, 1905 E. UNIVERSITY | - - - |
| • | • | • | • | • | • | • |
| • | • | • | • | • | • | • |
| • | • | • | • | • | • | • |

TABLE 3550

FIGURE 35

AUTONOMOUS NEIGHBORHOOD VEHICLE COMMERCE NETWORK AND COMMUNITY

CLAIMS OF PRIORITY

This patent application is a continuation and continuation in part, claims priority from, and hereby incorporates by reference and claims priority from the entirety of the disclosures of the following cases and each of the cases on which they depend and further claim priority or incorporate by reference:

(1) U.S. Provisional patent application Ser. No. 60/783,226, titled 'TRADE IDENTITY LICENSING IN A PROFESSIONAL SERVICES ENVIRONMENT WITH CONFLICT' filed on Mar. 17, 2006.
(2) U.S. Provisional patent application Ser. No. 60/817,470, titled 'SEGMENTED SERVICES HAVING A GLOBAL STRUCTURE OF NETWORKED INDEPENDENT ENTITIES', filed Jun. 28, 2006.
(3) U.S. Provisional patent application Ser. No. 60/853,499, titled 'METHOD AND APPARATUS OF NEIGHBORHOOD EXPRESSION AND USER CONTRIBUTION SYSTEM' filed on Oct. 19, 2006.
(4) U.S. Provisional patent application Ser. No. 60/854,230, titled 'METHOD AND APPARATUS OF NEIGHBORHOOD EXPRESSION AND USER CONTRIBUTION SYSTEM' filed on Oct. 25, 2006.
(5) U.S. Utility patent application Ser. No. 11/603,442 titled 'MAP BASED NEIGHBORHOOD SEARCH AND COMMUNITY CONTRIBUTION' filed on Nov. 22, 2006.
(6) U.S. Provisional patent application Ser. No. 61/526,693, titled 'GEOSPATIAL CONSTRAINT AROUND BIDDABILITY OF A GASTRONOMICAL ITEM' filed on Aug. 24, 2011.
(7) U.S. Utility patent application Ser. No. 13/236,964 titled 'NEAR-FIELD COMMUNICATION ENABLED WEARABLE APPAREL GARMENT AND METHOD TO CAPTURE GEOSPATIALLY AND SOCIALLY RELEVANT DATA OF A WEARER OF THE WEARABLE APPAREL GARMENT AND/OR A USER OF A READER DEVICE ASSOCIATED THEREWITH' filed on Sep. 20, 2011.
(8) U.S. Utility patent application Ser. No. 13/242,303, titled 'GEOSPATIALLY CONSTRAINED GASTRONOMIC BIDDING' filed on Sep. 23, 2011.
(9) U.S. Utility patent application Ser. No. 13/272,245, titled 'NEAR-FIELD COMMUNICATION ENABLED WEARABLE APPAREL GARMENT AND METHOD TO CAPTURE GEOSPATIALLY AND SOCIALLY RELEVANT DATA OF A WEARER OF THE WEARABLE APPAREL GARMENT AND/OR A USER OF A READER DEVICE ASSOCIATED THEREWITH' filed on Oct. 13, 2011.
(10) U.S. Provisional patent application Ser. No. 61/894,443, titled 'RADIO BROADCAST, COMMERCE PUSHPINS, AND AUTOMATED PAGE UPDATES TO A GEOSPATIALLY CONSTRAINED NEIGHBORHOOD REGION THROUGH AN INTERNET NETWORK AND SEPARATELY A TRACKABLE SOCIAL COMMUNITY FORMED BASED ON TRACKABLE TAG BASED APPAREL THAT CREATES INCENTIVES AND CONNECTIONS BETWEEN USERS WEARING PROMOTIONAL APPAREL AND THOSE OTHER USERS READING THE TRACKABLE TAG ON THE APPAREL' filed on Oct. 23, 2013.
(11) U.S. Utility patent application Ser. No. 14/079,611, titled 'JOB BROADCAST DATA PUBLICATION THROUGH A WORK-OPPORTUNITY LISTING SERVER USING A RADIAL ALGORITHM TO AUTOMATICALLY DISTRIBUTE THE JOB BROADCAST DATA IN A THRESHOLD RADIAL DISTANCE 4219 FROM A SET OF GEOSPATIAL COORDINATES ASSOCIATED WITH A MOBILE DEVICE' filed on Nov. 13, 2013.
(12) U.S. Utility patent application Ser. No. 14/089,779, titled 'EMERGENCY INCLUDING CRIME BROADCAST IN A NEIGHBORHOOD SOCIAL NETWORK' filed on Nov. 26, 2013.
(13) U.S. Utility patent application Ser. No. 14/100,034, titled 'SOCIAL CONNECTIONS THROUGH TAGGABLE APPAREL' filed on Dec. 9, 2013.
(14) U.S. Utility patent application Ser. No. 14/102,474, titled 'SHORT-TERM RESIDENTIAL SPACES IN A GEO-SPATIAL MAPPING ENVIRONMENT' filed on Dec. 10, 2013.
(15) U.S. Utility patent application Ser. No. 14/141,432 titled 'HOLIDAY EXPRESSION AND MAPPING IN A GEOSPATIALLY CONSTRAINED SOCIAL NETWORK' filed on Dec. 27, 2013.
(16) U.S. Utility patent application Ser. No. 14/142,764, titled 'DRIVERLESS VEHICLE COMMERCE NETWORK AND COMMUNITY' filed on Dec. 28, 2013.
(17) U.S. Utility patent application Ser. No. 14/144,612 titled 'MAP BASED NEIGHBORHOOD SEARCH AND COMMUNITY CONTRIBUTION' filed on Dec. 31, 2013.

FIELD OF TECHNOLOGY

This disclosure relates generally to the technical fields of communications and, in one example embodiment, to a method, apparatus, and system of an autonomous neighborhood vehicle commerce network and community.

BACKGROUND

Individuals may wish to acquire a variety of items. However, these individuals may not have the time and/or means to pick up these goods. Individuals may not have access to a vehicle and/or may live in an area where public transportation and/or other means of travel are unreliable, expensive and/or unsafe. Those with access to means of transportation may not wish to waste hours traveling to and from locations and/or attaining items. Individuals may not have time to complete these errands as work and/or other engagements may get in the way. Additionally, individuals may not wish to order online as they lack the time to wait for shipping. As a result, precious time may be wasted and/or errands foregone as a result of a lack of ability to complete them.

Home delivery services may be expensive, require tips and/or have inconvenient hours of operation and/or uncertain arrival times. Furthermore, individuals may not trust courier services to handle items and/or may feel that their items are not secure in transit. Individuals may have no way to conveniently acquire and/or deliver items without investing significant amounts of time, money and/or effort. As a result, time and money may be wasted and/or valuable opportunities for commerce may be lost.

SUMMARY

Disclosed are a method, a device and/or a system for autonomous neighborhood vehicle commerce through a commerce server of a neighborhood communication network, according to one embodiment.

In one aspect, an autonomous neighborhood vehicle comprising a set of wheels aligned in a pattern to provide the autonomous neighborhood vehicle stability when traversing a sidewalk, a bike lane, and a roadway. The autonomous neighborhood vehicle also comprises of a storage compartment of the autonomous neighborhood vehicle in which items are storable, an electronic locking mechanism of the storage compartment, a computer system of the autonomous neighborhood vehicle that is communicatively coupled to a commerce server of a neighborhood communication system through a wireless network to autonomously navigate the autonomous neighborhood vehicle to a destination specified by the commerce server, and a navigation server of the autonomous neighborhood vehicle to provide a remote sensing capability to the autonomous neighborhood vehicle such that the autonomous neighborhood vehicle is autonomously navigable to the destination.

In one embodiment, the autonomous neighborhood vehicle may utilize a sensor fusion algorithm through which at least some of an ultrasound unit, a radar unit, a light sensor, a LIDAR unit, a wheel encoding sensor, an accelerometer sensor, a gyroscopic sensor, a compass sensor, and/or a stereo optical sensor operate in concert to provide a three dimensional environmental view of an environment surrounding the autonomous neighborhood vehicle to the autonomous neighborhood vehicle. The autonomous neighborhood vehicle may include a sidewalk detection sensor to provide a sidewalk detection sensor through which the autonomous neighborhood vehicle may detect a gradation rise caused by a sidewalk start location and/or a gradation drop caused by a sidewalk end location. A telescoping platform coupled to a base of the autonomous neighborhood vehicle may automatically displace a set of front wheels to rise and/or fall based on the detected one of the gradation rise caused by the sidewalk start location and/or the gradation drop caused by the sidewalk end location to provide mechanical stability for the item in the storage compartment of the autonomous neighborhood vehicle.

The autonomous neighborhood vehicle may periodically transmit a heartbeat message to the commerce server having a set of current geo-spatial coordinates of the autonomous neighborhood vehicle, a time stamp, a date stamp, and/or an operational status of the vehicle. In one embodiment, the autonomous neighborhood vehicle may automatically generate an emergency broadcast message to a set of neighbors in a geo-spatial vicinity of the autonomous neighborhood vehicle when the autonomous neighborhood vehicle detects a failure condition comprising an impact, a mechanical failure, an electrical failure, and/or a damage condition. The emergency broadcast message may include a photo data, a geo-spatial coordinates data, a video data, an audio data, a timeout condition of the heartbeat message receipt at the commerce server, and/or a textual data associated with the failure condition. The autonomous neighborhood vehicle may automatically park itself in a garage structure associated with an operator of the autonomous neighborhood vehicle adjacent to a passenger vehicle, wherein the operator is at least one an individual, a family, a business, an owner, and/or a lease, according to one embodiment.

The storage compartment may be temperature regulated to maintain a temperature of an item in transit between a starting address associated with a merchant and/or a neighbor in a neighborhood in a geospatial vicinity of the autonomous neighborhood vehicle, and/or a destination address associated with a recipient of the item in the neighborhood in the geospatial vicinity of the autonomous neighborhood vehicle, wherein the neighborhood boundary is defined through a neighborhood boundary data provider. In one embodiment, the autonomous neighborhood vehicle may be in a form of an autonomous neighborhood bicycle having a detachable storage compartment thereon, and/or having an ability to driverlessly traverse through bicycle lanes adjacent to a roadway based on commands from the commerce server.

In another aspect, a method of an autonomous neighborhood vehicle comprising associating the autonomous neighborhood vehicle with a non-transient location and determining, through a commerce server of a neighborhood communication system, that a destination in a threshold radial distance from the non-transient location is received by the autonomous neighborhood vehicle through a wireless network. The method also includes determining an optimal route from the current location of the autonomous neighborhood vehicle to the destination and traveling autonomously on the optimal route to the destination.

In one embodiment, the method may include periodically determining, through a processor, a current location of the autonomous neighborhood vehicle, communicating the current location of the autonomous neighborhood vehicle to the commerce server, and automatically activating a set of light emitting diodes encompassing the autonomous neighborhood vehicle when a light sensor detects that an environmental brightness is below a threshold luminosity. The method may include creating an envelope around the autonomous neighborhood vehicle, wherein the envelope includes a set of minimum ranges. The set of minimum ranges may include a minimum distance that must be kept in a direction in front, behind, to a left, to a right, above, and/or below the autonomous neighborhood vehicle.

The method may include establishing a range of speed the autonomous vehicle may reach and establishing a minimum and/or a maximum distance traveled by the autonomous neighborhood vehicle, wherein the minimum and/or the maximum distance traveled by the autonomous neighborhood vehicle is set for a per trip, per day and/or a per delivery distance traveled. In one embodiment, the method may include establishing a maximum magnitude of deceleration, wherein the maximum magnitude of deceleration is measured in feet per second squared, and establishing a minimum crosswalk proximity at which the autonomous neighborhood vehicle is permitted to stop.

The method may include determining at a predetermined interval if a different route that is more efficient than the optimal route exists based on a delivery time, a pendency of time, and/or a minimal travel distance. The predetermined interval for determining if a different route is more efficient than the optimal route exists may include constantly determining, determining every minute, determining every one hundred yards, when the autonomous neighborhood vehicle encounters traffic, when the autonomous neighborhood vehicle encounters the object. The method may include calculating a different route and traveling along the different route as long as the different route remains a most efficient route. In one embodiment, the method may include determining when an alternate field of view is needed, prioritizing established constraints of the envelope, the speed, the distance traveled, the maximum magnitude of deceleration and/or the minimum crosswalk proximity in respect to the need to establish the alternate field of view, determining an optimal alternate field of view that does not violate established constraints prioritized above obtaining the alternate field of view, and obtaining the optimal alternate field of view without violating constraints prioritized above obtaining the alternate field of view.

In one embodiment, obtaining the optimal alternate field of view without violating constraints prioritized above obtaining the alternate field of view involves switching sensors, moving the autonomous neighborhood vehicle and/or moving sensors. The set of minimum ranges of the envelope may depend on a speed of the autonomous neighborhood vehicle, a set of weather conditions, a environment of the autonomous neighborhood vehicle, the item, and/or a nature of the object that is in close proximity with the autonomous neighborhood vehicle. The storage compartment may be temperature regulated to maintain a temperature and/or a humidity of an item in transit between a starting address associated with a merchant and/or a neighbor in a neighborhood in a geospatial vicinity of the autonomous neighborhood vehicle, and/or a destination location associated with a recipient of the item in the neighborhood in the geospatial vicinity of the autonomous neighborhood vehicle. In one embodiment, the neighborhood boundary may be defined through a neighborhood boundary data provider, and/or the storage compartment may be equipped with a suspension device to protect the item in the storage compartment while in transit.

The method may include automatically generating an emergency broadcast message to a set of neighbors in a geospatial vicinity of the autonomous neighborhood vehicle when the autonomous neighborhood vehicle detects a failure condition comprising an impact, a mechanical failure, an electrical failure, and/or a damage condition, wherein the emergency broadcast message includes a photo data, a geospatial coordinates data, a video data, an audio data, a timeout condition of a heartbeat message receipt at the commerce server, and/or a textual data associated with the failure condition. In one embodiment, the method may include periodically transmitting a heartbeat message to the commerce server having a set of current geo-spatial coordinates of the autonomous neighborhood vehicle, a time stamp, a date stamp, and/or an operational status of the vehicle. The method may include automatically contacting emergency response services when the autonomous neighborhood vehicle detects a crime, an accident involving third parties and/or an attempted tampering with the autonomous neighborhood vehicle.

The contacting may include a time stamp, the geo-spatial coordinates data, the photo data, the video data, the audio data, and/or the textual data, and/or wherein emergency response services include a police station, a fire station and/or a medical responder. In one embodiment, the method may include calculating a set of predicted behaviors of detected objects within a threshold distance from the autonomous neighborhood vehicle and determining confidence levels for the predicted behaviors, wherein the confidence levels are a number and/or a percentage of the probability of each predicted behavior occurring. The method may include adjusting confidence levels for the predicted behaviors based on a change in location, a change in speed, a change of direction, a change in angle and/or observed behavior, according to one embodiment. The method may include vending an item from the storage compartment and ejecting the item from an ejection module, wherein the item is ejected through an air based propulsion system aligned through a camera adjacent to the ejection module.

In one embodiment, the method may include detecting a stop sign and/or automatically stopping the autonomous neighborhood vehicle at the appropriate point when the stop sign is detected, detecting a yield sign and/or automatically monitoring and/or yielding to a traffic flow at an intersection in the neighborhood, detecting when a pedestrian is walking in a path proximate to the autonomous neighborhood vehicle, and/or detecting when a bicyclist is biking in a path proximate to the autonomous neighborhood vehicle. The method may include accepting a credit payment using a magnetic card reader of the autonomous neighborhood vehicle, a near-field credit scanner of the autonomous neighborhood vehicle, and/ or a biometric payment reader of the autonomous neighborhood vehicle. The commerce server may be in a privacy server of the neighborhood communication system that may be wirelessly coupled with the autonomous neighborhood vehicle.

The privacy server may be a community network comprising verifying that each user of the community network lives at a residence associated with a claimable residential address of the community network formed through a social community module of a privacy server using a processor and/or a memory. The privacy server may be a community network comprising obtaining from each user of the community network, using the processor of a data processing system 4204, member data associated with each user, the member data including an address, and associating the address with a profile of each user. In one embodiment, the privacy server may be a community network comprising determining a location of each user based on the member data, storing the member data in a database, and obtaining a personal address privacy preference from each user, the personal address privacy preference specifying if the address should be displayed to other users.

The method may include generating, using a mapping server associated with the privacy server through a network, a geospatial representation of a set of points on a map defining residences associated with each user of the community network having the member data, and authenticating, using a verify module of the privacy server, a particular user of a third-party application as being a verified user of the neighborhood communication system having a verified residential address in the neighborhood communication system. In one embodiment, the method may include communicating, using the verify module of the privacy server, a social graph of the particular user based on the personal address privacy preference of the particular user to the third-party application. The method may include providing, using the verify module of the privacy server, the verified residential address to the third-party application based on the authentication of the particular user of the third-party application as being the verified user of the neighborhood communication system.

The privacy server communicatively coupled with the mapping server through a network may apply an address verification algorithm associated with each user of the online community to verify that each user lives at a residence associated with a claimable residential address of an online community formed through a social community module of the privacy server using the processor and/or the memory. The mapping server may generate a latitudinal data and/or a longitudinal data associated with each claimable residential address of the online community associated with each user of the online community. The privacy server may automatically determine a set of access privileges in the online community associated with each user of the online community by constraining access in the online community based on a neighborhood boundary determined using a Bezier curve algorithm of the privacy server. The privacy server may transform the claimable residential address into a claimed address upon an occurrence of an event.

The privacy server may instantiate the event when a particular user is associated with the claimable residential address based on a verification of the particular user as living at a particular residential address associated with the claimable residential address using the privacy server. The privacy server may constrain the particular user to communicate through the online community only with a set of neighbors having verified addresses using the privacy server. The privacy server may define the set of neighbors as other users of the online community that have each verified their addresses in the online community using the privacy server and/or which have each claimed residential addresses that are in a threshold radial distance from the claimed address of the particular user.

In yet another aspect, a neighborhood communication system comprising a commerce server, a wireless network, and a set of autonomous neighborhood vehicles that are communicatively coupled to the commerce server of the neighborhood communication system through the wireless network to autonomously travel to destinations specified by the commerce server. Each of the set of autonomous neighborhood vehicles periodically transmits heartbeat messages to the commerce server having a set of current geo-spatial coordinates of each of the autonomous neighborhood vehicles, a time stamp, a date stamp, and an operational status of each of the autonomous neighborhood vehicles. At least some of the autonomous neighborhood vehicles are in a form of autonomous neighborhood bicycles each having a detachable storage compartment thereon, and having an ability to driverlessly traverse through bicycle lanes adjacent to a roadway based on commands from the commerce server.

In one embodiment, each of the autonomous neighborhood vehicle utilizes a sensory fusion algorithm through which at least some of an ultrasound unit, a radar unit, a light sensor, a LIDAR unit, a wheel encoding sensor, an accelerometer sensor, a gyroscopic sensor, a compass sensor, and/or a stereo optical sensor operate in concert to provide a three dimensional environmental view to the autonomous neighborhood vehicle of an environment surrounding each of the autonomous neighborhood vehicle. A particular autonomous neighborhood vehicles may automatically generate an emergency broadcast message to a set of neighbors in a geo-spatial vicinity of the particular autonomous neighborhood vehicle when the particular autonomous neighborhood vehicle detects a failure condition comprising an impact, a mechanical failure, an electrical failure, and/or a damage condition, wherein the emergency broadcast message includes a photo data, a geo-spatial coordinates data, a video data, an audio data, a timeout condition of the heartbeat message receipt at the commerce server, and/or a textual data associated with the failure condition.

Each of the autonomous neighborhood vehicles automatically may be able to park themselves in a garage structure associated with an operator of the autonomous neighborhood vehicle adjacent to a passenger vehicle, wherein the operator is at least one an individual, a family, a business, an owner, and/or a leasee. The storage compartment may be temperature regulated to maintain a temperature of an item in transit between a starting address associated with a merchant and/or a neighbor in a neighborhood in a geospatial vicinity of the autonomous neighborhood vehicle, and/or a destination address associated with a recipient of the item in the neighborhood in the geospatial vicinity of the autonomous neighborhood vehicle, wherein the neighborhood boundary is defined through a neighborhood boundary data provider.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 9A is an envelope view of an envelope of the autonomous neighborhood vehicle of FIG. 1A, according to one embodiment.

FIG. 20 is an exemplary graphical user interface view for data collection, according to one embodiment.

FIG. 35 is a table view of user address details, according to one embodiment.

Other features of the present embodiments will be apparent from the accompanying drawings and from the detailed description that follows.

DETAILED DESCRIPTION

A method, apparatus, and system of multi-occupant structure in a geo-spatial environment are disclosed. In the following description, for the purposes of explanation, numerous specific details are set forth in order to provide a thorough understanding of the various embodiments. It will be evident, however, to one skilled in the art that the various embodiments may be practiced without these specific details.

Figure 1A:
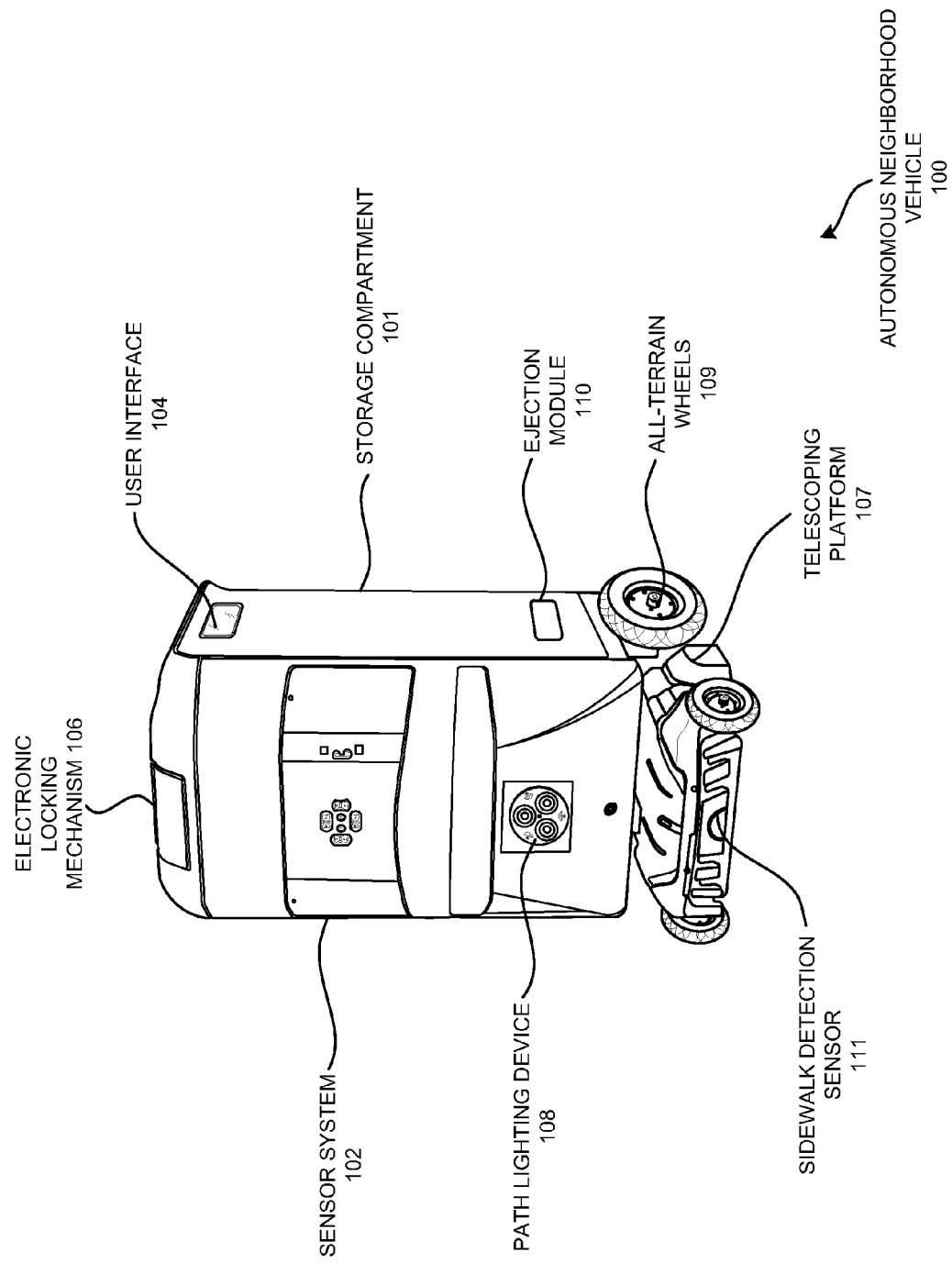
FIG. 1A is a view of an autonomous neighborhood vehicle, according to one embodiment.

FIG. 1A shows an autonomous neighborhood vehicle. Particularly, FIG. 1A shows the autonomous neighborhood vehicle 100, a storage compartment 101, a sensor system 102, a user interface 104, an electronic locking mechanism 106, a telescoping platform 107, a path lighting device 108, an all-terrain wheels 109, an ejection module 110, and a sidewalk detection sensor 111. In one embodiment, may be an electric and/or battery powered device. A propulsion system 208 (shown in FIG. 2) of the autonomous neighborhood vehicle 100 (e.g., driverless delivery vehicle, autonomous neighborhood delivery rover) may be powered by solar and/or wind power, according to one embodiment. In one embodiment, the autonomous neighborhood vehicle may be a wheeled vehicle, a treaded vehicle, an aerial vehicle, and/or an aquatic vehicle.

The autonomous neighborhood vehicle 100 may comprise of a set of wheels aligned in a way to provide the autonomous neighborhood vehicle 100 (e.g., neighborhood rover vehicle) stability when traveling to and/or from destinations (e.g., on sidewalks, bike lanes, a roadway, over rocks, over grass). The storage compartment 101 may be any shape that enables the autonomous neighborhood vehicle 100 to adequately store desired item(s) 4502 (e.g., a rectangular shape, a spherical shape, a cone shape). The storage compartment 101 may be made of metallic materials, wood, and/or a polymer based material. The interior of the storage compartment may be temperature controlled via the temperature control module 246 (e.g., heated, cooled, kept at a certain humidity) and/or may be comprised of (e.g., be made of, lined with, reinforced with, padded with) materials to aid in transport and/or storage of items 4502. In one embodiment, the storage compartment 101 may be lined with vinyl, nylon and/or Cordura to aid in keeping contents heated. In another embodiment, the storage compartment 101 may be padded and/or be equipped with a suspensions system to protect fragile contents. The contents may be a gastronomical item, a perishable item, a retail good, an electronic device, a piece of mail, an organ (e.g., for medical use), and/or any item capable of being transported via the autonomous neighborhood vehicle 100.

The storage compartment 101 may have compartments (e.g., separate sections capable of being maintained at different temperatures and/or humidity, trays, compartmentalized areas) and/or may have separate openings on the surface of the storage compartment 101 for each compartment(s). The autonomous neighborhood vehicle 100 may comprise of an ejection module 110, according to one embodiment. The ejection module 110 may be communicatively couple with a camera (e.g., a separate camera from that of a sensor system 102) and/or may eject items 4502 (e.g., packages, letters, non-fragile items) from the storage compartment 101 using pressurized air. In one embodiment, the autonomous neighborhood vehicle 100 may be able to eject items 4502 in a specific compartment of the storage compartment 101 while not ejecting items 4502 in another compartment and/or keeping other items 4502 controlled at a certain temperature and/or humidity.

In one embodiment, the sensor system 102 may be comprised of several sensors (e.g., several types, several of the same kind). The autonomous neighborhood vehicle 100 may possess multiple sensor systems 102. The sensor system 102 may be physically associated with the autonomous neighborhood vehicle 100 so that the vehicle is able to capture and/or analyze its surrounding environment and/or navigate. The sensor system 102 may be comprised of a global positioning system 218, an internal measurement unit 220, a radar unit 222, a laser rangefinder/LIDAR unit 224, a camera 226, and/or an ultrasound unit 228 (e.g., as described in FIG. 2).

The autonomous neighborhood vehicle 100 may have a user interface 104 physically associated with it. The user interface 104 may be a touch screen system, a key-pad based system, an audio based system (e.g., voice command), etc. The user interface 104 may enable individuals (e.g., a user of the autonomous neighborhood vehicle 100) to enter commands (e.g., a destination, a set of details about the pick-up and/or drop-off, a set of constraints for the vehicle's operation). In one embodiment, the user interface 104 may require a user verification (e.g., passcode, voice recognition, a biometric scan) before access to the user interface 104 may be granted. In another embodiment, the user interface 104 may be covered and/or encased by a protective surface until activated (e.g., unlocked) for use.

An electronic locking mechanism 106 may be physically associated with the autonomous neighborhood vehicle 100, according to one embodiment. The electronic locking mechanism 106 may be a combination lock, an electronic lock, a signal based lock, a passcode lock, a biometric scanner (e.g., fingerprint reader) and/or may keep the contents of the autonomous neighborhood vehicle 100 secure. In one embodiment, the electronic locking mechanism 106 may be unlocked and/or locked via the user interface 104. In one embodiment, the electronic locking mechanism 106 may automatically unlock when the autonomous neighborhood vehicle 100 arrives at its destination. The electronic locking mechanism 106 may unlock when the sender (e.g., owner, user) of the autonomous neighborhood vehicle 100 remotely unlocks the electronic locking mechanism 106 (e.g., using a data processing system 4204 (e.g., a smart phone, a tablet, a mobile device, a computer, a laptop). In another embodiment, a passcode may be sent to the recipient (e.g., store, individual, company) (e.g., via text message, via a push notification, via an update on a profile, in an email, etc.). The passcode to the electronic locking mechanism 106 may be changed on a predetermined basis (e.g., with every use, daily, weekly, hourly, upon request of the owner, upon request of the user (e.g., sender)). In one embodiment, the electronic locking mechanism 106 may be unlocked using a near-field communication technology such as iBeacon, NFC and/or a keypad unlock code.

The path lighting device 108 of the autonomous neighborhood vehicle 100 may automatically active a set of light emitting diodes encompassing the autonomous neighborhood vehicle 100 when a light sensor detects that an environmental brightness is below a threshold lumens. The path lighting device 108 may be comprised of multiple light sources. The autonomous neighborhood vehicle 100 may have multiple path lighting devices 108.

The autonomous neighborhood vehicle 100 may have all terrain wheels 109. The all terrain wheels 109 may be shock absorbing, on/off road, airless, puncture-sealing, run-flat etc. The autonomous neighborhood vehicle 100 may have a sidewalk detection sensor 111 to provide a mechanism through which the autonomous neighborhood vehicle is able to detect a gradation ride caused by a sidewalk start location and a gradation drop caused by a sidewalk end location (e.g., curb). The sidewalk detection sensor 111 may be a LIDAR, a RADAR, a setero optical sensor, an ultrasound unit 228, and/or another type of sensor. The telescoping platform 107 may enable the autonomous neighborhood vehicle 100 to traverse the sidewalk (e.g., move from the sidewalk to the road (e.g., bike lane) and/or from the road to the sidewalk) without disturbing, damaging and/or shifting its contents. The telescoping platform 107 is better described in FIGS. 43A and 43b.

Figure 1B:
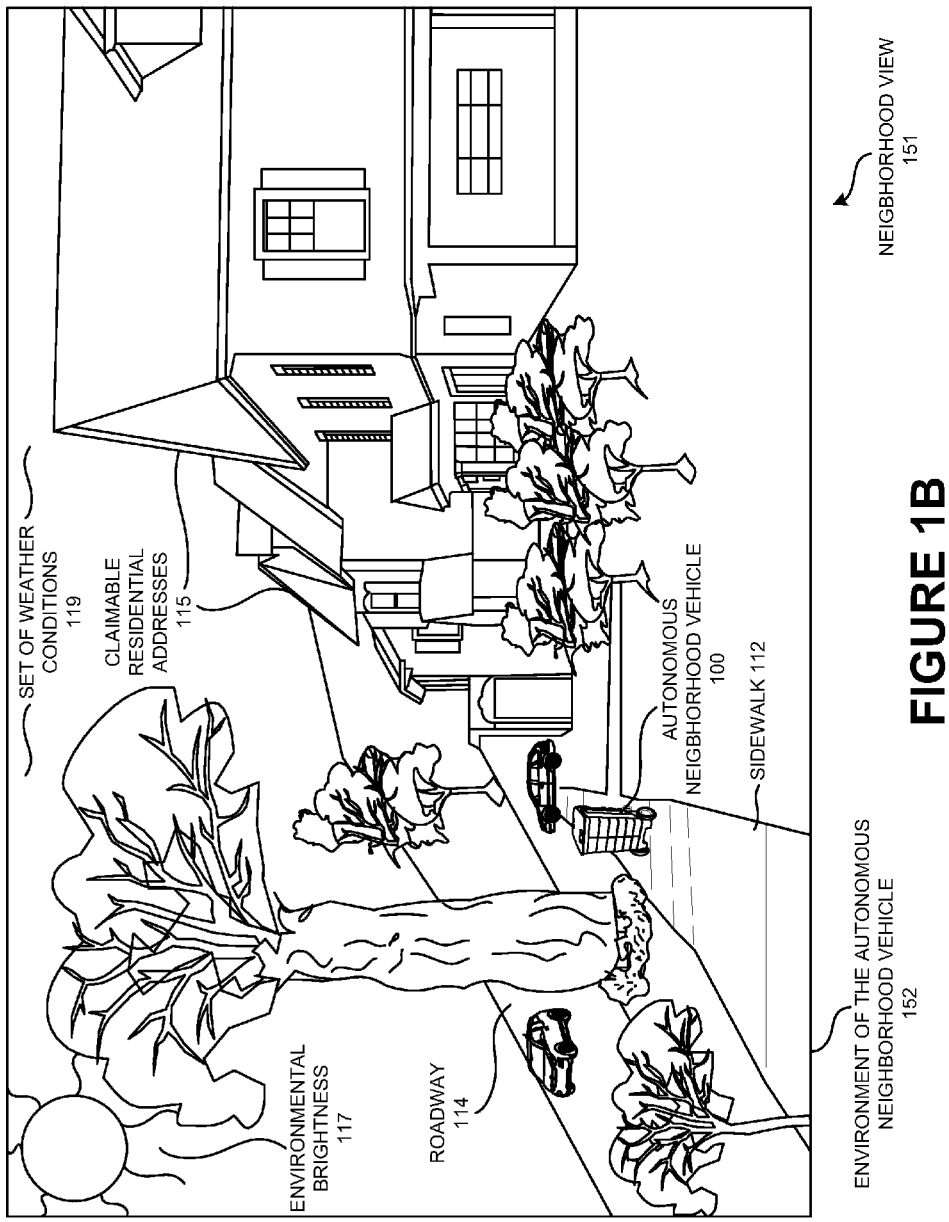
FIG. 1B is a neighborhood view of the autonomous neighborhood vehicle of FIG. 1A operating in a neighborhood environment, according to one environment.

FIG. 1B is a neighborhood view 151 of the autonomous neighborhood vehicle 100 traveling on a sidewalk while making a delivery in an environment of the autonomous neighborhood vehicle 152. Particularly, FIG. 1B shows a sidewalk 112, a roadway 114, a claimable residential addresses 115, an environmental brightness 117, and a set of weather conditions. In one embodiment, the autonomous neighborhood vehicle 100 may travel along sidewalks 112, bike lanes, and/or roadways 114. These paths, along with other possible routes of travel through the neighborhood, may be mapped (e.g., input to the global positioning system 218, input to the computer system 200, by transporting the autonomous neighborhood vehicle 100 through the neighborhood previously in order to create a map via the sensor system 102) on and/or by the autonomous neighborhood vehicle 100. In one embodiment, the sidewalk detection sensor 111 may scan the path of the autonomous neighborhood vehicle 100 and may detect that the sidewalk 112 is ending. The telescoping platform 107 may allow any number of the autonomous neighborhood vehicle's 100 wheels to be lowered and/or raised independent of the other wheels. In one embodiment, as the autonomous neighborhood vehicle 100 approached the end of a sidewalk 112, the front set of wheels may by lowered off the curb to meet the roadway 114 below as the rear wheels remain on the sidewalk 112. The rear set of wheels may then be lowered from the sidewalk 112 to the roadway 114 as the autonomous neighborhood vehicle 100 moves from the sidewalk 112 to the roadway 114. Once the autonomous neighborhood vehicle 100 is completely on the roadway 114, all wheels may be returned to their original positions. This way, the autonomous neighborhood vehicle 100 may be able to seamlessly transition from the roadway 114 to the sidewalk 112 and/or from the sidewalk 112 to the roadway 114.

Figure 2:
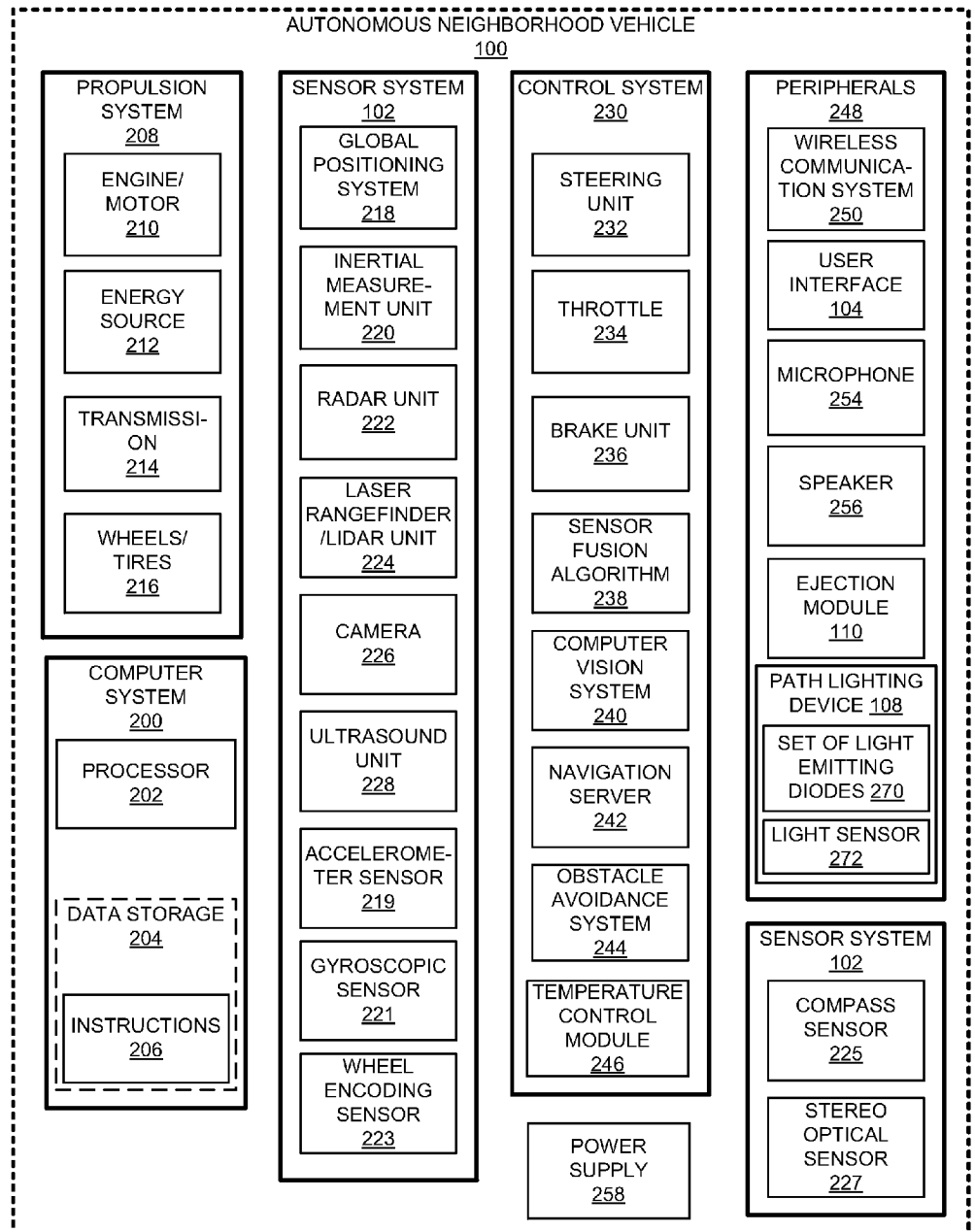
FIG. 2 is a functional block diagram illustrating the autonomous neighborhood vehicle of FIG. 1A, according to one embodiment.

FIG. 2 is a functional block diagram 250 illustrating an autonomous neighborhood vehicle, according to an example embodiment. The autonomous neighborhood vehicle 100 could be configured to operate fully or partially in an autonomous mode. For example, the autonomous neighborhood vehicle 100 could control itself while in the autonomous mode, and may be operable to determine a current state of the vehicle and its environment, determine a predicted behavior of at least one other entity (e.g., vehicle, pedestrian, biker, animal) in the environment, determine a confidence level that may correspond to a likelihood of the at least one other vehicle to perform the predicted behavior, and/or control the autonomous neighborhood vehicle 100 based on the determined information (described in FIGS. 3A-C). While in autonomous mode, the autonomous neighborhood vehicle 100 may be configured to operate without human interaction.

The autonomous neighborhood vehicle 100 could include various subsystems such as a computer system 200, a propulsion system 208, a sensor system 102, a control system 230, one or more peripherals 248, as well as a power supply 258. The autonomous neighborhood vehicle 100 may include more or fewer subsystems and each subsystem could include multiple elements. Further, each of the subsystems and elements of autonomous neighborhood vehicle 100 could be interconnected. Thus, one or more of the described functions of the autonomous neighborhood vehicle 100 may be divided up into additional functional or physical components, or combined into fewer functional or physical components. In some further examples, additional functional and/or physical components may be added to the examples illustrated by FIG. 2.

The propulsion system 208 may include components operable to provide powered motion for the autonomous neighborhood vehicle 100. Depending upon the embodiment, the propulsion system 208 could include an engine/motor 210, an energy source 212, a transmission 214, and/or wheels/tires 216. The engine/motor 210 could be any combination of an internal combustion engine, an electric motor, steam engine, Stirling engine, a solar powered engine, or other types of engines and/or motors. In some embodiments, the engine/motor 210 may be configured to convert energy source 212 into mechanical energy. In some embodiments, the propulsion system 208 could include multiple types of engines and/or motors. For instance, a gas-electric hybrid vehicle could include a gasoline engine and an electric motor. Other examples are possible.

The energy source 212 could represent a source of energy that may, in full or in part, power the engine/motor 210. That is, the engine/motor 210 could be configured to convert the energy source 212 into mechanical energy. Examples of energy sources 212 include gasoline, diesel, other petroleum-based fuels, propane, other compressed gas-based fuels, ethanol, solar panels, batteries, and other sources of electrical power. The energy source(s) 212 could additionally or alternatively include any combination of fuel tanks, batteries, capacitors, and/or flywheels. The energy source 212 could also provide energy for other systems of the autonomous neighborhood vehicle 100.

The transmission 214 could include elements that are operable to transmit mechanical power from the engine/motor 210 to the wheels/tires 216. To this end, the transmission 214 could include a gearbox, clutch, differential, and drive shafts. The transmission 214 could include other elements. The drive shafts could include one or more axles that could be coupled to the one or more wheels/tires 216.

The wheels/tires 216 of autonomous neighborhood vehicle 100 could be configured in various formats, including a unicycle, bicycle/motorcycle, tricycle, or a four-wheel format, a treaded system. Other wheel/tire geometries are possible, such as those including six or more wheels. Any combination of the wheels/tires 216 of autonomous neighborhood vehicle 100 may be operable to rotate differentially with respect to other wheels/tires 216. The wheels/tires 216 could represent at least one wheel that is fixedly attached to the transmission 214 and at least one tire coupled to a rim of the wheel that could make contact with the driving surface. The wheels/tires 216 could include any combination of metal and rubber, or another combination of materials. In one embodiment, the wheels/tyres 216 may include a wheel encoding sensor 223.

The sensor system 102 may include a number of sensors configured to sense information about the environment of the autonomous neighborhood vehicle 152. For example, the sensor system 102 could include a Global Positioning System (GPS) 218, an accelerometer sensor 219, an inertial measurement unit (IMU) 220, a gyroscopic sensor 221, a RADAR unit 222, a wheel encoding sensor 223, a laser rangefinder/LIDAR unit 224, a compass sensor 225, a camera 226, a stereo optical sensor 227, and/or an ultrasound unit 228. The sensor system 102 could also include sensors configured to monitor internal systems of the autonomous neighborhood vehicle 100 (e.g., $O_2$ monitor, fuel gauge, engine oil temperature). Other sensors are possible as well. One or more of the sensors included in sensor system 102 could be configured to be actuated separately and/or collectively in order to modify a position and/or an orientation of the one or more sensors.

The GPS 218 may be any sensor configured to estimate a geographic location of the autonomous neighborhood vehicle 100. To this end, GPS 218 could include a transceiver operable to provide information regarding the position of the autonomous neighborhood vehicle 100 with respect to the Earth. In one embodiment, the GPS 218 may be communicatively coupled with the commerce server 4200 allowing a state of the autonomous neighborhood vehicle 100 and/or a location of the autonomous neighborhood vehicle to be relayed to the server. In one embodiment, GPS 218 may be physically associated with the autonomous neighborhood vehicle 100 so that the vehicle is able to periodically (e.g., continuously, every minute, at a predetermined point) communicate its location to the garage sale server through a network 2904 and/or a cellular network 4208. In one embodiment, the global positioning system 218 may be communicatively coupled with the processor 202, a memory (e.g., the data storage 204), the LIDAR unit 224, the RADAR 222, and/or the camera 226.

The IMU 220 could include any combination of sensors (e.g., accelerometers and gyroscopes) configured to sense position and orientation changes of the autonomous neighborhood vehicle 100 based on inertial acceleration. In one embodiment, the IMU 220 may be used to calculate the magnitude of deceleration.

The RADAR unit 222 may represent a system that utilizes radio signals to sense objects within the local environment of the autonomous neighborhood vehicle 152. In some embodiments, in addition to sensing the objects, the RADAR unit 222 may additionally be configured to sense the speed and/or heading of the objects. The RADAR unit 222 may determine a range, an altitude, a direction, a shape, and/or speed of objects. In one embodiment, the autonomous neighborhood vehicle 100 may be able to travel on sidewalks, bike lanes, the side of the road, in streams, rivers, and/or may be able to stop at stop lights, wait to cross the road, navigate vehicle and/or pedestrian traffic, obey traffic laws etc. The autonomous neighborhood vehicle 100 may have upon it infrared sensors, laser sensors and/or an on board navigation.

Similarly, the laser rangefinder or LIDAR unit 224 may be any sensor configured to sense objects in the environment in which the autonomous neighborhood vehicle 100 is located using lasers. Depending upon the embodiment, the laser rangefinder/LIDAR unit 224 could include one or more laser sources, a laser scanner, and one or more detectors, among other system components. The laser rangefinder/LIDAR unit 224 could be configured to operate in a coherent (e.g., using heterodyne detection) or an incoherent detection mode. The LIDAR 108 may use ultraviolet, visible and/or near infrared light to image objects in a 360 degree field of view. The objects imaged by the LIDAR 108 may include non-metallic objects, metallic objects, rocks, people, vehicles, rain, traffic cones, traffic lights and/or signs etc. The LIDAR 108 may be communicatively couple to the navigation server to provide remote sensing capability to the autonomous neighborhood vehicle 100 such that the autonomous neighborhood vehicle 100 is autonomously navigable to the destination.

The camera 226 could include one or more devices configured to capture a plurality of images of the environment of the autonomous neighborhood vehicle 152. The camera 226 could be a still camera or a video camera. The camera 226 may be a set of cameras, a single multidirectional camera, a camera with a 360 degree view, a rotating camera, a stereo optic camera etc. The control system 230 may be configured to control operation of the autonomous neighborhood vehicle 100 and its components. Accordingly, the control system 230 could include various elements include steering unit 232, throttle 234, brake unit 236, a sensor fusion algorithm 238, a computer vision system 240, a navigation server 242, an obstacle avoidance system 244, and a temperature control module 246.

The steering unit 232 could represent any combination of mechanisms that may be operable to adjust the heading of autonomous neighborhood vehicle 100. The throttle 234 could be configured to control, for instance, the operating speed of the engine/motor 210 and, in turn, control the speed of the autonomous neighborhood vehicle 100. The brake unit 236 could include any combination of mechanisms configured to decelerate the autonomous neighborhood vehicle 100. The brake unit 236 could use friction to slow the wheels/tires 216. In other embodiments, the brake unit 136 could convert the kinetic energy of the wheels/tires 216 to electric current. The brake unit 236 may take other forms as well.

The sensor fusion algorithm 238 may be an algorithm (or a computer program product storing an algorithm) configured to accept data from the sensor system 102 as an input. The data may include, for example, data representing information sensed at the sensors of the sensor system 102. The sensor fusion algorithm 238 could include, for instance, a Kalman filter, Bayesian network, or other algorithm. The sensor fusion algorithm 238 could further provide various assessments based on the data from sensor system 102. Depending upon the embodiment, the assessments could include evaluations of individual objects and/or features in the environment of autonomous neighborhood vehicle 100, evaluation of a particular situation, and/or evaluate possible impacts based on the particular situation. In one embodiment, the sensor fusion algorithm may determine that a sidewalk is ending and/or beginning (e.g., by sensing a curb). The autonomous neighborhood vehicle may be able to adjust its path to avoid and/or intersect with the curb and/or sidewalk (e.g., traversing the curb to move from a bike lane to a sidewalk or vice versa). Other assessments are possible. The autonomous neighborhood vehicle 100 may be able to use the sensor fusion algorithm 238 to use multiple sources of data to navigate intersections (e.g., while turning in an intersection) without use of lanes, painted lines, demarcated paths etc.

The computer vision system 240 may be any system operable to process and analyze images captured by camera 226 in order to identify objects and/or features in the environment of autonomous neighborhood vehicle 100 that could include traffic signals, road way boundaries, and obstacles. The computer vision system 240 could use an object recognition algorithm, a Structure From Motion (SFM) algorithm, video tracking, and other computer vision techniques. In some embodiments, the computer vision system 240 could be additionally configured to map an environment, track objects, estimate the speed of objects, etc. The navigation and pathing system 242 may be any system configured to determine a driving path for the autonomous neighborhood vehicle 100. The navigation and pathing system 242 may additionally be configured to update the driving path dynamically while the autonomous neighborhood vehicle 100 is in operation. In some embodiments, the navigation and pathing system 242 could be configured to incorporate data from the sensor fusion algorithm 238, the GPS 218, and one or more predetermined maps so as to determine the driving path for autonomous neighborhood vehicle 100. The obstacle avoidance system 244 could represent a control system configured to identify, evaluate, and avoid or otherwise negotiate potential obstacles (e.g., pedestrians, vehicles, bicycles, sidewalks (e.g., curbs, paved sidewalks), traffic cones, downed tree branches) in the environment of the autonomous neighborhood vehicle 152. The control system 230 may additionally or alternatively include components other than those shown and described.

Peripherals 248 may be configured to allow interaction between the autonomous neighborhood vehicle 100 and external sensors, other vehicles, other computer systems, and/or a user. For example, Peripherals 248 could include a wireless communication system 250, the user interface 104, a microphone 254, a speaker 256, the path lighting device 108, and/or the ejection module 110. The path lighting device may include a set of light emitting diodes 270 and/or a light sensor 272 to detect that an environmental brightness is below a threshold luminosity. The speaker 1352 may play a message recorded (e.g., through the microphone 254 and/or a mobile device and/or computer that sends the message to the autonomous neighborhood vehicle). The microphone 254 may pick up and/or record noise from the autonomous neighborhood vehicle's environment. The speaker 256 may play the message (e.g., instructions to an individual at a destination (e.g., an order)) and/or announce actions of the autonomous neighborhood vehicle 100 (e.g., announce that the autonomous neighborhood vehicle 100 is about to make a left turn and/or break). In one embodiment, the autonomous neighborhood vehicle 100 may have one or more turn signals and/or break lights.

The speaker 256, microphone 254, and/or the wireless communication system 250 (e.g., working in concert) may record and/or play an audio message (e.g., from the sender to the recipient and/or vice versa) recorded on the autonomous neighborhood vehicle 100 itself and/or sent to the autonomous neighborhood vehicle 100 from the commerce server 4200 through the network. The wireless communication system 250 may enable the autonomous neighborhood vehicle 100 to communicate through the network with other autonomous neighborhood vehicles 100 (e.g., in the network, within a threshold radial distance 4219, owned by the same owner, sent by the same sender, sent to the same recipient). In one embodiment, this communication may be used to maximize efficiency of routes, coordinate and/or ensure timely delivery, to form a convoy etc.

In an example embodiment, the Peripherals 248 could provide, for instance, means for a user of the autonomous neighborhood vehicle 100 to interact with the user interface 104. To this end, the user interface 104 could provide information to a user of autonomous neighborhood vehicle 100. The user interface 104 could also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the Peripherals 248 may provide means for the autonomous neighborhood vehicle 100 to communicate with devices within its environment. The microphone 254 may be configured to receive audio (e.g., a voice command or other audio input) from a user of the autonomous neighborhood vehicle 100. Similarly, the speakers 256 may be configured to output audio to the user of the autonomous neighborhood vehicle 100. The ejection module 110 may be coupled with a camera and/or may enable the autonomous neighborhood vehicle 100 to eject item(s) 4502 using pressurized air (e.g., deliver packages to a door step without leaving the sidewalk 112.

In one example, the wireless communication system 250 could be configured to wirelessly communicate with one or more devices directly or via a communication network. For example, wireless communication system 250 could use 3G cellular communication, such as CDMA, EVDO, GSM/GPRS, or 4G cellular communication, such as WiMAX or LTE. Alternatively, wireless communication system 250 could communicate with a wireless local area network (WLAN), for example, using WiFi. In some embodiments, wireless communication system 250 could communicate directly with a device, for example, using an infrared link, Bluetooth, or ZigBee. Other wireless protocols, such as various vehicular communication systems, are possible within the context of the disclosure. For example, the wireless communication system 250 could include one or more dedicated short range communications (DSRC) devices that could include public and/or private data communications between vehicles and/or roadside stations. The wireless communication system 250 may also enable the autonomous neighborhood vehicle 100 to communicate and/or coordinate with other autonomous neighborhood vehicles 100.

The power supply 258 may provide power to various components of autonomous neighborhood vehicle 100 and could represent, for example, a rechargeable lithium-ion, lithium-sulfur, or lead-acid battery. In some embodiments, one or more banks of such batteries could be configured to provide electrical power. Other power supply materials and configurations are possible. In some embodiments, the power supply 258 and energy source 212 could be implemented together, as in some all-electric cars. In one embodiment, the autonomous neighborhood vehicle 100 may autonomously direct itself to a charging station (e.g., a set non-transitory charging stations, a nearest charging station, a nearest preapproved (e.g., claimed) charging station) and/or conduct necessary operations to charge itself when an energy supply reaches a threshold level, at a certain time of day, when a certain amount of time has elapsed, when a certain distance has been traveled etc.

Many or all of the functions of autonomous neighborhood vehicle 100 (e.g., the autonomous neighborhood vehicle 100) could be controlled by computer system 200. Computer system 200 may include at least one processor 202 (which could include at least one microprocessor) that executes instructions 206 stored in a non-transitory computer readable medium, such as the data storage 204. The processor 202 may be communicatively coupled to the commerce server 4200 (shown in FIG. 42) of the neighborhood communication system 2950 through a wireless network (e.g., the network of FIG. 42) to autonomously navigate the autonomous neighborhood vehicle (e.g., the neighborhood rover vehicle) to a destination specified by the commerce server 4200. The computer system 200 may also represent a plurality of computing devices that may serve to control individual components or subsystems of the autonomous neighborhood vehicle 100 in a distributed fashion.

In some embodiments, data storage 204 may contain instructions 206 (e.g., program logic) executable by the processor 202 to execute various functions of autonomous neighborhood vehicle 100, including those described above in connection with FIG. 2. Data storage 204 may contain additional instructions as well, including instructions to transmit data to, receive data from, interact with, and/or control one or more of the propulsion system 208, the sensor system 102, the control system 230, and the Peripherals 248. In addition to the instructions 206, the data storage 204 may store data such as roadway maps, path information, among other information. Such information may be used by the autonomous neighborhood vehicle 100 and computer system 200 at during the operation of the autonomous neighborhood vehicle 100 in the autonomous, semi-autonomous, and/or manual modes. The autonomous neighborhood vehicle 100 may include a user interface 104 for providing information to or receiving input from a user of the autonomous neighborhood vehicle 100. The user interface 104 could control or enable control of content and/or the layout of interactive images that could be displayed on the touchscreen. Further, the user interface 104 could include one or more input/output devices within the set of Peripherals 248, such as the wireless communication system 250, the touchscreen, the microphone 254, and the speaker 256.

The computer system 200 may control the function of the autonomous neighborhood vehicle 100 based on inputs received from various subsystems (e.g., propulsion system 208, sensor system 102, and control system 230), as well as from the user interface 104. For example, the computer system 200 may utilize input from the control system 230 in order to control the steering unit 232 to avoid an obstacle detected by the sensor system 102 and the obstacle avoidance system 244. Depending upon the embodiment, the computer system 200 could be operable to provide control over many aspects of the autonomous neighborhood vehicle 100 and its subsystems. The components of autonomous neighborhood vehicle 100 could be configured to work in an interconnected fashion with other components within or outside their respective systems. For instance, in an example embodiment, the camera 226 could capture a plurality of images that could represent information about a state of an environment of the autonomous neighborhood vehicle 152 operating in an autonomous mode. The environment could include another vehicle. The computer vision system 240 could recognize the other vehicle as such based on object recognition models stored in data storage 204.

The computer system 200 could carry out several determinations based on the information. For example, the computer system 200 could determine one or more predicted behaviors 305 of the other vehicle. The predicted behavior could be based on several factors including the current state of the autonomous neighborhood vehicle 100 (e.g., vehicle speed, current lane, etc.) and the current state of the environment of the autonomous neighborhood vehicle 152 (e.g., speed limit, number of available lanes, position and relative motion of other vehicles, etc.). For instance, in a first scenario, if another vehicle is rapidly overtaking the autonomous neighborhood vehicle 100 from a left-hand lane, while autonomous neighborhood vehicle 100 is in a center lane, one predicted behavior could be that the other vehicle will continue to overtake the autonomous neighborhood vehicle 100 from the left-hand lane.

In a second scenario, if the other vehicle is overtaking autonomous neighborhood vehicle 100 in the left-hand lane, but a third vehicle traveling ahead of autonomous neighborhood vehicle 100 is impeding further progress in the left-hand lane, a predicted behavior could be that the other vehicle may cut in front of autonomous neighborhood vehicle 100. The computer system 200 could further determine a confidence level corresponding to each predicted behavior. For instance, in the first scenario, if the left-hand lane is open for the other vehicle to proceed, the computer system 200 could determine that it is highly likely that the other vehicle will continue to overtake autonomous neighborhood vehicle 100 and remain in the left-hand lane. Thus, the confidence level corresponding to the first predicted behavior (that the other vehicle will maintain its lane and continue to overtake) could be high, such as 90%.

In the second scenario, where the other vehicle is blocked by a third vehicle, the computer system 200 could determine that there is a 50% chance that the other vehicle may cut in front of autonomous neighborhood vehicle 100 since the other vehicle could simply slow and stay in the left-hand lane behind the third vehicle. Accordingly, the computer system 200 could assign a 50% confidence level (or another signifier) to the second predicted behavior in which the other vehicle may cut in front of the autonomous neighborhood vehicle 100.

In the example embodiment, the computer system 200 could work with data storage 204 and other systems in order to control the control system 230 based on at least on the predicted behavior, the confidence level, the current state of the autonomous neighborhood vehicle 100, and the current state of the environment of the autonomous neighborhood vehicle 152. In the first scenario, the computer system 200 may elect to adjust nothing as the likelihood (confidence level) of the other vehicle staying in its own lane is high. In the second scenario, the computer system 200 may elect to control autonomous neighborhood vehicle 100 to slow down slightly (by reducing throttle 234) or to shift slightly to the right (by controlling steering unit 232) within the current lane in order to avoid a potential collision. Other examples of interconnection between the components of autonomous neighborhood vehicle 100 are numerous and possible within the context of the disclosure.

Although FIG. 2 shows various components of autonomous neighborhood vehicle 100, i.e., wireless communication system 250, computer system 200, data storage 204, and user interface 104, as being integrated into the autonomous neighborhood vehicle 100, one or more of these components could be mounted or associated separately from the autonomous neighborhood vehicle 100. For example, data storage 204 could, in part or in full, exist separate from the autonomous neighborhood vehicle 100. Thus, the autonomous neighborhood vehicle 100 could be provided in the form of device elements that may be located separately or together. The device elements that make up autonomous neighborhood vehicle 100 could be communicatively coupled together in a wired and/or wireless fashion.

Figure 3A:
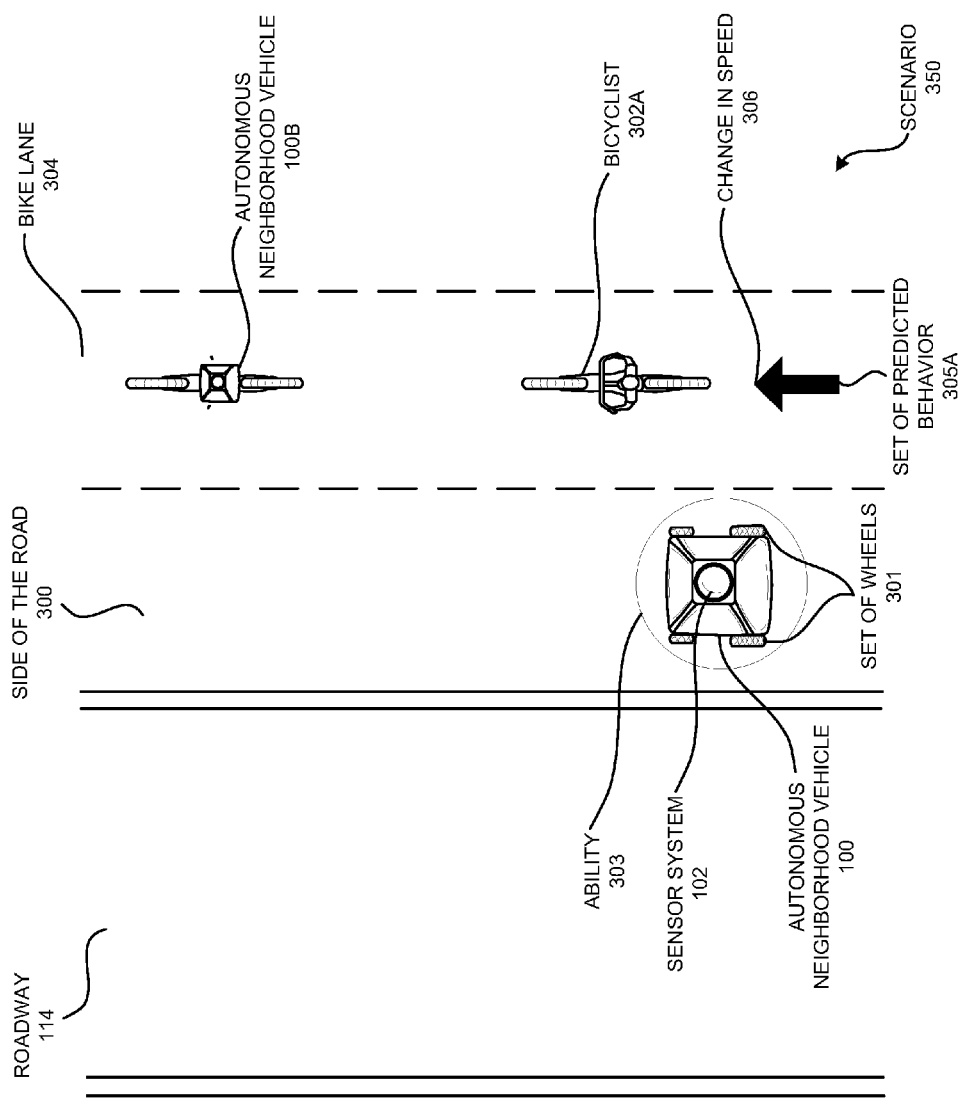
FIG. 3A is a scenario of the autonomous neighborhood on the side of the road predicting bicycle behavior, according to one embodiment.

FIG. 3A illustrates a scenario 350 involving the roadway 114 with a side of the road 300, an ability 303, and a bike lane 304. An autonomous neighborhood vehicle 100B (e.g., an autonomous neighborhood bicycle 4300 shown in FIG. 43A) could be in the bike lane 304. An autonomous neighborhood vehicle 100 could be operating in an autonomous mode in the side of the road 300. In one embodiment, the autonomous neighborhood vehicle 100 may have the ability to travel autonomously in a bike lane 304. The autonomous neighborhood vehicle 100 and the autonomous neighborhood vehicle 100B could be travelling at the same speed. Another bicyclist 302A could be in the bike lane 304 and approaching the autonomous neighborhood vehicle 100B from behind at a higher rate of speed. The sensor system 102 (e.g., the LIDAR 108, the RADAR unit 222, the camera 226, an ultrasound unit 228) of the autonomous neighborhood vehicle 100 could be capturing sensor data based on an environment of the autonomous neighborhood vehicle 100.

Although the embodiment of FIG. 3A, the sensor system 102 is shown on the top of the autonomous neighborhood vehicle 100, it should be appreciated that the sensor system 102 may be located internally, on the front, on the sides etc. of the autonomous neighborhood vehicle 100. In particular, the camera 226 could capture a plurality of images of the autonomous neighborhood vehicle 100B, the other bicyclist 302A, as well as other features in the environment so as to help the computer system of the autonomous neighborhood vehicle 100 to determine the current state of the environment of the autonomous neighborhood vehicle 152. Other sensors associated with the autonomous neighborhood vehicle 100 could be operable to provide the speed, heading, location, and other data such that the computer system of the autonomous neighborhood vehicle 100 could determine the current state of the autonomous neighborhood vehicle 100.

Based upon the current state of the autonomous neighborhood vehicle 100 and the current state of the environment of the autonomous neighborhood vehicle 152, the computer system in autonomous neighborhood vehicle 100 could further determine a predicted behavior of at least one other autonomous neighborhood vehicle 100 in the environment of the autonomous neighborhood vehicle 152. Within the context of FIG. 3A, a set of predicted behaviors 305A (e.g., a predicted behavior, a number of predicted behaviors) may be determined for both autonomous neighborhood vehicle 100B and the other bicyclist 302A. As the predicted behaviors 305 could be based on the current state of the environment of the autonomous neighborhood vehicle 152, the computer system of the autonomous neighborhood vehicle 100 could take into account factors such as the speed of the respective autonomous neighborhood vehicles 100, their headings, the roadway speed limit, and other available lanes, among other factors. In one embodiment, a change in speed 306 of the bicyclist 302A may be part of a criteria used to determine predicted behaviors 305A.

For instance, the autonomous neighborhood vehicle 100B could have a predicted behavior of proceeding at the same speed, and within the same lane. Depending on the embodiment, such a predicted behavior that maintains a 'status quo' may be considered a default predicted behavior. Predicted behaviors 305A for the other bicyclist 302A could include the other bicyclist 302A slowing down to match the speed of the autonomous neighborhood vehicle 100B. Alternatively, the other bicyclist 302A could change lanes to the side of the road 300 or the other bicyclist 302A could change lanes to the side of the road 300 and cut off the autonomous neighborhood vehicle 100.

Depending upon the embodiment and the situation, a wide variety of predicted behaviors 305 of other autonomous neighborhood vehicles 100 could be possible. Possible predicted behaviors 305 could include, but are not limited to, other autonomous neighborhood vehicles 100 changing lanes, accelerating, decelerating, changing heading, or vehicles exiting the roadway, merging into the side of the road 300 (e.g., to turn right off of the roadway 114). Predicted behaviors 305 could also include other entities (e.g., other autonomous neighborhood vehicles 100, other vehicles (e.g., cars), bicyclists, pedestrians, animals) pulling over due to an emergency situation, colliding with an obstacle, and colliding with another entity. Predicted behaviors 305 could be based on what another entity may do in response to the autonomous neighborhood vehicle 100 or in response to a third entity (e.g., bicyclist). Other predicted behaviors 305 could be determined that relate to any vehicle (e.g., autonomous neighborhood vehicle, car, bicycle) driving behavior observable and/or predictable based on the methods and apparatus disclosed herein.

For each predicted behavior or for a predetermined set of predicted behaviors 305, the computer system of autonomous neighborhood vehicle 100 could determine corresponding confidence levels. The confidence levels could be determined based on the likelihood that the given entity (e.g., vehicle) will perform the given predicted behavior. For instance, if the autonomous neighborhood vehicle 100B is highly likely to perform the predicted behavior (staying in the current lane, maintaining current speed), the corresponding confidence level could be determined to be high (e.g., 90%). In some embodiments, the confidence level could be represented as a number, a percentage, or in some other form. With respect to the other bicyclist 302A, possible confidence levels could be expressed as follows: slowing down to match speed of autonomous neighborhood vehicle 100B—40%, maintaining speed and staying in the bike lane 304—40%, maintaining speed and changing to side of the road 300—20%.

The computer system could control autonomous neighborhood vehicle 100 in the autonomous mode based on at least the determined predicted behaviors 305 and confidence levels. For instance, the computer system could take into account the fact the autonomous neighborhood vehicle 100B is highly unlikely to change its rate of speed or lane and as such, the computer system could consider autonomous neighborhood vehicle 100B as a 'moving obstacle' that limits the drivable portion of the path for both the autonomous neighborhood vehicle 100 as well as the other bicyclist 302A. The computer system may further consider that there is some finite probability that the other bicyclist 302A will pull into the side of the road 300 and cut off the autonomous neighborhood vehicle 100. As such, the computer system may cause the autonomous neighborhood vehicle 100 to slow down slightly, for instance by reducing the throttle, so as to allow a margin of safety if the other bicyclist 302A elects to cut in front.

Figure 3B:
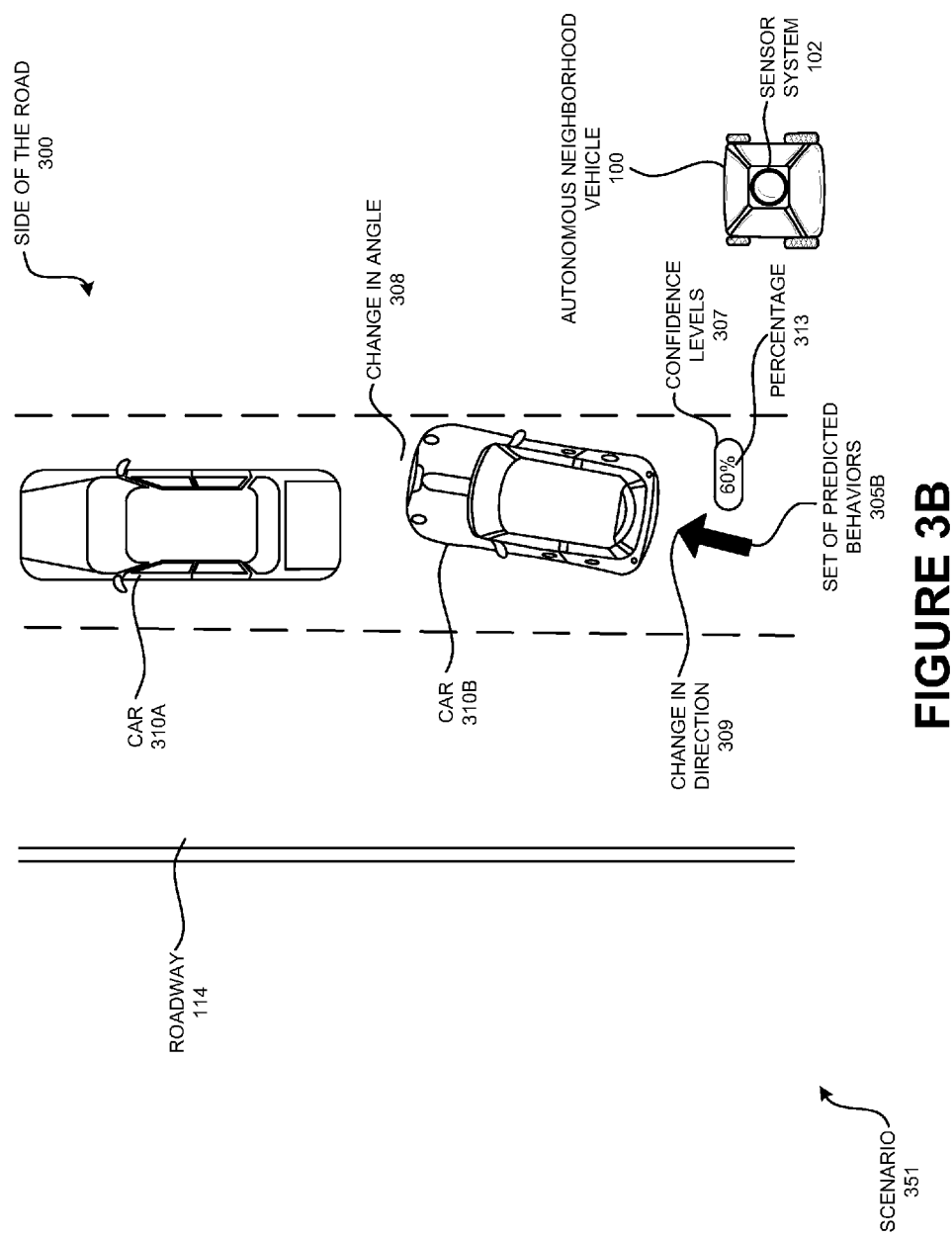
FIG. 3B is a scenario of the autonomous neighborhood vehicle predicting car behavior, according to one embodiment.

FIG. 3B illustrates a scenario 351 similar to that in FIG. 3A. In scenario 351, a car 310B has changed its heading towards the side of the road 300 and has moved closer to the autonomous neighborhood vehicle 100. The computer system of autonomous neighborhood vehicle 100 may continuously update the state of the car 310B as well as its environment, for instance at a rate of thirty times per second. Accordingly, the computer system may be dynamically determining predicted behaviors 305 and their corresponding confidence levels for car 310B in the environment of the autonomous neighborhood vehicle 152. In scenario 351, due at least in part to the changing environment, a new predicted behavior could be determined for car 310B. In such a situation, the autonomous neighborhood vehicle 100 may make way for the car 310B by slowing down. Thus, the predicted behaviors 305 and corresponding confidence levels 307 could change dynamically.

In scenario 351, the computer system of autonomous neighborhood vehicle 100 could update the confidence level of the predicted behavior of the other vehicles (e.g., car 310B). For instance, since the car 310B has changed its heading toward the side of the road 300 and has moved nearer to the autonomous neighborhood vehicle 100, it may be determined that the car 310B is highly likely to change lanes into the side of the road 300 based on an observed change in angle 308 and/or a change in direction 309, according to one embodiment. Accordingly, based on the increased confidence level 307 of the predicted behavior of the car 310B, the computer system of the autonomous neighborhood vehicle 100 could control the brake unit to abruptly slow the autonomous neighborhood vehicle 100 so as to avoid a collision with the car 310B. As such, the computer system of autonomous neighborhood vehicle 100 could carry out a range of different control actions in response to varying predicted behaviors 305B (e.g., a set of predicated behaviors) and their confidence levels. For example, if another entity (e.g., a car, another autonomous neighborhood vehicle, an animal, a pedestrian) is predicted to behave very dangerously and such predicted behavior has a high confidence level, the computer system of autonomous neighborhood vehicle 100 could react by aggressively applying the brakes or steering the autonomous neighborhood vehicle 100 evasively to avoid a collision.

Conversely, if the computer system determines that the other entity may carry out a predicted behavior that is very dangerous, but the confidence level is very low, the computer system may determine that only a minor adjustment in speed is necessary or the computer system may determine that no adjustment is required. In one embodiment, the autonomous neighborhood vehicle 100 may predict a collision between cars 310A and 310B. The autonomous neighborhood vehicle may be able to adjust its speed and/or course to avoid being involved in the collision.

Figure 3C:
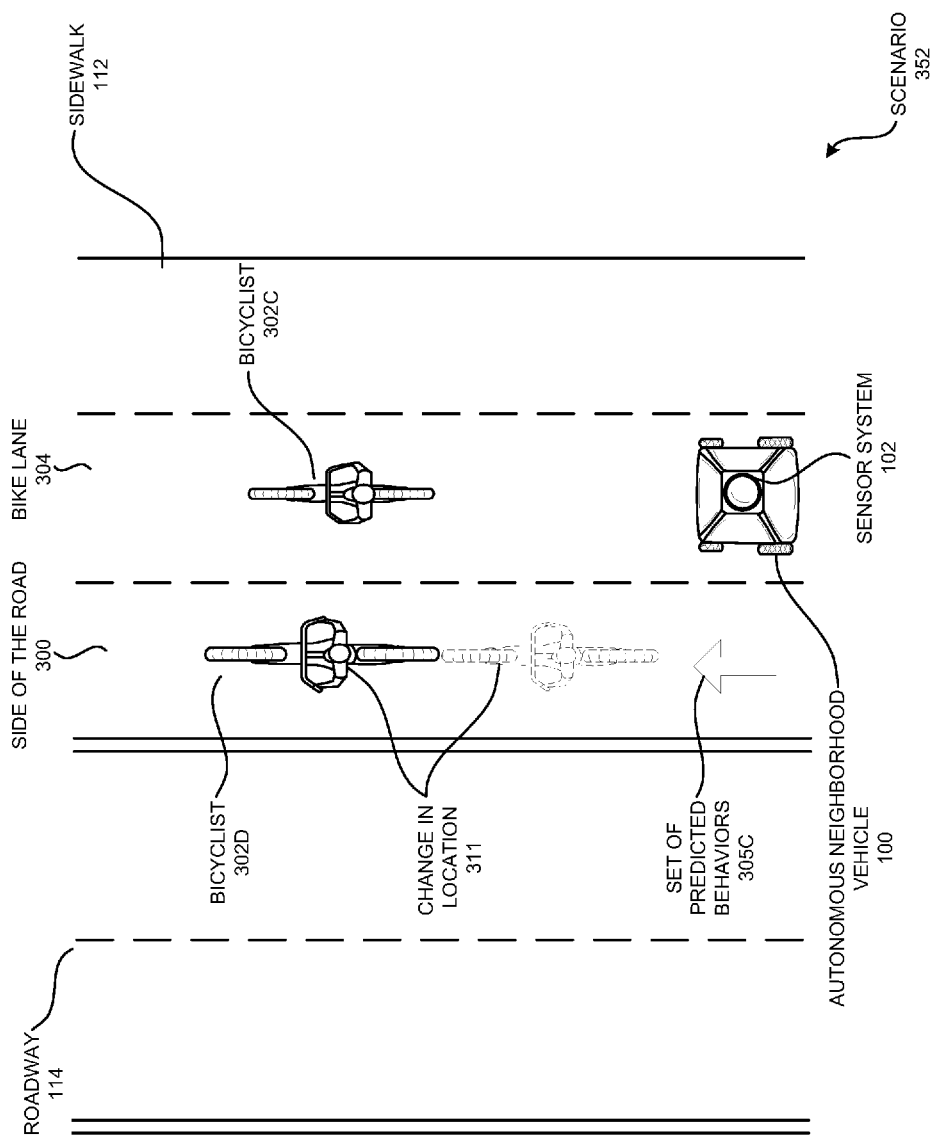
FIG. 3C is a scenario of the autonomous neighborhood vehicle in a bike lane predicating bicycle behavior, according to one embodiment.

FIG. 3C is a top view of an autonomous neighborhood vehicle 100 operating scenario 352. In scenario 352, an autonomous neighborhood vehicle 100 with a sensor system 102 could be operating in an autonomous mode. As such, the sensor system 102 could be obtaining data from the environment of the autonomous neighborhood vehicle 152 and the computer system of the autonomous neighborhood vehicle 100 could be determining a current state of the autonomous neighborhood vehicle 100 and a current state of the environment of the autonomous neighborhood vehicle 152.

Scenario 352 includes a bicyclist 302C traveling at the same speed and in the same bike lane 304 as the autonomous neighborhood vehicle 100. A bicyclist 302D could be traveling at a higher speed in the side of the road 300. In such a situation, the computer system of autonomous neighborhood vehicle 100 could determine predicted behaviors 305C (e.g., a set of predicted behaviors) for the bicyclist 302C and bicyclist 302D. The bicyclist 302D could continue at its current speed and within its current lane. Thus, a 'default' predicted behavior could be determined. For another possible predicted behavior, the bicyclist 302D may also change lanes into the bike lane 304 and cut off the autonomous neighborhood vehicle 100. The computer system of autonomous neighborhood vehicle 100 could determine a default predicted behavior for the bicyclist 302D (e.g., the bicyclist 302D will maintain present speed and lane).

The computer system of autonomous neighborhood vehicle 100 could determine confidence levels 307 for each predicted behavior. For instance, the confidence level for the bicyclist 302C maintaining speed and the same lane could be relatively high. The confidence level of the bicyclist 302D to change lanes into the bike lane 304 and cut off the autonomous neighborhood vehicle 100 could be determined to be relatively low, for instance, because the space between the bicyclist 302C and the autonomous neighborhood vehicle 100 is too small to safely execute a lane change. Further, the confidence level of the bicyclist 302D maintaining its speed and its current lane may be determined to be relatively high, at least in part because the side of the road 300 is clear ahead. Thus, based on these predictions and confidence levels, the computer system of autonomous neighborhood vehicle 100 could control the autonomous neighborhood vehicle 100 to maintain its current speed and heading in bike lane 304. In one embodiment, a change in location 311 could be used to determine a confidence level for predicted behaviors 305.

Figure 4:
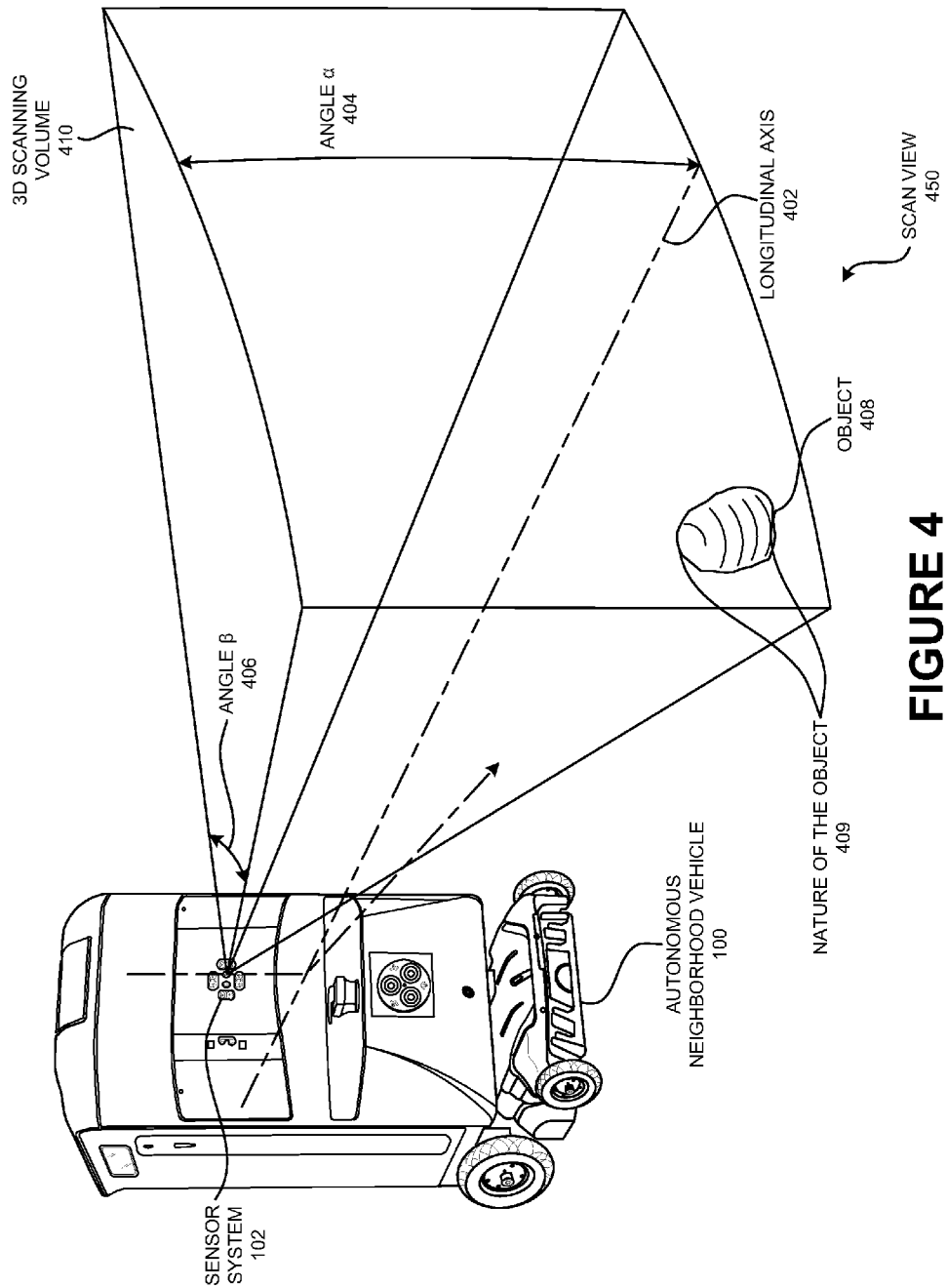
FIG. 4 is a scan view of the autonomous neighborhood vehicle of FIG. 1A detecting an object, according to one embodiment.

FIG. 4 is a scan view 450 of the autonomous neighborhood vehicle 100. Particularly, FIG. 4 shows the sensor system 102 (e.g., the LIDAR 108, the RADAR unit 222, the camera 226, a stereo optic sensor, and/or an ultrasound unit 228), a longitudinal axis, an angle β 404, an angle α 406, an object 408, and a nature of the object 409. To produce a three-dimensional (3D) image, in one embodiment of the present invention, the sensor system 102 may be panned (or oscillated) in, along and/or out of the longitudinal axis to create a 3D scanning volume 410, as shown in FIG. 4. For sake of illustration, FIG. 4 defines the scanning volume 410 by the angle α 404 (in the vertical scanning direction) and the angle β 406 (in the horizontal scanning direction). The angle α 404 may range from 30 to 70 degrees, at angular speeds ranging from 100-1000 degrees per second. The angle β 406 (i.e., the panning angle) may range from 1 to 270 degrees, at a panning rate ranging from 1-150 degrees per second. Combined the imaging sensor system 102 typically can completely scan the 3D scanning volume 410 at more than two times a second.

In order to accurately determine the distance to objects in the 3D scanning volume 410, the direction that the sensor system 102 is pointed at the time of receiving light reflected from the objects 408 is needed (i.e., the angle of deflection from the longitudinal axis 402 is needed). Further, in one embodiment of the present invention, geospatial positional data of the instantaneous vehicle position is utilized by processor (e.g., the processor 202) to calculate based on the distance of the object from the autonomous neighborhood vehicle 100 and its direction from the autonomous neighborhood vehicle 100, the geospatial location of the objects in the field of view. In one configuration of the present invention, the processor may include a personal computer running on a Linux operating system, and the algorithms may be programmed in Java programming language. Other computing systems and programming languages can be used in the present invention. The processor (e.g., the processor 202) may be communicatively coupled with a real time positioning device, such as for example the global positioning system (GPS) 218 and/or the internal measurement unit 1324, that transmits the location, heading, altitude, and speed of the vehicle multiple times per second to processor. The real time positioning device may typically be mounted to the autonomous neighborhood vehicle 100 and may transmit data (such as location, heading, altitude, and speed of the vehicle) to all imaging sensors (e.g., other LIDAR, radar, ultrasound units 228 and/or cameras) (and all processors) on the autonomous neighborhood vehicle 100.

With commercially available GPS and the INS units, processor objects 102 may be able to determine a position of an object in the field of view to an accuracy of better than 10 cm. In one embodiment of the present invention, the processor 202 may correlate GPS position, LADAR measurements, and/or angle of deflection data to produce a map of obstacles in a path of the autonomous neighborhood vehicle 100. The accuracy of the map may depend on the accuracy of the data from the positioning device (e.g., the global positioning system 218). The following are illustrative examples of the accuracies of such data: position 10 cm, forward velocity 0.07 km/hr, acceleration 0.01%, roll/pitch 0.03 degrees, heading 0.1 degrees, lateral velocity 0.2%.

In one embodiment of the present invention, a Kalman filter (commercially integrated) sorts through all data inputs to the processor (e.g., the processor 202). A Kalman filter is a known method of estimating the state of a system based upon recursive measurement of noisy data. In this instance, the Kalman filter is able to much more accurately estimate vehicle position by taking into account the type of noise inherent in each type of sensor and then constructing an optimal estimate of the actual position. Such filtering is described by A. Kelly, in "A 3d State Space Formulation of a Navigation Kalman Filter for Autonomous Vehicles," CMU Robotics Institute, Tech. Rep., 1994, the entire contents of which are incorporated herein by reference. The Kalman filter is a set of mathematical equations that provides an efficient computational (recursive) means to estimate the state of a process, in a way that minimizes the mean of the squared error. The filter is very powerful in several aspects: it supports estimations of past, present, and even future states, and it can do so even when the precise nature of the modeled system is unknown.

The positioning device, by including GPS and/or INS data, may be able to provide complementary data to the processor. GPS and INS may have reciprocal errors. That is GPS may be noisy with finite drift, while INS may not be noisy but may have infinite drift. Further, the processor may be configured to accept additional inputs (discussed below) to reduce drift in its estimate of vehicle position when, for example the GPS data may not be available. The nature of the object 409 may include its size, shape, position and/or identity.

Figure 5A:
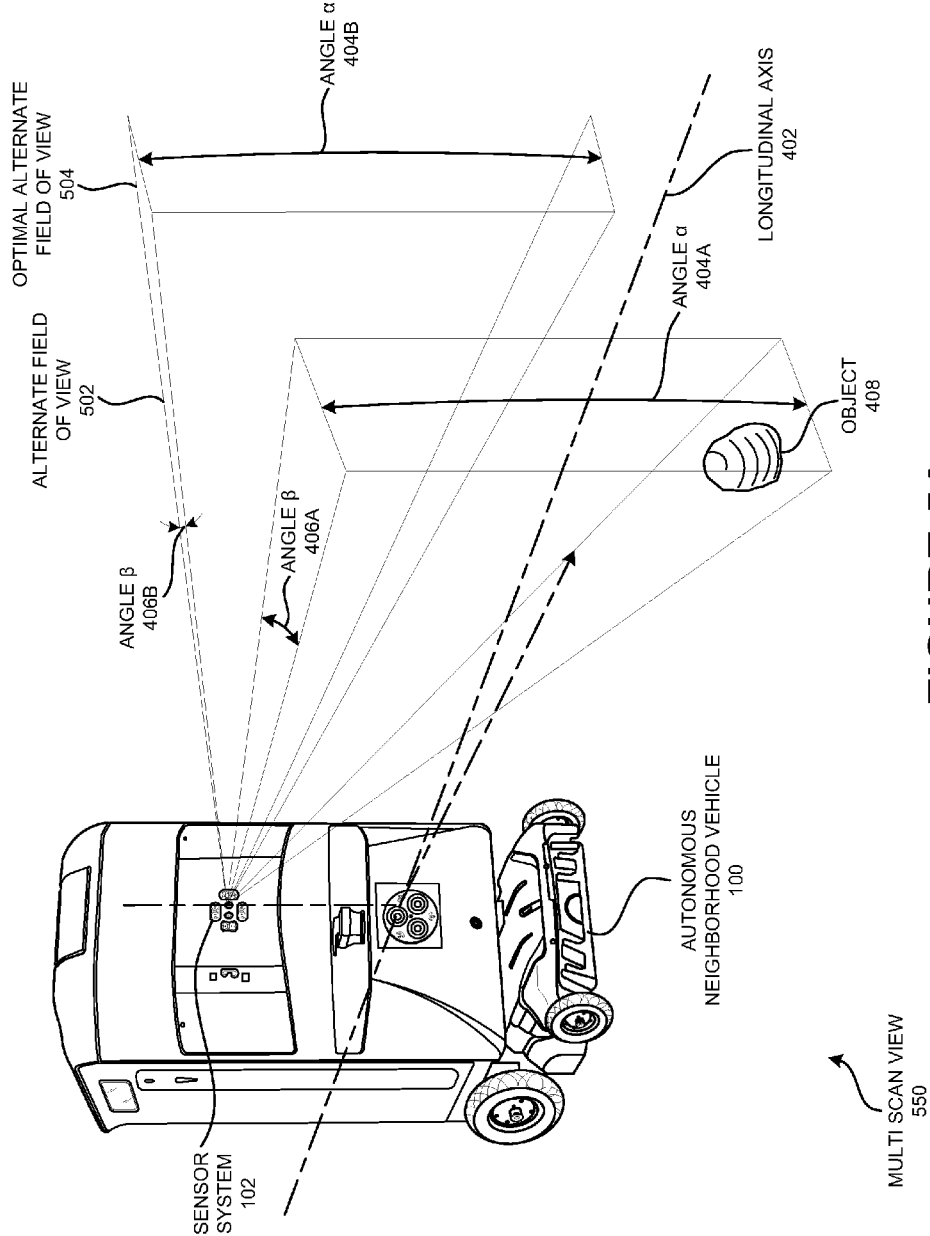
FIG. 5A is a multi scan view of the autonomous neighborhood vehicle of FIG. 1A performing a multi sensor scan of its environment, according to one embodiment.

FIG. 5A is a multi scan view 550 of the autonomous neighborhood autonomous neighborhood vehicle 100 100 according to the present invention depicting one embodiment in which multiple sensors systems 102 (e.g., LIDAR, radar, ultrasound, and/or camera(s)) are used. In this embodiment, one or more of the imaging sensors (e.g., sensor systems 306) is dedicated to scanning for the detection of objects 408 nearby the autonomous neighborhood autonomous neighborhood vehicle 100 100 (e.g., within 50 m) while another of the imaging sensors is dedicated to scanning for the detection of objects farther away from the autonomous neighborhood vehicle 100 (e.g., beyond 50 m).

In another embodiment of the invention, multiple imaging sensors are used for redundancy and to provide different perspectives of the same object. In one embodiment, the autonomous neighborhood vehicle 100 may determine that an alternate field of view is needed. For example, the autonomous neighborhood vehicle 100 may come to an intersection. However, a car may block the autonomous neighborhood vehicle's 100 ability to gain a view of the intersection to the right. As the autonomous neighborhood vehicle may plan to make a left turn, it must be aware of a traffic flow 5210 (shown in FIG. 52) coming from the right. The autonomous neighborhood vehicle 100 may prioritize its established constraints (e.g., the minimum crosswalk stopping distance, the envelope 900, the magnitude of deceleration). The autonomous neighborhood vehicle 100 may determine an optimal alternate field of view that does not violate established constraints prioritized above obtaining the alternate field of view. Achieving this alternate field of view may include moving (rotating, shifting) sensors and/or moving the autonomous neighborhood vehicle 100, according to one environment.

FIG. 5A shows an alternate field of view 502 and an optimal alternate field of view 504. In an example embodiment, the autonomous neighborhood vehicle 100 may arrive at a stop sign 5206 at an intersection 5200. A car in a next lane may block the view of the autonomous neighborhood vehicle 100. The autonomous neighborhood vehicle 100 may require the blocked view in order to assess a traffic flow 5210 before continuing along the route. The autonomous neighborhood vehicle may determine that an alternate field of view 502 is required. The autonomous neighborhood vehicle may identify a number of alternative fields of view 502 and/or select the alternate field of view that is most efficient at capturing the desired field of view, requires the least amount of time and/or effort to attain, and/or does not violate constraints that have been prioritized above attaining the alternative field of view 502 (e.g., maintaining an envelope 900). The optimal alternate field of view may be that which satisfies on or more of the above mentioned criteria. In the embodiment of FIG. 5A, the alternate field of view 502 and the optimal alternate field of view 504 are the same. It should be appreciated that this may not always be the case.

Figure 5B:
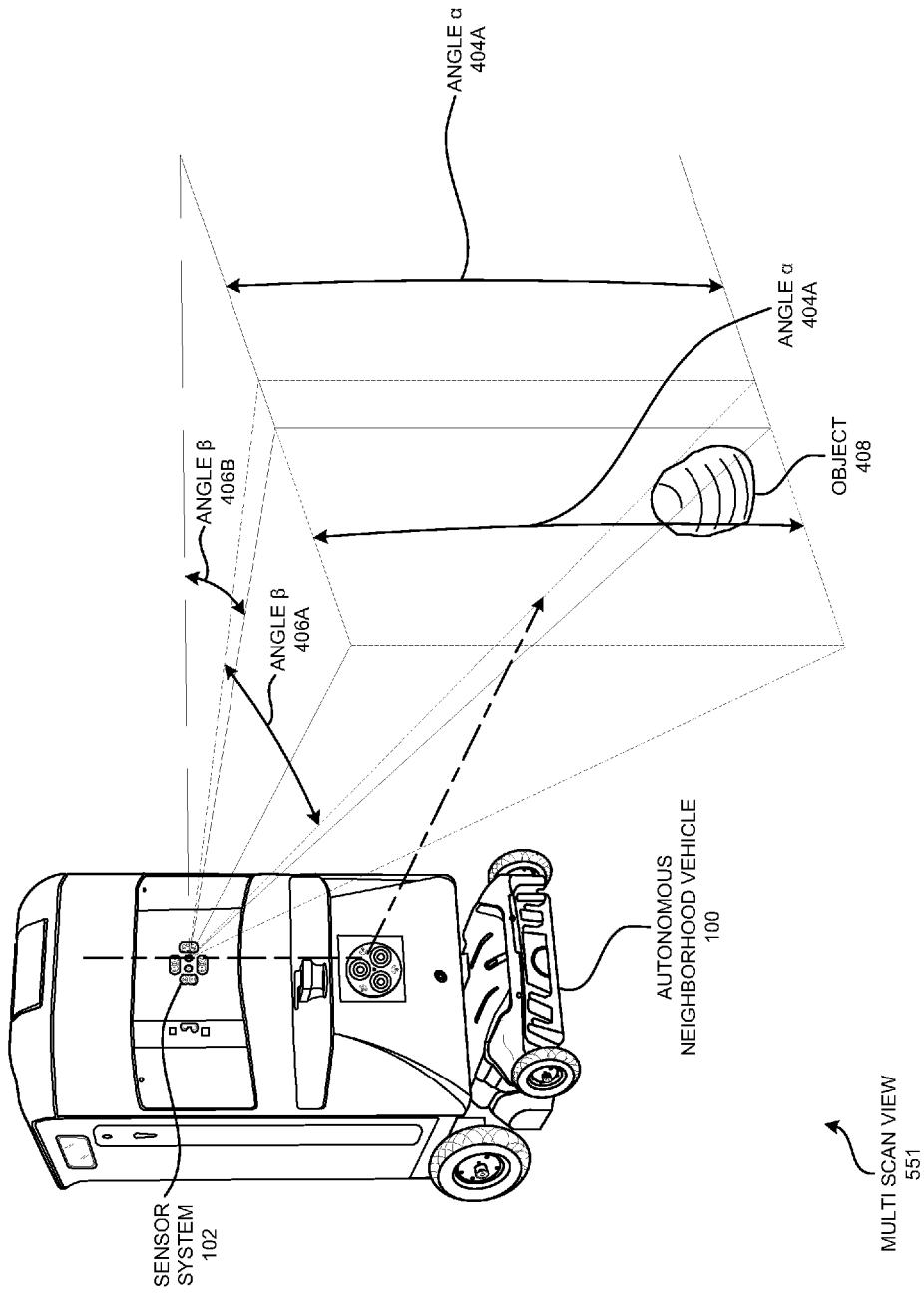
FIG. 5B is a multi scan view of the autonomous neighborhood vehicle of FIG. 5A using multiple sensor systems to scan overlapping fields of view, according to one embodiment.

FIG. 5B is a multi scan view 551 of an autonomous neighborhood vehicle 100 according to the present invention depicting one embodiment in which multiple imaging sensors systems 102 are used to scan the same or overlapping fields of view. This configuration may provide redundant coverage in the center of the path so that, if one imaging sensor (e.g., the sensor system 102) fails, the other one can still sense obstacles most likely to be directly in the autonomous neighborhood vehicle's 100 path. The data from the imaging sensors may be correlated by placing all data onto the same elevation grid.

In another embodiment, the imaging sensors may be configured to locate objects removed from a autonomous neighborhood vehicle 100; and processor (e.g., a sensor processor 600 shown in FIG. 6, the processor 202 and/or the processor 202) may be configured to direct one of the sensors to scan a first sector associated with a path of the autonomous neighborhood vehicle 100, while directing another of the sensors to scan a second sector identified with an obstacle (e.g., the object 408). As such, the first and/or second sector determinations can be based on a number of factors including, but not limited to a autonomous neighborhood vehicle 100 speed, an identified obstacle location, a projected path of the autonomous neighborhood vehicle 100, a resolution required to resolve a complex obstacle or a collection of obstacles to be resolved, sensory input other than from the sensors, an identified priority sector in which an obstacle has been identified, and auxiliary information indicating the presence of an obstacle (e.g., the object 408), a moving obstacle (e.g., a car, a pedestrian, a bike, and/or an animal), another autonomous neighborhood vehicle 100, a landmark, or an area of interest.

In one variant of this embodiment, the processor (e.g., the sensor processor 600 shown in FIG. 6, the processor 202 shown in FIG. 2) can direct one sensor to scan (using an angle α 404A, an angle α 404B, an angle β 406A, an/or an angle β 406B as described in FIG. 4) a first sector associated with a path of the autonomous neighborhood vehicle 100, and in a programmed manner direct the same sensor (e.g., in a dynamic fashion) to scan a second sector identified with an object 408. Factors which determine the programmed duty cycle by which one sensor scans the first sector and then a second sector include for example the speed of the autonomous neighborhood vehicle 100, the proximity of the obstacle (e.g., the object 408), any movement of the obstacle, an identified status of the obstacle (e.g., friend or foe), the proximity of the obstacle to the projected path of the autonomous neighborhood vehicle 100, and the calculated clearance from the autonomous neighborhood vehicle 100 to the obstacle.

Moreover, in one embodiment of the present invention, one of the imaging sensors (e.g., sensor systems 306) is dedicated to scanning in a horizontal direction while another imaging sensor is directed to scan in the vertical direction. Scan information from this unit permits the processor to better identify the general terrain and terrain curvature from which obstacles can be identified. Complementary data from both horizontal and vertical scans helps identity the edges of composite obstacles (groups of individual obstacles that should be treated as one obstacle) more accurately. One of the issues with handling moving obstacles is determining the full proportions of an obstacle. To calculate the full proportions of an obstacle, multiple "independent" obstacles are intelligently grouped to form one larger composite obstacle when for example the data points representing the independent objects 408 (e.g., obstacles) are within a set distance of each other (e.g., within 100 cm). Moreover, in other embodiments of the present invention, the grouping into composite obstacles is set by more than just a distance of separation between points normally qualifying as an obstacle point. Other factors that can be used in the determination include for example the number of times each point identified as an obstacle is seen, whether the obstacle point moves spatially in time, and whether (as discussed elsewhere) if there is confirmation of the obstacle by other image sensors or stereographic cameras.

Having two completely different perspectives of the obstacles facilitates this task by the obstacles being viewed from two separate dimensions (i.e., from top to bottom and from left to right). Since the beams tend to wrap around the curvature of an obstacle, this provides accurate estimations of the size and orientation of a composite obstacle. For instance, consider a spherical boulder. While the backside of the spherical boulder cannot be seen, the sensing beam maps out a contour of the spherical boulder providing the aforementioned size and orientation, providing an estimate of the full size of the spherical boulder.

Figure 6:
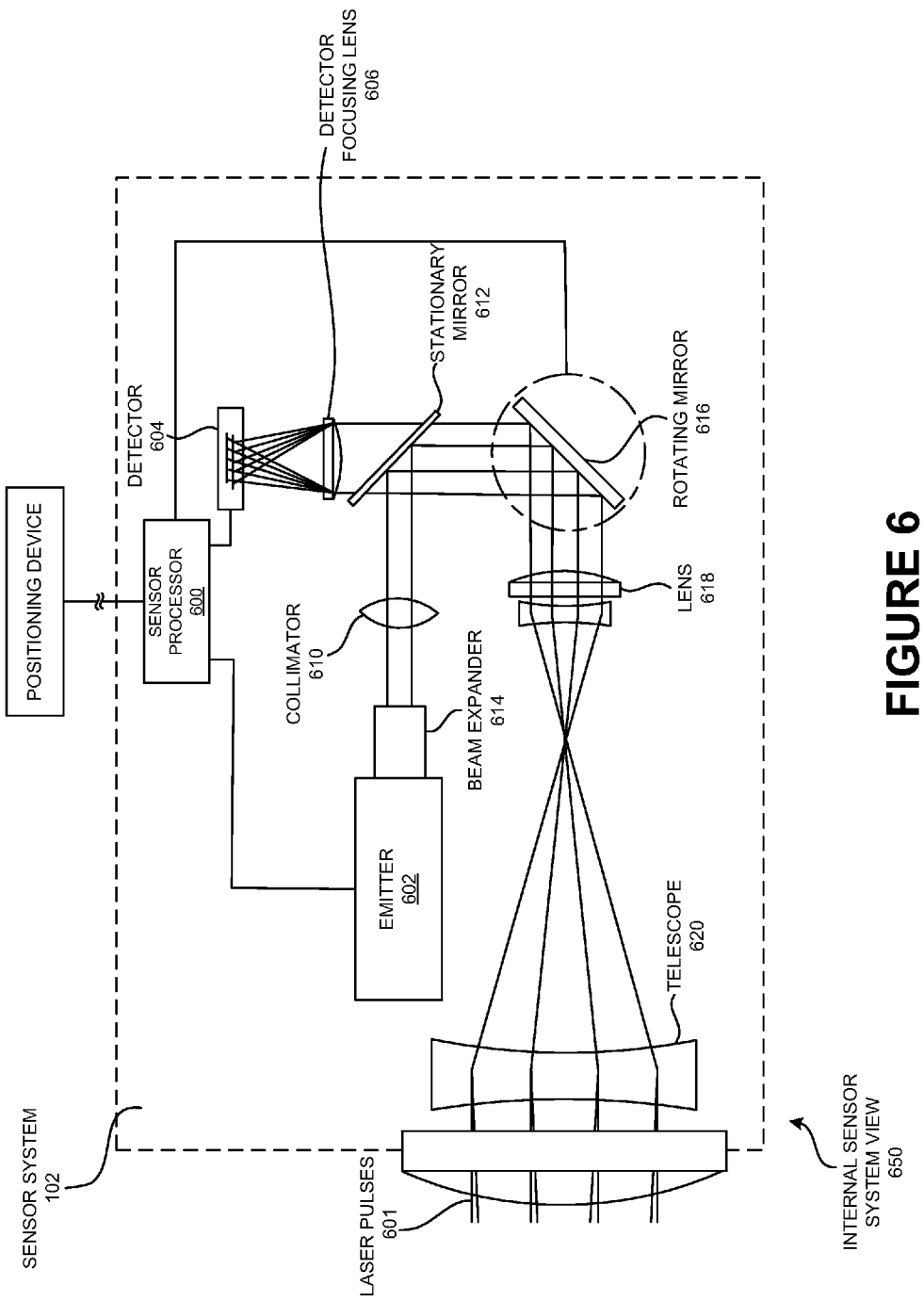
FIG. 6 is an internal sensor system view of the sensor system, according to one embodiment.

FIG. 6 is an internal sensor system view 650 of the sensor system 102, according to one embodiment. As shown in FIG. 6, the sensor system 102 includes a detector 604 for detecting return of an echoed signal. The sensor system 102 utilizes a sensor processor 600 for controlling the timing and emission of the laser pulses 601 and for correlating emission of the laser pulses 601 with reception of the echoed signal 20. The sensor processor 600 may be on-board the autonomous neighborhood vehicle 100 or a part of the sensor system 102.

In an exemplary example, laser pulses 601 from emitter 602 pass through a beam expander 614 and a collimator 610. The laser pulses 601 are reflected at a stationary mirror 612 to a rotating mirror 616 and then forwarded through lens 618 and a telescope 620 to form a beam for the laser pulses 601 with a diameter of 1-10 mm, providing a corresponding resolution for the synthesized three-dimensional field of view. The telescope 620 serves to collect light reflected from objects 22.

In one embodiment of the present invention, the detector 604 is configured to detect light only of a wavelength of the emitted light in order to discriminate the laser light reflected from the object back to the detector from background light. Accordingly, the sensor system 102 operates, in one embodiment of the present invention, by sending out a laser pulse that is reflected by an object 208 and measured by the detector 604 provided the object is within range of the sensitivity of the detector 604. The elapsed time between emission and reception of the laser pulse permits the sensor processor 600 is used to calculate the distance between the object 408 and the detector 604. In one embodiment of the present invention, the optics (e.g., the beam expander 614, the collimator 610, the rotating mirror 616, the stationary mirror 612, the lens 618, and the telescope 620) are configured to direct the beam instantaneously into a two-dimensional sector of a plane defined with respect to the longitudinal axis 402, and the detector 604 is a field-programmable gate array for reception of the received signals at predetermined angular positions corresponding to a respective angular direction a.

Via the rotating mirror 616, laser pulses 601 are swept through a radial sector a within plane defined with respect to the longitudinal axis 402. In one embodiment of the present invention, in order to accomplish mapping of objects in the field of view in front of the sensor system 102, the rotating mirror 616 is rotated across an angular displacement ranging from 30 to 90 degrees, at angular speeds ranging from 100-10000 degrees per second. For example, a 90 degree scanning range can be scanned 75 times per second or an 80 degree scanning range can be scanned between 5 and 100 times per second. Furthermore, the angular resolution can be dynamically adjusted (e.g., providing on command angular resolutions of 0.01, 0.5, 0.75, or 1 degrees for different commercially available sensors (e.g., the sensor system 102, the LIDAR 108, the RADAR unit 222, the camera 226, and/or the ultrasound unit 228).

Commercially available components can be used for the emitter 602 and the detector 604 to provide ranging measurements. In one embodiment, the emitter 602, the detector 604, and the associated optics constitute a laser radar (LADAR) system, but other systems capable of making precise distance measurements can be used in the present invention, such as for example a light detection and ranging (LIDAR) sensor, a radar, or a camera. LIDAR (Light Detection and Ranging; or Laser Imaging Detection and Ranging) is a technology that determines distance to an object or surface using laser pulses Like the similar radar technology, which uses radio waves instead of light, the range to an object is determined by measuring the time delay between transmission of a pulse and detection of the reflected signal. LADAR (Laser Detection and Ranging) refers to elastic backscatter LIDAR systems. The term laser radar is also in use, but with laser radar laser light (and not radio waves) are used.

The primary difference between LIDAR and radar may be that with LIDAR, much shorter wavelengths of the electromagnetic spectrum are used, typically in the ultraviolet, visible, or near infrared. In general it is possible to image a feature or object only about the same size as the wavelength, or larger. Thus, LIDAR may provide more accurate mapping than radar systems. Moreover, an object may need to produce a dielectric discontinuity in order to reflect the transmitted wave. At radar (microwave or radio) frequencies, a metallic object may produce a significant reflection. However non-metallic objects, such as rain and rocks may produce weaker reflections, and some materials may produce no detectable reflection at all, meaning some objects or features may be effectively invisible at radar frequencies. Lasers may provide one solution to these problems. The beam densities and coherency may be excellent. Moreover the wavelengths may be much smaller than can be achieved with radio systems, and range from about 10 micrometers to the UV (e.g., 250 nm). At these wavelengths, a LIDAR system can offer much higher resolution than radar.

Figure 7:
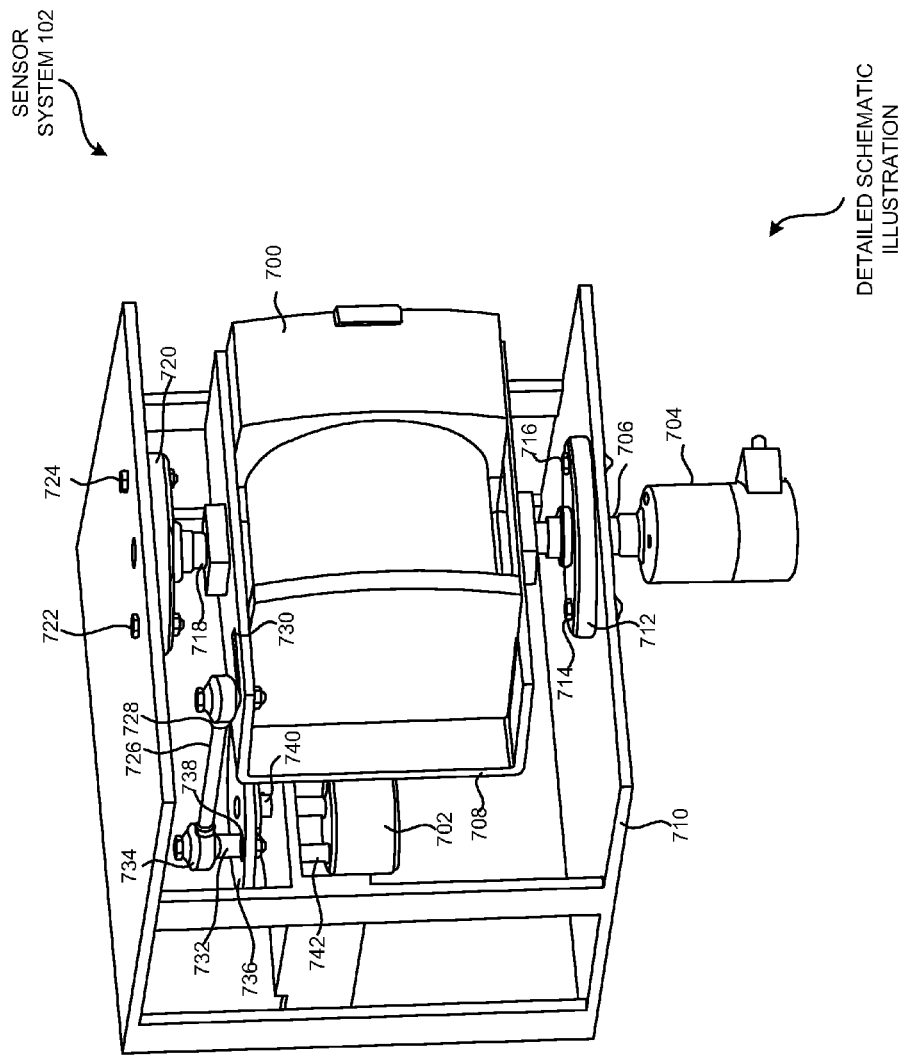
FIG. 7 illustrates the sensor system as a LIDAR sensor, according to one embodiment.

FIG. 7 is a detailed schematic illustration of sensor system 102 of the present invention. FIG. 7 presents a frontal view of sensor system 102. FIG. 7 shows a motor 702 configured to oscillate the sensor system 102 (e.g., the LIDAR 108, the RADAR unit 222, and/or the camera 226) in and out of a plane normal to a predetermined axis (e.g., the longitudinal axis 402) of the imaging sensor (e.g., the sensor system 102). In one embodiment of the present invention, a 12-volt DC motor operating at a speed of 120 RPM is used to oscillate the sensor system 102 in and out the plane. Other motors with reciprocating speeds different than 120 RPM can be used.

As shown in FIG. 7, an absolute rotary encoder 704 is placed on a shaft 706 that is oscillating. The encoder 704 provides an accurate reading of the angle at which the shaft 706 is instantaneously located. By the encoder 704, an accurate measurement of the direction that the sensor system 102 is pointed, at the time of the scan, is known. In one embodiment of the present invention, the encoder 704 is an ethernet optical encoder (commercially available from Fraba Posital), placed on shaft 706 to provide both the angular position and angular velocity of the shaft.

To decrease the delay between reading a value from the sensor and reading a value from the encoder, a separate 100 MBit ethernet connection with its own dedicated ethernet card connected the sensor processor 600 (shown in FIG. 6) with the encoder. This created communications delays between the encoder and the I/O computer that were consistent at approximately 0.5 ms. Testing revealed that an actual scan (e.g., LADAR scan) was taken approximately 12.5 ms before the data was available at the I/O computer. When this time was added to the 0.5 ms of delay from the encoder communications, a 13 ms delay from the actual scan to the actual reading of the encoder position and velocity was present. To counteract the angular offset this delay created, in one embodiment of the present invention, the velocity of the encoder is multiplied times the communications delay of 0.013 seconds to calculate the angular offset due to the delay. This angular offset (which was either negative or positive depending on the direction of oscillation) was then added to the encoder's position, giving the actual angle at the time when the scan occurred. This processing permits the orientation of the platform (e.g., LADAR platform) to be accurate within 0.05 degrees.

Further, according to the embodiment illustrated in FIG. 7, the metal shaft 706 is attached to a detector bracket 708 which is supported by a metal casing 710 with bearing 712. Bearing 712 is attached to metal casing 710 with a fastening mechanism such as bolts 714 and 716. Detector bracket 708 is attached to metal shaft 706. Further, as shown in FIG. 7, metal shaft 718 is attached to bearing 720. Bearing 720 is attached to metal casing 710 with a fastening mechanism such as bolts 722 and 724. Push rod 726 is attached to detector bracket 708 with ball joint 728 on slot 730. Push rod 726 is attached to pivot spacer 732 with ball joint 734. Pivot spacer 732 is attached to servo arm 736 on slot 738. Servo arm 736 is attached to metal shaft 740. Motor 702 is attached to servo arm 736 and is suspended from metal casing 710 by motor mounts 742.

The sensor system 102 operates, in one embodiment, by oscillating a measurement sensor laterally about an axis of the autonomous neighborhood vehicle 100, as shown in FIG. 4. In the one embodiment, the shaft 740 of motor 702 rotates at a constant speed, causing servo arm 736 to also spin at a constant speed. One end of Push rod 726 moves with servo arm 736, causing detector bracket 708 to oscillate back and forth. The degree of rotation can be adjusted by moving the mount point of ball joint 728 along slot 730, and/or the mount point of ball joint 734 along slot 738. Moving the mount point closer to shaft 718 increases the angle of rotation, while moving the mount point away from shaft 718 decreases the angle of rotation.

While sensor 700 is oscillating, the sensor 700 is taking measurements of the surrounding environment along the vertical scanning plane, as shown in FIG. 4. The absolute rotary encoder 704 operates as an angular position mechanism, and transmits the absolute angle of deflection of detector bracket 708 to sensor processor 600. At the same time, a real time positioning device, such as a global positioning system (GPS) 218 or an inertial navigation system (INS), transmits the location, heading, altitude, and speed of the vehicle multiple times per second to sensor processor 600. Software running on the sensor processor 600 integrates the data, and, in one embodiment, uses matrix transformations to transform the YZ measurements from each 2D scan (as shown in FIG. 4) into a 3D view of the surrounding environment. Due to the use of the real time positioning device, in the present invention, a terrain map can be calculated even while the vehicle is moving at speeds in excess of 45 miles per hour.

Figure 8:
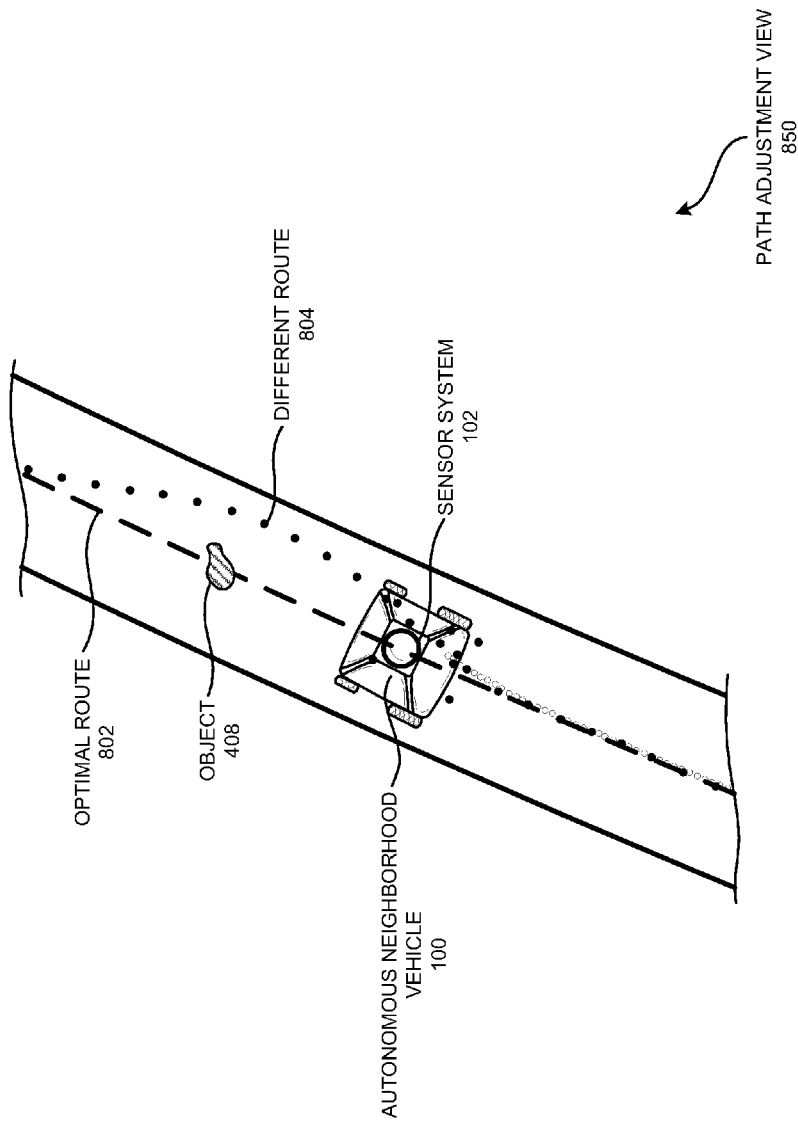
FIG. 8 is a path adjustment view 850 of the autonomous neighborhood vehicle of FIG. 1A rerouting around an object, according to one embodiment.

FIG. 8 is a path adjustment view 850 that illustrates results of path planning. In FIG. 8, the sensor system 102 of the autonomous neighborhood vehicle 100 identifies an object 408 in an optimal route 802. The processor 202 determines that there is adequate clearance to permit the autonomous neighborhood vehicle 100 to deviate to the right as it advances to the obstacle 408 and then deviate left to return to the optimal route 802. The projected path of the autonomous neighborhood vehicle 100 is shown by different route 804.

In one embodiment, the autonomous neighborhood vehicle 100 may determine that multiple objects 408 block the optimal route 802. The processor 202, working in concert with a sensor fusion algorithm 1338 (shown in FIG. 2), may divide the path and a data map into sectors. The first portion of the path may contain no obstacles and require no deviation along the optimal route 802. The second section may contain the object 408, and a third section may contain an additional obstacle. The object 408 in the second section of the path may require the processor 202 to determine clearance and a path around the object 408. Further, deviation from the path may require controlling the speed of the autonomous neighborhood vehicle 100 so as to safely pass the object 408 at a speed suited for the radius of the turn. If the object 408 in the third section of the path continues to block the path of the autonomous neighborhood vehicle 100, the autonomous neighborhood vehicle 100 may determine if the autonomous neighborhood vehicle 100 should remain on the different route 804 (e.g., the path taken to avoid the object 408 located in the second section), return to the optimal route 802, or take an alternate different route (not show) to avoid the second object 408.

FIG. 9A is an envelope view 950 of the autonomous neighborhood vehicle 100 with an envelope 900 defined by a set of minimum ranges 902. A minimum distance 911 in a direction in front 916, behind 918, to a right 914, to a left 913, above, and/or below the autonomous neighborhood vehicle 100 may compose the envelope 900. In one embodiment, ultrasound signals (e.g., emitted, relayed and/or processed by an ultrasound unit 228) may be used to monitor and/or maintain the set of minimum ranges 902. In another embodiment, the set of minimum ranges 902 may depend on a speed 5307 of the autonomous neighborhood vehicle, a set of weather conditions, the environment of the autonomous neighborhood vehicle 152, the item 4502, and a nature of the object 409 that is in close proximity with the autonomous neighborhood vehicle etc. In FIG. 9A, the set of minimum ranges are defined in four directions around the vehicle and are useful to define an exemplary envelope 900 around the autonomous neighborhood vehicle 100. Such an envelope 900 can be used to control the autonomous neighborhood vehicle 100 by monitoring object tracks and changing neighborhood autonomous vehicle's 100 speed and course to avoid other objects (e.g., the object 408) entering the envelope 900. Additionally, communication with other vehicles (e.g., other autonomous neighborhood vehicle) can be utilized to coordinate between the vehicles, for example, with both vehicles changing speed and/or course to avoid either vehicle's envelopes 900 from being entered.

Figure 9B:
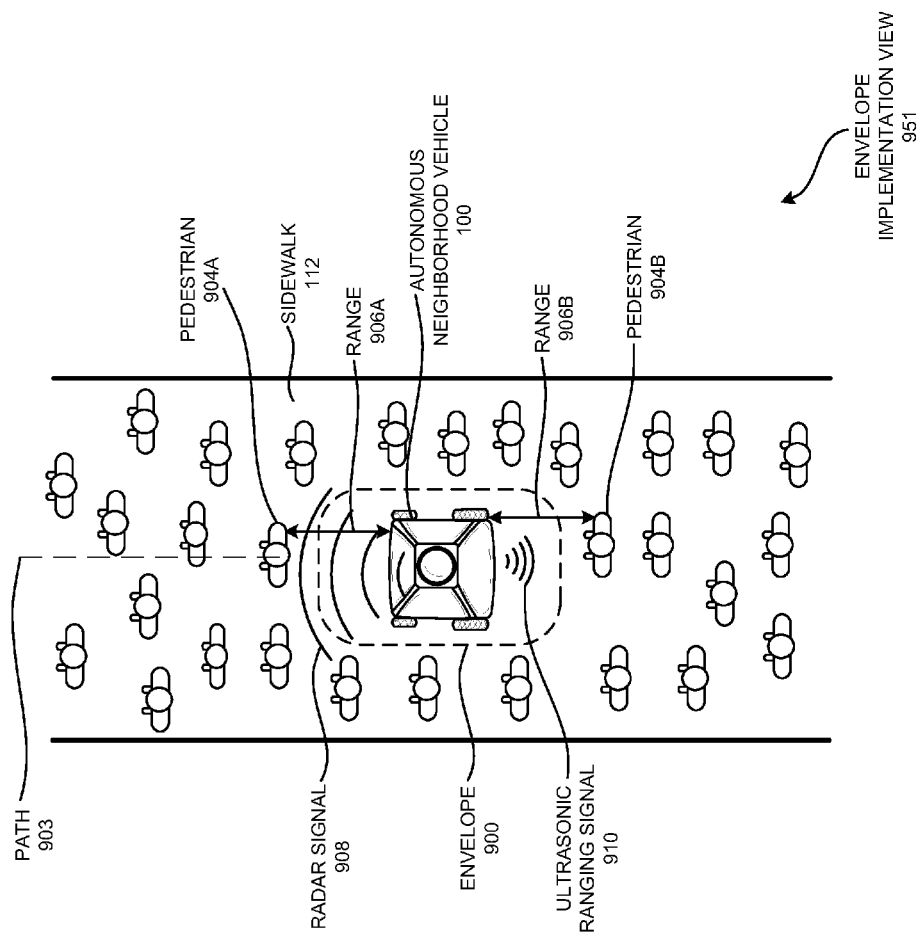
FIG. 9B is an envelope implementation view of the autonomous neighborhood vehicle of FIG. 9A maintaining its envelope in pedestrian traffic, according to one embodiment.

FIG. 9B is an envelope implementation view 951 illustrating the envelope 900 of the autonomous neighborhood vehicle 100 being maintained in pedestrian traffic on the sidewalk 112. In one embodiment, the autonomous neighborhood vehicle 100 may use a radar signal 908 to detect a range 906A from an object (e.g., the pedestrian 904A). The autonomous neighborhood vehicle 100 may adjust speed and/or course to ensure that the envelope 900 is not breached and avoid collisions. The autonomous neighborhood vehicle 100 may use ultrasonic ranging signals 910 (e.g., ultrasound) to detect a range (e.g., a range 906B) from an object (e.g., the pedestrian 904B). In one embodiment, the autonomous neighborhood vehicle 100 may use its sensors (e.g., the LIDAR 108, the RADAR unit 222, the camera 226, the sensor system 102, and/or the ultrasonic unit 228) and/or sensor fusion algorithm 1338 to locate and/or calculate an optimal route through obstacles (e.g., pedestrian traffic) in order to maximize travel efficiency (e.g., minimize travel time) while maintaining the envelope 900.

In another embodiment, the autonomous neighborhood vehicle 100 may draft off objects (e.g., bikers, pedestrians), increasing fuel economy. The autonomous neighborhood vehicle 100 may be able to communicate with a traffic server in order to gain access to traffic patterns and/or traffic light patters. The autonomous neighborhood vehicle 100 may be able to integrate this information along with pedestrian monitoring techniques to calculate and/or plan an optimal route and/or reroute to an optimal path (e.g., when the autonomous neighborhood vehicle 100 encounters traffic, delays, construction). Additionally, by integrating pedestrian monitoring techniques with vehicle control methods and by enforcing minimum desirable ranges, the autonomous neighborhood vehicle 100 may be able to maximize efficiency while increasing safety. Further, the autonomous neighborhood vehicle 100 may be able to automatically park, deliver items, recharge or refuel (e.g., by automatically traveling to a fueling area when energy levels reach a threshold level and/or perform necessary steps to charge itself), send the itself for maintenance, pick up parcels, perform any other similar tasks, and/or return at a set time or on command to a predetermined location.

Figure 9C:
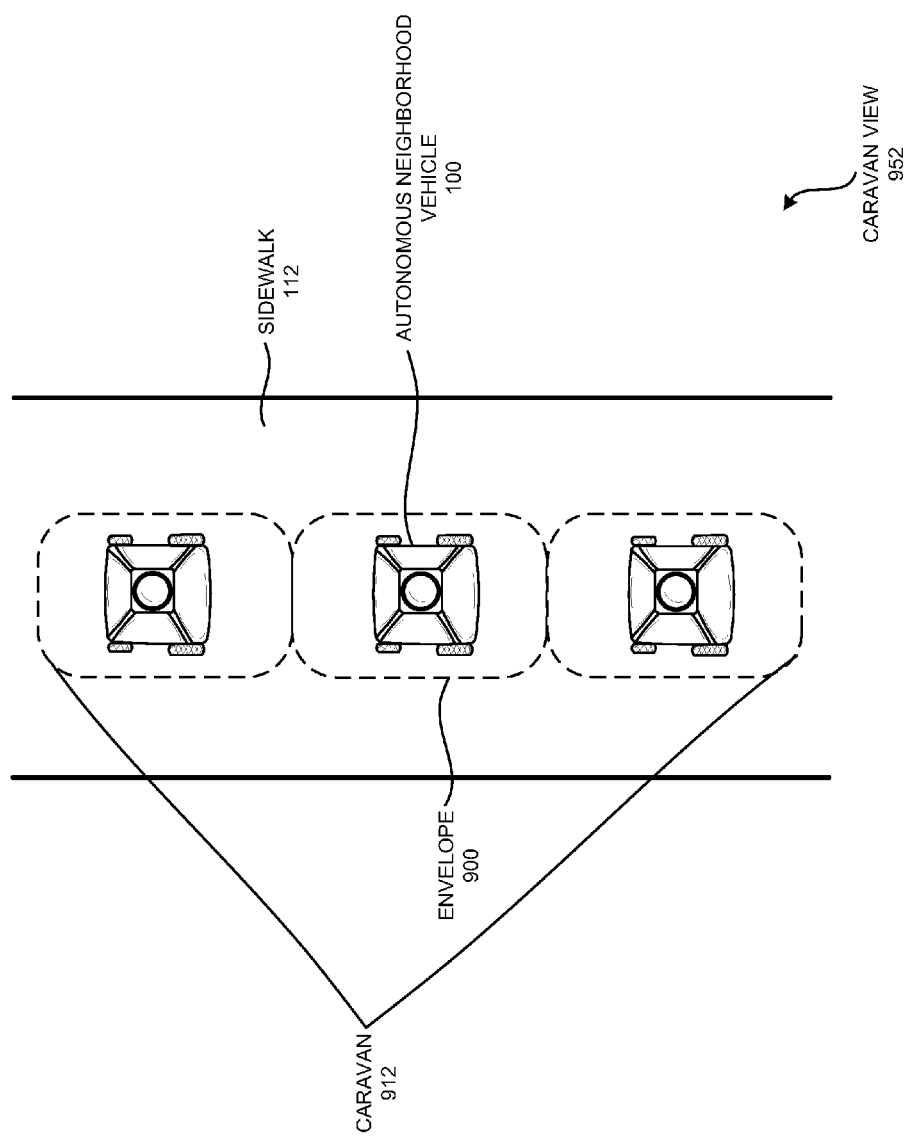
FIG. 9C is a caravan view of the autonomous neighborhood vehicle of FIG. 9B in a caravan with multiple other autonomous neighborhood vehicles, according to one embodiment.

FIG. 9C is a caravan view 952 of three autonomous neighborhood vehicles 100 in a caravan 912 on the sidewalk 112. In one embodiment, autonomous neighborhood vehicles 100 may be caravanned. For example, urbanized areas can use platooned vehicles to implement mass deliveries. A caravan 912 can make circuitous routes in an urban area, making scheduled stops or drive-bys to load and/or unload items in the caravan 912. Platoons (e.g., caravans 912) may be formed (e.g., set up to execute large deliveries together) and/or formed on route (e.g., autonomous neighborhood vehicles 100 may be able to meet up to form a platoon when forming a platoon would improve the capabilities of the autonomous neighborhood vehicles 100 (e.g., allowing them to draft off one another, to expedite deliveries and/or pick-ups, to coordinate delivery and/or pick up times)). Autonomous neighborhood vehicles 100 may not need to have the same owner, cargo, settings (e.g., envelope settings, speed settings etc.) in order to form the caravan 912. Caravans 912 may allow the autonomous neighborhood vehicles 100 to travel in closer proximity to one another (e.g., with smaller sets of minimum rangers 902 of the envelopes 900) than would otherwise be permitted.

Minimum ranges for the autonomous neighborhood autonomous neighborhood vehicle 100 100 are desirable in controlling the autonomous neighborhood autonomous neighborhood vehicle 100 100, as described in methods above in FIG. 9B. A number of methods to define the set of minimum ranges 902 are known.

Figure 10:
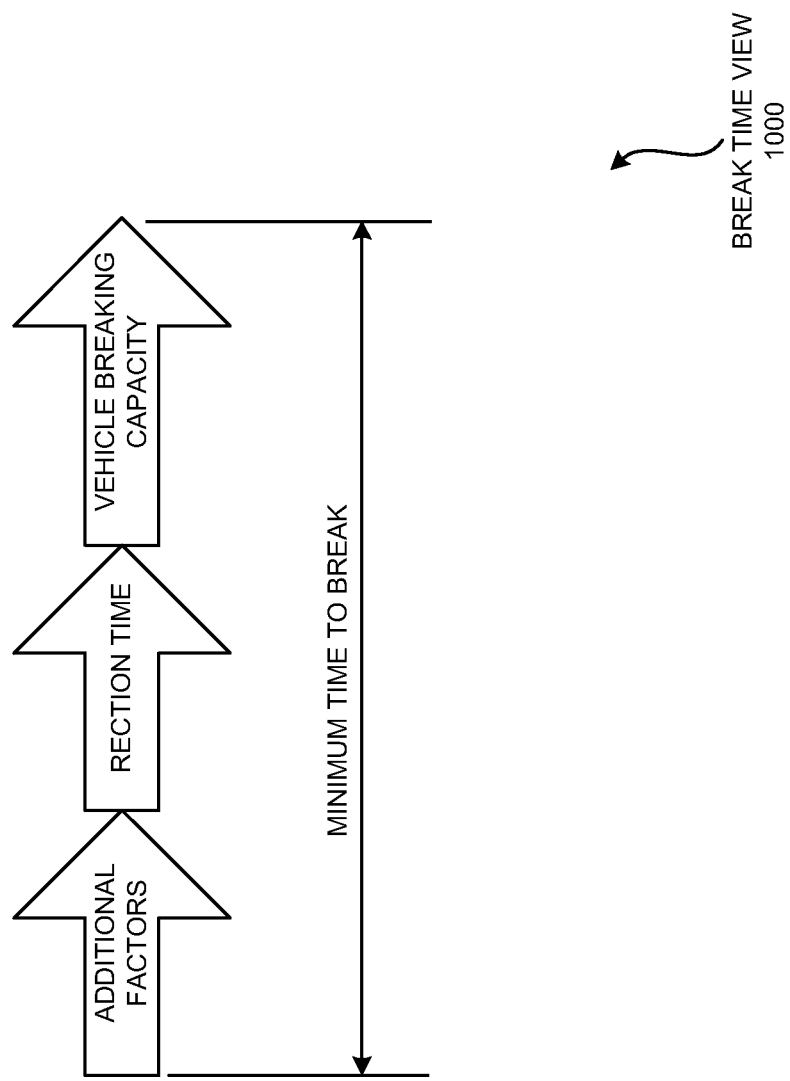
FIG. 10 is a break time view of a minimum break time calculation, according to one embodiment.

FIG. 10 is a break time view 1000 that describes one exemplary method to formulate a minimum desirable range in front of the autonomous neighborhood autonomous neighborhood vehicle 100, in accordance with the present disclosure. A minimum stopping time is described to include a time defined by a minimum time to brake, a control reaction time, and additional factors affecting time to stop.

A minimum time to brake describes a braking capacity of the autonomous neighborhood vehicle 100 at the present speed. Such a braking capacity can be determined for a particular autonomous neighborhood vehicle 100 through many methods, for example, by testing the autonomous neighborhood vehicle 100 at various speeds. It will be appreciated that braking capacity for different autonomous neighborhood vehicle 100s will be different values, for example, with a large autonomous neighborhood vehicle 100 requiring a greater time to stop than a smaller autonomous neighborhood vehicle 100. A control reaction time includes both mechanical responses in the autonomous neighborhood vehicle 100 to an operator or control module ordering a stop and a response time of the operator or the control module to an impetus describing a need to stop.

Factors affecting a time to stop include road conditions; weather conditions; autonomous neighborhood vehicle 100 maintenance conditions, including conditions of the braking devices on the autonomous neighborhood vehicle 100 and tire tread; operability of autonomous neighborhood vehicle 100 control systems such as anti-lock braking and lateral stability control. Factors can include a selectable or automatically calibrating factor for occupants in the autonomous neighborhood vehicle 100, for example, particular driver reaction times and comfort of the occupants of the autonomous neighborhood vehicle 100 with close ranges between autonomous neighborhood vehicle 100s. Time to stop values can readily be converted to minimum desirable ranges by one having ordinary skill in the art.

Additionally, the above mentioned method for determining the minimum time to break may be used to calculate a magnitude of deceleration. If the calculated magnitude of deceleration is greater than the established maximum magnitude of deceleration, the autonomous neighborhood vehicle 100 may determine if there is an alternative action that will not break an established constraint (e.g., the envelope 900 and/or an established maximum speed). The autonomous neighborhood vehicle may also prioritize constraints and choose to maintain ones that are prioritized higher than others (e.g., the autonomous neighborhood vehicle 100 may exceed that maximum magnitude of deceleration in order to avoid a collision when no other viable actions are available). The autonomous neighborhood vehicle 100 may combine the above mentioned calculations of minimum time to break with the predicted behaviors 305 mentioned in FIGS. 3A-C) to decrease speed, alter the path of the autonomous neighborhood vehicle 100, increase speed etc. For example, if the autonomous neighborhood vehicle 100 determines that the likelihood of occurrence of a predicted behavior that would cause the autonomous vehicle to need to decelerate at a magnitude greater than the maximum magnitude of deceleration is above a threshold level, the autonomous neighborhood vehicle 100 may take proactive measures to avoid such a scenario (e.g., reduce the speed of the autonomous neighborhood vehicle 100).

Figure 11:
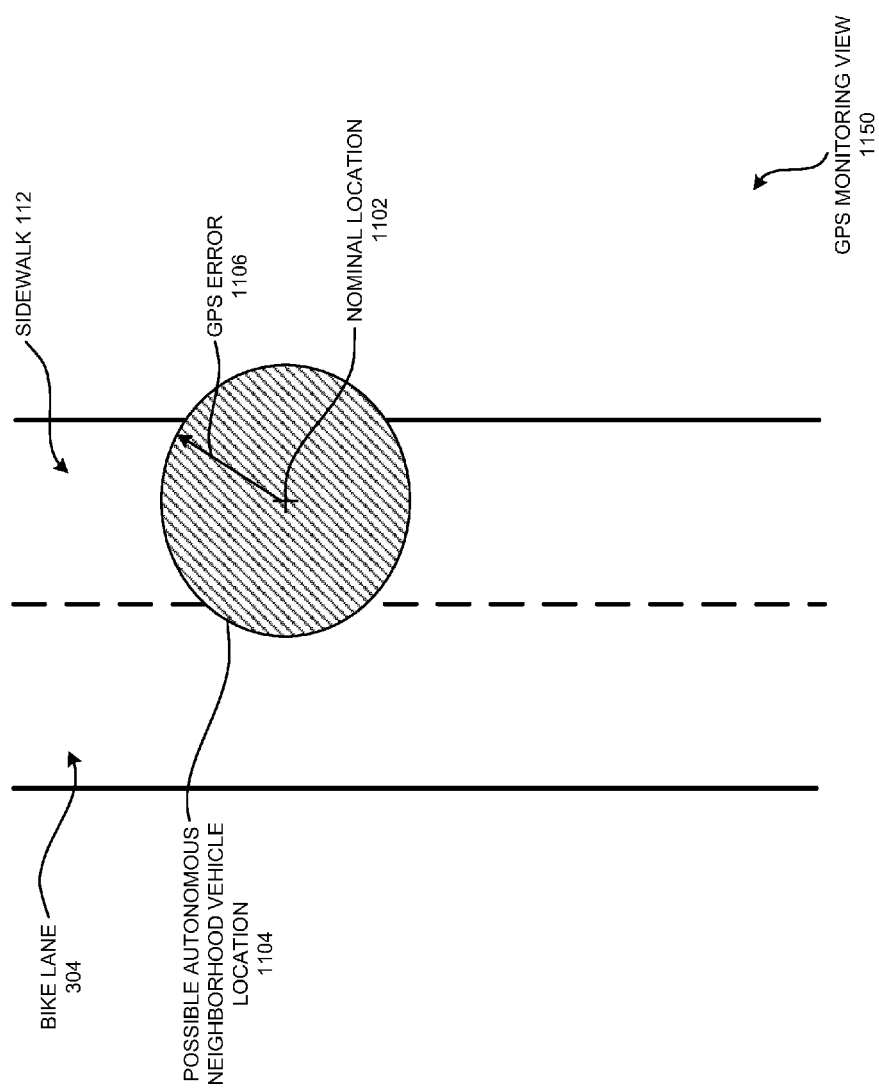
FIG. 11 is a GPS monitoring view of a possible autonomous neighborhood vehicle location, according to one embodiment.

FIG. 11 is a GPS monitoring view 1150 depicting an exemplary GPS coordinate monitored through a GPS device combined with 3D map data for the GPS coordinate. A nominal location 1102 identified through a GPS device can be used to describe an area wherein the device can be located. In FIG. 11, the nominal location 1102 combined with GPS error yields an area wherein the GPS device in the autonomous neighborhood vehicle 100 can be located or an area of possible autonomous neighborhood vehicle 100 locations. The coordinate of the nominal location 1102 can be coordinated with corresponding coordinates in 3D map data, and the area of possible autonomous neighborhood vehicle locations 1104 can be projected onto a map.

Figure 12:
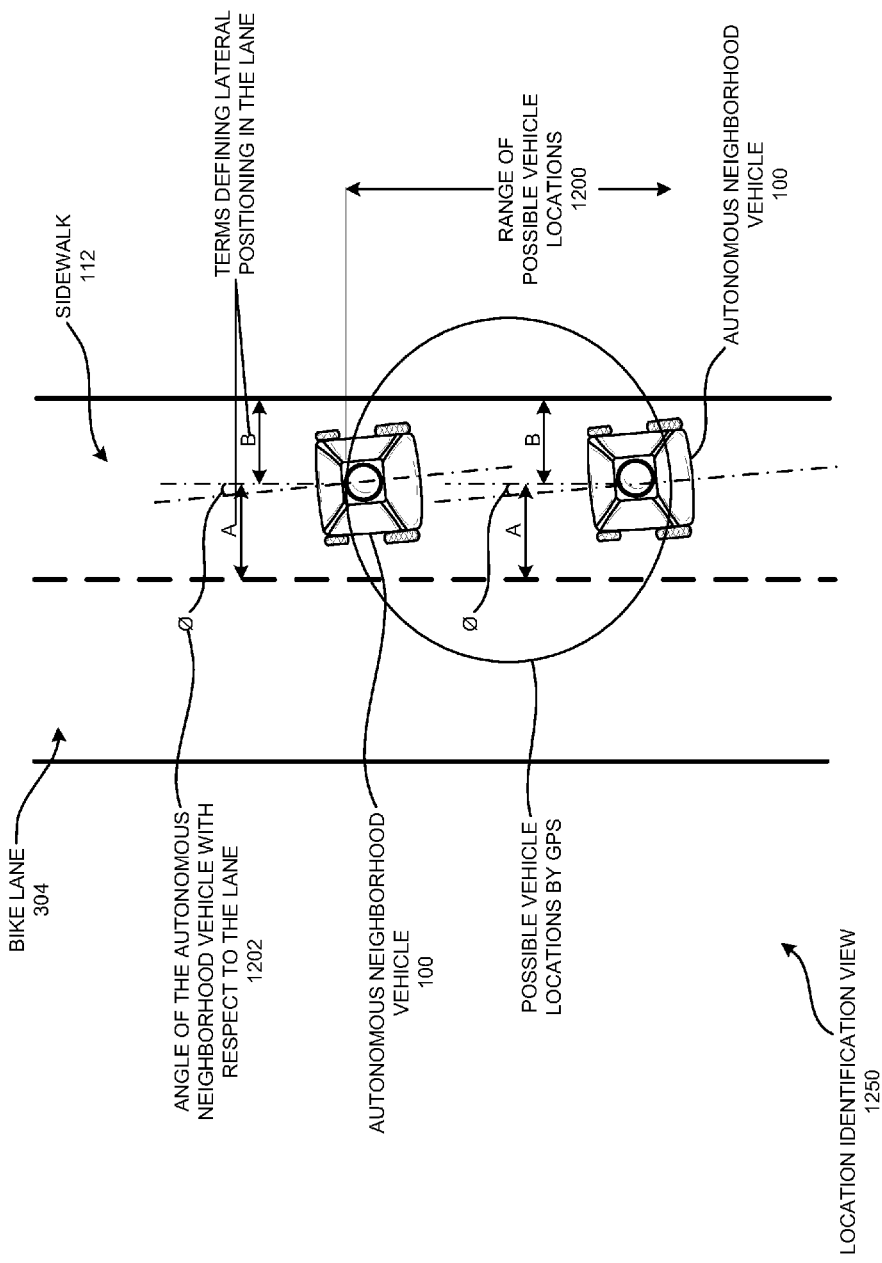
FIG. 12 is a location identification view determining the location of the autonomous neighborhood vehicle from possible locations, according to one embodiment.

Within the area of possible autonomous neighborhood vehicle locations 1104 made possible by monitoring GPS data, other information can be utilized to localize the location of the autonomous neighborhood vehicle 100 within the area of possible autonomous neighborhood vehicle locations 1104 described in FIG. 12. For example, image recognition methods can be utilized to identify features on the road in front of the autonomous neighborhood vehicle 100. In one embodiment, the sensor fusion algorithm 1338 may combine information from multiple sensors on the autonomous neighborhood vehicle 100 to more accurately locate the autonomous neighborhood vehicle 100.

FIG. 12 is a location identification view 1250 depicting an identification of a lateral position as well as an angular orientation with respect to the lane. This information can be used to place the autonomous neighborhood vehicle 100 within the area of possible autonomous neighborhood vehicle 100 locations. Further, lane markers can be examined, for example, utilizing a dotted line versus a solid line to identify a lane of travel from possible lanes of travel within the possible autonomous neighborhood vehicle 100 locations. Additionally, any recognizable features identified within the camera data can be used to fix a location. Recognizable features that can be identified and used in conjunction with a 3D map database to determine location include occurrence of an intersection, an off-ramp or on-ramp, encountering a bridge or overpass, approaching an identifiable building, or any other similar details contained within the 3D map data.

Methods utilized in FIG. 12 can sufficiently locate the autonomous neighborhood vehicle 100 or may designate a range of locations or alternate locations where the autonomous neighborhood vehicle 100 might be located.

In one embodiment, a directional signal, such as a radio signal from a known source or a radar signal return, may be used to localize the position of an autonomous neighborhood vehicle 100. In the exemplary determination made in FIG. 12, a range of possible vehicle locations 1200 has been determined A directional signal from the radio tower depicted allows an intersection between the range of positions within the lane determined in FIG. 12 and the direction to the radio tower (not shown) to determine a fixed location of the autonomous neighborhood vehicle 100. In this way, a combination of information sources can be utilized to determine a fixed location of an autonomous neighborhood vehicle 100 with reasonable accuracy.

In an alternate embodiment, a location of an autonomous neighborhood vehicle 100 may be fixed, refining an approximate location originating from a GPS coordinate and a digital map database, first with visual data or radar data and then with a radio or other wireless directional signal. It will be appreciated that a number of methods to localize the position of an autonomous neighborhood vehicle 100 can be utilized equally to fix the location of the autonomous neighborhood vehicle 100 to enable the methods described herein. For example, in combination with a GPS signal, visual data, or radar data in combination with digital map information, a plurality of radio, radar, or similar signals originating from known sources can be utilized to localize a position of an autonomous neighborhood vehicle 100. In another example, a local communications network could contain a local correction factor specific to that geographic location to correct position determined by GPS coordinates. The disclosure is not intended to be limited to the particular examples described herein.

In one embodiment, radar returns or radio returns from two known objects can be used to triangulate position of an autonomous neighborhood vehicle 100 on a map. Once a position is fixed at some instant in time, another method could determine an estimated change in position of the autonomous neighborhood vehicle 100 by estimating motion of the autonomous neighborhood vehicle 100, for example, assuming travel along the present sidewalk 112 based upon a monitored speed, through use of a gyroscopic or accelerometer device, or based upon determining a GPS error margin by comparing the last fixed location to the GPS nominal position at that instant and assuming the GPS error margin to be similar for some period. One having ordinary skill in the art will appreciate that many such exemplary methods are known, and the disclosure is not intended to be limited to the exemplary methods described herein.

Further, an exemplary infrastructure device includes a GPS differential device, for example, that can be located along roads, communicate with passing vehicles, and provide a GPS offset value to the autonomous neighborhood vehicles 100 for a localized area. In such a known device, a GPS nominal location for the device is compared to a fixed, known position for the device, and the difference yields a GPS offset value that can be utilized by vehicles (e.g., the autonomous neighborhood vehicle 100) operating in the area. Through use of such a device, sensor readings and calculations to triangulate a location of a host vehicle are unnecessary. Using methods to determine a location of a leader vehicle in a caravan 912 (e.g., convoy) and coordinate a number of vehicles based upon the operation of the leader vehicle can be of great advantage to streamlining travel within a densely populated or urban area.

Object tracking is a method whereby a host vehicle utilizes information such as radar returns to determine sequential relative positions of a target object to the host vehicle. In one embodiment, positions for a first object (e.g., the autonomous neighborhood vehicle 100), $O_1$, and a second object, $O_2$, are described at sequential times $T_1$-$T_3$. The three plotted positions of object $O_1$ describe an object getting sequentially closer to the host vehicle. Such a track can be utilized in a number of ways by the host vehicle (e.g., the autonomous neighborhood vehicle 100), for example, by comparing a range to $O_1$ to a minimum allowable range or by determining a likelihood of collision between $O_1$ and the host vehicle (e.g., the autonomous neighborhood vehicle 100).

FIG. 12 further depicts exemplary analysis of a vehicle's lateral position and angle of the autonomous neighborhood vehicle with respect to the lane 1202 (theta) based upon sensor information, in accordance with the present disclosure. The autonomous neighborhood vehicle 100 is depicted including in the sidewalk 112. A visual field can be described by an area that is represented in a visual image. Boundaries of a visual field that can be analyzed through a visual image can be described as an angular area extending outward from the camera capturing the image. By utilizing image recognition methods, lane markers, road features, landmarks, other vehicles on the road, or other recognizable images can be utilized to estimate a vehicle position and orientation with respect to sidewalk 112. From analysis of visual images, a lateral position within lane (e.g., the sidewalk 112), defined by terms A and B defining lateral positioning in the lane, can be estimated, for example, according to distances a and b from the lane markers.

Similarly, orientation of the autonomous neighborhood vehicle 100 within the lane can be estimated and described as angle theta. In one embodiment, the angle of the autonomous neighborhood vehicle with respect to the lane 1202 may refer to an angle of the autonomous neighborhood vehicle with respect to the path (e.g., the planned path, the optimal path).

This may allow the autonomous neighborhood vehicle 100 to autonomously travel and/or navigate without a need for lane markers, designated lines, and/or paths.

Figure 13A:
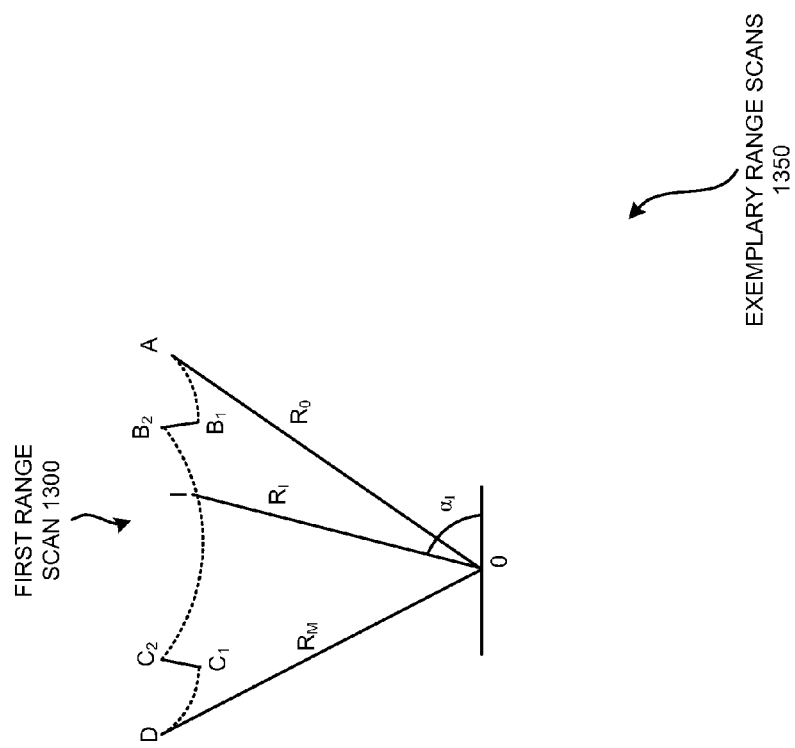
FIG. 13A is an exemplary range scan of a first range scan, according to one embodiment.
Figure 13B:
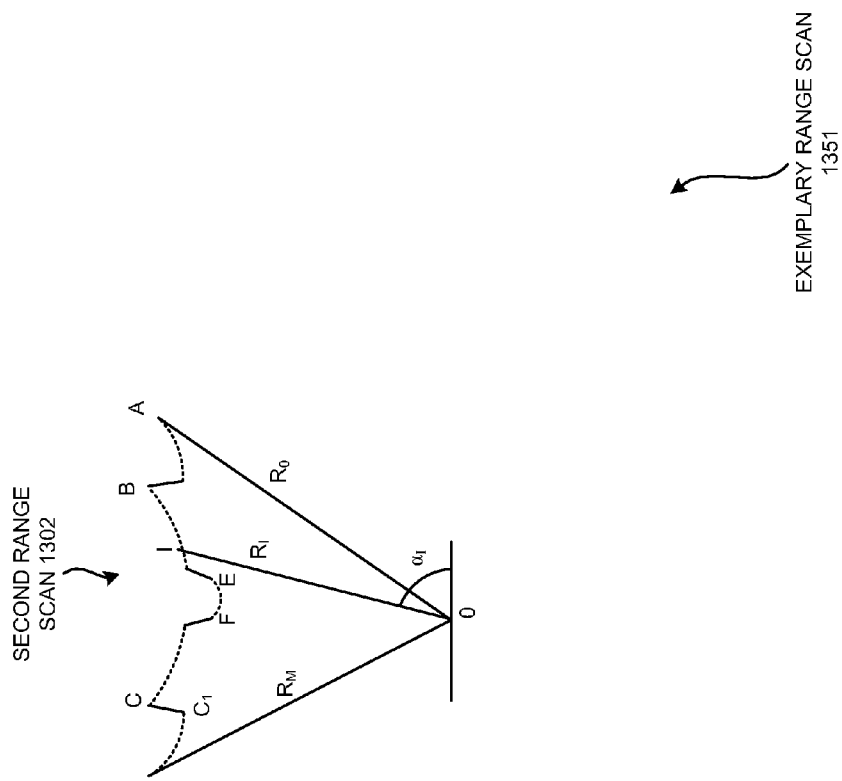
FIG. 13B is an exemplary range scan of a second range scan, according to one embodiment.

FIGS. 13A and 13B are exemplary range scans 1350 and 1351 for the autonomous neighborhood vehicle 100. FIG. 13A depicts a first range scan 1300 along the road (not shown), in which the segments a-$b_1$ and $c_1$-d represent a sidewalk on either side of the road, segments $b_1$-$b_2$ and $c_1$-$c_2$ represent a curb adjacent to each sidewalk, and the middle segment $b_2$-$c_2$ represents the road. FIG. 13B depicts a second range scan 1302 further along the road, in which the segment e-f, in between the segment b-c, represents an obstacle such as a car on the road in front of the autonomous neighborhood vehicle 100. In FIGS. 13A and 13B, the beam lines $R_0$, $R_i$ and $R_m$, extending from an origin O for each of range scans 1300 and 1302, represent the distances (ranges) from the laser scanner to the points a, i, and d. The angle $\alpha_i$ is the azimuth angle of the line O-i with respect to the laser scanner reference.

Due to noise in the range measurements, as well as the configuration and condition of roads and sidewalks, classification of traversable and non-traversable areas based on only one range scan is not reliable and robust. Accordingly, the method of the invention builds a three-dimensional road model from cumulated range scans, which are gathered by the laser scanner, and from geo-locations, which are obtained from the navigation unit. This three-dimensional road model, which represents a ground plane, is formulated as a constrained quadratic surface. The inputted range scan data, after being transformed into world coordinate points of the three-dimensional road model, can then be correctly classified based on heights above the ground plane.

Figure 14:
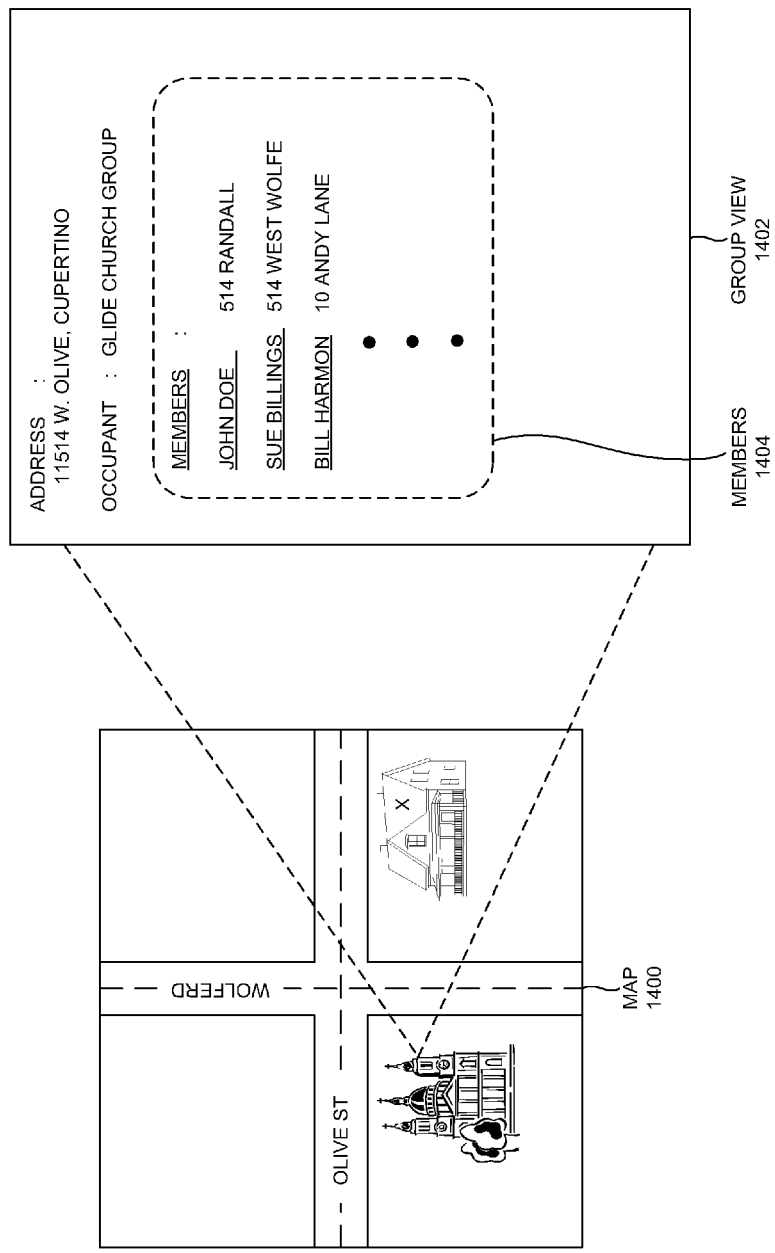
FIG. 14 is a user interface view of a group view associated with particular geographical location, according to one embodiment.

FIG. 14 is a user interface view of a group view 1402 associated with particular geographical location, according to one embodiment. Particularly FIG. 14 illustrates, a map 1400, a groups view 1402, according to one embodiment. In the example embodiment illustrated in FIG. 14, the map view 1400 may display map view of the geographical location of the specific group of the global neighborhood environment 1800 (e.g., the privacy server 2900 of FIG. 29). The groups view 1402 may contain the information (e.g., address, occupant, etc.) associated with the particular group of the specific geographical location (e.g., the geographical location displayed in the map 1400) of the global neighborhood environment 1800 (e.g., the privacy server 2900 of FIG. 29). The members 1404 may contain the information about the members associated with the group (e.g., the group associated with geographical location displayed in the map) of the global neighborhood environment 1800 (e.g., the privacy server 2900 of FIG. 29).

Figure 15:
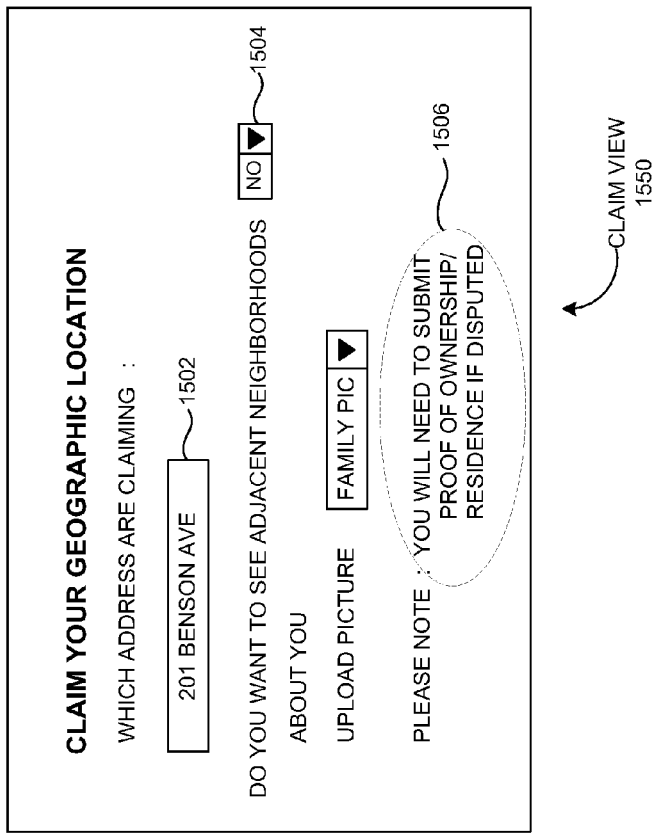
FIG. 15 is a user interface view of claim view, according to one embodiment.

FIG. 15 is a user interface view of claim view 1550, according to one embodiment. The claim view 1550 may enable the user to claim the geographical location of the registered user. Also, the claim view 1550 may facilitate the user of the global neighborhood environment 1800 (e.g., the privacy server 2900 of FIG. 29) to claim the geographical location of property under dispute.

In the example embodiment illustrated in FIG. 15, the operation 1502 may allow the registered user of the global neighborhood environment 1800 (e.g., the privacy server 2900 of FIG. 29) to claim the address of the geographic location claimed by the registered user. The operation 1504 illustrated in example embodiment of FIG. 15, may enable the user to delist the claim of the geographical location. The operation 1506 may offer information associated with the document to be submitted by the registered users of the global neighborhood environment 1800 (e.g., the privacy server 2900 of FIG. 29) to claim the geographical location.

Figure 16:
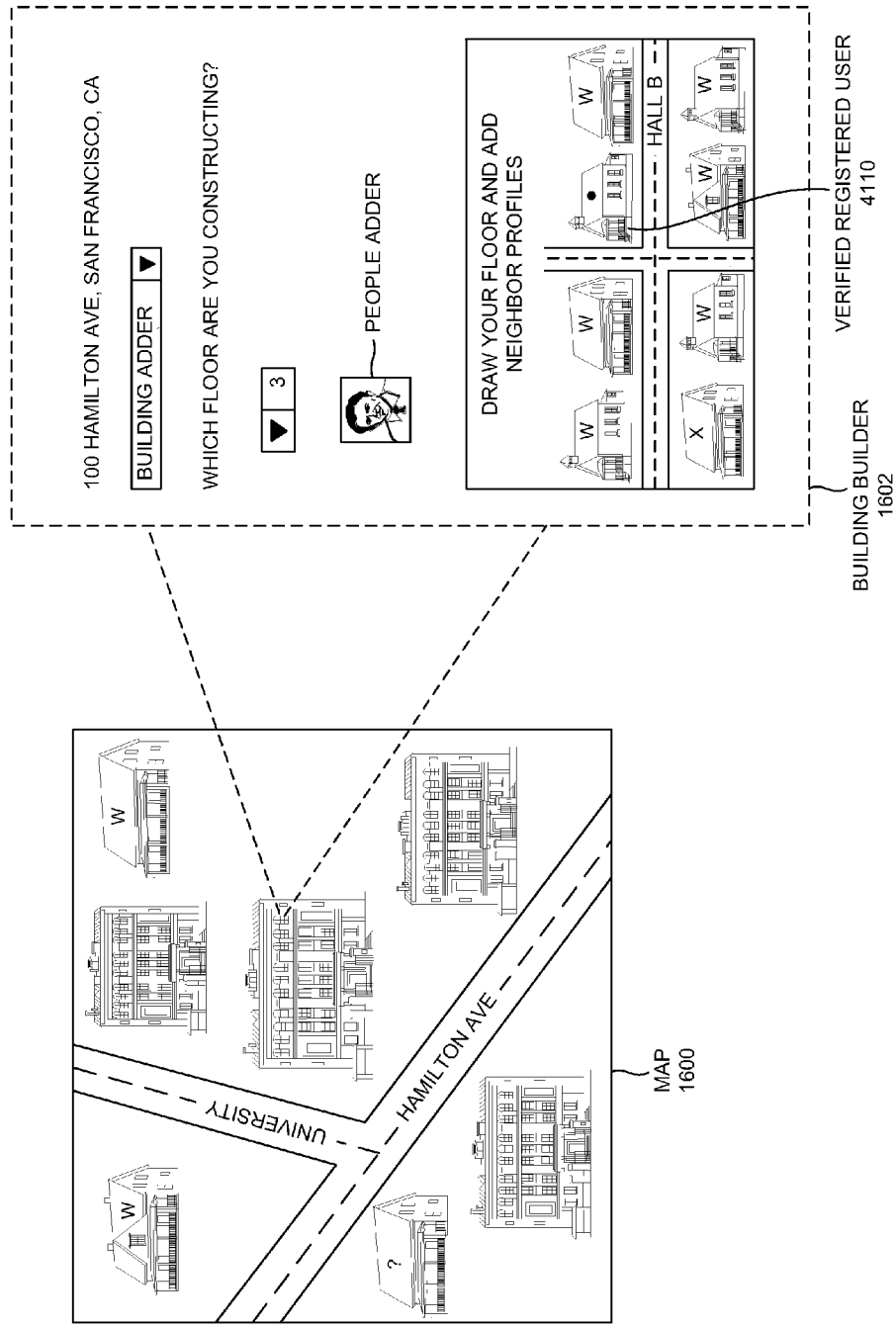
FIG. 16 is a user interface view of a building builder, according to one embodiment.

FIG. 16 is a user interface view of a building builder 1602, according to one embodiment. Particularly the FIG. 16 illustrates, a map 1600, a building builder 1602, according to one embodiment. The map 1600 may display the geographical location in which the verified registered user (e.g., the verified registered user 4110 of FIG. 41A-B) may create and/or modify empty claimable profiles (e.g., the claimable profile 4006 of FIG. 40A-12B, the claimable profile 4102 of FIG. 41A, the claimable profile 1704 of FIG. 17), building layouts, social network pages, and floor levels structures housing residents and businesses in the neighborhood (e.g., the neighborhood 2902A-N of FIG. 29). The building builder 1602 may enable the verified registered users (e.g., the verified registered user 4110 of FIG. 41A-B) of the global neighborhood environment 1800 (e.g., the privacy server 2900 of FIG. 29) to draw floor level structures, add neighbor's profiles and/or may also enable to select the floor number, claimable type, etc. as illustrated in example embodiment of FIG. 16.

The verified registered user 4110 may be verified registered user of the global neighborhood environment 1800 (e.g., the privacy server 2900 of FIG. 29) interested in creating and/or modifying claimable profiles (e.g., the claimable profile 4006 of FIG. 40A-12B, the claimable profile 4102 of FIG. 41A, the claimable profile 1704 of FIG. 17), building layouts, social network pages, and floor level structure housing residents and businesses in the neighborhood (e.g., the neighborhood 2902A-N of FIG. 29) in the building builder 1602.

Figure 29:
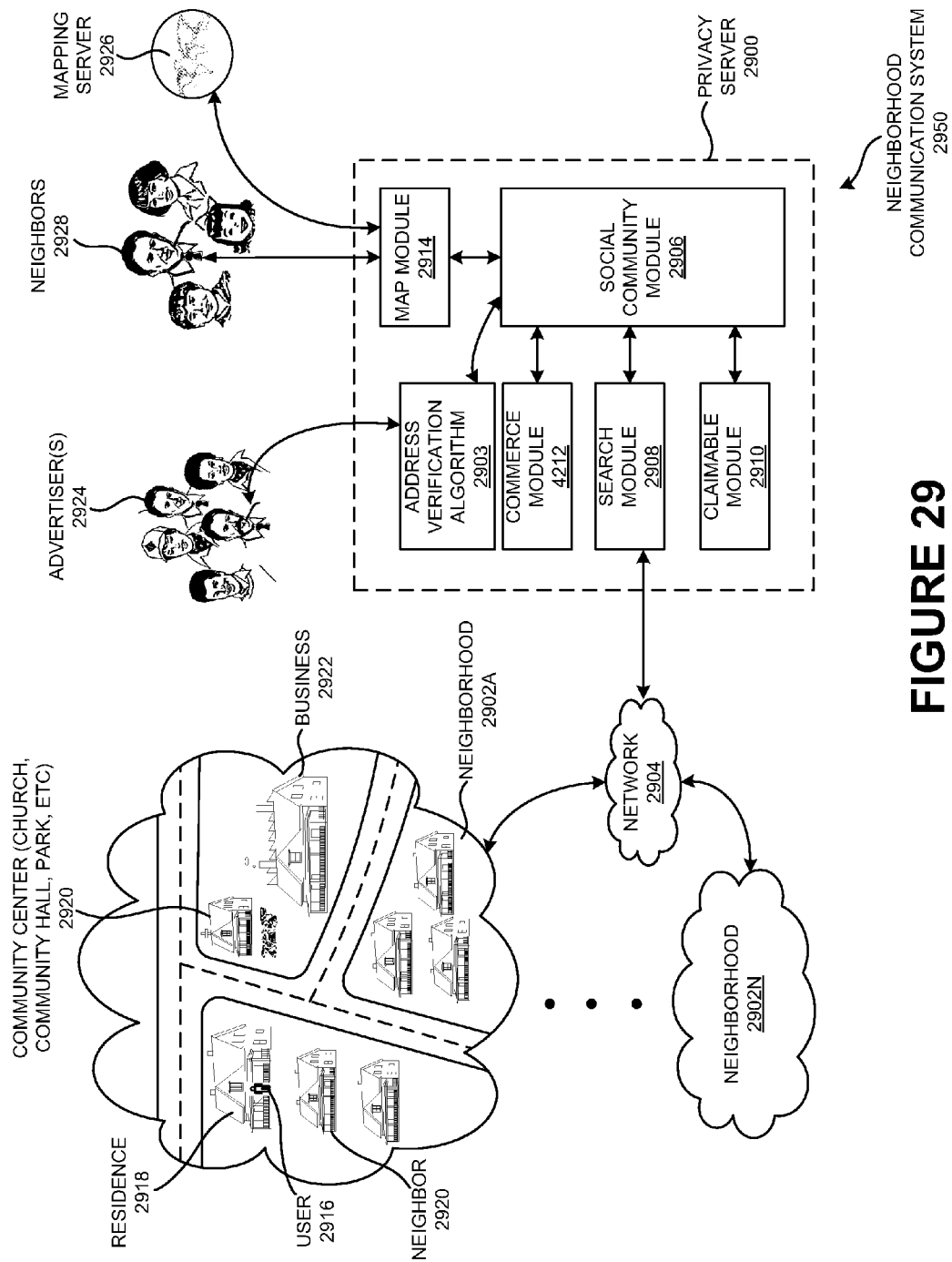
FIG. 29 is a system view of a global neighborhood environment 1800 communicating with the neighborhood(s) through a network, an advertiser(s), a global map data and an occupant data according to one embodiment.

For example, a social community module (e.g., a social community module 2906 of FIG. 29) of the global neighborhood environment 1800 (e.g., the privacy server 2900 of FIG. 29) may generate a building creator (e.g., the building builder 1602 of FIG. 16) in which the registered users may create and/or modify empty claimable profiles (e.g., the claimable profile 4006 of FIG. 40A-12B, the claimable profile 4102 of FIG. 41A, the claimable profile 1704 of FIG. 17), building layouts, social network pages, and floor levels structures housing residents and/or businesses in the neighborhood (e.g., the neighborhood 2902A-N of FIG. 29).

Figure 17:
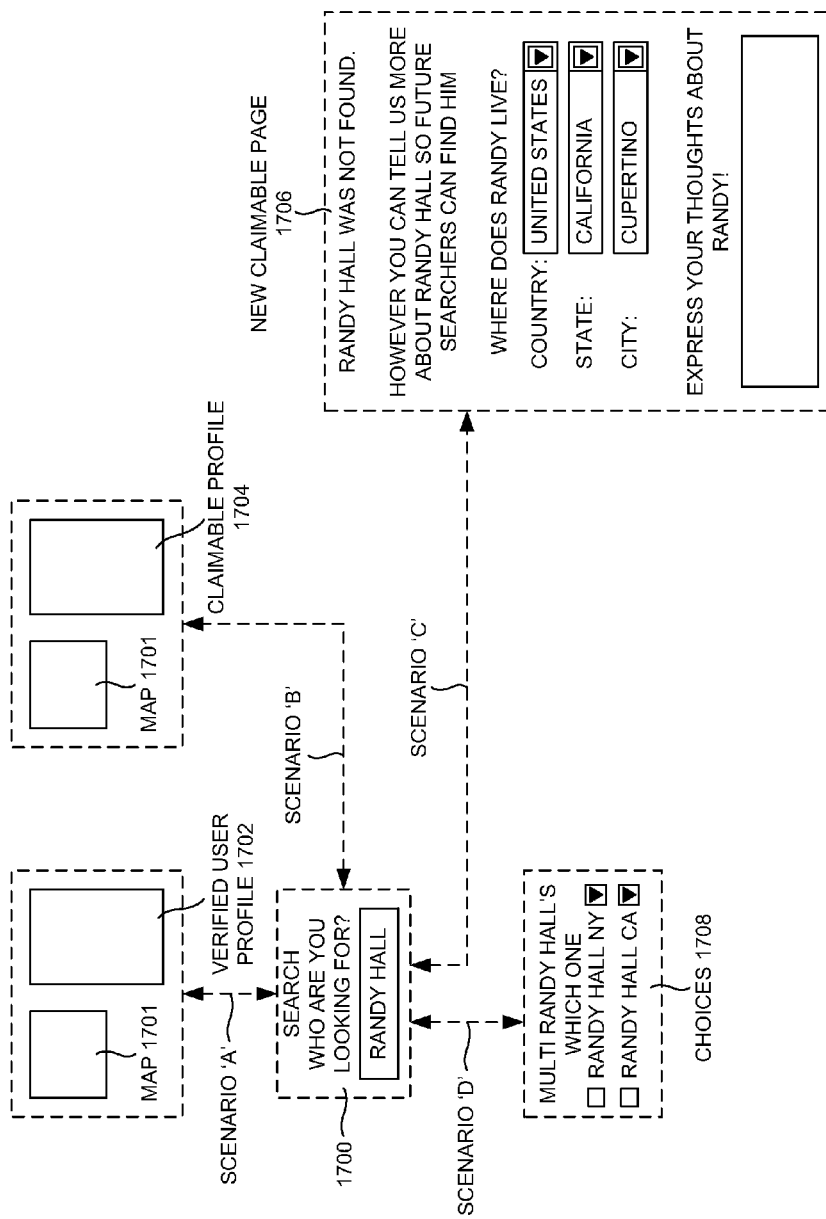
FIG. 17 is a systematic view of communication of claimable data, according to one embodiment.

FIG. 17 is a systematic view of communication of claimable data, according to one embodiment. Particularly FIG. 17 illustrates a map 1701, verified user profile 1702, choices 1708 and a new claimable page 1706, according to one embodiment. The map 1701 may locate the details of the address of the registered user of the global neighborhood environment 1800 (e.g., the privacy server 2900 of FIG. 29). The verified user profile 1702 may store the profiles of the verified user of the global neighborhood environment 1800 (e.g., the privacy server 2900 of FIG. 29. The claimable profile 1704 may be the profiles of the registered user who may claim them in the global neighborhood environment 1800 (e.g., the privacy server 2900 of FIG. 29).

In operation 1700 the search for the user profile (e.g., the user profile 29200 of FIG. 40A) is been carried whom the registered user may be searching. The new claimable page 1706 may solicit for the details of a user whom the registered user is searching for in the global neighborhood environment 1800 (e.g., the privacy server 2900 of FIG. 29). The choices 1708 may ask whether the requested search is any among the displayed names. The new claimable page 1706 may request for the details of location such as country, state and/or city. The operation 1700 may communicate with the choices 1708, and the new claimable page 1706.

For example, a no-match module (e.g., a no-match module 3112 of FIG. 31) of the search module (e.g., the search module 2908 of FIG. 29)*to* request additional information from the verified registered user about a person, place, and business having no listing in the global neighborhood environment 1800 (e.g., the privacy server 2900 of FIG. 29) when no matches are found in a search query of the verified registered user (e.g., the verified registered user 4110 of FIG. 41A-B), and to create a new claimable page 1706 based on a response of the verified registered user 1702 about the at least one person, place, and business not previously indexed in the global neighborhood environment 1800 (e.g., the privacy server 2900 of FIG. 29).

Figure 18:
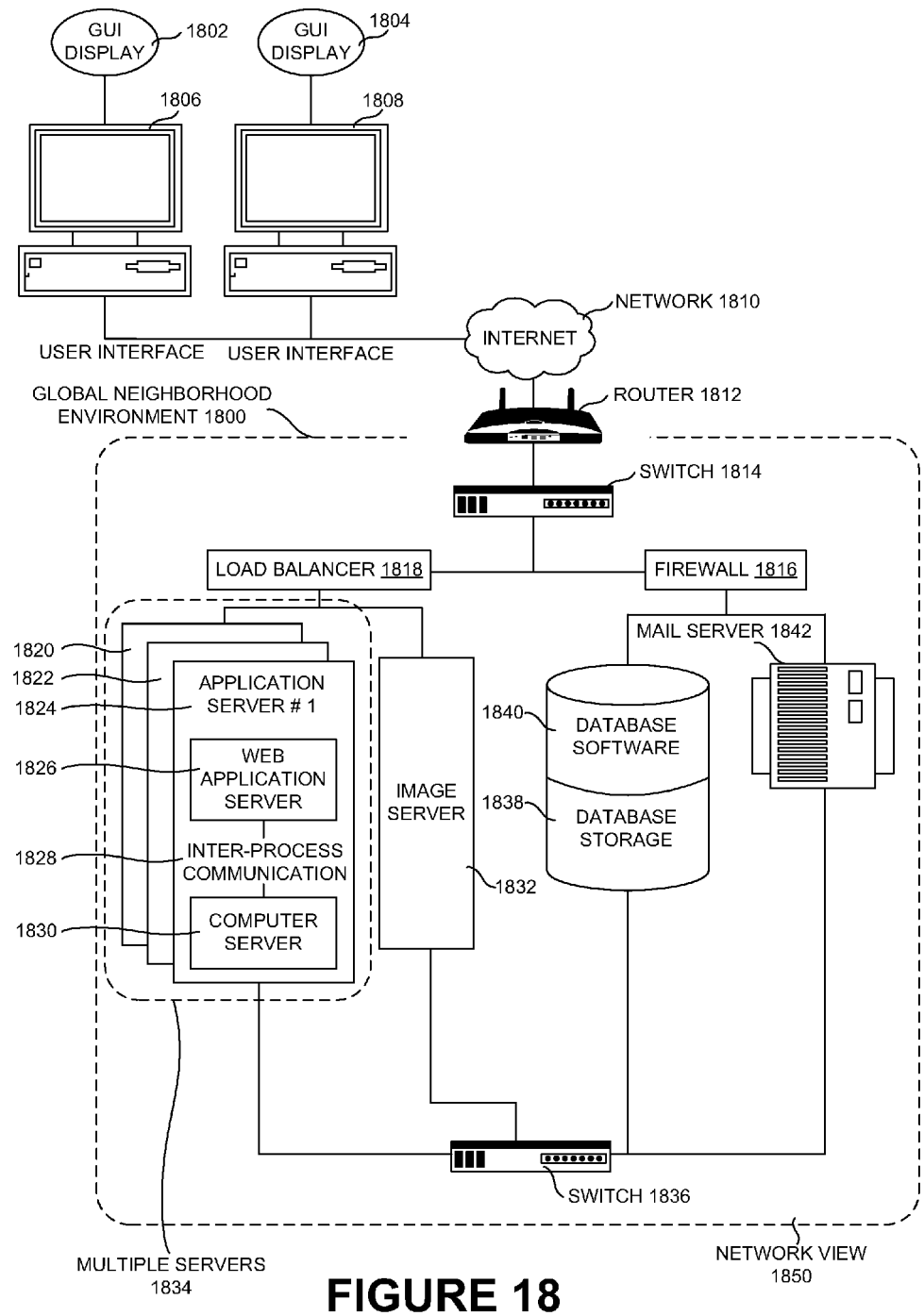
FIG. 18 is a systematic view of a network view, according to one embodiment.

FIG. 18 is a systematic view of a network view 1850, according to one embodiment. Particularly it may include a GUI display 1802, a GUI display 1804, device 1806, a device 1808, a network 1810, a router 1812, a switch 1814, a firewall 1816, a load balancer 1818, an application server #3 1820, an application server #2 1822, an application server#1 1824, a web application server 1826, an inter-process communication 1828, a computer server 1830, an image server 1832, a multiple servers 1834, a switch 1836, a database storage 1838, database software 1840 and a mail server 1842, according to one embodiment.

The GUI display 1802 and GUI display 1804 may display particular case of user interface for interacting with a device capable of representing data (e.g., computer, cellular telephones, television sets etc.) which employs graphical images and widgets in addition to text to represent the information and actions available to the user (e.g., the user 2916 of FIG. 29). The device 1806 and device 1808 may be any device capable of presenting data (e.g., computer, cellular telephones, television sets etc.). The network 1810 may be any collection of networks (e.g., internet, private networks, university social system, private network of a company etc.) that may transfer any data to the user (e.g., the user 2916 of FIG. 29) and the global neighborhood environment 1800 (e.g., the privacy server 2900 of FIG. 29).

The router 1812 may forward packets between networks and/or information packets between the global neighborhood environment 1800 (e.g., the privacy server 2900 of FIG. 29) and registered user over the network (e.g., internet). The switch 1814 may act as a gatekeeper to and from the network (e.g., internet) and the device. The firewall 1816 may provides protection (e.g., permit, deny or proxy data connections) from unauthorized access to the global neighborhood environment 1800 (e.g., the privacy server 2900 of FIG. 29. The load balancer 1818 may balance the traffic load across multiple mirrored servers in the global neighborhood environment 1800 (e.g., the privacy server 2900 of FIG. 29) and may be used to increase the capacity of a server farm beyond that of a single server and/or may allow the service to continue even in the face of server down time due to server failure and/or server maintenance.

The application server #2 1822 may be server computer on a computer network dedicated to running certain software applications of the global neighborhood environment 1800 (e.g., the privacy server 2900 of FIG. 29). The web application server 1826 may be server holding all the web pages associated with the global neighborhood environment 1800 (e.g., the privacy server 2900 of FIG. 29). The inter-process communication 1828 may be set of rules for organizing and un-organizing factors and results regarding the global neighborhood environment 1800 (e.g., the privacy server 2900 of FIG. 29). The computer server 1830 may serve as the application layer in the multiple servers of the global neighborhood environment 1800 (e.g., the privacy server 2900 of FIG. 29) and/or may include a central processing unit (CPU), a random access memory (RAM) temporary storage of information, and/or a read only memory (ROM) for permanent storage of information regarding the global neighborhood environment 1800 (e.g., the privacy server 2900 of FIG. 29).

The image server 1832 may store and provide digital images of the registered user of the global neighborhood environment 1800 (e.g., the privacy server 2900 of FIG. 29). The multiple servers 1834 may be multiple computers or devices on a network that may manages network resources connecting the registered user and the global neighborhood environment 1800 (e.g., the privacy server 2900 of FIG. 29). The database storage 1838 may store software, descriptive data, digital images, system data and any other data item that may be related to the user (e.g., the user 2916 of FIG. 29) of the global neighborhood environment 1800 (e.g., the privacy server 2900 of FIG. 29). The database software 1840 may be provided a database management system that may support the global neighborhood environment 1800 (e.g., the neighborhood environment 2900 of FIG. 29. The mail server 1842 may be provided for sending, receiving and storing mails. The device 1806 and 1808 may communicate with the GUI display(s) 1802 and 1804, the router 1812 through the network 1810 and the global neighborhood environment 1800 (e.g., the privacy server 2900 of FIG. 29).

Figure 19:
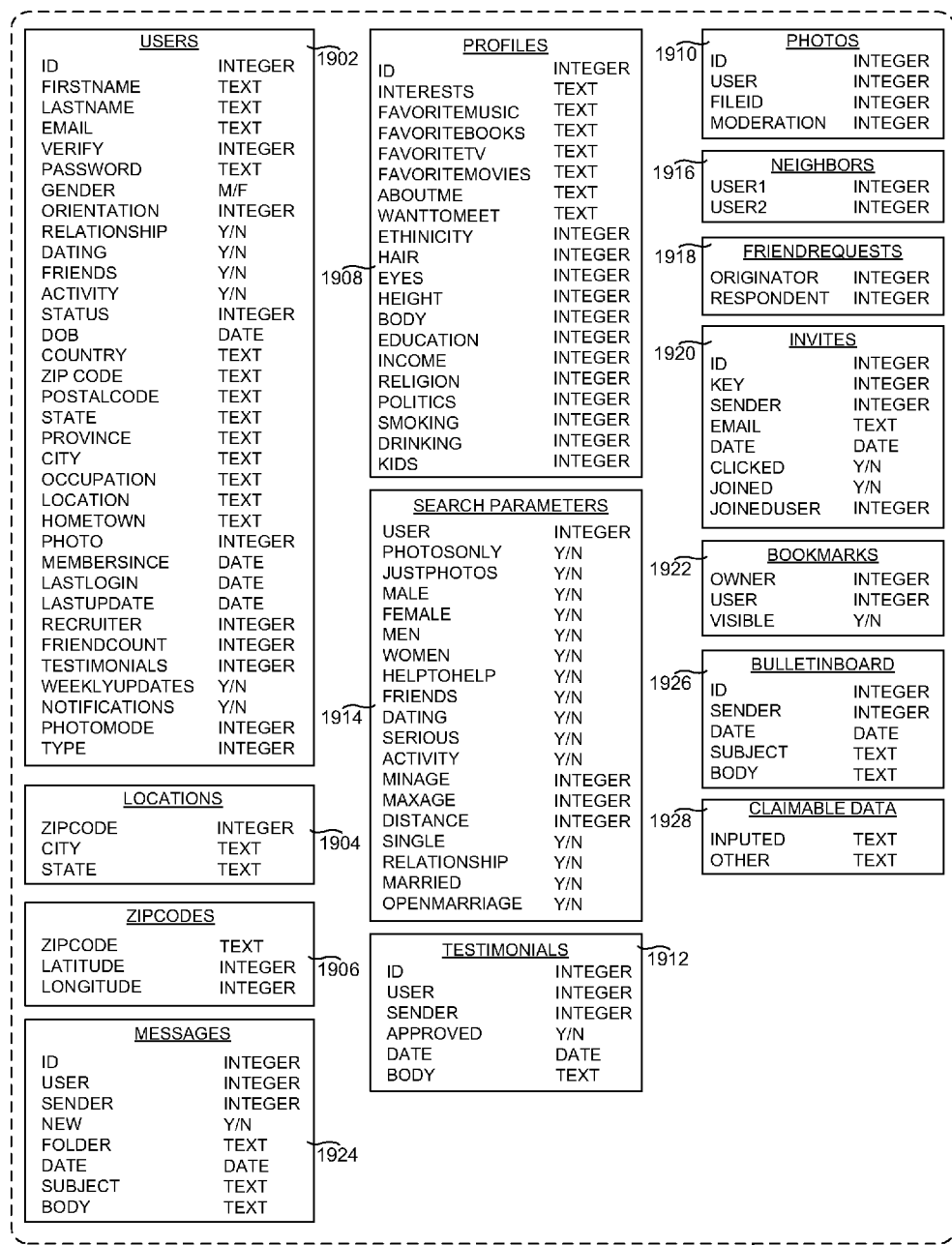
FIG. 19 is a block diagram of a database, according to one embodiment.

FIG. 19 is a block diagram of a database, according to one embodiment. Particularly the block diagram of the database 1900 of FIG. 19 illustrates a user data 1902, a location data, a zip codes data 1906, a profiles data 1908, a photos data 1910, a testimonials data 1912, a search parameters data 1914, a neighbor data 1916, a friends requests data 1918, a invites data 1920, a bookmarks data 1922, a messages data 1924 and a bulletin board data 1926, according to one embodiment.

The database 1900 be may include descriptive data, preference data, relationship data, and/or other data items regarding the registered user of the global neighborhood environment 1800 (e.g., the privacy server 2900 of FIG. 29.

The user data 1902 may be a descriptive data referring to information that may describe a user (e.g., the user 2916 of FIG. 29). It may include elements in a certain format for example Id may be formatted as integer, Firstname may be in text, Lastname may be in text, Email may be in text, Verify may be in integer, Password may be in text, Gender may be in m/f, Orientation may be in integer, Relationship may be in y/n, Dating may be in y/n, Friends may be in y/n, Activity may be in y/n, Status may be in integer, Dob may be in date, Country may be in text, Zip code may be in text, Postalcode may be in text, State may be in text, Province may be in text, City may be in text, Occupation may be in text, Location may be in text, Hometown may be in text, Photo may be in integer, Membersince may be in date, Lastlogin may be in date, Lastupdate may be in date, Recruiter may be in integer, Friendcount may be in integer, Testimonials may be in integer, Weeklypdates may be in y/n, Notifications may be in y/n, Photomode may be in integer and/or Type may be in integer.

The locations data 1904 may clarify the location details in formatted approach. For example Zip code may be formatted as integer, City may be in text and/or State may be in text. The zip codes data 1906 may provide information of a user location in formatted manner. For example Zip code may be formatted as text, Latitude may be in integer and/or Longitude may be in integer. The profile data 1908 may clutch personnel descriptive data that may be formatted.

For examples ID may be formatted as integer, Interests may be in text, Favoritemusic may be in text, Favaoritebooks may be in text, Favoritetv may be in text, Favoritemovies may be in text, Aboutme may be in text, Wanttommet may be in text, Ethnicity may be in integer, Hair may be in integer, Eyes may be in integer, Height may be in integer, Body may be in integer, Education may be in integer, Income may be in integer, Religion may be in integer, Politics may be in integer Smoking may be in integer, Drinking may be in integer and/or Kids may be in integer.

The photos data 1910 may represent a digital image and/or a photograph of the user formatted in certain approach. For example Id may be formatted as integer, User may be in integer, Fileid may be in integer and/or Moderation may be in integer. The testimonials data 1912 may allow users to write "testimonials" 1912, or comments, about each other and in these testimonials, users may describe their relationship to an individual and their comments about that individual. For example the user might write a testimonial that states "Rohan has been a friend of mine since graduation days. He is smart, intelligent, and a talented person." The elements of testimonials data 1912 may be formatted as Id may be in integer, User may be in integer, Sender may be integer, Approved may be in y/n, Date may be in date and/or Body may be formatted in text.

The search parameters data 1914 may be preference data referring to the data that may describe preferences one user has with respect to another (For example, the user may indicate that he is looking for a female who is seeking a male for a serious relationship). The elements of the search parameters data 1914 may be formatted as User 1902 may be in integer, Photosonly may be in y/n, Justphotos may be in y/n, Male may be in y/n, Female may be in y/n, Men may be in y/n, Women may be in y/n, Helptohelp may be in y/n, Friends may be in y/n, Dating may be in y/n, Serious may be in y/n, Activity may be in y/n, Minage may be in integer, Maxage may be in integer, Distance may be in integer, Single may be in y/n, Relationship may be in y/n, Married may be in y/n and/or Openmarriage may be in y/n.

The neighbor's data 1916 may generally refer to relationships among registered users of the global neighborhood environment 1800 (e.g., the privacy server 2900 of FIG. 29) that have been verified and the user has requested another individual to join the system as neighbor 1916, and the request may be accepted. The elements of the neighbors data 1916 may be formatted as user1 may be in integer and/or user2 may be in integer. The friend requests data 1918 may tracks requests by users within the neighborhood (e.g., the neighborhood 2902A-N of FIG. 29) to other individuals, which requests have not yet been accepted and may contain elements originator and/or respondent formatted in integer. The invites data 1920 may describe the status of a request by the user to invite an individual outside the neighborhood (e.g., the neighborhood 2902A-N of FIG. 29) to join the neighborhood (e.g., the neighborhood 2902A-N of FIG. 29) and clarify either the request has been accepted, ignored and/or pending.

The elements of the invites data 1920 may be formatted as Id may be in integer, Key may be in integer, Sender may be in integer, Email may be in text, Date may be in date format, Clicked may be in y/n, Joined may be in y/n and/or Joineduser may be in integer. The bookmarks data 1922 may be provide the data for a process allowed wherein a registered user of the global neighborhood environment 1800 (e.g., the privacy server 2900 of FIG. 29) may indicate an interest in the profile of another registered user. The bookmark data 1922 elements may be formatted as Owner may be in integer, User may be in integer and/or Visible may be in y/n. The message data 1924 may allow the users to send one another private messages.

The message data 1924 may be formatted as Id may be in integer, User may be in integer, Sender may be in integer, New may be in y/n, Folder may be in text, Date may be in date format, Subject may be in text and/or Body may be in text format. The bulletin board data 1926 may supports the function of a bulletin board that users may use to conduct online discussions, conversation and/or debate. The claimable data 1928 may share the user profiles (e.g., the user profile 29200 of FIG. 40A) in the neighborhood (e.g., the neighborhood 2902A-N of FIG. 29) and its elements may be formatted as claimablesinputed and/or others may be in text format.

FIG. 20 is an exemplary graphical user interface view for data collection, according to one embodiment. Particularly FIG. 20 illustrates exemplary screens 2002, 2004 that may be provided to the user (e.g., the user 2916 of FIG. 29) through an interface may be through the network (e.g., Internet), to obtain user descriptive data. The screen 2002 may collect data allowing the user (e.g., the user 2916 of FIG. 29) to login securely and be identified by the neighborhood (e.g., the neighborhood 2902A-N of FIG. 29). This screen 2002 may allow the user to identify the reason he/she is joining the neighborhood. For example, a user may be joining the neighborhood for "neighborhood watch". The screen 2004 may show example of how further groups may be joined. For example, the user (e.g., the user 2916 of FIG. 29) may be willing to join a group "Raj for city council". It may also enclose the data concerning Dob, country, zip/postal code, hometown, occupation and/or interest.

Figure 21:
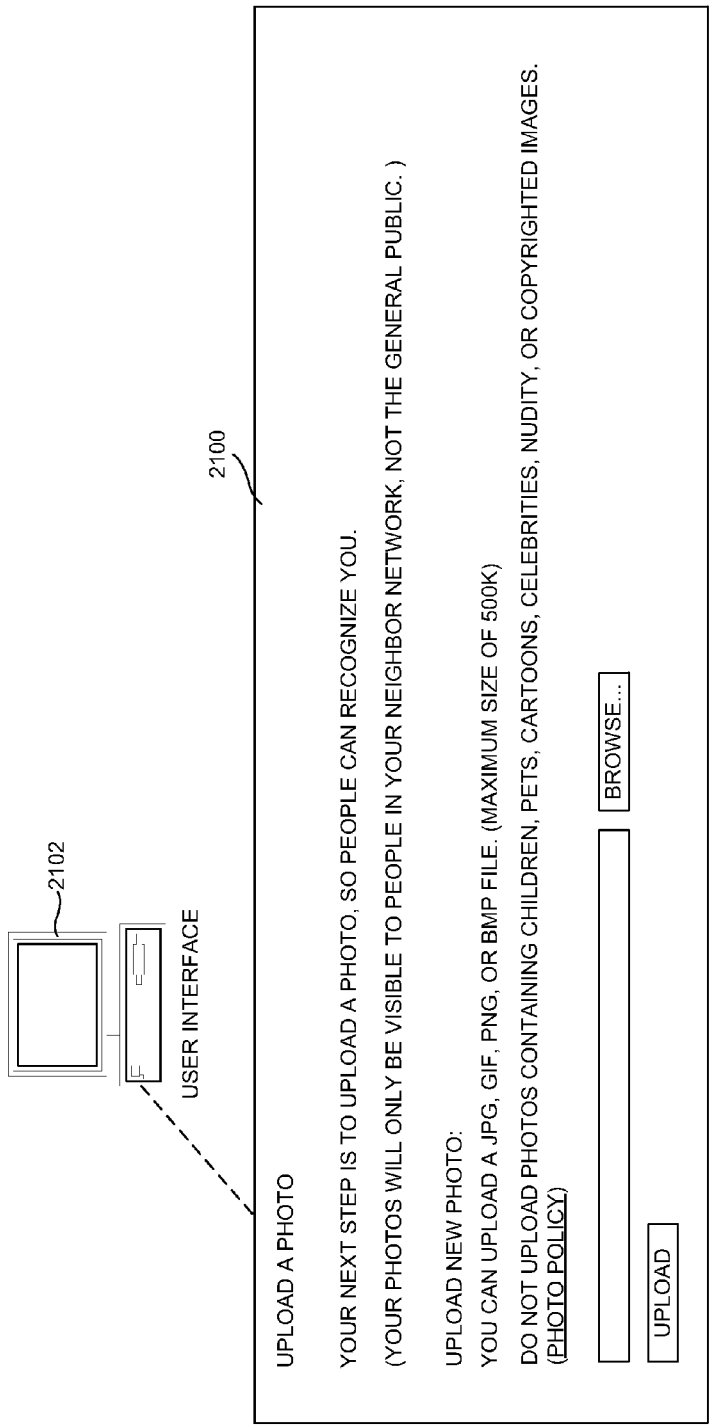
FIG. 21 is an exemplary graphical user interface view of image collection, according to one embodiment.

FIG. 21 is an exemplary graphical user interface view of image collection, according to one embodiment. A screen 2100 may be interface provided to the user (e.g., the user 2916 of FIG. 29) over the network (e.g., internet) may be to obtain digital images from system user. The interface 2102 may allow the user (e.g., the user 2916 of FIG. 29) to browse files on his/her computer, select them, and then upload them to the neighborhood (e.g., the neighborhood 2902A-N of FIG. 29). The user (e.g., the user 2916 of FIG. 29) may upload the digital images and/or photo that may be visible to people in the neighbor (e.g., the neighbor 2920 of FIG. 29) network and not the general public. The user may be able to upload a JPG, GIF, PNG and/or BMP file in the screen 2100.

Figure 22:
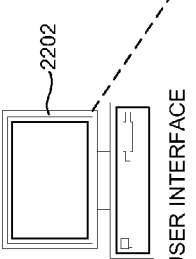
FIG. 22 is an exemplary graphical user interface view of an invitation, according to one embodiment.

FIG. 22 is an exemplary graphical user interface view of an invitation, according to one embodiment. An exemplary screen 2200 may be provided to a user through a user interface 2202 may be over the network (e.g., internet) to allow users to invite neighbor or acquaintances to join the neighborhood (e.g., the neighborhood 2902A-N of FIG. 29). The user interface 2202 may allow the user (e.g., the user 2916 of FIG. 29) to enter one or a plurality of e-mail addresses for friends they may like to invite to the neighborhood (e.g., the neighborhood 2902A-N of FIG. 29). The exemplary screen 2200 may include the "subject", "From", "To", "Optional personnel message", and/or "Message body" sections. In the "Subject" section a standard language text may be included for joining the neighborhood (e.g., Invitation to join Fatdoor from John Doe, a neighborhood).

The "From" section may include the senders email id (e.g., user@domain.com). The "To" section may be provided to add the email id of the person to whom the sender may want to join the neighborhood (e.g., the neighborhood 2902A-N of FIG. 29). The message that may be sent to the friends and/or acquaintances may include standard language describing the present neighborhood, the benefits of joining and the steps required to join the neighborhood (e.g., the neighborhood 2902A-N of FIG. 29). The user (e.g., the user 2916 of FIG. 29) may choose to include a personal message, along with the standard invitation in the "Optional personal message" section. In the "Message body" section the invited friend or acquaintance may initiate the process to join the system by clicking directly on an HTML link included in the e-mail message (e.g., http://www.fatdoor.com/join.jsp?Invite=140807). In one embodiment, the user (e.g., the user 2916 of FIG. 29) may import e-mail addresses from a standard computerized address book. The system may further notify the inviting user when her invitee accepts or declines the invitation to join the neighborhood (e.g., the neighborhood 2902A-N of FIG. 29).

Figure 23:
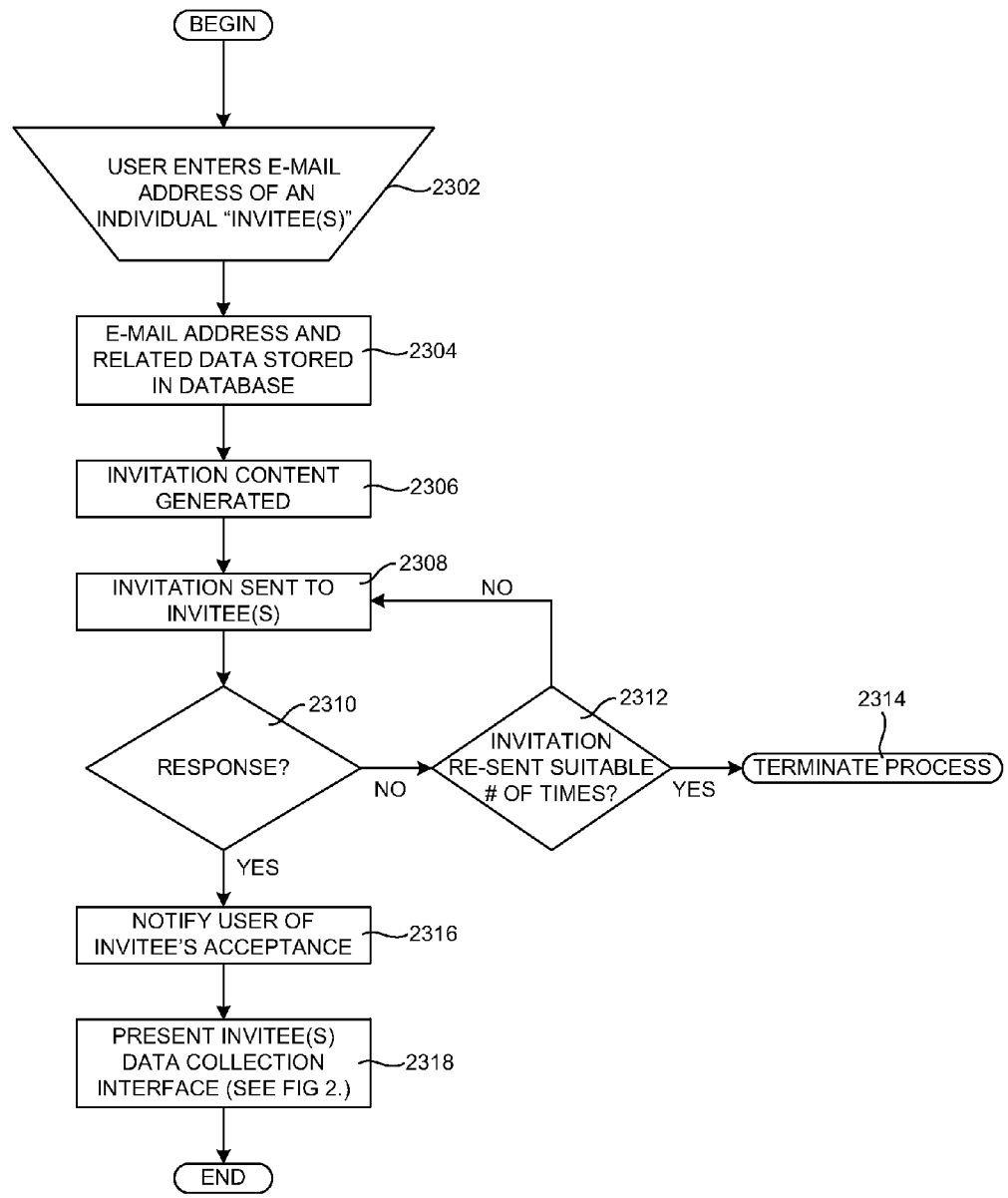
FIG. 23 is a flowchart of inviting the invitee(s) by the registered user, notifying the registered user upon the acceptance of the invitation by the invitee(s) and, processing and storing the input data associated with the user in the database, according to one embodiment.

FIG. 23 is a flowchart of inviting the invitee(s) by the registered user, notifying the registered user upon the acceptance of the invitation by the invitee(s) and, processing and storing the input data associated with the user (e.g., the user 2916 of FIG. 29) in the database, according to one embodiment. In operation 2302, the verified registered user (e.g., the verified registered user 4110 of FIG. 41A-B, the verified registered user 4110 of FIG. 16) willing to invite the individual enters the email addresses of an individual "invitee". In operation 2304, the email address and the related data of the invitee may be stored in the database. In operation 2306, the invitation content for inviting the invitee may be generated from the data stored in the database. In operation 2308, the registered user sends invitation to the invitee(s).

In operation 2310, response from the user (e.g., the user 2916 of FIG. 29) may be determined. The operation 2312, if the invitee doesn't respond to invitation sent by the registered user then registered user may resend the invitation for a predefined number of times. In operation 2314, if the registered user resends the invitation to the same invitee for predefined number of times and if the invitee still doesn't respond to the invitation the process may be terminated automatically.

In operation 2316, if the invitee accepts the invitation sent by the registered user then system may notify the registered user that the invitee has accepted the invitation. In operation 2318, the input from the present invitee(s) that may contain the descriptive data about the friend (e.g., registered user) may be processed and stored in the database.

For example, each registered user associated e-mail addresses of individuals who are not registered users may be stored and identified by each registered user as neighbors. An invitation to become a new user (e.g., the user 2916 of FIG. 29) may be communicated out to neighbor (e.g., the neighbors neighbor of FIG. 29) of the particular user. An acceptance of the neighbor (e.g., the neighbor 2920 of FIG. 29) to whom the invitation was sent may be processed.

Figure 41A:
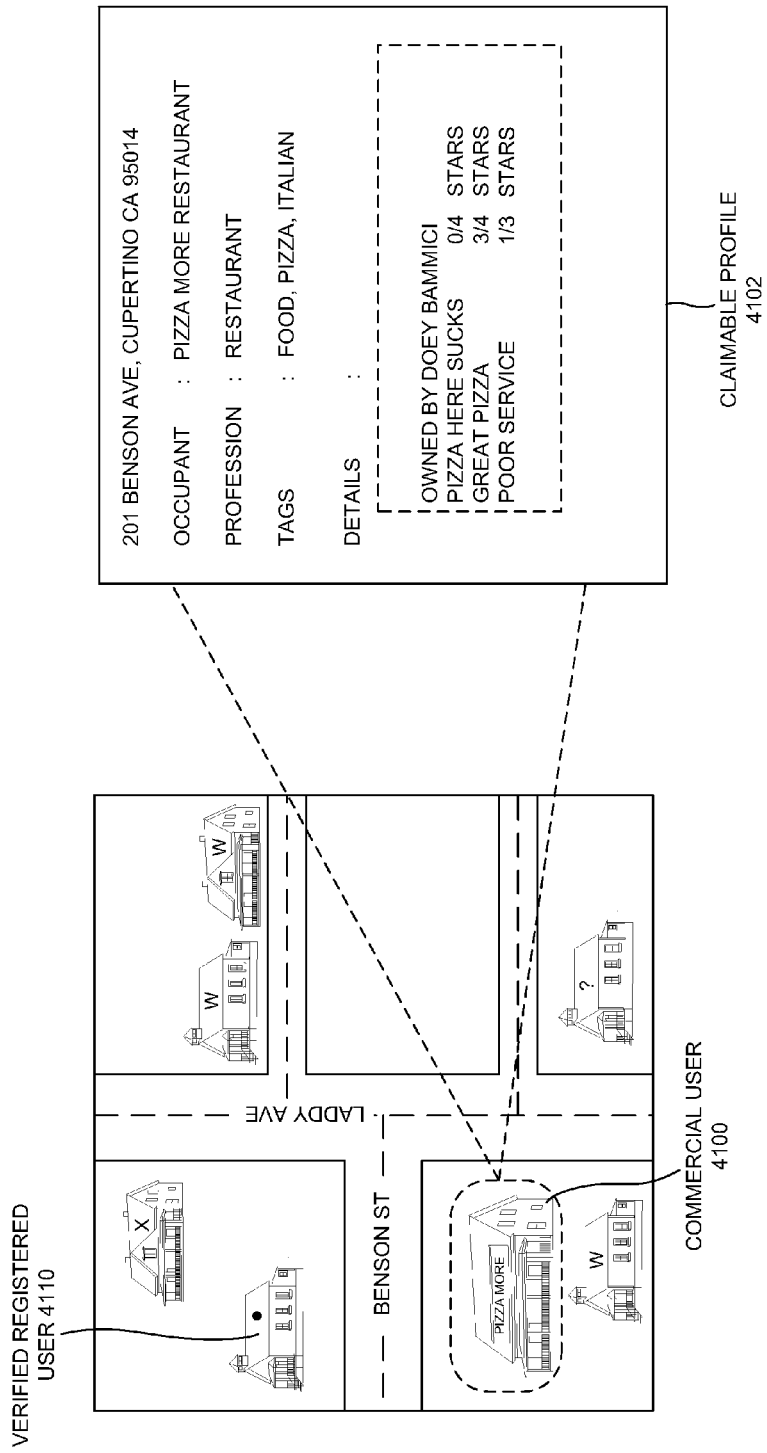
FIG. 41A is a user interface view of mapping of a claimable profile of the commercial user, according to one embodiment.
Figure 41B:
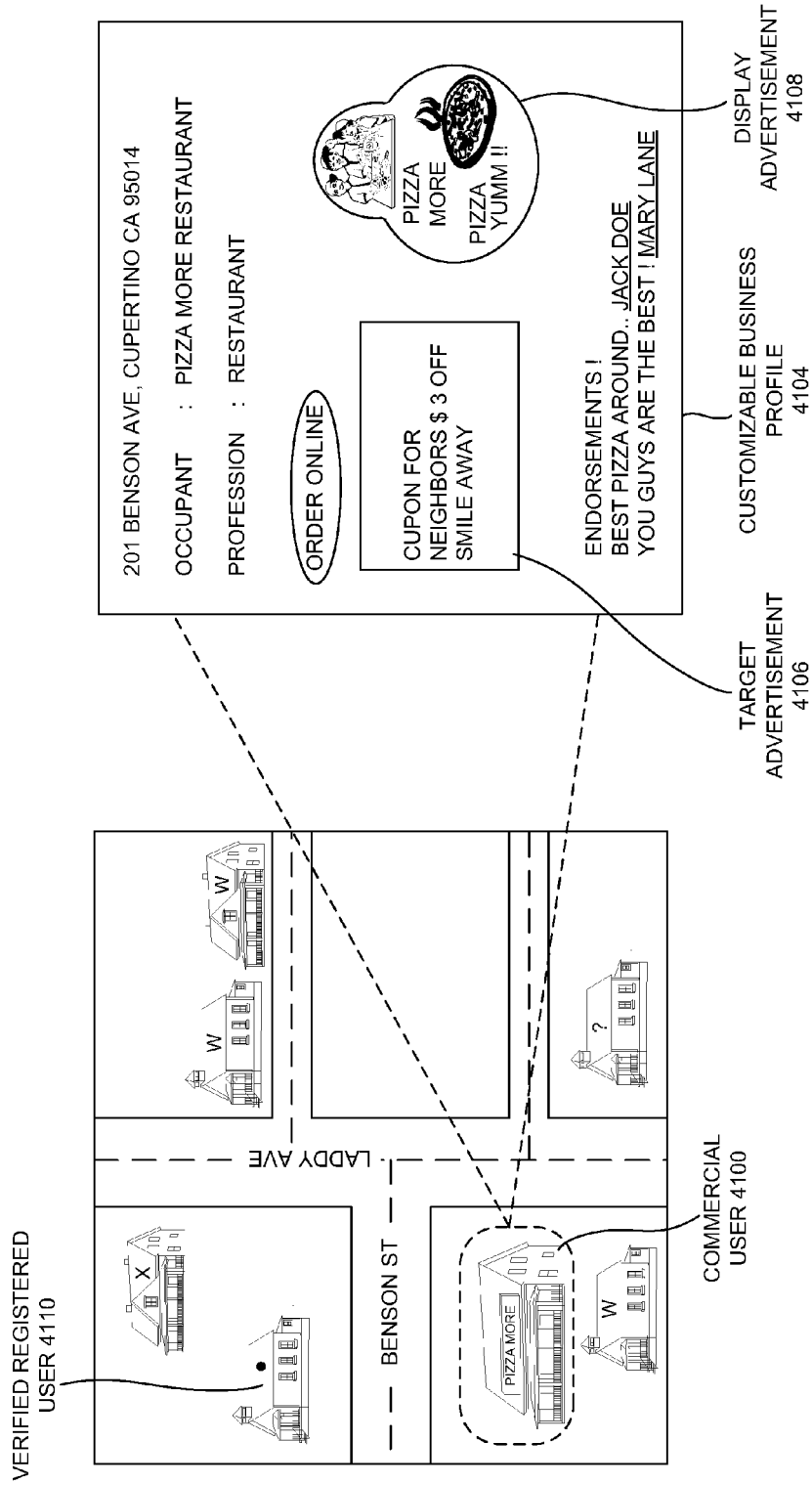
FIG. 41B is a user interface view of mapping of customizable business profile of the commercial user, according to one embodiment.

The neighbor (e.g., the neighbor 2920 of FIG. 29) may be added to a database and/or storing of the neighbor (e.g., the neighbor 2920 of FIG. 29), a user ID and a set of user IDs of registered users who are directly connected to the neighbor (e.g., the neighbor 2920 of FIG. 29), the set of user IDs stored of the neighbor (e.g., the neighbor 2920 of FIG. 29) including at least the user ID of the verified registered user (e.g., the verified registered user 4110 of FIG. 41A-B, the verified registered user 4110 of FIG. 16). Furthermore, the verified registered user may be notified that the invitation to the neighbor (e.g., the neighbor 2920 of FIG. 29) has been accepted when an acceptance is processed. Also, inputs from the neighbor (e.g., the neighbor 2920 of FIG. 29) having descriptive data about the friend may be processed and the inputs in the database may be stored.

Figure 24:
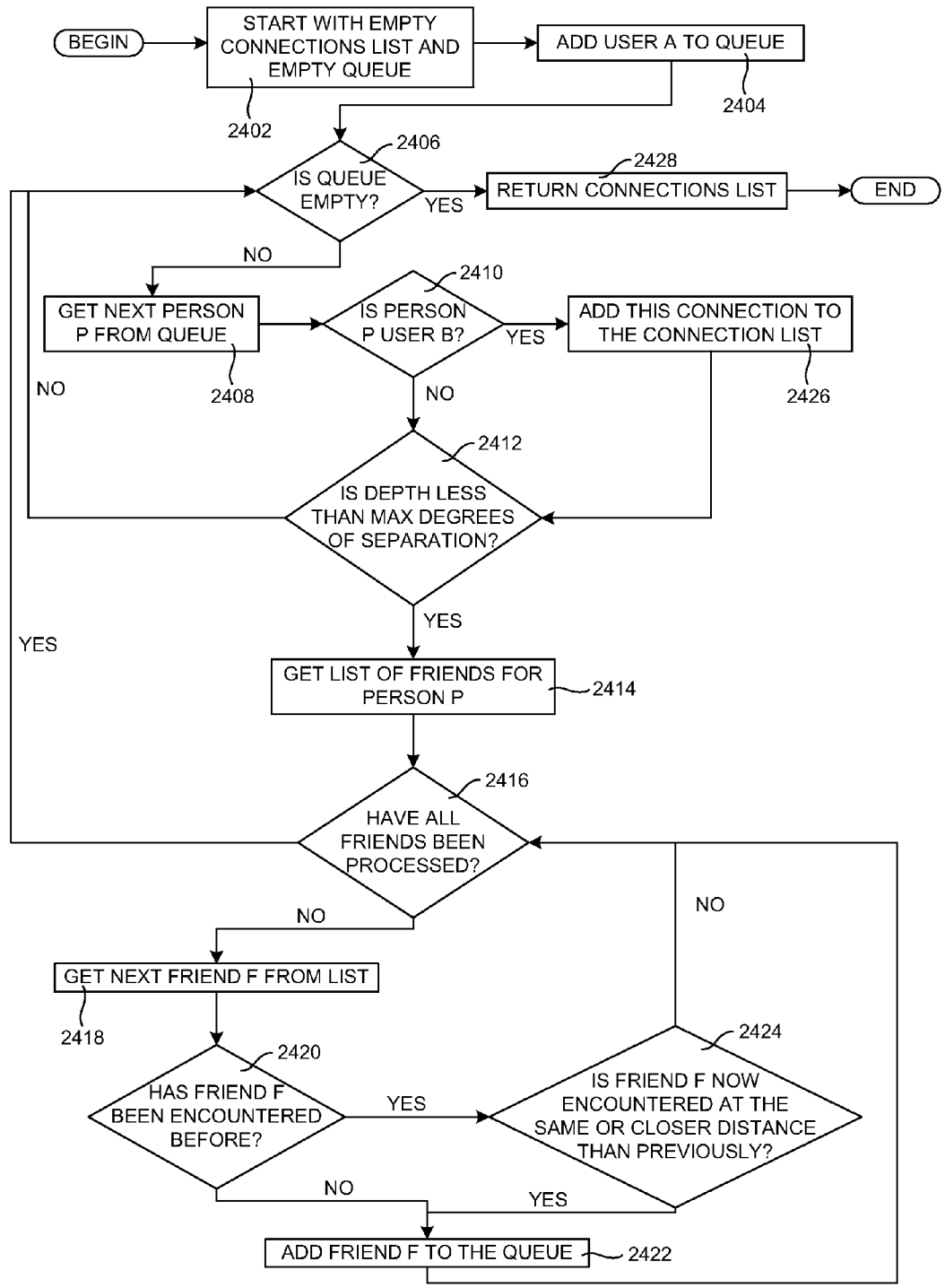
FIG. 24 is a flowchart of adding the neighbor to the queue, according to one embodiment.

FIG. 24 is a flowchart of adding the neighbor (e.g., the neighbor 2920 of FIG. 29) to the queue, according to one embodiment. In operation 2402, the system may start with the empty connection list and empty queue. In operation 2404, the user may be added to the queue. In operation 2406, it is determined whether the queue is empty. In operation 2408, if it is determined that the queue is not empty then the next person P may be taken from the queue. In operation 2410, it may be determined whether the person P from the queue is user B or not. In operation 2412, if the person P is not user B then it may be determined whether the depth of the geographical location is less than maximum degrees of separation.

If it is determined that depth is more than maximum allowable degrees of separation then it may repeat the operation 2408. In operation 2414, if may be determined that the depth of the geographical location (e.g., the geographical location 4004 of FIG. 40A) is less than maximum degrees of separation then the neighbors (e.g., the neighbor 2920 of FIG. 29) list for person P may be processed. In operation 2416, it may be determined whether all the neighbors (e.g., the neighbor 2920 of FIG. 29) in the neighborhood (e.g., the neighborhood 2902A-N of FIG. 29) have been processed or not. If all the friends are processed it may be determined the queue is empty.

In operation 2418, if all the neighbors (e.g., the neighbor 2920 of FIG. 29) for person P are not processed then next neighbor N may be taken from the list. In operation 2420, it may be determined whether the neighbor (e.g., the neighbor 2920 of FIG. 29) N has encountered before or not. In operation 2422, if the neighbor (e.g., the neighbor 2920 of FIG. 29) has not been encountered before then the neighbor may be added to the queue. In operation 2424, if the neighbor N has been encountered before it may be further determined whether the geographical location (e.g., the geographical location 4004 of FIG. 40A) from where the neighbor (e.g., the neighbor 2920 of FIG. 29) has encountered previously is the same place or closer to that place.

If it is determined that the neighbor (e.g., the neighbor 2920 of FIG. 29) has encountered at the same or closer place then the friend may be added to the queue. If it may be determined that friend is not encountered at the same place or closer to that place then it may be again checked that all the friends have processed. In operation 2426, if it is determined that the person P is user B than the connection may be added to the connection list and after adding the connection to connection list it follows the operation 2412. In operation 2428, if it may be determined that queue is empty then the operation may return the connections list.

For example, a first user ID with the verified registered user (e.g., the verified registered user 4110 of FIG. 41A-B, the verified registered user 4110 of FIG. 16) and a second user ID may be applied to the different registered user. The verified registered user (e.g., the verified registered user 4110 of FIG. 41A-B, the verified registered user 4110 of FIG. 16) with the different registered user may be connected with each other through at least one of a geo-positioning data associated with the first user ID and the second user ID. In addition, a maximum degree of separation (Nmax) of at least two that is allowed for connecting any two registered users, (e.g., the two registered users who may be directly connected may be deemed to be separated by one degree of separation and two registered users who may be connected through no less than one other registered user may be deemed to be separated by two degrees of separation and two registered users who may be connected through not less than N other registered users may be deemed to be separated by N+1 degrees of separation).

Furthermore, the user ID of the different registered user may be searched (e.g., the method limits the searching of the different registered user in the sets of user IDs that may be stored as registered users who are less than Nmax degrees of separation away from the verified registered user (e.g., the verified registered user 4110 of FIG. 41A-B, the verified registered user 4110 of FIG. 16), such that the verified registered user (e.g., the verified registered user 4110 of FIG. 41A-B, the verified registered user 4110 of FIG. 16) and the different registered user who may be separated by more than Nmax degrees of separation are not found and connected) in a set of user IDs that may be stored of registered users who are less than Nmax degrees of separation away from the verified registered user (e.g., the verified registered user 4110 of FIG. 41A-B, the verified registered user 4110 of FIG. 16), and not in the sets of user IDs that may be stored for registered users who are greater than or equal to Nmax degrees of separation away from the verified registered user (e.g., the verified registered user 4110 of FIG. 41A-B, the verified registered user 4110 of FIG. 16), until the user ID of the different registered user may be found in one of the searched sets. Also, the verified registered user (e.g., the verified registered user 4110 of FIG. 41A-B, the verified registered user 4110 of FIG. 16) may be connected to the different registered user if the user ID of the different registered user may be found in one of the searched sets.

Moreover, the sets of user IDs that may be stored of registered users may be searched initially who are directly connected to the verified registered user (e.g., the verified registered user 4110 of FIG. 41A-B, the verified registered user 4110 of FIG. 16). A profile of the different registered user may be communicated to the verified registered user (e.g., the verified registered user 4110 of FIG. 41A-B, the verified registered user 4110 of FIG. 16) to display through a marker associating the verified registered user (e.g., the verified registered user 4110 of FIG. 41A-B, the verified registered user 4110 of FIG. 16) with the different registered user. A connection path between the verified registered user (e.g., the verified registered user 4110 of FIG. 41A-B, the verified registered user 4110 of FIG. 16) and the different registered user, the connection path indicating at least one other registered user may be stored through whom the connection path between the verified registered user (e.g., the verified registered user 4110 of FIG. 41A-B, the verified registered user 4110 of FIG. 16) and the different registered user is made.

In addition, the connection path between the verified registered user (e.g., the verified registered user 4110 of FIG. 41A-B, the verified registered user 4110 of FIG. 16) and the different registered user may be communicated to the verified registered user to display. A hyperlink in the connection path of each of the at least one registered users may be embedded through whom the connection path between the verified registered user (e.g., the verified registered user 4110 of FIG. 41A-B, the verified registered user 4110 of FIG. 16) and the different registered user is made.

Figure 25:
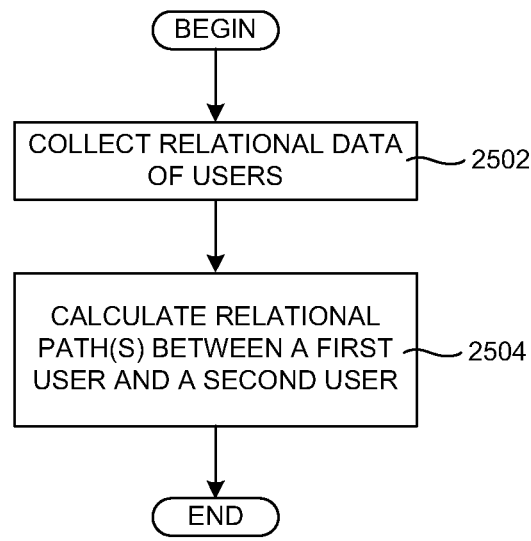
FIG. 25 is a flowchart of communicating brief profiles of the registered users, processing a hyperlink selection from the verified registered user and calculating and ensuring the Nmax degree of separation of the registered users away from verified registered users, according to one embodiment.

FIG. 25 is a flowchart of communicating brief profiles of the registered users, processing a hyperlink selection from the verified registered user (e.g., the verified registered user 4110 of FIG. 41A-B, the verified registered user 4110 of FIG. 16) and calculating and ensuring the Nmax degree of separation of the registered users away from verified registered users (e.g., the verified registered user 4110 of FIG. 41A-B, the verified registered user 4110 of FIG. 16), according to one embodiment. In operation 2502, the data of the registered users may be collected from the database. In operation 2504, the relational path between the first user and the second user may be calculated (e.g., the Nmax degree of separation between verified registered user (e.g., the verified registered user 4110 of FIG. 41A-B, the verified registered user 4110 of FIG. 16) and the registered user).

For example, the brief profiles of registered users, including a brief profile of the different registered user, to the verified registered user (e.g., the verified registered user 4110 of FIG. 41A-B, the verified registered user 4110 of FIG. 16) for display, each of the brief profiles including a hyperlink to a corresponding full profile may be communicated.

Furthermore, the hyperlink selection from the verified registered user (e.g., the verified registered user 4110 of FIG. 41A-B, the verified registered user 4110 of FIG. 16) may be processed (e.g., upon processing the hyperlink selection of the full profile of the different registered user, the full profile of the different registered user may be communicated to the verified registered user (e.g., the verified registered user 4110 of FIG. 41A-B, the verified registered user 4110 of FIG. 16) for display). In addition, the brief profiles of those registered users may be ensured who are more than Nmax degrees of separation away from the verified registered user (e.g., the verified registered user 4110 of FIG. 41A-B, the verified registered user 4110 of FIG. 16) are not communicated to the verified registered user (e.g., the verified registered user 4110 of FIG. 41A-B, the verified registered user 4110 of FIG. 16) for display.

Figure 26:
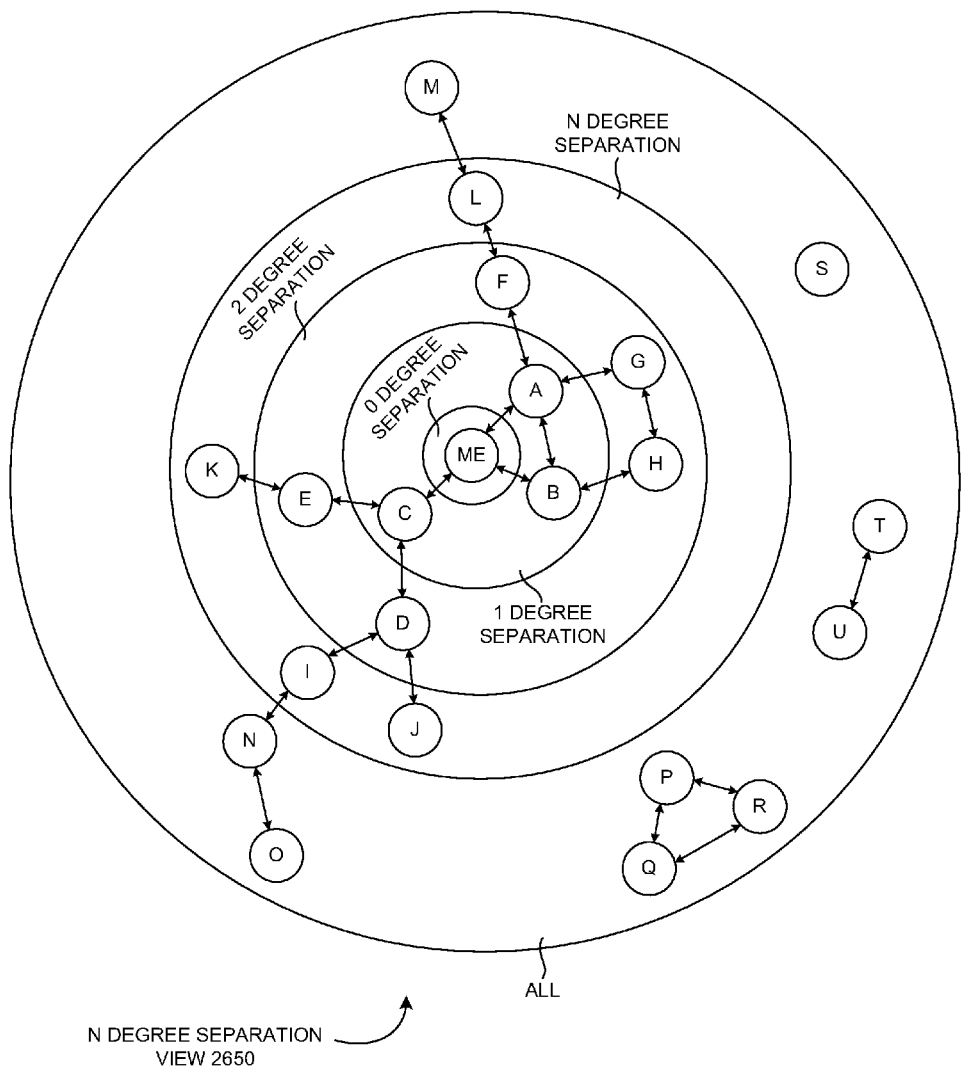
FIG. 26 is an N degree separation view, according to one embodiment.

FIG. 26 is an N degree separation view 2650, according to one embodiment. ME may be a verified registered user (e.g., the verified registered user 4110 of FIG. 41A-B, the verified registered user 4110 of FIG. 16) of the global neighborhood environment 1800 (e.g., the privacy server 2900 of FIG. 29) centered in the neighborhood network. A, B, C, D, E, F, G, H, I, J, K, L, M, N, O, P, Q, R, S, T, and/or U may be the other registered user of the neighborhood network. The member of the neighborhood network may be separated from the centered verified registered user (e.g., the verified registered user 4110 of FIG. 41A-B, the verified registered user 4110 of FIG. 16) ME of the neighborhood network by certain degree of separation. The registered user A, B and C may be directly connected and are deemed to be separated by one degree of separation from verified registered user (e.g., the verified registered user 4110 of FIG. 41A-B, the verified registered user 4110 of FIG. 16) ME. The registered user D, E, F, G, and H may be connected through no less than one other registered user may be deemed to be separated by two degree of separation from verified registered user (e.g., the verified registered user 4110 of FIG. 41A-B, the verified registered user 4110 of FIG. 16) ME. The registered user I, J, K, and L may be connected through no less than N−1 other registered user may be deemed to be separated by N degree of separation from verified registered user (e.g., the verified registered user 4110 of FIG. 41A-B, the verified registered user 4110 of FIG. 16) ME. The registered user M, N, O, P, Q, R S, T and U may be all registered user.

Figure 27:
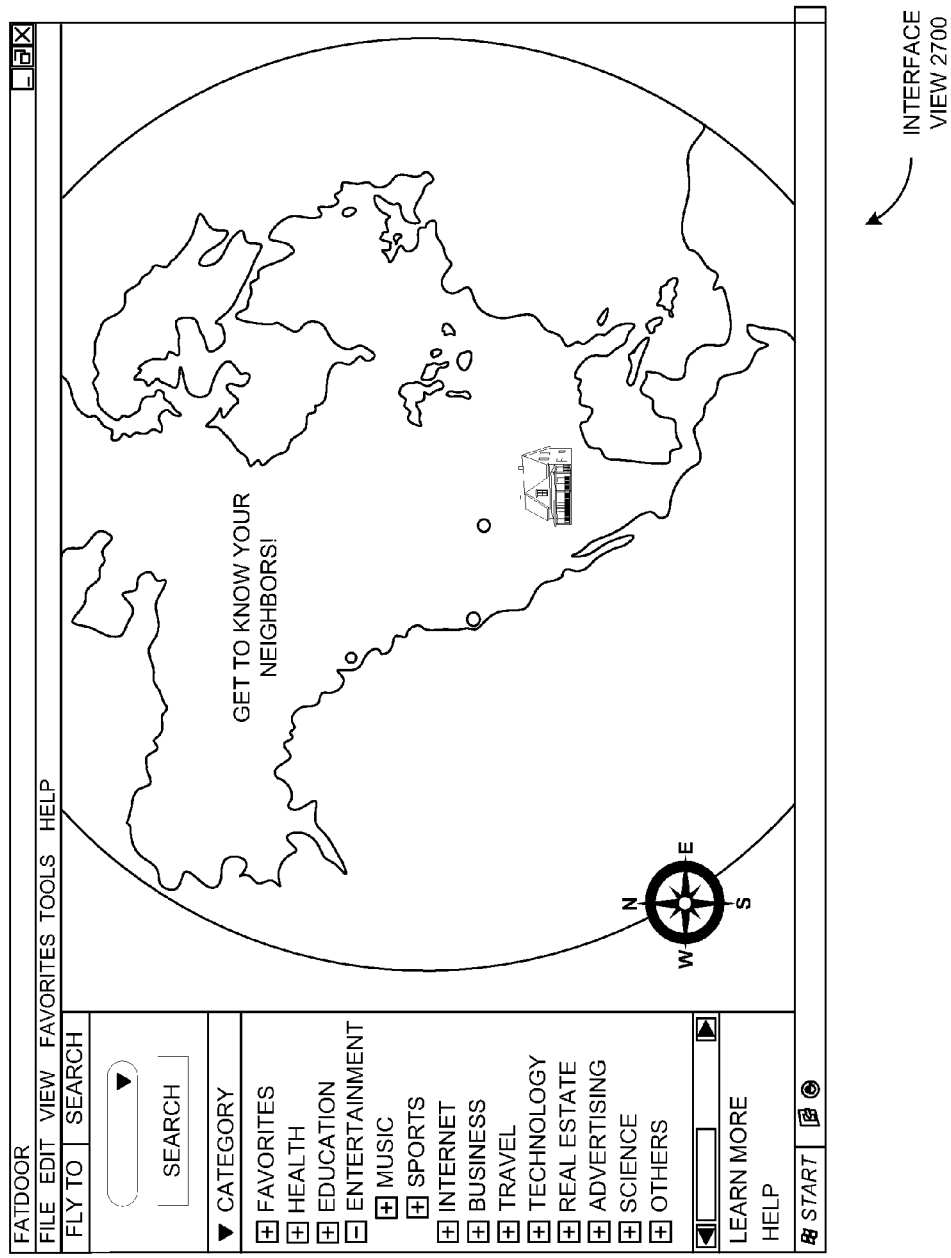
FIG. 27 is a user interface view showing a map, according to one embodiment.

FIG. 27 is a user interface view 2700 showing a map, according to one embodiment. Particularly FIG. 27 illustrates a satellite photo of a physical world. The registered user of the global neighborhood environment 1800 (e.g., the privacy server 2900 of FIG. 29) may use this for exploring the geographical location (e.g., the geographical location 4004 of FIG. 40A) of the neighbors (e.g., the neighbor 2920 of FIG. 29). The registered user (e.g., the verified registered user 4110 of FIG. 41A-B, the verified registered user 4110 of FIG. 16) may navigate, zoom, explore and quickly find particular desired geographical locations of the desired neighbors (e.g., the neighbor 2920 of FIG. 29). This may help the registered user to read the map and/or plot the route of the neighbors (e.g., the neighbor 2920 of FIG. 29) on the world map.

Figure 28A:
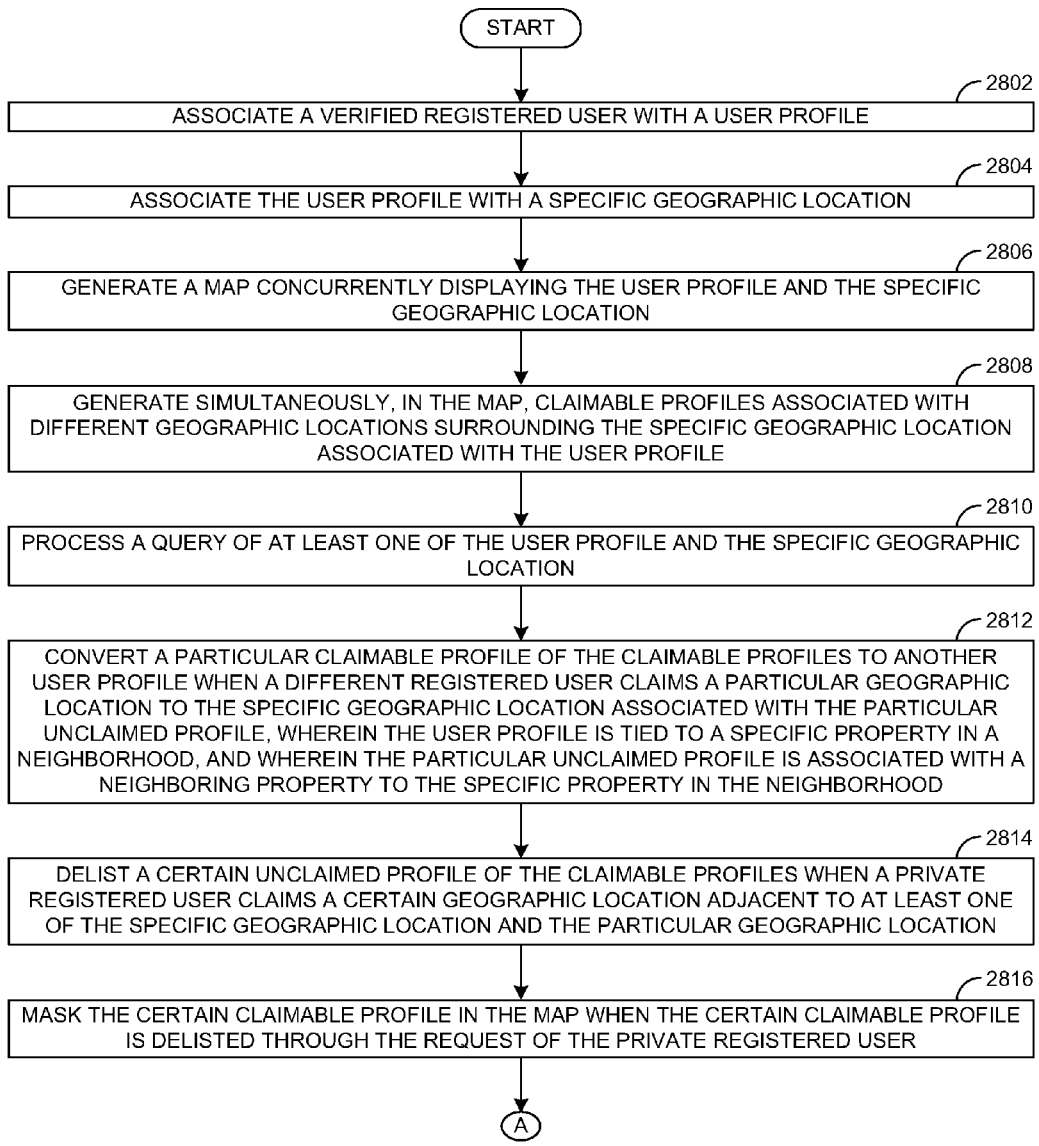
FIG. 28A is a process flow chart of searching a map based community and neighborhood contribution, according to one embodiment.

FIG. 28A is a process flow of searching map based community and neighborhood contribution, according to one embodiment. In operation 2802, a verified registered user (e.g., a verified registered user 4110 of FIG. 41A-13B, a verified registered user 4110 of FIG. 16) may be associated with a user profile (e.g., a user profile 29200 of FIG. 40A). In operation 2804, the user profile (e.g., the user profile 29200 of FIG. 40A) may be associated with a specific geographic location (e.g., a geographic location 4004 of FIG. 40A).

Figure 40A:
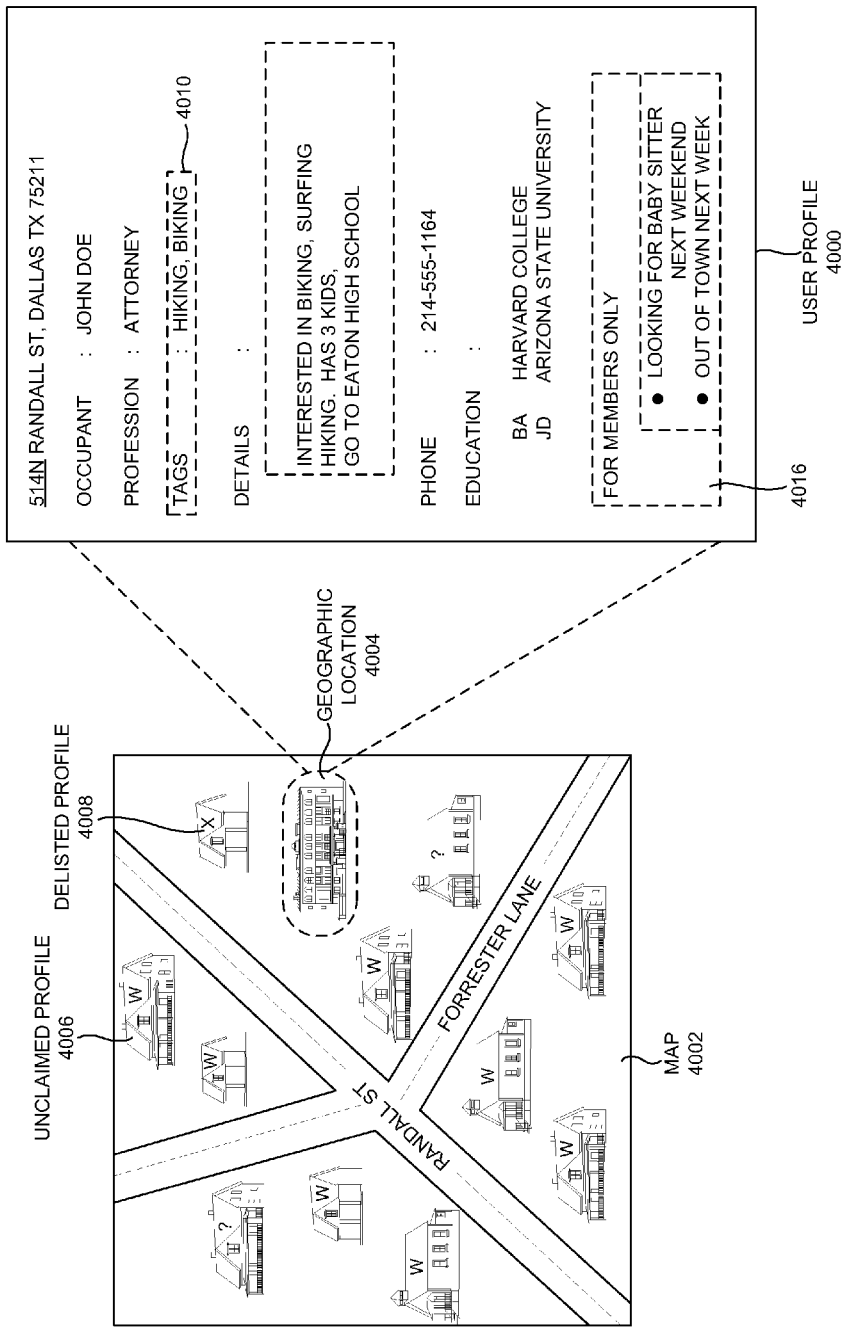
FIG. 40A is a user interface view of mapping user profile of the geographical location, according to one embodiment.

In operation 2806, a map (e.g., a map 4002 of FIG. 40A-12B, a map 1400 of FIG. 14, a map 1600 of FIG. 16, a map 1701 of FIG. 17) may be generated concurrently displaying the user profile (e.g., the user profile 29200 of FIG. 40A) and the specific geographic location (e.g., the geographic location 4004 of FIG. 40A). In operation, 2808, in the map, claimable profiles (e.g., a claimable profile 4006 of FIG. 40A-B, a claimable profile 4102 of FIG. 41A, a claimable profile 1704 of FIG. 17) associated with different geographic locations may be simultaneously generated surrounding the specific geographic location (e.g., the geographic location 4004 of FIG. 40A) associated with the user profile (e.g., the user profile 29200 of FIG. 40A).

In operation 2810, a query of at least one of the user profile (e.g., the user profile 29200 of FIG. 40A) and the specific geographic location (e.g., the geographic location 4004 of FIG. 40A) may be processed. In operation 2812, a particular claimable profile of the claimable profiles (e.g., the claimable profile 4006 of FIG. 40A-B, the claimable profile 4102 of FIG. 41A, the claimable profile 1704 of FIG. 17) may be converted to another user profile (e.g., the user profile 29200 of FIG. 40A) when a different registered user claims a particular geographic location to the specific geographic location (e.g., the geographic location 4004 of FIG. 40A) associated with the particular claimable profile (e.g., the claimable profile 4006 of FIG. 40A-B, the claimable profile 4102 of FIG. 41A, the claimable profile 1704 of FIG. 17), wherein the user profile (e.g., the user profile 29200 of FIG. 40A) may be tied to a specific property in a neighborhood (e.g., a neighborhood 2902A-2902N of FIG. 29), and wherein the particular claimable profile (e.g., the claimable profile 4006 of FIG. 40A-12B, the claimable profile 4102 of FIG. 41A, the claimable profile 1704 of FIG. 17) may be associated with a neighboring property to the specific property in the neighborhood (e.g., the neighborhood 2920A-2920N of FIG. 29).

In operation 2814, a certain claimable profile (e.g., the claimable profile 4006 of FIG. 40A-12B, the claimable profile 4102 of FIG. 41A, the claimable profile 1704 of FIG. 17) of the claimable profiles (e.g., the claimable profile 4006 of FIG. 40A-B, the claimable profile 4102 of FIG. 41A, the claimable profile 1704 of FIG. 17) may be delisted when a private registered user claims a certain geographic location (e.g., the geographic location 4004 of FIG. 40A) adjacent to at least one of the specific geographic location and the particular geographic location (e.g., the geographic location 4004 of FIG. 40A).

In operation 2816, the certain claimable profile (e.g., the claimable profile 4006 of FIG. 40A-B, the claimable profile 4102 of FIG. 41A, the claimable profile 1704 of FIG. 17) in the map (e.g., the map 4002 of FIG. 40A-B, the map 1400 of FIG. 14, the map 1600 of FIG. 16, the map 1701 of FIG. 17) when the certain claimable profile may be delisted and/or be masked through the request of the private registered user.

Figure 28B:
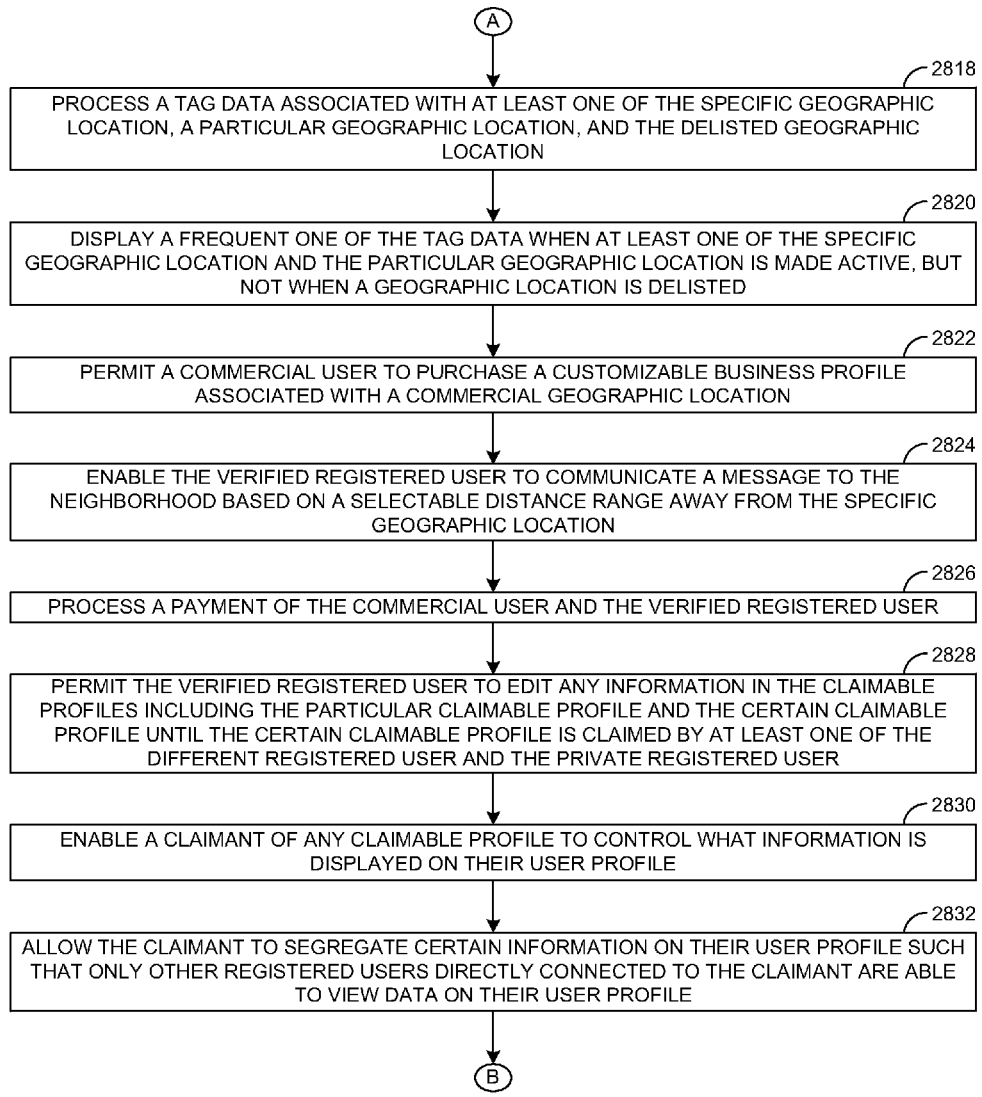
FIG. 28B is a continuation of process flow of FIG. 28A showing additional processes, according to one embodiment.

FIG. 28B is a continuation of process flow of FIG. 28A showing additional processes, according to one embodiment. In operation 2818, a tag data associated with at least one of the specific geographic location, the particular geographic location (e.g., the geographic location 4004 of FIG. 40A), and the delisted geographic location may be processed. In operation 2820, a frequent one of the tag data may be displayed when at least one of the specific geographic location and the particular geographic location (e.g., the geographic location 4004 of FIG. 40A) may be made active, but not when the geographic location (e.g., the geographic location 4004 of FIG. 40A) may be delisted.

In operation 2822, a commercial user (e.g., a commercial user 4100 of FIG. 41A-B) may be permitted to purchase a customizable business profile (e.g., a customizable business profile 4104 of FIG. 41B) associated with a commercial geographic location. In operation 2824, the verified registered user (e.g., the verified registered user 4110 of FIG. 41A-B, the verified registered user 4110 of FIG. 16) to communicate a message to the neighborhood (e.g., the neighborhood 2902A-2902N of FIG. 29) may be enabled based on a selectable distance range away from the specific geographic location.

In operation 2826, a payment of the commercial user (e.g., the commercial user 4100 of FIG. 41A-B) and the verified registered user (e.g., the verified registered user 4110 of FIG. 41A-B, the verified registered user 4110 of FIG. 16) may be processed. In operation 2828, the verified registered user (e.g., the verified registered user 4110 of FIG. 41A-B, the verified registered user 4110 of FIG. 16) may be permitted to edit any information in the claimable profiles (e.g., the claimable profile 4006 of FIG. 40A-B, the claimable profile 4102 of FIG. 41A, the claimable profile 1704 of FIG. 17) including the particular claimable profile and the certain claimable profile until the certain claimable profile may be claimed by at least one of the different registered user and the private registered user.

In operation 2830, a claimant of any claimable profile (e.g., the claimable profile 4006 of FIG. 40A-B, the claimable profile 4102 of FIG. 41A, the claimable profile 1704 of FIG. 17) may be enabled to control what information is displayed on their user profile (e.g., the user profile 29200 of FIG. 40A). In operation 2832, the claimant to segregate certain information on their user profile (e.g., the user profile 29200 of FIG. 40A) may be allowed such that only other registered users directly connected to the claimant are able to view data on their user profile (e.g., the user profile 29200 of FIG. 40A).

Figure 28C:
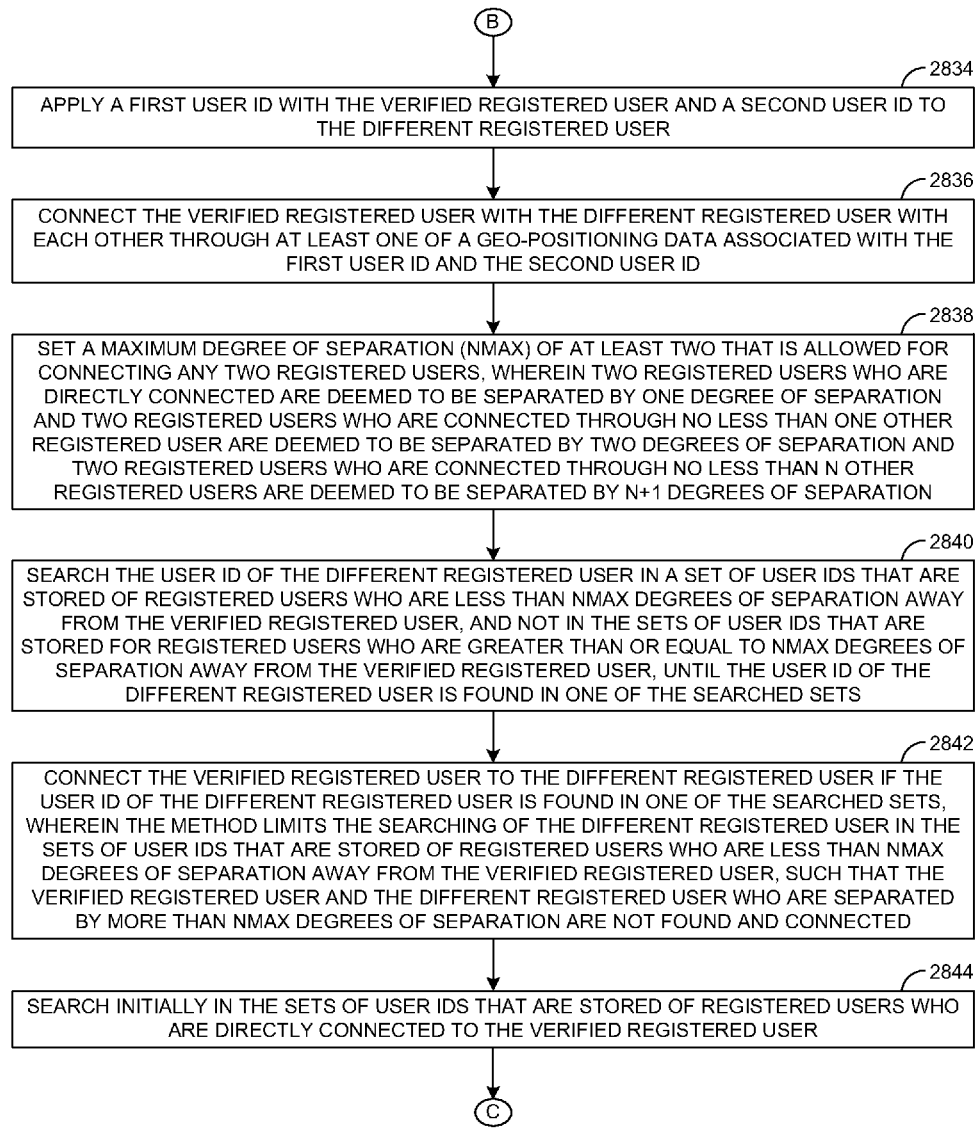
FIG. 28C is a continuation of process flow of FIG. 28B showing additional processes, according to one embodiment.

FIG. 28C is a continuation of process flow of FIG. 28B showing additional processes, according to one embodiment. In operation 2834, a first user ID with the verified registered user (e.g., the verified registered user 4110 of FIG. 41A-B, the verified registered user 4110 of FIG. 16) and a second user ID to the different registered user may be applied. In operation 2836, the verified registered user (e.g., the verified registered user 4110 of FIG. 41A-B, the verified registered user 4110 of FIG. 16) with the different registered user with each other may be connected through at least one of associated with the first user ID and the second user ID.

In operation 2838, a maximum degree of separation (Nmax) of at least two may be set that is allowed for connecting any two registered users, wherein two registered users who are directly connected may be deemed to be separated by one degree of separation and two registered users who are connected through no less than one other registered user may be deemed to be separated by two degrees of separation and two registered users who may be connected through no less than N other registered users are deemed to be separated by N+1 degrees of separation. In operation 2840, the user ID of the different registered user may be searched in a set of user IDs that are stored of registered users who are less than Nmax degrees of separation away from the verified registered user (e.g., the verified registered user 4110 of FIG. 41A-B, the verified registered user 4110 of FIG. 16), and not in the sets of user IDs that are stored for registered users who may be greater than or equal to Nmax degrees of separation away from the verified registered user (e.g., the verified registered user 4110 of FIG. 41A-B, the verified registered user 4110 of FIG. 16), until the user ID of the different registered user may be found in one of the searched sets.

In operation 2842, the verified registered user (e.g., the verified registered user 4110 of FIG. 41A-B, the verified registered user 4110 of FIG. 16) may be connected to the different registered user if the user ID of the different registered user may be found in one of the searched sets, wherein the method limits the searching of the different registered user in the sets of user IDs that may be stored of registered users who may be less than Nmax degrees of separation away from the verified registered user (e.g., the verified registered user 4110 of FIG. 41A-B, the verified registered user 4110 of FIG. 16), such that the verified registered user (e.g., the verified registered user 4110 of FIG. 41A-B, the verified registered user 4110 of FIG. 16) and the different registered user who may be separated by more than Nmax degrees of separation are not found and connected. In operation 2844, initially in the sets of user IDs that are stored of registered users who may be directly connected to the verified registered user (e.g., the verified registered user 4110 of FIG. 41A-B, the verified registered user 4110 of FIG. 16) may be initially searched.

Figure 28D:
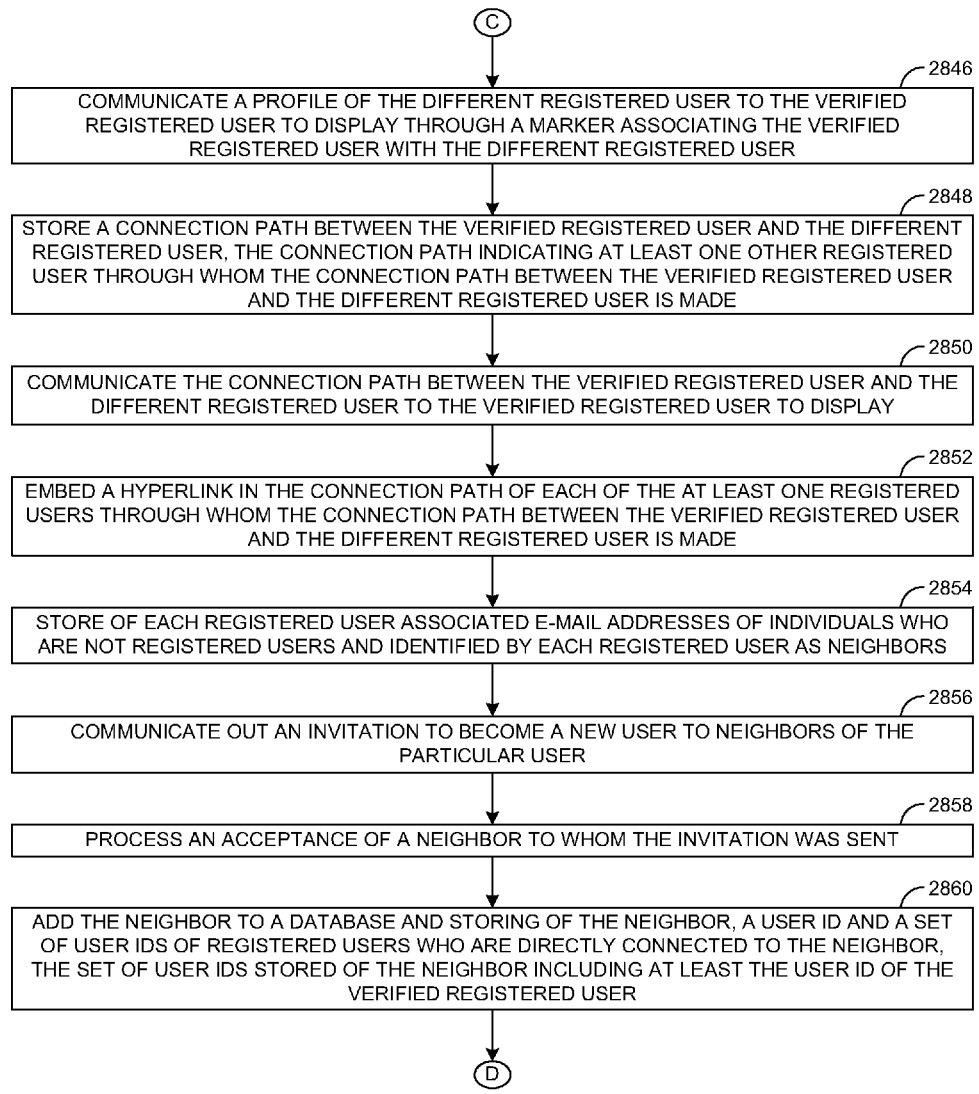
FIG. 28D is a continuation of process flow of FIG. 28C showing additional processes, according to one embodiment.

FIG. 28D is a continuation of process flow of FIG. 28C showing additional processes, according to one embodiment. In operation 2846, a profile of the different registered user to the verified registered user (e.g., the verified registered user 4110 of FIG. 41A-B, the verified registered user 4110 of FIG. 16) to display may be communicated through a marker associating the verified registered user (e.g., the verified registered user 4110 of FIG. 41A-B, the verified registered user 4110 of FIG. 16) with the different registered user.

In operation 2848, a connection path between the verified registered user (e.g., the verified registered user 4110 of FIG. 41A-B, the verified registered user 4110 of FIG. 16) and the different registered user, the connection path indicating at least one other registered user may be stored through whom the connection path between the verified registered user (e.g., the verified registered user 4110 of FIG. 41A-B, the verified registered user 4110 of FIG. 16) and the different registered user may be made.

In operation 2850, the connection path between the verified registered user (e.g., the verified registered user 4110 of FIG. 41A-B, the verified registered user 4110 of FIG. 16) and the different registered user to the verified registered user (e.g., the verified registered user 4110 of FIG. 41A-B, the verified registered user 4110 of FIG. 16) may be communicated to display.

In operation 2852, a hyperlink in the connection path of each of the at least one registered users may be embedded through whom the connection path between the verified registered user (e.g., the verified registered user 4110 of FIG. 41A-B, the verified registered user 4110 of FIG. 16) and the different registered user may be made. In operation 2854, each registered user associated e-mail addresses of individuals who are not registered users may be stored and identified by each registered user as neighbors (e.g., a neighbor 2920 of FIG. 29).

In operation 2856, an invitation may be communicated to become a new user (e.g., a user 2916 of FIG. 29) to neighbors (e.g., the neighbor 2920 of FIG. 29) of the particular user. In operation 2858, an acceptance of the neighbor (e.g., the neighbor 2920 of FIG. 29) to whom the invitation was sent may be processed. In operation 2860, the neighbor (e.g., the neighbor 2920 of FIG. 29) to a database and storing of the neighbor (e.g., the neighbor 2920 of FIG. 29), a user ID and the set of user IDs of registered users may be added who are directly connected to the neighbor (e.g., the neighbor 2920 of FIG. 29), the set of user IDs stored of the neighbor (e.g., the neighbor 2920 of FIG. 29) including at least the user ID of the verified registered user (e.g., the verified registered user 4110 of FIG. 41A-B, the verified registered user 4110 of FIG. 16).

Figure 28E:
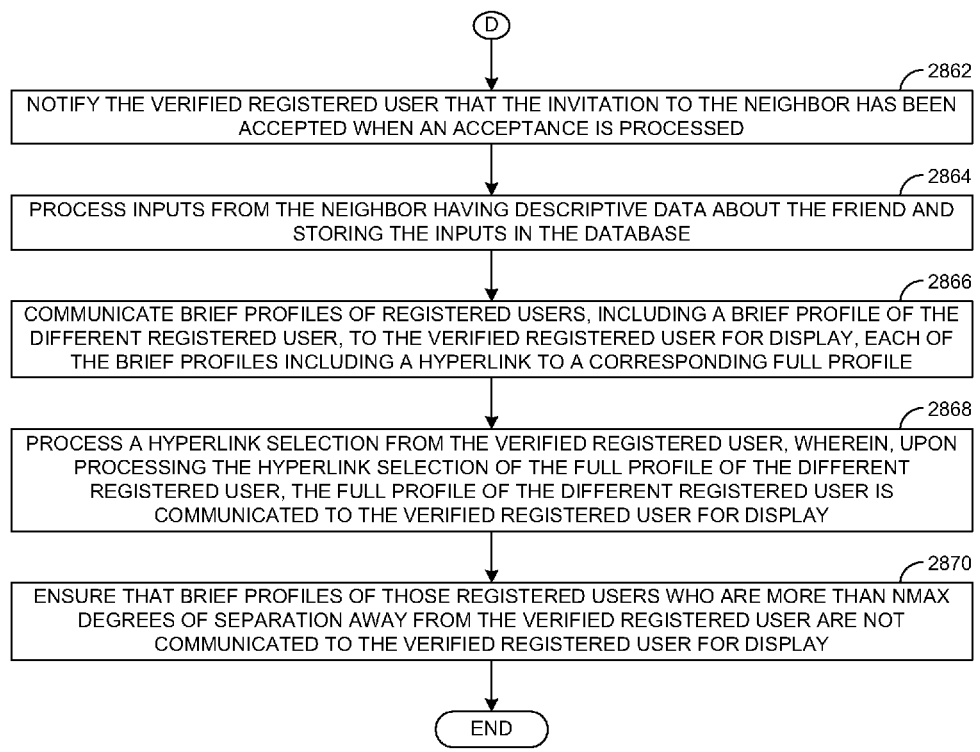
FIG. 28E is a continuation of process flow of FIG. 28D showing additional processes, according to one embodiment.

FIG. 28E is a continuation of process flow of FIG. 28D showing additional processes, according to one embodiment.

In operation 2862, the verified registered user (e.g., the verified registered user 4110 of FIG. 41A-B, the verified registered user 4110 of FIG. 16) that the invitation to the neighbor (e.g., the neighbor 2920 of FIG. 29) has been accepted may be notified when the acceptance is processed.

In operation 2864, inputs from the neighbor (e.g., the neighbor 2920 of FIG. 29) having descriptive data about the friend and storing the inputs in the database may be processed. In operation 2866, brief profiles of registered users, including a brief profile of the different registered user may be communicated, to the verified registered user (e.g., the verified registered user 4110 of FIG. 41A-B, the verified registered user 4110 of FIG. 16) for display, each of the brief profiles including the hyperlink to a corresponding full profile.

In operation 2868, the hyperlink selection from the verified registered user (e.g., the verified registered user 4110 of FIG. 41A-B, the verified registered user 4110 of FIG. 16) may be processed, wherein, upon processing the hyperlink selection of the full profile of the different registered user, the full profile of the different registered user is communicated to the verified registered user (e.g., the verified registered user 4110 of FIG. 41A-B, the verified registered user 4110 of FIG. 16) for display.

In operation 2870, brief profiles of those registered users who may be more than Nmax degrees of separation away from the verified registered user (e.g., the verified registered user 4110 of FIG. 41A-B, the verified registered user 4110 of FIG. 16) may not communicated to the verified registered user (e.g., the verified registered user 4110 of FIG. 41A-B, the verified registered user 4110 of FIG. 16) may be ensured for display.

In one embodiment, a neighborhood communication system 2950 2950 is described. This embodiment includes a privacy server 2900 to apply an address verification algorithm (e.g., using verify module 3006 of FIG. 30) associated with each user of the online community (e.g., as shown in the social community view 3650 of FIG. 36 formed through the neighborhood network module as described in FIG. 38) to verify that each user lives at a residence associated with a claimable residential address 4247 (e.g., using sub-modules of the claimable module 2910 as described in FIG. 31) of an online community (e.g., as shown in the social community view 3650 of FIG. 36 formed through the neighborhood network module as described in FIG. 38) formed through a social community module 2906 of the privacy server 2900 using a processor 3902 and a memory (e.g., as described in FIG. 39).

Figure 31:
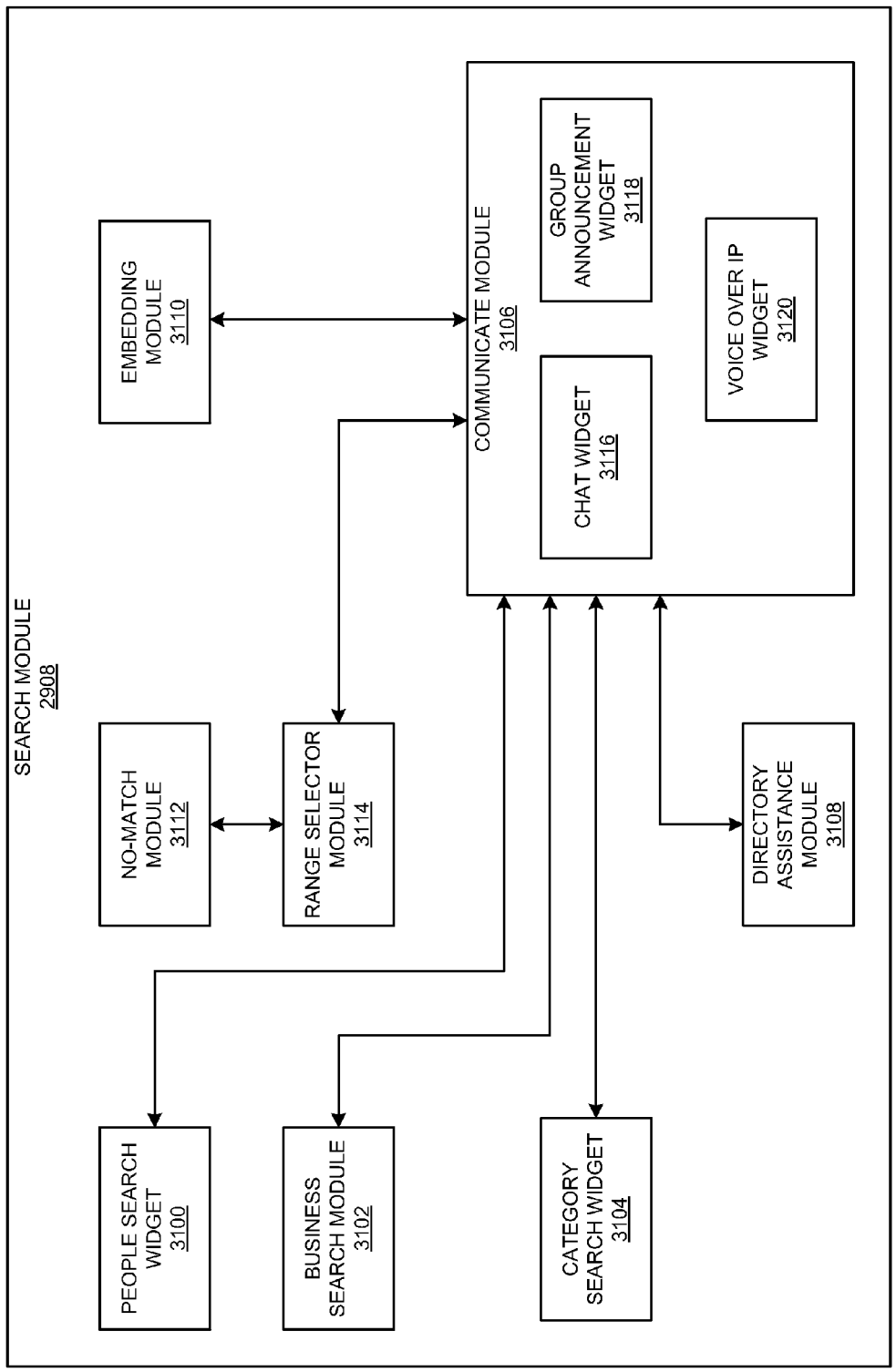
FIG. 31 is an exploded view of a search module of FIG. 29, according to one embodiment.

A network 2904, and a mapping server 2926 (e.g., providing global map data) communicatively coupled with the privacy server 2900 through the network 2904 generate a latitudinal data and a longitudinal data associated with each claimable residential address 4247 (e.g., using sub-modules of the claimable module 2910 as described in FIG. 31) of the online community (e.g., as shown in the social community view 3650 of FIG. 36 formed through the neighborhood network module as described in FIG. 38) associated with each user of the online community (e.g., as shown in the social community view 3650 of FIG. 36 formed through the neighborhood network module as described in FIG. 38) in this embodiment.

The privacy server 2900 automatically determines a set of access privileges in the online community (e.g., as shown in the social community view 3650 of FIG. 31 formed through the neighborhood network module as described in FIG. 38) associated with each user of the online community (e.g., as shown in the social community view 3650 of FIG. 36 formed through the neighborhood network module as described in FIG. 38) by constraining access in the online community (e.g., as shown in the social community view 3650 of FIG. 36 formed through the neighborhood network module as described in FIG. 38) based on a neighborhood boundary determined using a Bezier curve algorithm 3040 of the privacy server 2900 in this embodiment.

The privacy server 2900 (e.g., a hardware device of a global neighborhood environment 1800) may transform the claimable residential address 4247 (e.g., using sub-modules of the claimable module 2910 as described in FIG. 31) into a claimed address upon an occurrence of an event. The privacy server 2900 may instantiate the event when a particular user 2916 is associated with the claimable residential address 4247 (e.g., using sub-modules of the claimable module 2910 as described in FIG. 31) based on a verification of the particular user 2916 as living at a particular residential address (e.g., associated with the residence 2918 of FIG. 29) associated with the claimable residential address 4247 (e.g., using sub-modules of the claimable module 2910 as described in FIG. 31) using the privacy server 2900. The privacy server 2900 may constrain the particular user 2916 to communicate through the online community (e.g., as shown in the social community view 3650 of FIG. 36 formed through the neighborhood network module as described in FIG. 38) only with a set of neighbors 2928 (e.g., such as the particular neighbor 2920 of FIG. 29 forming an occupant data) having verified addresses using the privacy server 2900. The privacy server 2900 may define the set of neighbors 2928 (e.g., such as the particular neighbor 2920 of FIG. 29) as other users of the online community (e.g., as shown in the social community view 3650 of FIG. 36 formed through the neighborhood network module as described in FIG. 38) that have each verified their addresses in the online community (e.g., as shown in the social community view 3650 of FIG. 36 formed through the neighborhood network module as described in FIG. 38) using the privacy server 2900 and/or which have each claimed residential addresses that are in a threshold radial distance 4219 from the claimed address of the particular user 2916.

The privacy server 2900 may constrain the threshold radial distance 4219 to be less than a distance of the neighborhood boundary using the Bezier curve algorithm 3040. The privacy server 2900 may permit the neighborhood boundary to take on a variety of shapes based on an associated geographic connotation, a historical connotation, a political connotation, and/or a cultural connotation of neighborhood boundaries. The privacy server 2900 may apply a database of constraints (e.g., the databases of FIG. 30 including the places database 3018) associated with neighborhood boundaries that are imposed on a map view of the online community (e.g., as shown in the social community view 3650 of FIG. 36 formed through the neighborhood network module as described in FIG. 38) when permitting the neighborhood boundary to take on the variety of shapes.

Figure 36:
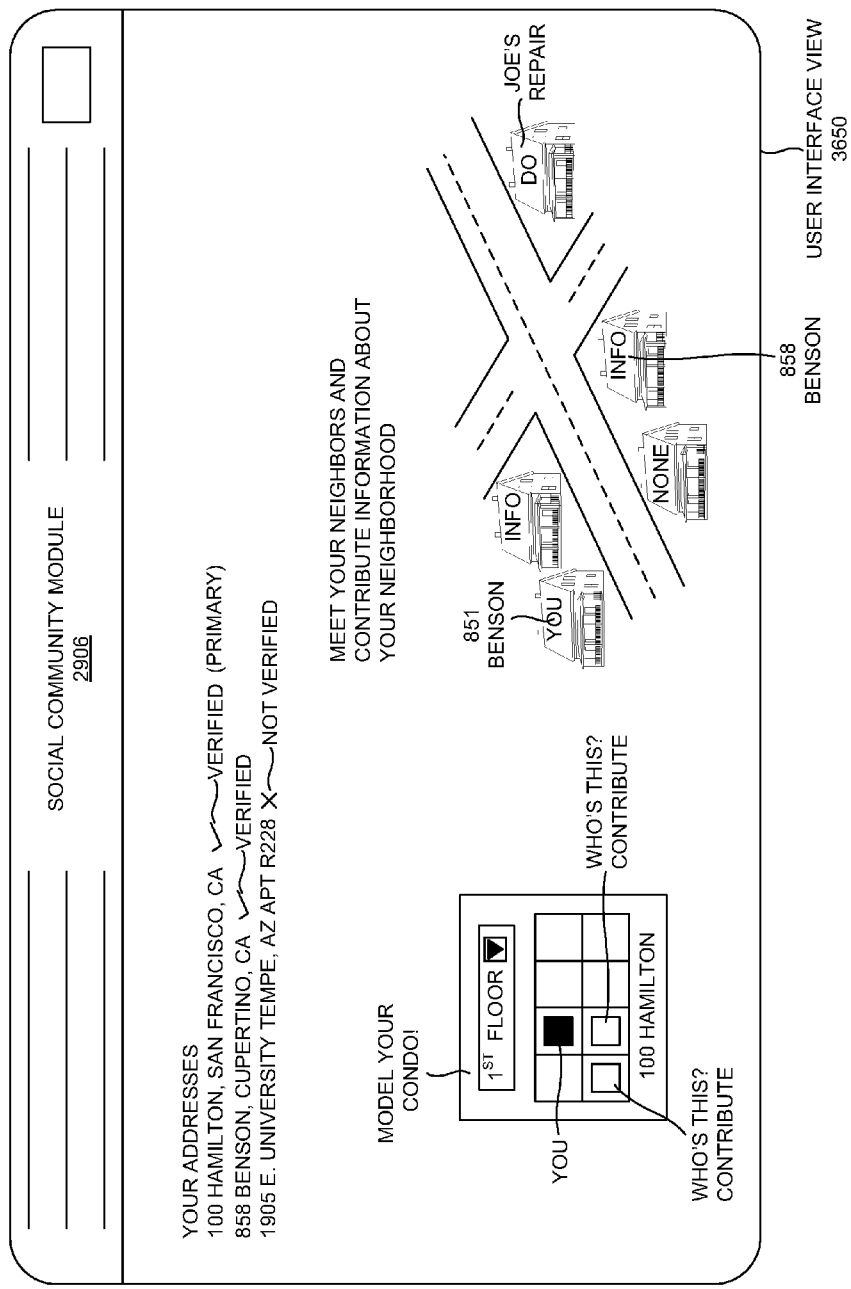
FIG. 36 is a social community view of a social community module, according to one embodiment.
Figure 38:
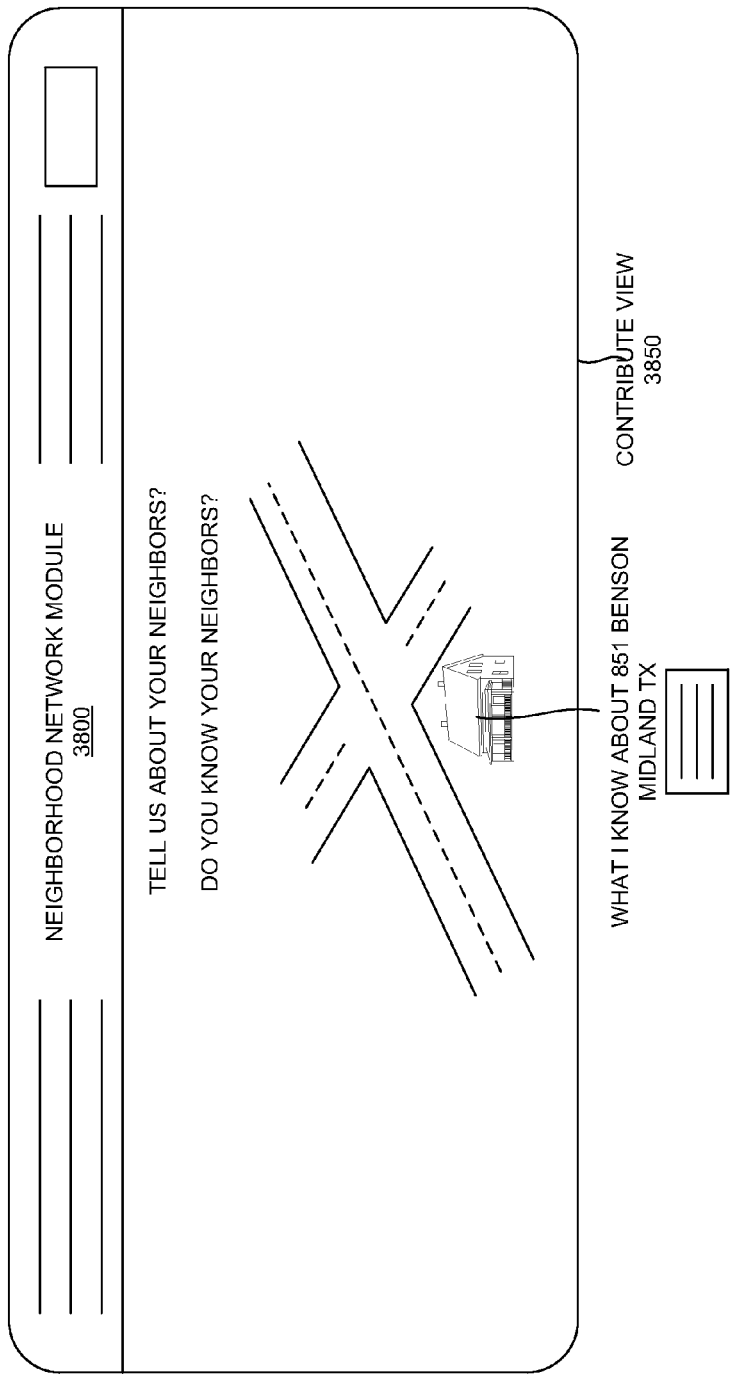
FIG. 38 is a contribute view of a neighborhood network module, according to one embodiment.

The privacy server 2900 may generate a user-generated boundary in a form of a polygon describing geo spatial boundaries defining the particular neighborhood when a first user of a particular neighborhood that verifies a first residential address of the particular neighborhood using the privacy server 2900 prior to other users in that particular neighborhood verifying their addresses in that particular neighborhood places a set of points defining the particular neighborhood using a set of drawing tools in the map view of the online community (e.g., as shown in the social community view 3650 of FIG. 36 formed through the neighborhood network module as described in FIG. 38). The privacy server 2900 may optionally extend the threshold radial distance 4219 to an adjacent boundary of an adjacent neighborhood based a request of the particular user 2916. The privacy server 2900 may generate a separate login to the online community (e.g., as shown in the social community view 3650 of FIG. 36 formed through the neighborhood network module as described in FIG. 38) designed to be usable by a police department, a municipal agency, a neighborhood association, and/or a neighborhood leader associated with the particular neighborhood.

The separate login may permit the police department, the municipal agency, the neighborhood association, and/or the neighborhood leader to: (1) invite residents of the particular neighborhood themselves (e.g., see the user interface view of FIG. 22) using the privacy server 2900 using a self-authenticating access code that permits new users that enter the self-authenticating access code in the online community (e.g., as shown in the social community view 3650 of FIG. 36 formed through the neighborhood network module as described in FIG. 38) to automatically join the particular neighborhood as verified users (e.g., the verified user 4110 of FIG. 41A), (2) generate a virtual neighborhood watch group and/or an emergency preparedness group restricted to users verified in the particular neighborhood using the privacy server 2900, (3) conduct high value crime and/or safety related discussions from local police and/or fire officials that is restricted to users verified in the particular neighborhood using the privacy server 2900, (4) broadcast information across the particular neighborhood, and (5) receive and/or track neighborhood level membership and/or activity to identify leaders from the restricted group of users verified in the particular neighborhood using the privacy server 2900.

The privacy server 2900 may permit each of the restricted group of users verified in the particular neighborhood using the privacy server 2900 to: (1) share information about a suspicious activity that is likely to affect several neighborhoods, (2) explain about a lost pet that might have wandered into an adjoining neighborhood, (3) rally support from neighbors 2928 (e.g., such as the particular neighbor 2920 of FIG. 29) from multiple neighborhoods to address civic issues, (4) spread information about events comprising a local theater production and/or a neighborhood garage sale, and/or (5) solicit advice and/or recommendations from the restricted group of users verified in the particular neighborhood and/or optionally in the adjacent neighborhood.

The privacy server 2900 may flag a neighborhood feed from the particular neighborhood and/or optionally from the adjacent neighborhood as being inappropriate. The privacy server 2900 may suspend users that repeatedly communicate self-promotional messages that are inappropriate as voted based on a sensibility of any one of the verified users (e.g., the verified user 4110 of FIG. 41A) of the particular neighborhood and/or optionally from the adjacent neighborhood. The privacy server 2900 may personalize which nearby neighborhoods that verified users (e.g., the verified user 4110 of FIG. 41A) are able to communicate through based on a request of the particular user 2916. The privacy server 2900 may permit the neighborhood leader to communicate privately with leaders of an adjoining neighborhood to plan and/or organize on behalf of an entire constituency of verified users (e.g., a plurality of the verified user 4110 of FIG. 41A) of the particular neighborhood associated with the neighborhood leader.

The privacy server 2900 may filter feeds to only display messages from the particular neighborhood associated with each verified user. The privacy server 2900 may restrict posts only in the particular neighborhood to verified users (e.g., the verified user 4110 of FIG. 41A) having verified addresses within the neighborhood boundary (e.g., the claim view 1550 of FIG. 15 describes a claiming process of an address). The address verification algorithm (e.g., using verify module 3006 of FIG. 30) of the privacy server 2900 utilizes a set of verification methods to perform verification of the particular user 2916 through any of a: (1) a postcard verification method through which the privacy server 2900 generates a physical postcard that is postal mailed to addresses of requesting users in the particular neighborhood and/or having a unique alphanumeric sequence in a form of an access code printed thereon which authenticates users that enter the access code to view and/or search privileges in the particular neighborhood of the online community (e.g., as shown in the social community view 3650 of FIG. 36 formed through the neighborhood network module as described in FIG. 38), (2) a credit card verification method through which the privacy server 2900 verifies the claimable residential address 4247 (e.g., using sub-modules of the claimable module 2910 as described in FIG. 31) when at least one a credit card billing address and/or a debit card billing address is matched with an inputted address through an authentication services provider, (3) a privately-published access code method through which the privacy server 2900 communicates to user profiles of the police department, the municipal agency, the neighborhood association, and/or the neighborhood leader an instant access code that is printable at town hall meetings and/or gatherings sponsored by any one of the police department, the municipal agency, the neighborhood association, and/or the neighborhood leader, (4) a neighbor vouching method through which the privacy server 2900 authenticates new users when existing verified users (e.g., the verified user 4110 of FIG. 41A) agree to a candidacy of new users in the particular neighborhood, (5) a phone verification method through which the privacy server 2900 authenticates new users whose phone number is matched with an inputted phone number through the authentication services provider, and (6) a social security verification method through which the privacy server 2900 authenticates new users whose social security number is matched with an inputted social security number through the authentication services provider.

The privacy server 2900 may initially set the particular neighborhood to a pilot phase status in which the online community (e.g., as shown in the social community view 3650 of FIG. 36 formed through the neighborhood network module as described in FIG. 38) of the particular neighborhood is provisionally defined until a minimum number of users verify their residential addresses in the particular neighborhood through the privacy server 2900. The privacy server 2900 may automatically delete profiles of users that remain unverified after a threshold window of time. The neighborhood communication system 2950 2950 may be designed to create private websites to facilitate communication among neighbors 2928 (e.g., such as the particular neighbor 2920 of FIG. 29) and/or build stronger neighborhoods.

In another embodiment a method of a neighborhood communication system 2950 2950 is described. The method includes applying an address verification algorithm (e.g., using verify module 3006 of FIG. 30) associated with each user of the online community (e.g., as shown in the social community view 3650 of FIG. 36 formed through the neighborhood network module as described in FIG. 38) using a privacy server 2900, verifying that each user lives at a residence associated with a claimable residential address 4247 (e.g., using sub-modules of the claimable module 2910 as described in FIG. 31) of an online community (e.g., as shown in the social community view 3650 of FIG. 36 formed through the neighborhood network module as described in FIG. 38) formed through a social community module 2906 of the privacy server 2900 using a processor 3902 and a memory (e.g., as described in FIG. 39), generating a latitudinal data and a longitudinal data associated with each claimable residential address 4247 (e.g., using sub-modules of the claimable module 2910 as described in FIG. 31) of the online community (e.g., as shown in the social community view 3650 of FIG. 36 formed through the neighborhood network module as described in FIG. 38) associated with each user of the online community (e.g., as shown in the social community view 3650 of FIG. 36 formed through the neighborhood network module as described in FIG. 38), and determining a set of access privileges in the online community (e.g., as shown in the social community view 3650 of FIG. 36 formed through the neighborhood network module as described in FIG. 38) associated with each user of the online community (e.g., as shown in the social community view 3650 of FIG. 36 formed through the neighborhood network module as described in FIG. 38) by constraining access in the online community (e.g., as shown in the social community view 3650 of FIG. 36 formed through the neighborhood network module as described in FIG. 38) based on a neighborhood boundary determined using a Bezier curve algorithm 3040 of the privacy server 2900.

The method may transform the claimable residential address 4247 (e.g., using sub-modules of the claimable module 2910 as described in FIG. 31) into a claimed address upon an occurrence of an event. The method may instantiate the event when a particular user 2916 is associated with the claimable residential address 4247 (e.g., using sub-modules of the claimable module 2910 as described in FIG. 31) based on a verification of the particular user 2916 as living at a particular residential address (e.g., associated with the residence 2918 of FIG. 29) associated with the claimable residential address 4247 (e.g., using sub-modules of the claimable module 2910 as described in FIG. 31) using the privacy server 2900.

The method may constrain the particular user 2916 to communicate through the online community (e.g., as shown in the social community view 3650 of FIG. 36 formed through the neighborhood network module as described in FIG. 38) only with a set of neighbors 2928 (e.g., such as the particular neighbor 2920 of FIG. 29) having verified addresses using the privacy server 2900. The method may define the set of neighbors 2928 (e.g., such as the particular neighbor 2920 of FIG. 29) as other users of the online community (e.g., as shown in the social community view 3650 of FIG. 36 formed through the neighborhood network module as described in FIG. 38) that have each verified their addresses in the online community (e.g., as shown in the social community view 3650 of FIG. 36 formed through the neighborhood network module as described in FIG. 38) using the privacy server 2900 and/or which have each claimed residential addresses that are in a threshold radial distance 4219 from the claimed address of the particular user 2916.

The method may constrain the threshold radial distance 4219 to be less than a distance of the neighborhood boundary using the Bezier curve algorithm 3040.

In addition, the method may define a neighborhood boundary to take on a variety of shapes based on an associated geographic connotation, a historical connotation, a political connotation, and/or a cultural connotation of neighborhood boundaries. The method may apply a database of constraints (e.g., the databases of FIG. 30 including the places database 3018) associated with neighborhood boundaries that are imposed on a map view of the online community (e.g., as shown in the social community view 3650 of FIG. 36 formed through the neighborhood network module as described in FIG. 38) when permitting the neighborhood boundary to take on the variety of shapes.

The method may generate a user-generated boundary in a form of a polygon describing geospatial boundaries defining the particular neighborhood when a first user of a particular neighborhood that verifies a first residential address of the particular neighborhood using the privacy server 2900 prior to other users in that particular neighborhood verifying their addresses in that particular neighborhood places a set of points defining the particular neighborhood using a set of drawing tools in the map view of the online community (e.g., as shown in the social community view 3650 of FIG. 36 formed through the neighborhood network module as described in FIG. 38). The method may optionally extend the threshold radial distance 4219 to an adjacent boundary of an adjacent neighborhood based a request of the particular user 2916.

The method may generate a separate login to the online community (e.g., as shown in the social community view 3650 of FIG. 36 formed through the neighborhood network module as described in FIG. 38) designed to be usable by a police department, a municipal agency, a neighborhood association, and/or a neighborhood leader associated with the particular neighborhood.

The method may permit the police department, the municipal agency, the neighborhood association, and/or the neighborhood leader to: (1) invite residents of the particular neighborhood themselves (e.g., see the user interface view of FIG. 22) using the privacy server 2900 using a self-authenticating access code that permits new users that enter the self-authenticating access code in the online community (e.g., as shown in the social community view 3650 of FIG. 36 formed through the neighborhood network module as described in FIG. 38) to automatically join the particular neighborhood as verified users (e.g., the verified user 4110 of FIG. 41A), (2) generate a virtual neighborhood watch group and/or an emergency preparedness group restricted to users verified in the particular neighborhood using the privacy server 2900, (3) conduct high value crime and/or safety related discussions from local police and/or fire officials that is restricted to users verified in the particular neighborhood using the privacy server 2900, (4) broadcast information across the particular neighborhood, and/or (5) receive and/or track neighborhood level membership and/or activity to identify leaders from the restricted group of users verified in the particular neighborhood using the privacy server 2900.

The method may permit each of the restricted group of users verified in the particular neighborhood using the privacy server 2900 to: (1) share information about a suspicious activity that is likely to affect several neighborhoods, (2) explain about a lost pet that might have wandered into an adjoining neighborhood, (3) rally support from neighbors 2928 (e.g., such as the particular neighbor 2920 of FIG. 29) from multiple neighborhoods to address civic issues, (4) spread information about events comprising a local theater production and/or a neighborhood garage sale, and/or (5) solicit advice and/or recommendations from the restricted group of users verified in the particular neighborhood and/or optionally in the adjacent neighborhood.

The method may flag a neighborhood feed from the particular neighborhood and/or optionally from the adjacent neighborhood as being inappropriate. The method may suspend users that repeatedly communicate self-promotional messages that are inappropriate as voted based on a sensibility of any one of the verified users (e.g., the verified user 4110 of FIG. 41A) of the particular neighborhood and/or optionally from the adjacent neighborhood. The method may personalize which nearby neighborhoods that verified users (e.g., the verified user 4110 of FIG. 41A) are able to communicate through based on a request of the particular user 2916. The method may permit the neighborhood leader to communicate privately with leaders of an adjoining neighborhood to plan and/or organize on behalf of an entire constituency of verified users of the particular neighborhood associated with the neighborhood leader.

The method may filter feeds to only display messages from the particular neighborhood associated with each verified user. The method may restrict posts only in the particular neighborhood to verified users (e.g., the verified user 4110 of FIG. 41A) having verified addresses within the neighborhood boundary (e.g., the claim view 1550 of FIG. 15 describes a claiming process of an address). The method may utilize a set of verification methods to perform verification of the particular user 2916 through: (1) generating a physical postcard that is postal mailed to addresses of requesting users in the particular neighborhood and/or having a unique alphanumeric sequence in a form of an access code printed thereon which authenticates users that enter the access code to view and/or search privileges in the particular neighborhood of the online community (e.g., as shown in the social community view 3650 of FIG. 36 formed through the neighborhood network module as described in FIG. 38). (2) verifying the claimable residential address 4247 (e.g., using sub-modules of the claimable module 2910 as described in FIG. 31) when at least one a credit card billing address and/or a debit card billing address is matched with an inputted address through an authentication services provider. (3) communicating to user profiles of the police department, the municipal agency, the neighborhood association, and/or the neighborhood leader an instant access code that is printable at town hall meetings and/or gatherings sponsored by any one of the police department, the municipal agency, the neighborhood association, and/or the neighborhood leader. (4) authenticating new users when existing verified users (e.g., the verified user 4110 of FIG. 41A) agree to a candidacy of new users in the particular neighborhood. (5) authenticating new users whose phone number is matched with an inputted phone number through the authentication services provider. (6) authenticating new users whose social security number is matched with an inputted social security number through the authentication services provider.

The method may initially set the particular neighborhood to a pilot phase status in which the online community (e.g., as shown in the social community view 3650 of FIG. 36 formed through the neighborhood network module as described in FIG. 38) of the particular neighborhood is provisionally defined until a minimum number of users verify their residential addresses in the particular neighborhood through the privacy server 2900. The method may automatically delete profiles of users that remain unverified after a threshold window of time. The neighborhood communication system 2950 2950 may be designed to create private websites to facilitate communication among neighbors 2928 (e.g., such as the particular neighbor 2920 of FIG. 29) and/or build stronger neighborhoods.

In yet another embodiment, another neighborhood communication system 2950 2950 is described. This embodiment includes a privacy server 2900 to apply an address verification algorithm (e.g., using verify module 3006 of FIG. 30) associated with each user of the online community (e.g., as shown in the social community view 3650 of FIG. 36 formed through the neighborhood network module as described in FIG. 38) to verify that each user lives at a residence associated with a claimable residential address 4247 (e.g., using sub-modules of the claimable module 2910 as described in FIG. 31) of an online community (e.g., as shown in the social community view 3650 of FIG. 36 formed through the neighborhood network module as described in FIG. 38) formed through a social community module 2906 of the privacy server 2900 using a processor 3902 and a memory (e.g., as described in FIG. 39), a network 2904, and a mapping server 2926 (e.g., providing global map data) communicatively coupled with the privacy server 2900 through the network 2904 to generate a latitudinal data and a longitudinal data associated with each claimable residential address 4247 (e.g., using sub-modules of the claimable module 2910 as described in FIG. 31) of the online community (e.g., as shown in the social community view 3650 of FIG. 36 formed through the neighborhood network module as described in FIG. 38) associated with each user of the online community (e.g., as shown in the social community view 3650 of FIG. 36 formed through the neighborhood network module as described in FIG. 38). The privacy server 2900 automatically determines a set of access privileges in the online community (e.g., as shown in the social community view 3650 of FIG. 36 formed through the neighborhood network module as described in FIG. 38) associated with each user of the online community (e.g., as shown in the social community view 3650 of FIG. 36 formed through the neighborhood network module as described in FIG. 38) by constraining access in the online community (e.g., as shown in the social community view 3650 of FIG. 36 formed through the neighborhood network module as described in FIG. 38) based on a neighborhood boundary determined using a Bezier curve algorithm 3040 of the privacy server 2900 in this embodiment.

In addition, in this yet another embodiment the privacy server 2900 transforms the claimable residential address 4247 (e.g., using sub-modules of the claimable module 2910 as described in FIG. 31) into a claimed address upon an occurrence of an event. The privacy server 2900 instantiates the event when a particular user 2916 is associated with the claimable residential address 4247 (e.g., using sub-modules of the claimable module 2910 as described in FIG. 31) based on a verification of the particular user 2916 as living at a particular residential address (e.g., associated with the residence 2918 of FIG. 29) associated with the claimable residential address 4247 (e.g., using sub-modules of the claimable module 2910 as described in FIG. 31) using the privacy server 2900 in this yet another embodiment. The privacy server 2900 constrains the particular user 2916 to communicate through the online community (e.g., as shown in the social community view 3650 of FIG. 36 formed through the neighborhood network module as described in FIG. 38) only with a set of neighbors 2928 (e.g., such as the particular neighbor 2920 of FIG. 29) having verified addresses using the privacy server 2900 in this yet another embodiment. The privacy server 2900 defines the set of neighbors 2928 (e.g., such as the particular neighbor 2920 of FIG. 29) as other users of the online community (e.g., as shown in the social community view 3650 of FIG. 36 formed through the neighborhood network module as described in FIG. 38) that have each verified their addresses in the online community (e.g., as shown in the social community view 3650 of FIG. 36 formed through the neighborhood network module as described in FIG. 38) using the privacy server 2900 and which have each claimed residential addresses that are in a threshold radial distance 4219 from the claimed address of the particular user 2916 in this yet another embodiment.

FIG. 29 is a system view of a privacy server 2900 communicating with neighborhood(s) 2902A-N through a network 2904, an advertiser(s) 2924, a mapping server 2926, an a database of neighbors 2928 (e.g., occupant data), according to one embodiment. Particularly FIG. 29 illustrates the privacy server 2900, the neighborhood 2902A-N, the network 2904, advertiser(s) 2924, mapping server 2926, and the a database of neighbors 2928 (e.g., occupant data), according to one embodiment. The privacy server 2900 may contain a social community module 2906, a search module 2908, a claimable module 2910, a commerce module 4212 and a map module 2914. The neighborhood may include a user 2916, a community center 2920, a residence 2918, a neighbor 2920 and a business 2922, according to one embodiment.

The privacy server 2900 may include any number of neighborhoods having registered users and/or unregistered users. The neighborhood(s) 2902 may be a geographically localized community in a larger city, town, and/or suburb. The network 2904 may be search engines, blogs, social networks, professional networks and static website that may unite individuals, groups and/or community. The social community module 2906 may generate a building creator in which the registered users may create and/or modify empty claimable profiles (e.g., a claimable profile 4006 of FIG. 40A-12B, a claimable profile 4102 of FIG. 41A, a claimable profile 1704 of FIG. 17). The search module 2908 may include searching of information of an individual, group and/or community.

The social community module 2906 (e.g., that applies the Bezier curve algorithm 3040 of FIG. 30 using a series of modules working in concert as described in FIG. 30), as a function/module of the emergency response server, may determine the location of the user 2916, the distance between the user 2916 and other verified users (e.g., the verified user 4110 of FIG. 41A), and the distance between the user 2916 and locations of interest. With that information, the social community module 2906 (e.g., that applies the Bezier curve algorithm 3040 of FIG. 30 using a series of modules working in concert as described in FIG. 30) may further determine which verified users (e.g., the verified user 4110 of FIG. 41A) are within a predetermined vicinity of a user 2916. This set of verified users within the vicinity of another verified user may then be determined to be receptive to broadcasts transmitted by the user 2916 and to be available as transmitters of broadcasts to the user 2916.

The social community module 2906 (e.g., that applies the Bezier curve algorithm 3040 of FIG. 30 using a series of modules working in concert as described in FIG. 30) in effect may create a link between verified users of the network 2904 that allows the users to communicate with each other, and this link may be based on the physical distance between the users as measured relative to a current geospatial location of the device (e.g., the device 1806, the device 1808 of FIG. 18) with a claimed and verified (e.g., through a verification mechanism such as a postcard verification, a utility bill verification, and/or a vouching of the user with other users) non-transitory location (e.g., a home location, a work location) of the user and/or other users. In an alternate embodiment, the transitory location of the user (e.g., their current location, a current location of their vehicle and/or mobile phone) and/or the other users may also be used by the radial algorithm (e.g., the Bezier curve algorithm 3040 of FIG. 30) to determine an appropriate threshold distance for broadcasting a message.

Furthermore, the social community module 2906 (e.g., that applies the Bezier curve algorithm 3040 of FIG. 30 using a series of modules working in concert as described in FIG. 30) may automatically update a set of pages associated with profiles of individuals and/or businesses that have not yet joined the network based on preseeded address information. In effect, the social community module 2906 (e.g., that applies the Bezier curve algorithm 3040 of FIG. 30 using a series of modules working in concert as described in FIG. 30) may update preseeded pages in a geo-constrained radial distance from where a broadcast originates (e.g., using an epicenter 4244 calculated from the current location of the device (e.g., the device 1806, the device 1808 of FIG. 18) (e.g., a a mobile version of the device 1806 of FIG. 18 (e.g., a mobile phone, a tablet computer) with information about the neighborhood broadcast data. In effect, through this methodology, the social community module 2906 (e.g., that applies the Bezier curve algorithm 3040 of FIG. 30 using a series of modules working in concert as described in FIG. 30) may leave 'inboxes' and/or post 'alerts' on pages created for users that have not yet signed up based on a confirmed address of the users through a public and/or a private data source (e.g., from Infogroup®, from a white page directory, etc.).

The social community module 2906 (e.g., that applies the Bezier curve algorithm 3040 of FIG. 30 using a series of modules working in concert as described in FIG. 30) of the privacy server 2900 may be different from previous implementations because it is the first implementation to simulate the experience of local radio transmission between individuals using the internet and non-radio network technology by basing their network broadcast range on the proximity of verified users to one another, according to one embodiment.

The Bezier curve algorithm 3040 may operate as follows, according to one embodiment. The radial algorithm (e.g., the Bezier curve algorithm 3040 of FIG. 30) may utilize a radial distribution function (e.g., a pair correlation function)

$$g(r)$$

In the neighborhood communication system 2950 2950. The radial distribution function may describe how density varies as a function of distance from a user 2916, according to one embodiment.

If a given user 2916 is taken to be at the origin O (e.g., the epicenter 4244), and if $$\rho = N/V$$

is the average number density of recipients (e.g., other users of the neighborhood communication system 2950 2950 such as neighbors 2928 of FIG. 29) in the neighborhood communication system 2950 2950, then the local time-averaged density at a distance r from O is $$\rho g(r)$$

according to one embodiment. This simplified definition may hold for a homogeneous and isotropic type of recipients (e.g., other users of the neighborhood communication system 2950 2950 such as neighbors 2928 of FIG. 29), according to one embodiment of the Bezier curve algorithm 3040.

A more anisotropic distribution (e.g., exhibiting properties with different values when measured in different directions) of the recipients (e.g., other users of the neighborhood communication system 2950 2950 such as neighbors 2928 of FIG. 29) will be described below, according to one embodiment of the Bezier curve algorithm 3040. In simplest terms it may be a measure of the probability of finding a recipient at a distance of r away from a given user 2916, relative to that for an ideal distribution scenario, according to one embodiment. The anisotropic algorithm involves determining how many recipients (e.g., other users of the neighborhood communication system 2950 2950 such as neighbors 2928 of FIG. 29) are within a distance of r and r+dr away from the user 2916, according to one embodiment. The Bezier curve algorithm 3040 may be determined by calculating the distance between all user pairs and binning them into a user histogram, according to one embodiment.

The histogram may then be normalized with respect to an ideal user at the origin o, where user histograms are completely uncorrelated, according to one embodiment. For three dimensions (e.g., such as a building representation in the privacy server 2900 in which there are multiple residents in each floor), this normalization may be the number density of the system multiplied by the volume of the spherical shell, which mathematically can be expressed as $$g(r)_f = 4\pi r^2 \rho dr;$$

where $\rho$ may be the user density, according to one embodiment of the Bezier curve algorithm 3040.

The radial distribution function of the Bezier curve algorithm 3040 can be computed either via computer simulation methods like the Monte Carlo method, or via the Ornstein-Zernike equation, using approximative closure relations like the Percus-Yevick approximation or the Hypernetted Chain Theory, according to one embodiment.

This may be important because by confining the broadcast reach of a verified user in the neighborhood communication system 2950 2950 to a specified range, the social community module 2906 (e.g., that applies the Bezier curve algorithm 3040 of FIG. 30 using a series of modules working in concert as described in FIG. 30) may replicate the experience of local radio broadcasting and enable verified users to communicate information to their immediate neighbors as well as receive information from their immediate neighbors in areas that they care about, according to one embodiment. Such methodologies can be complemented with hyperlocal advertising targeted to potential users of the privacy server 2900 on preseeded profile pages and/or active user pages of the privacy server 2900. Advertisement communications thus may become highly specialized and localized resulting in an increase in their value and interest to the local verified users of the network through the privacy server 2900. For example, advertisers may wish to communicate helpful home security devices to a set of users located in a geospatial area with a high concentration of home break-in broadcasts.

The social community module 2906 (e.g., that applies the Bezier curve algorithm 3040 of FIG. 30 using a series of modules working in concert as described in FIG. 30) may also have wide application as it may solve the problem of trying to locate a receptive audience to a verified user's broadcasts, whether that broadcast may a personal emergency, an one's personal music, an advertisement for a car for sale, a solicitation for a new employee, and/or a recommendation for a good restaurant in the area. This social community module 2906 (e.g., that applies the Bezier curve algorithm 3040 of FIG. 30 using a series of modules working in concert as described in FIG. 30) may eliminate unnecessarily broadcasting that information to those who are not receptive to it, both as a transmitter and as a recipient of the broadcast. The radial algorithm (e.g., the Bezier curve algorithm 3040 of FIG. 30) saves both time (which may be critical and limited in an emergency context) and effort of every user involved by transmitting information only to areas that a user cares about, according to one embodiment.

In effect, the radial algorithm (e.g., the Bezier curve algorithm 3040 of FIG. 30) of the emergency response server enables users to notify people around locations that are cared about (e.g., around where they live, work, and/or where they are physically located). In one embodiment, the user 2916 can be provided 'feedback' and/or a communication that the neighbor 2928 may be responding to the emergency after the neighborhood broadcast data may be delivered to the recipients (e.g., other users of the neighborhood communication system 2950 2950 such as neighbors 2928 of FIG. 29) and/or to the neighborhood services using the social community module 2906 (e.g., that applies the Bezier curve algorithm 3040 of FIG. 30 using a series of modules working in concert as described in FIG. 30) of the privacy server 2900. For example, after the neighborhood broadcast data may be delivered, the device (e.g., the device 1806, the device 1808 of FIG. 18) (e.g., a mobile version of the device 1806 of FIG. 18 (e.g., a mobile phone, a tablet computer)) may display a message saying: "3256 neighbors around a 1 radius from you have been notified on their profile pages of your crime broadcast in Menlo Park and 4 people are responding" and/or "8356 neighbors and two hospitals around a 2.7 radius from you have been notified of your medical emergency."

The various embodiments described herein of the privacy server 2900 using the social community module 2906 (e.g., that applies the Bezier curve algorithm 3040 of FIG. 30 using a series of modules working in concert as described in FIG. 30) may solve a central problem of internet radio service providers (e.g., Pandora) by retaining cultural significance related to a person's locations of association. For example, the social community module 2906 (e.g., that applies the Bezier curve algorithm 3040 of FIG. 30 using a series of modules working in concert as described in FIG. 30) may be used to 'create' new radio stations, television stations, and/or mini alert broadcasts to a geospatially constrained area on one end, and provide a means for those 'tuning in' to consume information posted in a geospatial area that the listener cares about and/or associates themselves with. The information provided can be actionable in that the user 2916 may be able to secure new opportunities through face to face human interaction and physical meeting not otherwise possible in internet radio scenarios.

The radial algorithm (e.g., the Bezier curve algorithm 3040 of FIG. 30) may be a set of instructions that may enable users (e.g., verified users, non-verified users) of the Nextdoor.com and Fatdoor.com websites and applications to broadcast their activities (e.g., garage sale, t-shirt sale, crime alert) to surrounding neighbors within a claimed neighborhood and to guests of a claimed neighborhood, according to one embodiment. The radial algorithm (e.g., the Bezier curve algorithm 3040 of FIG. 30) may be new because current technology does not allow for users of a network (e.g., Nextdoor.com, Fatdoor.com) to locally broadcast their activity to a locally defined geospatial area. With the radial algorithm (e.g., the Bezier curve algorithm 3040 of FIG. 30), users of the network may communicate with one another in a locally defined manner, which may present more relevant information and activities, according to one embodiment. For example, if a verified user of the network broadcasts an emergency, locally defined neighbors of the verified user may be much more interested in responding than if they observed an emergency on a general news broadcast on traditional radio, according to one embodiment. The social community module 2906 may solve the problem of neighbors living in the locally defined geospatial area who don't typically interact, and allows them to connect within a virtual space that did not exist before, according to one embodiment. Community boards (e.g., stolen or missing item boards) may have been a primary method of distributing content in a surrounding neighborhood effectively prior to the disclosures described herein. However, there was no way to easily distribute content related to exigent circumstances and/or with urgency in a broadcast-like manner to those listening around a neighborhood through mobile devices until the various embodiments applying the social community module 2906 as described herein.

A Bezier curve algorithm 3040 may be a method of calculating a sequence of operations, and in this case a sequence of radio operations, according to one embodiment. Starting from an initial state and initial input, the Bezier curve algorithm 3040 describes a computation that, when executed, proceeds through a finite number of well-defined successive states, eventually producing radial patterned distribution (e.g., simulating a local radio station), according to one embodiment.

The privacy server 2900 may solve technical challenges through the social community module 2906 (e.g., that applies the Bezier curve algorithm 3040 of FIG. 30 using a series of modules working in concert as described in FIG. 30) by implementing a vigorous screening process to screen out any lewd or vulgar content in one embodiment. For example, what may be considered lewd content sometimes could be subjective, and verified users could argue that the operator of the privacy server 2900 is restricting their constitutional right to freedom of speech (e.g., if the emergency response server is operated by a government entity) through a crowd-moderation capability enabled by the social community module 2906 (e.g., that applies the Bezier curve algorithm 3040 of FIG. 30 using a series of modules working in concert as described in FIG. 30), according to one embodiment. In one embodiment, verified users may sign an electronic agreement to screen their content and agree that the neighborhood communication system 2950 2950 may delete any content that it deems inappropriate for broadcasting, through the social community module 2906 (e.g., that applies the Bezier curve algorithm 3040 of FIG. 30 using a series of modules working in concert as described in FIG. 30) according to one embodiment. For example, it may be determined that a lost item such as a misplaced set of car keys does not qualify as an "emergency" that should be broadcast.

The social community module 2906 (e.g., that applies the Bezier curve algorithm 3040 of FIG. 30 using a series of modules working in concert as described in FIG. 30), in addition to neighborhood broadcasts (e.g., such as emergency broadcasts), may allow verified users to create and broadcast their own radio show, e.g., music, talk show, commercial, instructional contents, etc., and to choose their neighborhood(s) for broadcasting based on a claimed location, according to one embodiment. The social community module 2906 (e.g., that applies the Bezier curve algorithm 3040 of FIG. 30 using a series of modules working in concert as described in FIG. 30) may allow users to choose the neighborhoods that they would want to receive the broadcasts, live and recorded broadcasts, and/or the types and topics (e.g., minor crimes, property crimes, medical emergencies) of broadcasts that interest them.

The social community module 2906 (e.g., that applies the Bezier curve algorithm 3040 of FIG. 30 using a series of modules working in concert as described in FIG. 30) based approach of the privacy server 2900 may be a completely different concept from the currently existing neighborhood (e.g., geospatial) social networking options. The social community module 2906 (e.g., that applies the Bezier curve algorithm 3040 of FIG. 30 using a series of modules working in concert as described in FIG. 30) may also allow the user to create his/her own radio station, television station and/or other content such as the neighborhood broadcast data and distribute this content around locations to users and pre-seeded profiles around them. For example, the user may wish to broadcast their live reporting of a structure fire or interview eye-witnesses to a robbery. The social community module 2906 (e.g., that applies the Bezier curve algorithm 3040 of FIG. 30 using a series of modules working in concert as described in FIG. 30) can allow verified users to create their content and broadcast in the selected geospatial area. It also allows verified listeners to listen to only the relevant local broadcasts of their choice.

The social community module 2906 (e.g., that applies the Bezier curve algorithm 3040 of FIG. 30 using a series of modules working in concert as described in FIG. 30) may be important because it may provide any verified user the opportunity to create his/her own radial broadcast message (e.g., can be audio, video, pictorial and/or textual content) and distribute this content to a broad group. Social community module 2906 (e.g., that applies the Bezier curve algorithm 3040 of FIG. 30 using a series of modules working in concert as described in FIG. 30) may also allow verified listeners to listen to any missed live broadcasts through the prerecorded features, according to one embodiment. Through this, the social community module 2906 (e.g., that applies the Bezier curve algorithm 3040 of FIG. 30 using a series of modules working in concert as described in FIG. 30) changes the way social networks (e.g., Nextdoor®, Fatdoor®, Facebook®, Path®, etc.) operate by enabling location centric broadcasting to regions that a user cares about, according to one embodiment. Social community module 2906 (e.g., that applies the Bezier curve algorithm 3040 of FIG. 30 using a series of modules working in concert as described in FIG. 30) may solve a technical challenge by defining ranges based on a type of an emergency type, a type of neighborhood, and/or boundary condition of a neighborhood by analyzing whether the neighborhood broadcast data may be associated with a particular kind of recipient, a particular neighborhood, a temporal limitation, and/or through another criteria.

By using the social community module 2906 (e.g., that applies the Bezier curve algorithm 3040 of FIG. 30 using a series of modules working in concert as described in FIG. 30) of the privacy server 2900 the user 2916 may be able to filter irrelevant offers and information provided by broadcasts. In one embodiment, only the broadcasting user (e.g., the user 2916) may be a verified user to create accountability for a particular broadcast and/or credibility of the broadcaster. In this embodiment, recipients (e.g., other users of the neighborhood communication system 2950 2950 such as neighbors 2928 of FIG. 29) of the broadcast may not need to be verified users of the emergency response network. By directing traffic and organizing the onslaught of broadcasts, the social community module 2906 (e.g., that applies the Bezier curve algorithm 3040 of FIG. 30 using a series of modules working in concert as described in FIG. 30) of the privacy server 2900 may be able to identify the origins and nature of each group of incoming information and locate recipients (e.g., other users of the neighborhood communication system 2950 2950 such as neighbors 2928 of FIG. 29) that are relevant/interested in the neighborhood broadcast data, maximizing the effective use of each broadcast. For example, the neighbor 2928 may be able to specify that they own a firearm so that they would be a relevant neighbor 2928 for broadcast data to respond to a school shooting. In another example, a neighbor 2928 may specify that they are a medical professional (e.g., paramedic, physician) such that they may receive medical emergency broadcasts, according to one embodiment.

The social community module 2906 (e.g., that applies the Bezier curve algorithm 3040 of FIG. 30 using a series of modules working in concert as described in FIG. 30) of the privacy server 2900 may process the input data from the device (e.g., the device 1806, the device 1808 of FIG. 18) (e.g., a mobile version of the device 1806 of FIG. 18 (e.g., a mobile phone, a tablet computer)) in order to identify which notification(s) to broadcast to which individual(s). This may be separate from a traditional radio broadcast as it not only geographically constrains broadcasters and recipients (e.g., other users of the neighborhood communication system 2950 2950 such as neighbors 2928 of FIG. 29) but also makes use of user preferences in order to allow broadcasters to target an optimal audience and allow recipients (e.g., other users of the neighborhood communication system 2950 2950 such as neighbors 2928 of FIG. 29) to alter and customize what they consume. The user 2916 may associate him/herself with a non-transitory address in order to remain constantly connected to their neighborhood and/or neighbors even when they themselves or their neighbors are away. The Bezier curve algorithm 3040 may be also unique from a neighborhood social network (e.g., the privacy server 2900) as it permits users to broadcast emergencies, information, audio, video etc. to other users, allowing users to create their own stations.

In order to implement the social community module 2906 (e.g., that applies the Bezier curve algorithm 3040 of FIG. 30 using a series of modules working in concert as described in FIG. 30), geospatial data may need to be collected and amassed in order to create a foundation on which users may sign up and verify themselves by claiming a specific address, associating themselves with that geospatial location. The social community module 2906 (e.g., that applies the Bezier curve algorithm 3040 of FIG. 30 using a series of modules working in concert as described in FIG. 30) may then be able to utilize the geospatial database 2922 to filter out surrounding noise and deliver only relevant data to recipients (e.g., other users of the neighborhood communication system 2950 2950 such as neighbors 2928 of FIG. 29). In order to accomplish this, the social community module 2906 (e.g., that applies the Bezier curve algorithm 3040 of FIG. 30 using a series of modules working in concert as described in FIG. 30) may be able to verify the reliability of geospatial coordinates, time stamps, and user information associated with the device (e.g., the device 1806, the device 1808 of FIG. 18) (e.g., a a mobile version of the device 1806 of FIG. 18 (e.g., a mobile phone, a tablet computer)). In addition, threshold geospatial radii, private neighborhood boundaries, and personal preferences may be established in the privacy server 2900 and accommodated using the social community module 2906 (e.g., that applies the Bezier curve algorithm 3040 of FIG. 30 using a series of modules working in concert as described in FIG. 30). The geospatial database 2922 may work in concert with the social community module 2906 (e.g., that applies the Bezier curve algorithm 3040 of FIG. 30 using a series of modules working in concert as described in FIG. 30) to store, organize, and manage broadcasts, pushpins, user profiles, preseeded user profiles, metadata, and epicenter 4244 locations associated with the privacy server 2900 (e.g., a neighborhood social network such as Fatdoor.com, Nextdoor.com).

The Bezier curve algorithm 3040 may be used to calculate relative distances between each one of millions of records as associated with each placed geo-spatial coordinate in the privacy server 2900 (e.g., a neighborhood social network such as Fatdoor.com, Nextdoor.com). Calculations of relative distance between each geospatial coordinate can be a large computational challenge because of the high number of reads, writes, modify, and creates associated with each geospatial coordinate added to the privacy server 2900 and subsequent recalculations of surrounding geospatial coordinates associated with other users and/or other profile pages based a relative distance away from a newly added set of geospatial coordinates (e.g., associated with the neighborhood broadcast data and/or with other pushpin types). To overcome this computational challenge, the radial algorithm (e.g., the Bezier curve algorithm 3040 of FIG. 30) may leverage a massively parallel computing architecture 4246 through which processing functions are distributed across a large set of processors accessed in a distributed computing system 4248 through the network 2904.

In order to achieve the utilization of the massively parallel computing architecture 4246 in a context of a radial distribution function of a privacy server 2900, a number of technical challenges have been overcome in at least one embodiment. Particularly, the social community module 2906 constructs a series of tables based on an ordered geospatial ranking based on frequency of interaction through a set of 'n' number of users simultaneously interacting with the privacy server 2900, in one preferred embodiment. In this manner, sessions of access between the privacy server 2900 and users of the privacy server 2900 (e.g., the user 2916) may be monitored based on geospatial claimed areas of the user (e.g., a claimed work and/or home location of the user), and/or a present geospatial location of the user. In this manner, tables associated with data related to claimed geospatial areas of the user and/or the present geospatial location of the user may be anticipatorily cached in the memory 2924 to ensure that a response time of the privacy server 2900 may be not constrained by delays caused by extraction, retrieval, and transformation of tables that are not likely to be required for a current and/or anticipated set of sessions between users and the privacy server 2900.

In a preferred embodiment, an elastic computing environment may be used by the social community module 2906 to provide for increase/decreases of capacity within minutes of a database function requirement. In this manner, the social community module 2906 can adapt to workload changes based on number of requests of processing simultaneous and/or concurrent requests associated with neighborhood broadcast data by provisioning and de-provisioning resources in an autonomic manner, such that at each point in time the available resources match the current demand as closely as possible.

The social community module 2906 (e.g., that applies the Bezier curve algorithm 3040 of FIG. 30 using a series of modules working in concert as described in FIG. 30) may be a concept whereby a server communicating data to a dispersed group of recipients (e.g., other users of the neighborhood communication system 2950 2950 such as neighbors 2928 of FIG. 29) over a network 2904, which may be an internet protocol based wide area network (as opposed to a network communicating by radio frequency communications) communicates that data only to a geospatially-constrained group of recipients (e.g., other users of the neighborhood communication system 2950 2950 such as neighbors 2928 of FIG. 29). The social community module 2906 (e.g., that applies the Bezier curve algorithm 3040 of FIG. 30 using a series of modules working in concert as described in FIG. 30) may apply a geospatial constraint related to a radial distance away from an origin point, or a constraint related to regional, state, territory, county, municipal, neighborhood, building, community, district, locality, and/or other geospatial boundaries.

The social community module 2906 (e.g., that applies the Bezier curve algorithm 3040 of FIG. 30 using a series of modules working in concert as described in FIG. 30) may be new as applied to data traveling over wide area networks using internet protocol topology in a geospatial social networking and commerce context, according to one embodiment. While radio broadcasts, by their nature, are transmitted in a radial pattern surrounding the origin point, there may be no known mechanism for restricting access to the data only to verified users of a service subscribing to the broadcast. As applied to wired computer networks, while techniques for applying geospatial constraints have been applied to search results, and to other limited uses, there has as yet been no application of geospatial constraint as applied to the various embodiments described herein using the social community module 2906 (e.g., that applies the Bezier curve algorithm 3040 of FIG. 30 using a series of modules working in concert as described in FIG. 30).

The social community module 2906 (e.g., that applies the Bezier curve algorithm 3040 of FIG. 30 using a series of modules working in concert as described in FIG. 30) may be roughly analogous to broadcast radio communications such as a) in broadcast radio, b) in wireless computer networking, and c) in mobile telephony. However, all of these systems broadcast their information promiscuously, making the data transmitted available to anyone within range of the transmitter who may be equipped with the appropriate receiving device. In contrast, the social community module 2906 (e.g., that applies the Bezier curve algorithm 3040 of FIG. 30 using a series of modules working in concert as described in FIG. 30) herein describes a system in which networks are used to transmit data in a selective manner in that information may be distributed around a physical location of homes or businesses in areas of interest/relevancy.

The social community module 2906 (e.g., that applies the Bezier curve algorithm 3040 of FIG. 30 using a series of modules working in concert as described in FIG. 30) may solve a problem of restricting data transmitted over networks to specific users who are within a specified distance from the individual who originates the data. In a broad sense, by enabling commerce and communications that are strictly limited within defined neighborhood boundaries, the social community module 2906 (e.g., that applies the Bezier curve algorithm 3040 of FIG. 30 using a series of modules working in concert as described in FIG. 30) may enable the privacy server 2900 (e.g., a neighborhood social network such as Fatdoor.com, Nextdoor.com) communications, attacking the serious social conditions of anonymity and disengagement in community that afflict the nation and, increasingly, the world.

The social community module 2906 (e.g., that applies the Bezier curve algorithm 3040 of FIG. 30 using a series of modules working in concert as described in FIG. 30) may comprise one or more modules that instruct the privacy server 2900 to restrict the broadcasting of the neighborhood broadcast data to one or more parts of the geospatial area 117. For example, in the embodiment of FIG. 29, the social community module 2906 (e.g., that applies the Bezier curve algorithm 3040 of FIG. 30 using a series of modules working in concert as described in FIG. 30) may instruct the privacy server 2900 to broadcast the neighborhood broadcast data to the recipients (e.g., other users of the neighborhood communication system 2950 2950 such as neighbors 2928 of FIG. 29) but not to the area outside the threshold radial distance 4219.

In one or more embodiments, the social community module 2906 (e.g., that applies the Bezier curve algorithm 3040 of FIG. 30 using a series of modules working in concert as described in FIG. 30) may allow the privacy server 2900 to function in manner that simulates a traditional radio broadcast (e.g., using a radio tower to transmit a radio frequency signal) in that both the privacy server 2900 and the radio broadcast are restricted in the geospatial scope of the broadcast transmission. In one or more embodiments, the social community module 2906 (e.g., that applies the Bezier curve algorithm 3040 of FIG. 30 using a series of modules working in concert as described in FIG. 30) may prevent the broadcast of the neighborhood broadcast data to any geospatial area to which the user 2916 does not wish to transmit the neighborhood broadcast data, and/or to users that have either muted and/or selectively subscribed to a set of broadcast feeds.

The social community module 2906 (e.g., that applies the Bezier curve algorithm 3040 of FIG. 30 using a series of modules working in concert as described in FIG. 30) may analyze the neighborhood broadcast data to determine which recipients (e.g., other users of the neighborhood communication system 2950 2950 such as neighbors 2928 of FIG. 29) may receive notification data 4212 within the threshold radial distance 4219 (e.g., set by the user 2916 and/or auto calculated based on a type of emergency posting). The social community module 2906 (e.g., that applies the Bezier curve algorithm 3040 of FIG. 30 using a series of modules working in concert as described in FIG. 30) may use a variety of parameters, including information associated with the neighborhood broadcast data (e.g., location of the broadcast, type of broadcast, etc.) to determine the threshold radial distance 4219.

The social community module 2906 (e.g., that applies the Bezier curve algorithm 3040 of FIG. 30 using a series of modules working in concert as described in FIG. 30) may also determine which verified addresses associated with recipients (e.g., other users of the neighborhood communication system 2950 2950 such as neighbors 2928 of FIG. 29) having verified user profiles are located within the threshold radial distance 4219. The social community module 2906 (e.g., that applies the Bezier curve algorithm 3040 of FIG. 30 using a series of modules working in concert as described in FIG. 30) may then broadcast the notification data 4212 to the profiles and/or mobile devices of the verified users having verified addresses within the threshold radial distance 4219.

The social community module 2906 (e.g., that applies the Bezier curve algorithm 3040 of FIG. 30 using a series of modules working in concert as described in FIG. 30) may therefore simulate traditional radio broadcasting (e.g., from a radio station transmission tower) over the IP network. Thus, the social community module 2906 (e.g., that applies the Bezier curve algorithm 3040 of FIG. 30 using a series of modules working in concert as described in FIG. 30) may allow the broadcast to include information and data that traditional radio broadcasts may not be able to convey, for example geospatial coordinates and/or real-time bi-directional communications. Additionally, the social community module 2906 (e.g., that applies the Bezier curve algorithm 3040 of FIG. 30 using a series of modules working in concert as described in FIG. 30) may allow individual users low-entry broadcast capability without resort to expensive equipment and/or licensing by the Federal Communications Commission (FCC).

Another advantage of this broadcast via the social community module 2906 (e.g., that applies the Bezier curve algorithm 3040 of FIG. 30 using a series of modules working in concert as described in FIG. 30) may be that it may bypass obstructions that traditionally disrupt radio waves such as mountains and/or atmospheric disturbances. Yet another advantage of the social community module 2906 (e.g., that applies the Bezier curve algorithm 3040 of FIG. 30 using a series of modules working in concert as described in FIG. 30) may be that it may expand the physical distance of broadcast capability without resort to the expense ordinarily associated with generating powerful carrier signals. In yet another advantage, the social community module 2906 (e.g., that applies the Bezier curve algorithm 3040 of FIG. 30 using a series of modules working in concert as described in FIG. 30) may allow for almost unlimited channels and/or stations as compared to traditional radio where only a narrow band of electromagnetic radiation has been appropriated for use among a small number of entities by government regulators (e.g., the FCC).

The claimable module 2910 may enable the registered users to create and/or update their information. A 'claimable' (e.g., may be enabled through the claimable module 2910) can be defined as a perpetual collective work of many authors. Similar to a blog in structure and logic, a claimable allows anyone to edit, delete or modify content that has been placed on the Web site using a browser interface, including the work of previous authors. In contrast, a blog (e.g., or a social network page), typically authored by an individual, may not allow visitors to change the original posted material, only add comments to the original content. The term claimable refers to either the web site or the software used to create the site. The term 'claimable' also implies fast creation, ease of creation, and community approval in many software contexts (e.g., claimable means "quick" in Hawaiian).

The commerce module 4212 may provide an advertisement system to a business that may enable the users to purchase location in the neighborhood(s) 2902. The map module 2914 may be indulged in study, practice, representing and/or generating maps, or globes. The user 2916 may be an individuals and/or households that may purchase and/or use goods and services and/or be an active member of any group or community and/or resident and/or a part of any neighborhood(s) 2902. The residence 2918 may be a house, a place to live and/or like a nursing home in a neighborhood(s) 2902.

The community center 2920 may be public locations where members of a community may gather for group activities, social support, public information, and other purposes. The business 2922 may be a customer service, finance, sales, production, communications/public relations and/or marketing organization that may be located in the neighborhood(s) 2902. The advertiser(s) 2924 may be an individual and/or a firm drawing public who may be responsible in encouraging the people attention to goods and/or services by promoting businesses, and/or may perform through a variety of media. The mapping server 2926 may contain the details/maps of any area, region and/or neighborhood. The social community module 2906 of the privacy server 2900 may communicate with the neighborhood(s) 2902 through the network 2904 and/or the search module 2908. The social community module 2906 of the privacy server 2900 may communicate with the advertiser(s) 2924 through the commerce module, the database of neighbors 2928 (e.g., occupant data) and/or mapping server 2926 through the map module 2914.

For example, the neighborhoods 2902A-N may have registered users and/or unregistered users of a privacy server 2900. Also, the social community module 2906 of the privacy server 2900 may generate a building creator (e.g., building builder 1602 of FIG. 16) in which the registered users may create and/or modify empty claimable profiles, building layouts, social network pages, and/or floor levels structures housing residents and/or businesses in the neighborhood.

In addition, the claimable module 2910 of the privacy server 2900 may enable the registered users to create a social network page of themselves, and/or may edit information associated with the unregistered users identifiable through a viewing of physical properties in which, the unregistered users reside when the registered users have knowledge of characteristics associated with the unregistered users.

Furthermore, the search module 2908 of the privacy server 2900 may enable a people search (e.g., the people search widget 3100 of FIG. 31), a business search (e.g., the business search module 3102 of FIG. 31), and/or a category search (e.g., the category search widget 3104 of FIG. 31) of any data in the social community module 2906 and/or may enable embedding of any content in the privacy server 2900 in other search engines, blogs, social networks, professional networks and/or static websites.

The commerce module 4212 of the privacy server 2900 may provide an advertisement system to a business who purchase their location in the privacy server 2900 in which the advertisement may be viewable concurrently with a map indicating a location of the business, and/or in which revenue may be attributed to the privacy server 2900 when the registered users and/or the unregistered users click-in on a simultaneously displayed data of the advertisement along with the map indicating a location of the business.

Moreover, a map module 2914 of the privacy server 2900 may include a map data associated with a satellite data (e.g., generated by the satellite data module 3400 of FIG. 34) which may serve as a basis of rendering the map in the privacy server 2900 and/or which includes a simplified map generator which may transform the map to a fewer color and/or location complex form using a parcel data which identifies some residence, civic, and/or business locations in the satellite data.

In addition, a first instruction set may enable a social network to reside above a map data, in which the social network may be associated with specific geographical locations identifiable in the map data. Also, a second instruction set integrated with the first instruction set may enable users of the social network to create profiles of other people through a forum which provides a free form of expression of the users sharing information about any entities and/or people residing in any geographical location identifiable in the satellite map data, and/or to provide a technique of each of the users to claim a geographic location (e.g., a geographic location 29024 of FIG. 40A) to control content in their respective claimed geographic locations (e.g., a geographic location 29024 of FIG. 40A).

Furthermore, a third instruction set integrated with the first instruction set and the second instruction set may enable searching of people in the privacy server 2900 by indexing each of the data shared by the user 2916 of any of the people and/or the entities residing in any geographic location (e.g., a geographic location 29024 of FIG. 40A). A fourth instruction set may provide a moderation of content about each other posted of the users 2916 through trusted users of the privacy server 2900 who have an ability to ban specific users and/or delete any offensive and libelous content in the privacy server 2900.

Also, a fifth instruction set may enable an insertion of any content generated in the privacy server 2900 in other search engines through a syndication and/or advertising relationship between the privacy server 2900 and/or other internet commerce and search portals.

Moreover, a sixth instruction set may grow the social network through neighborhood groups, local politicians, block watch communities, issue activism groups, and neighbor(s) 2920 who invite other known parties and/or members to share profiles of themselves and/or learn characteristics and information about other supporters and/or residents in a geographic area of interest through the privacy server 2900.

Also, a seventh instruction set may determine quantify an effect on at least one of a desirability of a location, a popularity of a location, and a market value of a location based on an algorithm that considers a number of demographic and social characteristics of a region surrounding the location through a reviews module.

Figure 30:
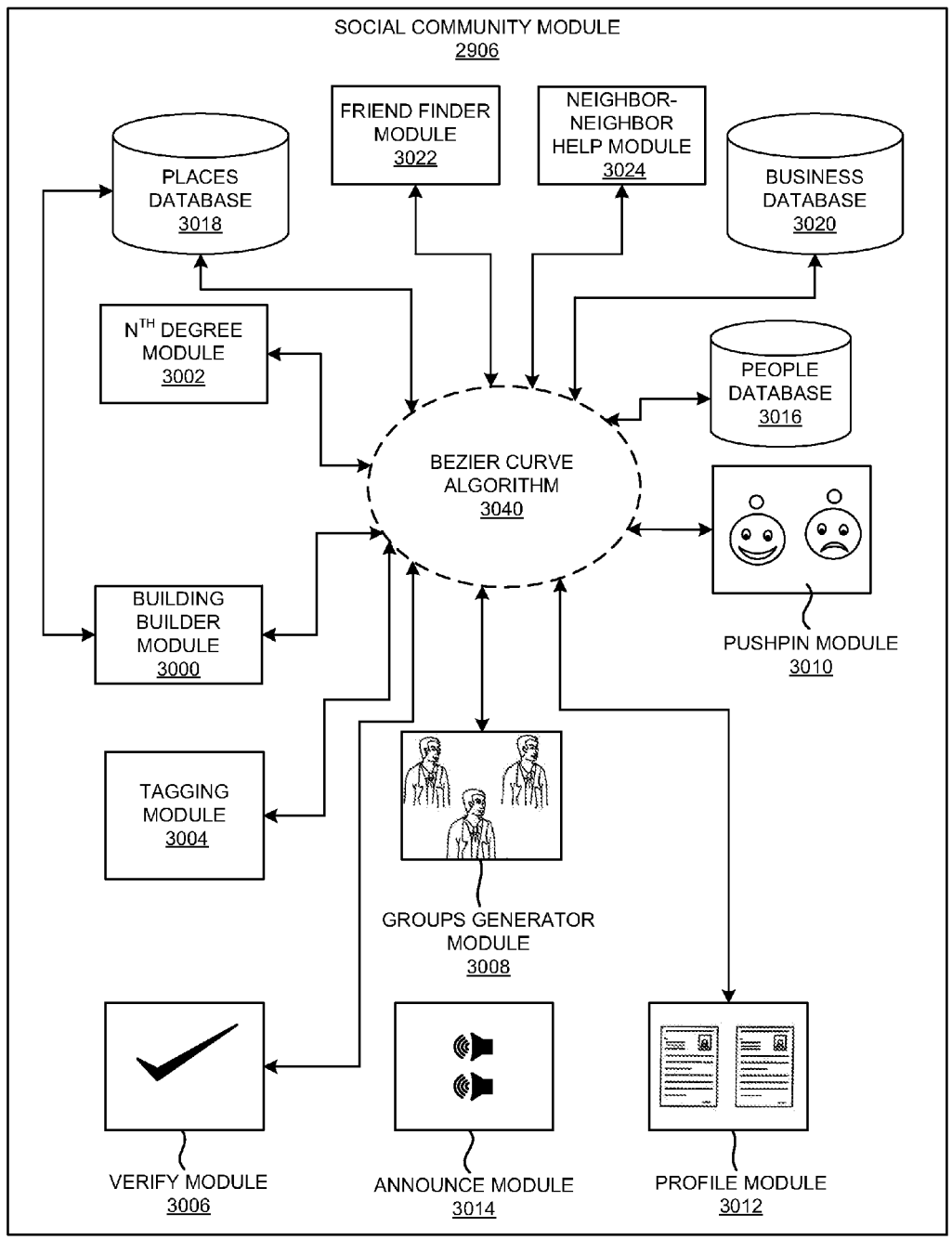
FIG. 30 is an exploded view of a social community module of FIG. 29, according to one embodiment.

FIG. 30 is an exploded view of the social community module 2906 of FIG. 29, according to one embodiment. Particularly FIG. 30 illustrates a building builder module 3000, an $N^{th}$ degree module 3002, a tagging module 3004, a verify module 3006, a groups generator module 3008, a pushpin module 3010, a profile module 3012, an announce module 3014, a people database 3016, a places database 3018, a business database 3020, a friend finder module 3022 and a neighbor-neighbor help module 3024, according to one embodiment.

The $N^{th}$ degree module 3002 may enable the particular registered user to communicate with an unknown registered user through a common registered user who may be a friend and/or a member of a common community. The tagging module 3004 may enable the user 2916 to leave brief comments on each of the claimable profiles (e.g., the claimable profile 4006 of FIG. 40A-12B, the claimable profile 4102 of FIG. 41A, the claimable profile 1704 of FIG. 17) and social network pages in the global neighborhood environment 1800 (e.g., the privacy server 2900 of FIG. 29).

The verify module 3006 may validate the data, profiles and/or email addresses received from various registered user(s) before any changes may be included. The groups generator module 3008 may enable the registered users to form groups may be depending on common interest, culture, style, hobbies and/or caste. The pushpin module 3010 may generate customized indicators of different types of users, locations, and interests directly in the map. The profile module 3012 may enable the user to create a set of profiles of the registered users and to submit media content of themselves, identifiable through a map.

The announce module 3014 may distribute a message in a specified range of distance away from the registered users when a registered user purchases a message to communicate to certain ones of the registered users surrounding a geographic vicinity adjacent to the particular registered user originating the message. The people database 3016 may keep records of the visitor/users (e.g., a user 2916 of FIG. 29). The places database module 3018 may manage the data related to the location of the user (e.g., address of the registered user). The business database 3020 may manage an extensive list of leading information related to business. The friend finder module 3022 may match the profile of the registered user with common interest and/or help the registered user to get in touch with new friends or acquaintances.

For example, the verify module 3006 of the social community module 2906 of FIG. 29 may authenticate an email address of a registered user prior to enabling the registered user to edit information associated with the unregistered users through an email response and/or a digital signature technique. The groups generator module 3008 of the social community module (e.g., the social community module 2906 of FIG. 29) may enable the registered users to form groups with each other surrounding at least one of a common neighborhood (e.g., a neighborhood 2902A-N of FIG. 29), political, cultural, educational, professional and/or social interest.

In addition, the tagging module 3004 of the social community module (e.g., the social community module 2906 of FIG. 29) may enable the registered users and/or the unregistered users to leave brief comments on each of the claimable profiles (e.g., the claimable profile 4006 of FIG. 40A-12B, the claimable profile 4102 of FIG. 41A, the claimable profile 1704 of FIG. 17) and/or social network pages in the global neighborhood environment 1800 (e.g., the privacy server 2900 of FIG. 29), in which the brief comments may be simultaneously displayed when a pointing device rolls over a pushpin indicating a physical property associated with any of the registered users and/or the unregistered users. Also, the pushpin module 3010 of the social community module 2906 of FIG. 29 may be generating customized indicators of different types of users, locations, and/or interests directly in the map.

Further, the announce module 3014 of the social community module 2906 of FIG. 29 may distribute a message in a specified range of distance away from the registered users when a registered user purchases a message to communicate to certain ones of the registered users surrounding a geographic vicinity adjacent to the particular registered user originating the message, wherein the particular registered user purchases the message through a governmental currency and/or a number of tokens collected by the particular user (e.g. the user 2916 of FIG. 29) through a creation of content in the global neighborhood environment 1800 (e.g., the privacy server 2900 of FIG. 29).

In addition, the $N^{th}$ degree module 3002 of the social community module 2906 of FIG. 29 may enable the particular registered user to communicate with an unknown registered user through a common registered user known by the particular registered user and/or the unknown registered user that is an $N^{th}$ degree of separation away from the particular registered user and/or the unknown registered user.

Moreover, the profile module 3012 of the social community module 2906 of FIG. 29 may create a set of profiles of each one of the registered users and to enable each one of the registered users to submit media content of themselves, other registered users, and unregistered users identifiable through the map.

FIG. 31 is an exploded view of the search module 2908 of FIG. 29, according to one embodiment. Particularly FIG. 31 illustrates a people search widget 300, a business search module 3102, a category search widget 3104, a communication module 3106, a directory assistance module 3108, an embedding module 3110, a no-match module 3112, a range selector module 3114, a chat widget 3116, a group announcement widget 3118, a Voice Over IP widget 3120, according to one embodiment.

The people search widget 3100 may help in getting the information like the address, phone number and/or e-mail id of the people of particular interest from a group and/or community. The business search module 3102 may help the users (e.g., the user 2916 of FIG. 29) to find the companies, products, services, and/or business related information they need to know about.

The category search widget 3104 may narrow down searches from a broader scope (e.g., if one is interested in information from a particular center, one can go to the category under the center and enter one's query there and it will return results from that particular category only). The communication module 3106 may provide/facilitate multiple by which one can communicate, people to communicate with, and subjects to communicate about among different members of the global neighborhood environment 1800 (e.g., the privacy server 2900 of FIG. 29).

The directory assistance module 3108 may provide voice response assistance to users (e.g., the user 2916 of FIG. 29) assessable through a web and telephony interface of any category, business and search queries of user's of any search engine contents. The embedding module 3110 may automatically extract address and/or contact info from other social networks, search engines, and content providers.

The no-match module 3112 may request additional information from a verified registered user (e.g., a verified registered user 4110 of FIG. 41A-B, a verified registered user 4110 of FIG. 16) about a person, place, and business having no listing in the global neighborhood environment 1800 (e.g., the privacy server 2900 of FIG. 29) when no matches are found in a search query of the verified registered user (e.g., a verified registered user 4110 of FIG. 41A-B, a verified registered user 4110 of FIG. 16).

The chat widget 3116 may provide people to chat online, which is a way of communicating by broadcasting messages to people on the same site in real time. The group announcement widget 3118 may communicate with a group and/or community in may be by Usenet, Mailing list, calling and/or E-mail message sent to notify subscribers. The Voice over IP widget 3120 may help in routing of voice conversations over the Internet and/or through any other IP-based network. The communication module 3106 may communicate directly with the people search widget 300, the business search module 3102, the category search widget 3104, the directory assistance module 3108, the embedding module 3110 may communicate with the no-match module 3112 through the range selector module 3114.

For example, a search module 2908 of the global neighborhood environment 1800 (e.g., the privacy server 2900 of FIG. 29) may enable the people search, the business search, and the category search of any data in the social community module (e.g., the social community module 2906 of FIG. 29) and/or may enable embedding of any content in the global neighborhood environment 1800 (e.g., the privacy server 2900 of FIG. 29) in other search engines, blogs, social networks, professional networks and/or static websites.

In addition, the communicate module 3106 of the search module 2906 may enable voice over internet, live chat, and/or group announcement functionality in the global neighborhood environment 1800 (e.g., the privacy server 2900 of FIG. 29) among different members of the global neighborhood environment 1800 (e.g., the privacy server 2900 of FIG. 29).

Also, the directory assistance module 3108 of the search module 2908 may provide voice response assistance to users (e.g., the user 2916 of FIG. 29) assessable through a web and/or telephony interface of any category, business, community, and residence search queries of users (e.g., the user 2916 of FIG. 29) of any search engine embedding content of the global neighborhood environment 1800 (e.g., the privacy server 2900 of FIG. 29).

The embedding module 3110 of the search module 2908 may automatically extract address and/or contact info from other social networks, search engines, and content providers, and/or to enable automatic extraction of group lists from contact databases of instant messaging platforms.

Furthermore, the no-match module 3112 of the search module 2908 to request additional information from the verified registered user (e.g., the verified registered user 4110 of FIG. 41A-B) about a person, place, and/or business having no listing in the global neighborhood environment 1800 (e.g., the privacy server 2900 of FIG. 29) when no matches are found in a search query of the verified registered user (e.g., the verified registered user 4110 of FIG. 41A-B, the verified registered user 4110 of FIG. 16) and to create a new claimable page based on a response of the verified registered user (e.g., the verified registered user 4110 of FIG. 41A-B, the verified registered user 4110 of FIG. 16) about the at least one person, place, and/or business not previously indexed in the global neighborhood environment 1800 (e.g., the privacy server 2900 of FIG. 29).

Figure 32:
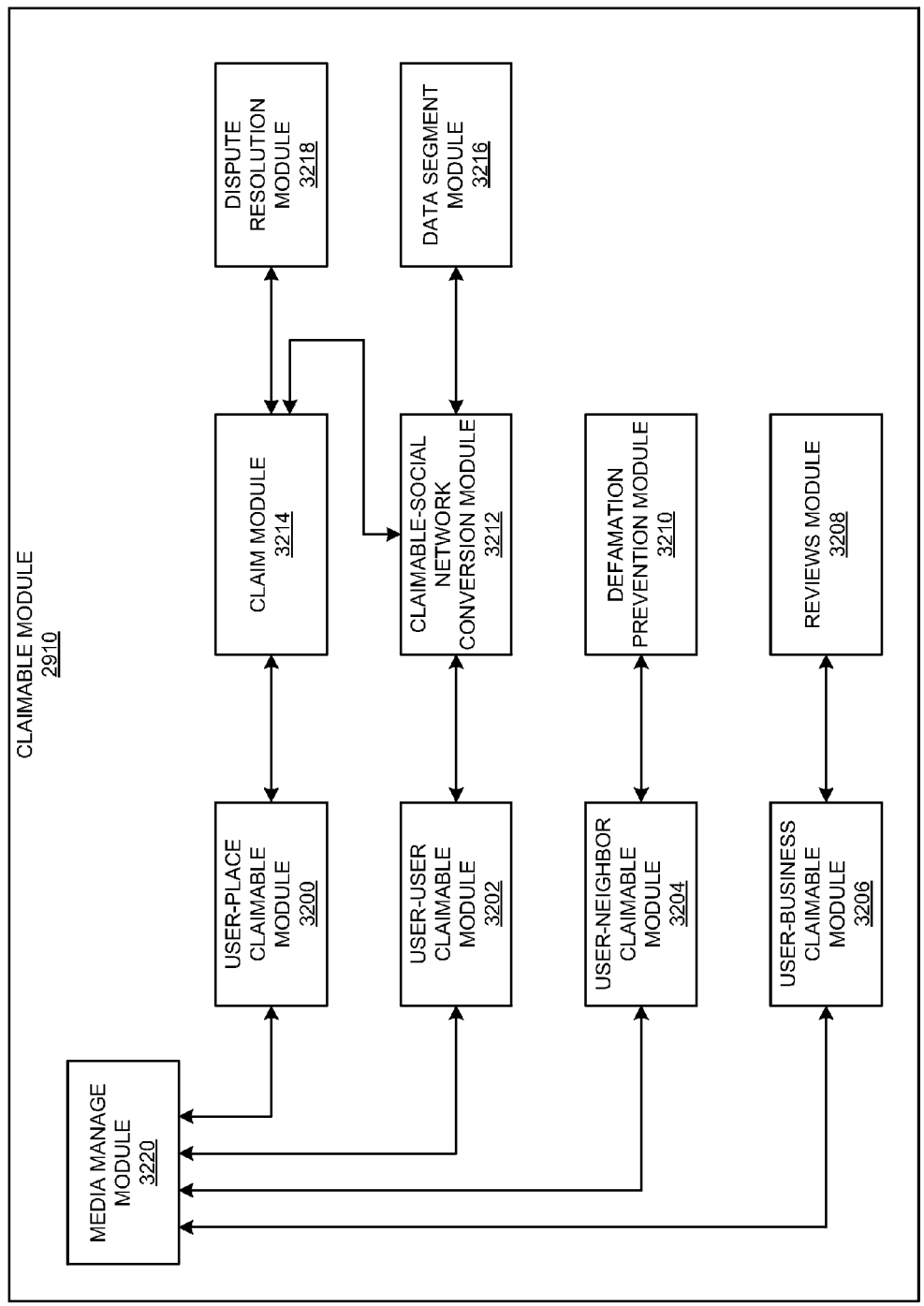
FIG. 32 is an exploded view of a claimable module of FIG. 29, according to one embodiment.

FIG. 32 is an exploded view of the claimable module 2910 of FIG. 29, according to one embodiment. Particularly FIG. 32 illustrates a user-place claimable module 3200, a user-user claimable module 3202, a user-neighbor claimable module 3204, a user-business claimable module 3206, a reviews module 3208, a defamation prevention module 3210, a claimable-social network conversion module 3212, a claim module 3214, a data segment module 3216, a dispute resolution module 3218 and a media manage module 3220, according to one embodiment.

The user-place claimable module 3200 may manage the information of the user (e.g., the user 2916 of FIG. 29) location in the global neighborhood environment 1800 (e.g., the privacy server 2900 of FIG. 29). The user-user claimable module 3202 may manage the user (e.g., the user 2916 of FIG. 29) to view a profile of another user and geographical location in the neighborhood. The user-neighbor claimable module 3204 may manage the user (e.g., the users 2916 of FIG. 29) to view the profile of the registered neighbor and/or may trace the geographical location of the user in the global neighborhood environment 1800 (e.g., the privacy server 2900 of FIG. 29). The user-business claimable module 3206 may manage the profile of the user (e.g., the user 2916 of FIG. 29) managing a commercial business in the neighborhood environment. The reviews module 3208 may provide remarks, local reviews and/or ratings of various businesses as contributed by the users (e.g., the user 2916 of FIG. 29) of the global neighborhood environment 1800 (e.g., the privacy server 2900 of FIG. 29). The defamation prevention module 3210 may enable the registered users to modify the information associated with the unregistered users identifiable through the viewing of the physical properties.

The claimable-social network conversion module 3212 of the claimable module 2910 of FIG. 29 may transform the claimable profiles (e.g., the claimable profile 4006 of FIG. 40A-12B, the claimable profile 4102 of FIG. 41A, the claimable profile 1704 of FIG. 17) to social network profiles when the registered users claim the claimable profiles (e.g., the claimable profile 4006 of FIG. 40A-12B, the claimable profile 4102 of FIG. 41A, the claimable profile 1704 of FIG. 17).

The claim module 3214 may enable the unregistered users to claim the physical properties associated with their residence (e.g., the residence 2918 of FIG. 29). The dispute resolution module 3218 may determine a legitimate user among different unregistered users who claim a same physical property. The media manage module 3220 may allow users (e.g., the user 2916 of FIG. 29) to manage and/or review a list any product from product catalog using a fully integrated, simple to use interface.

The media manage module 3220 may communicate with the user-place claimable module 3200, user-place claimable module 3200, user-user claimable module 3202, the user-neighbor claimable module 3204 and the reviews module 3208 through user-business claimable module 3206. The user-place claimable module 3200 may communicate with the dispute resolution module 3218 through the claim module 3214. The user-user claimable module 3202 may communicate with the data segment module 3216 through the claimable-social network conversion module 3212. The user-neighbor claimable module 3204 may communicate with the defamation prevention module 3210. The user-business claimable module 3206 may communicate with the reviews module 3208. The claimable-social network conversion module 3212 may communicate with the claim module 3214.

For example, the claimable module 2910 of the global neighborhood environment 1800 (e.g., the privacy server 2900 of FIG. 29) may enable the registered users to create the social network page of themselves, and may edit information associated with the unregistered users identifiable through a viewing of physical properties in which the unregistered users reside when the registered users have knowledge of characteristics associated with the unregistered users. Also, the claim module 3214 of claimable module 2910 may enable the unregistered users to claim the physical properties associated with their residence.

Furthermore, the dispute resolution module 3218 of the claimable module 2910 may determine a legitimate user of different unregistered users who claim a same physical property. The defamation prevention module 3210 of the claimable module 2910 may enable the registered users to modify the information associated with the unregistered users identifiable through the viewing of the physical properties, and/or to enable registered user voting of an accuracy of the information associated with the unregistered users.

Moreover, the reviews module of the claimable module 2910 may provide comments, local reviews and/or ratings of various businesses as contributed by the registered users and/or unregistered users of the global network environment (e.g., the privacy server 2900 of FIG. 29). The claimable-social network conversion module 3212 of the claimable module 2910 of FIG. 29 may transform the claimable profiles (e.g., the claimable profile 4006 of FIG. 40A-12B, the claimable profile 4102 of FIG. 41A, the claimable profile 1704 of FIG. 17) to social network profiles when the registered users claim the claimable profiles (e.g., the claimable profile 4006 of FIG. 40A-12B, the claimable profile 4102 of FIG. 41A, the claimable profile 1704 of FIG. 17).

Figure 33:
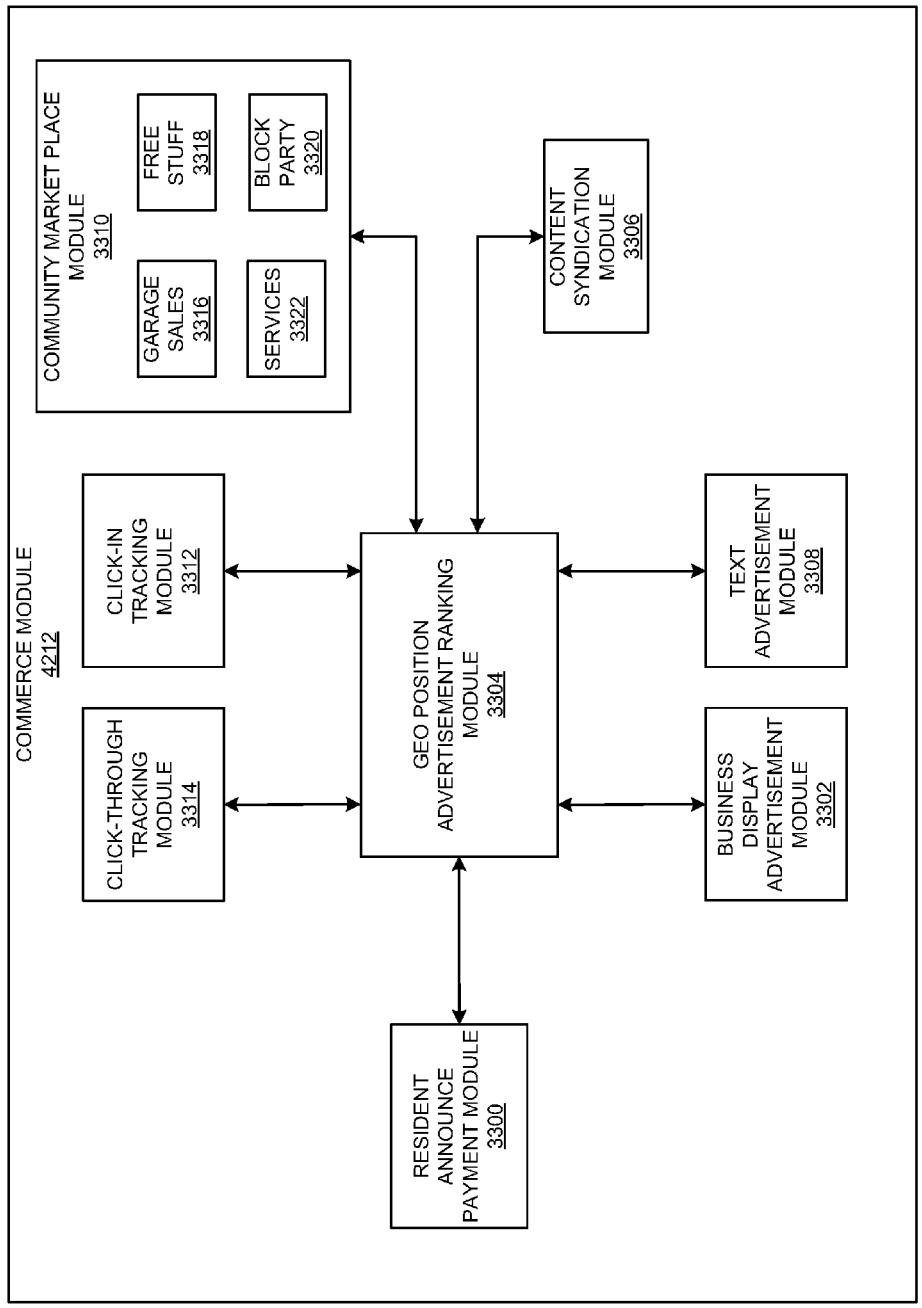
FIG. 33 is an exploded view of a commerce module of FIG. 29, according to one embodiment.

FIG. 33 is an exploded view of the commerce module 4212 of FIG. 29, according to one embodiment. Particularly FIG. 33 illustrates a resident announce payment module 3300, a business display advertisement module 3302, a geo position advertisement ranking module 3304, a content syndication module 3306, a text advertisement module 3308, a community marketplace module 3310, a click-in tracking module 3312, a click-through tracking module 3314, according to one embodiment.

The community marketplace module 3310 may contain garage sales 3316, a free stuff 3318, a block party 3320 and a services 3322, according to one embodiment. The geo-position advertisement ranking module 3304 may determine an order of the advertisement in a series of other advertisements provided in the global neighborhood environment 1800 (e.g., the privacy server 2900 of FIG. 29) by other advertisers. The click-through tracking module 3314 may determine a number of clicks-through from the advertisement to a primary website of the business.

A click-in tracking module 3312 may determine a number of user (e.g., the user 2916 of FIG. 29) who clicked in to the advertisement simultaneously. The community marketplace module 3310 may provide a forum in which the registered users can trade and/or announce messages of trading events with at least each other. The content syndication module 3306 may enable any data in the commerce module (e.g., the commerce module 4212 of FIG. 29) to be syndicated to other network based trading platforms.

The business display advertisement module 3302 may impart advertisements related to business (e.g., the business 2922 of FIG. 29), public relations, personal selling, and/or sales promotion to promote commercial goods and services. The text advertisement module 3308 may enable visibility of showing advertisements in the form of text in all dynamically created pages in the directory. The resident announce payment module 3300 may take part as component in a broader and complex process, like a purchase, a contract, etc.

The block party 3320 may be a large public celebration in which many members of a single neighborhood (e.g., the neighborhood 2902A-N of FIG. 29) congregate to observe a positive event of some importance. The free stuff 3318 may be the free services (e.g., advertisement, links, etc.) available on the net. The garage sales 3316 may be services that may be designed to make the process of advertising and/or may find a garage sale more efficient and effective. The services 3322 may be non-material equivalent of a good designed to provide a list of services that may be available for the user (e.g., the user 2916 of FIG. 29).

The geo position advertisement ranking module 3304 may communicate with the resident announce payment module 3300, the business display advertisement module 3302, the content syndication module 3306, the text advertisement module 3308, the community marketplace module 3310, the click-in tracking module 3312 and the click-through tracking module 3314.

For example, the commerce module 2908 of the global neighborhood environment 1800 (e.g., the privacy server 2900 of FIG. 29) may provide an advertisement system to a business which may purchase their location in the global neighborhood environment 1800 (e.g., the privacy server 2900 of FIG. 29) in which the advertisement may be viewable concurrently with a map indicating a location of the business, and/or in which revenue may be attributed to the global neighborhood environment 1800 (e.g., the privacy server 2900 of FIG. 29) when the registered users and/or the unregistered users click-in on a simultaneously displayed data of the advertisement along with the map indicating a location of the business.

Also, the geo-position advertisement ranking module 3304 of the commerce module 4212 to determine an order of the advertisement in a series of other advertisements provided in the global neighborhood environment 1800 (e.g., the privacy server 2900 of FIG. 29) by other advertisers, wherein the advertisement may be a display advertisement, a text advertisement, and/or an employment recruiting portal associated with the business that may be simultaneously displayed with the map indicating the location of the business.

Moreover, the click-through tracking module 3314 of the commerce module 4212 of FIG. 29 may determine a number of click-through from the advertisement to a primary website of the business. In addition, the click in tracking module 3312 of the commerce module 4212 may determine the number of users (e.g., the user 2916 of FIG. 29) who clicked in to the advertisement simultaneously displayed with the map indicating the location of the business.

The community marketplace module 3310 of the commerce module 4212 of FIG. 29 may provide a forum in which the registered users may trade and/or announce messages of trading events with certain registered users in geographic proximity from each other.

Also, the content syndication module 3306 of the commerce module 4212 of the FIG. 29 may enable any data in the commerce module 4212 to be syndicated to other network based trading platforms.

Figure 34:
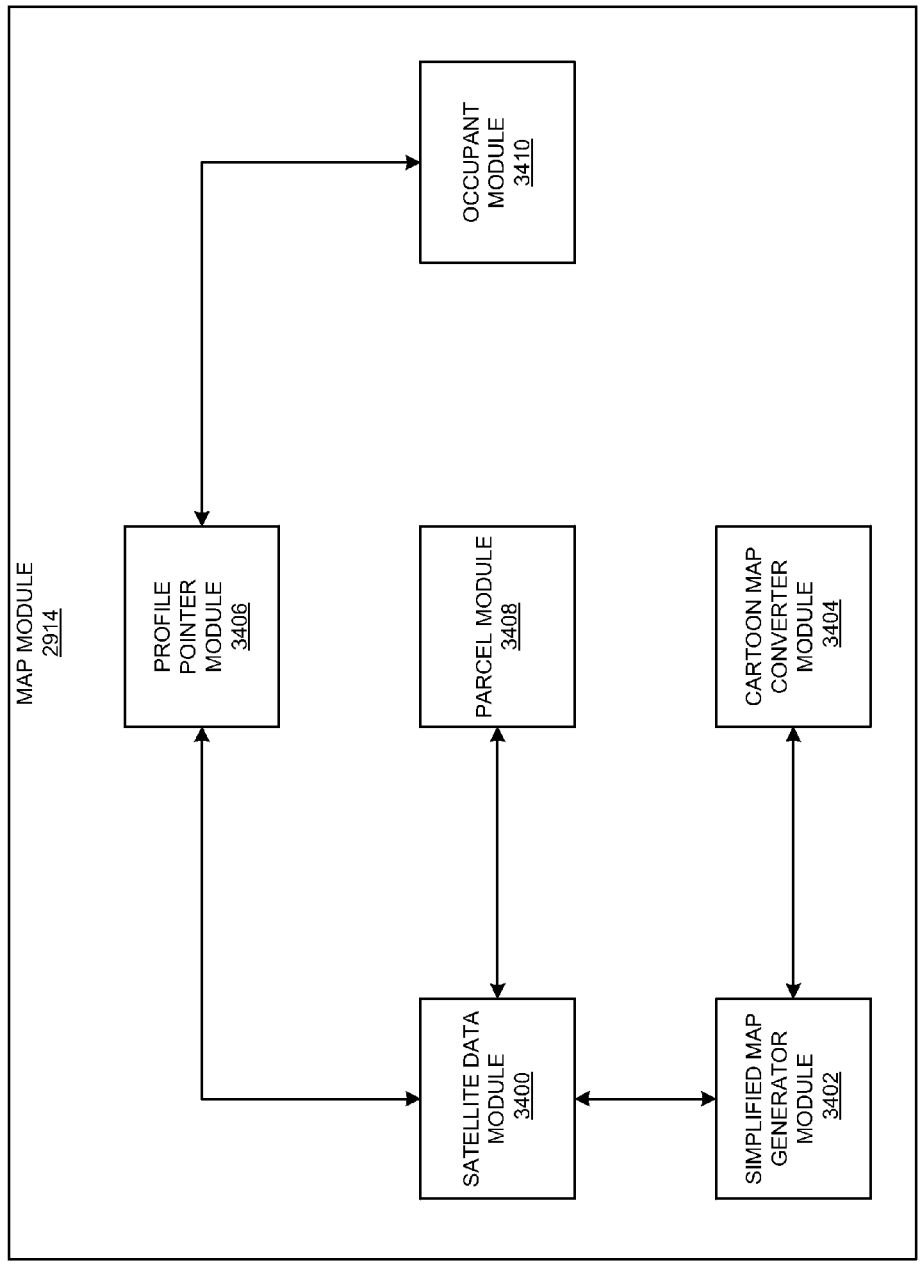
FIG. 34 is an exploded view of a map module of FIG. 29, according to one embodiment.

FIG. 34 is an exploded view of a map module 2914 of FIG. 29, according to one embodiment. Particularly FIG. 34 may include a satellite data module 3400, a simplified map generator module 3402, a cartoon map converter module 3404, a profile pointer module 3406, a parcel module 3408 and occupant module 3410, according to one embodiment. The satellite data module 3400 may help in mass broadcasting (e.g., maps) and/or as telecommunications relays in the map module 2914 of FIG. 29.

The simplified map generator module 3402 may receive the data (e.g., maps) from the satellite data module 3400 and/or may convert this complex map into a simplified map with fewer colors. The cartoon map converter module 3404 may apply a filter to the satellite data (e.g., data generated by the satellite data module 3400 of FIG. 34) into a simplified polygon based representation.

The parcel module 3408 may identify some residence, civic, and business locations in the satellite data (e.g., the satellite data module 3400 of FIG. 34). The occupant module 3410 may detect the geographical location of the registered user in the global neighborhood environment 1800 (e.g., the privacy server 2900 of FIG. 29). The profile pointer module 3406 may detect the profiles of the registered user via the data received from the satellite. The cartoon map converter module 3404 may communicate with, the satellite data module 3400, the simplified map generator module 3402, the profile pointer module 3406 and the occupant module 3410. The parcel module 3408 may communicate with the satellite data module 3400.

For example, a map module 2914 of the global neighborhood environment 1800 (e.g., the privacy server 2900 of FIG. 29) may include a map data associated with a satellite data (e.g., data generated by the satellite data module 3400 of FIG. 34) which serves as a basis of rendering the map in the global neighborhood environment 1800 (e.g., the privacy server 2900 of FIG. 29) and/or which includes a simplified map generator (e.g., the simplified map generator module 3402 of FIG. 34) which may transform the map to a fewer color and location complex form using a parcel data which identifies residence, civic, and business locations in the satellite data.

Also, the cartoon map converter module 3404 in the map module 2914 may apply a filter to the satellite data (e.g., data generated by the satellite data module 3400 of FIG. 34) to transform the satellite data into a simplified polygon based representation using a Bezier curve algorithm that converts point data of the satellite data to a simplified form.

FIG. 35 is a table view of user address details, according to one embodiment. Particularly the table 3550 of FIG. 35 illustrates a user field 3500, a verified? field 3502, a range field 3504, a principle address field 3506, a links field 3508, a contributed? field 3510 and an others field 3512, according to one embodiment. The table 3550 may include the information related to the address verification of the user (e.g., the user 2916 of FIG. 29). The user field 3500 may include information such as the names of the registered users in a global neighborhood environment 1800 (e.g., a privacy server 2900 of FIG. 29).

The verified? field 3502 may indicate the status whether the data, profiles and/or email address received from various registered user are validated or not. The range field 3504 may correspond to the distance of a particular registered user geographical location in the global neighborhood environment 1800 (e.g., the privacy server 2900 of FIG. 29).

The principal address field 3506 may display primary address of the registered user in the global neighborhood environment 1800 (e.g., the privacy server 2900 of FIG. 29). The links field 3508 may further give more accurate details and/or links of the address of the user (e.g., the user 2916 of FIG. 29). The contributed? field 3510 may provide the user with the details of another individual and/or users contribution towards the neighborhood environment (e.g., the privacy server 2900 of FIG. 29). The other(s) field 3512 may display the details like the state, city, zip and/or others of the user's location in the global neighborhood environment 1800 (e.g., the privacy server 2900 of FIG. 29).

The user field 3500 displays "Joe" in the first row and "Jane" in the second row of the user field 3500 column of the table 3550 illustrated in FIG. 7. The verified? field 3502 displays "Yes" in the first row and "No" in the second row of the verified? field 3502 column of the table 3550 illustrated in FIG. 7. The range field 3504 displays "5 miles" in the first row and "Not enabled" in the second row of the range field 3504 column of the table 3550 illustrated in FIG. 7. The principal address field 3506 displays "500 Clifford Cupertino, Calif." in the first row and "500 Johnson Cupertino, Calif." in the second row of the principle address field 3506 column of the table 3550 illustrated in FIG. 7. The links field 3508 displays "859 Bette, 854 Bette" in the first row and "851 Bette 2900 Steven's Road" in the second row of the links field 3508 column of the table 3550 illustrated in FIG. 7.

The contributed? field 3510 displays "858 Bette Cupertino, Calif., Farallone, Calif." in the first row and "500 Hamilton, Palo Alto, Calif., 1905E. University" in the second row of the contributed field 3510 column of the table 3550 illustrated in FIG. 7. The other(s) field 3512 displays "City, State, Zip, other" in the first row of the other(s) field 3512 column of the table 3550 illustrated in FIG. 7.

FIG. 36 is a user interface view of the social community module 2906, according to one embodiment. The user interface view 3650 may display the information associated with the social community module (e.g., the social community module 2906 of FIG. 29). The user interface 3650 may display map of the specific geographic location associated with the user profile of the social community module (e.g., the social community module 2906 of FIG. 29). The user interface view 3650 may display the map based geographic location associated with the user profile (e.g., the user profile 4000 of FIG. 40A) only after verifying the address of the registered user of the global neighborhood environment 1800 (e.g., the privacy server 2900 of FIG. 29).

In addition, the user interface 3650 may provide a building creator (e.g., the building builder 1602 of FIG. 16), in which the registered users of the global neighborhood environment 1800 (e.g., the privacy server 2900 of FIG. 29) may create and/or modify empty claimable profiles (e.g., a claimable profile 4006 of FIG. 40A-12B, a claimable profile 4102 of FIG. 41A, a claimable profile 1704 of FIG. 17), building layouts, social network pages, etc. The user interface view 3650 of the social community module 2906 may enable access to the user (e.g., the user 2916 of FIG. 29) to model a condo on any floor (e.g., basement, ground floor, first floor, etc.) selected through the drop down box by the registered user of the global neighborhood environment 1800 (e.g., the privacy server 2900 of FIG. 29). The user interface 3650 of the social community module (e.g., the social community module 2906 of FIG. 29) may enable the registered user of the global neighborhood environment 1800 (e.g., the privacy server 2900 of FIG. 29) to contribute information about their neighbors (e.g., the neighbor 2920 of FIG. 29).

Figure 37:
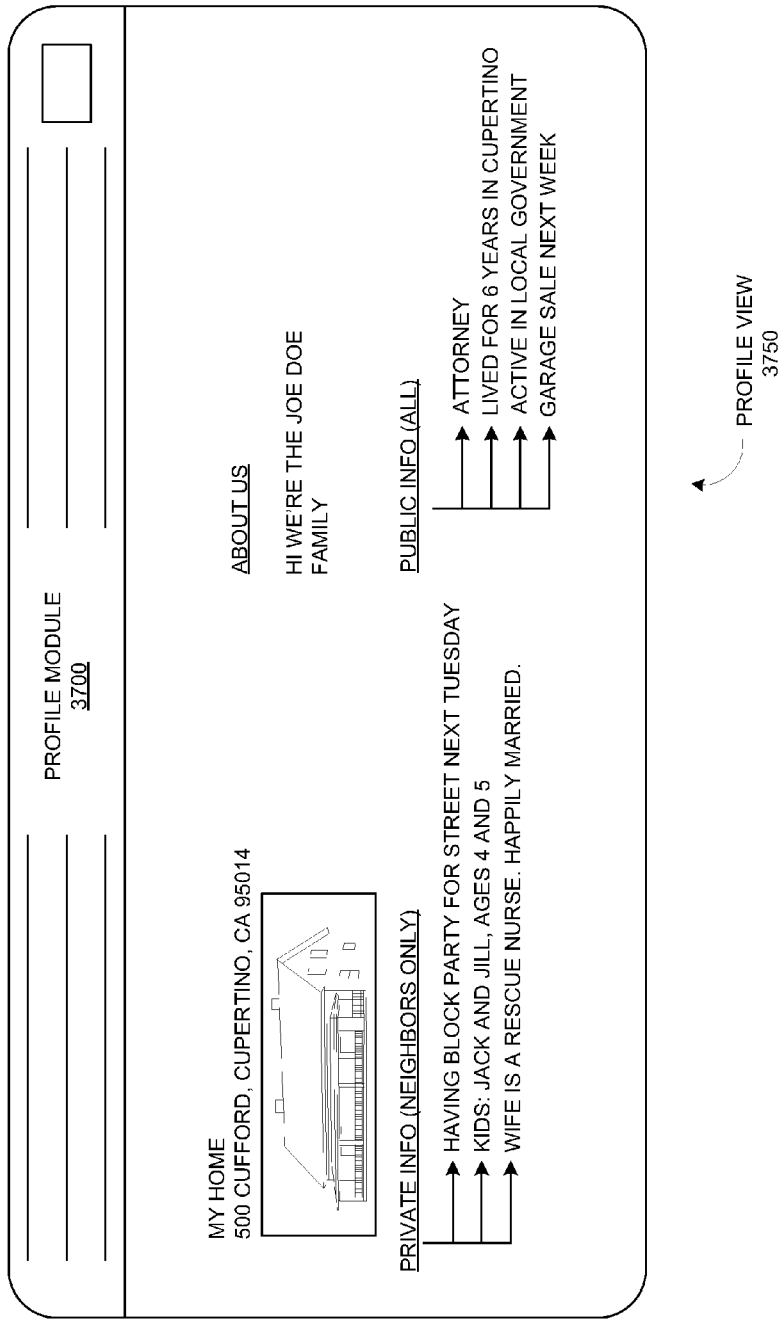
FIG. 37 is a profile view of a profile module, according to one embodiment.

FIG. 37 is a profile view 3750 of a profile module 3700, according to one embodiment. The profile view 3750 of profile module 3700 may offer the registered user to access the profile about the neighbors (e.g., the neighbor 2920 of FIG. 29). The profile view 3750 of profile module 3700 may indicate the information associated with the profile of the registered user of the global neighborhood environment 1800 (e.g., the privacy server 2900 of FIG. 29). The profile view 3750 may display the address of the registered user. The profile view 3750 may also display events organized by the neighbors (e.g., the neighbor 2920 of FIG. 29), history of the neighbors (e.g., the neighbor 2920 of FIG. 29), and/or may also offer the information (e.g., public, private, etc.) associated with the family of the neighbors (e.g., the neighbor 2920 of FIG. 29) located in the locality of the user (e.g., the user(s) 2916 of FIG. 29) of the global neighborhood environment 1800 (e.g., the privacy server 2900 of FIG. 29).

FIG. 38 is a contribute view 3850 of a neighborhood network module 3800, according to one embodiment. The contribute view 3850 of the neighborhood network module 3800 may enable the registered user of the global neighborhood environment 1800 (e.g., the privacy server 2900 of FIG. 29) to add information about their neighbors in the neighborhood network. The contribute view 3850 of the neighborhood network module 3800 may offer registered user of the global neighborhood environment 1800 (e.g., the privacy server 2900 of FIG. 29) to add valuable notes associated with the family, events, private information, etc.

Figure 39:
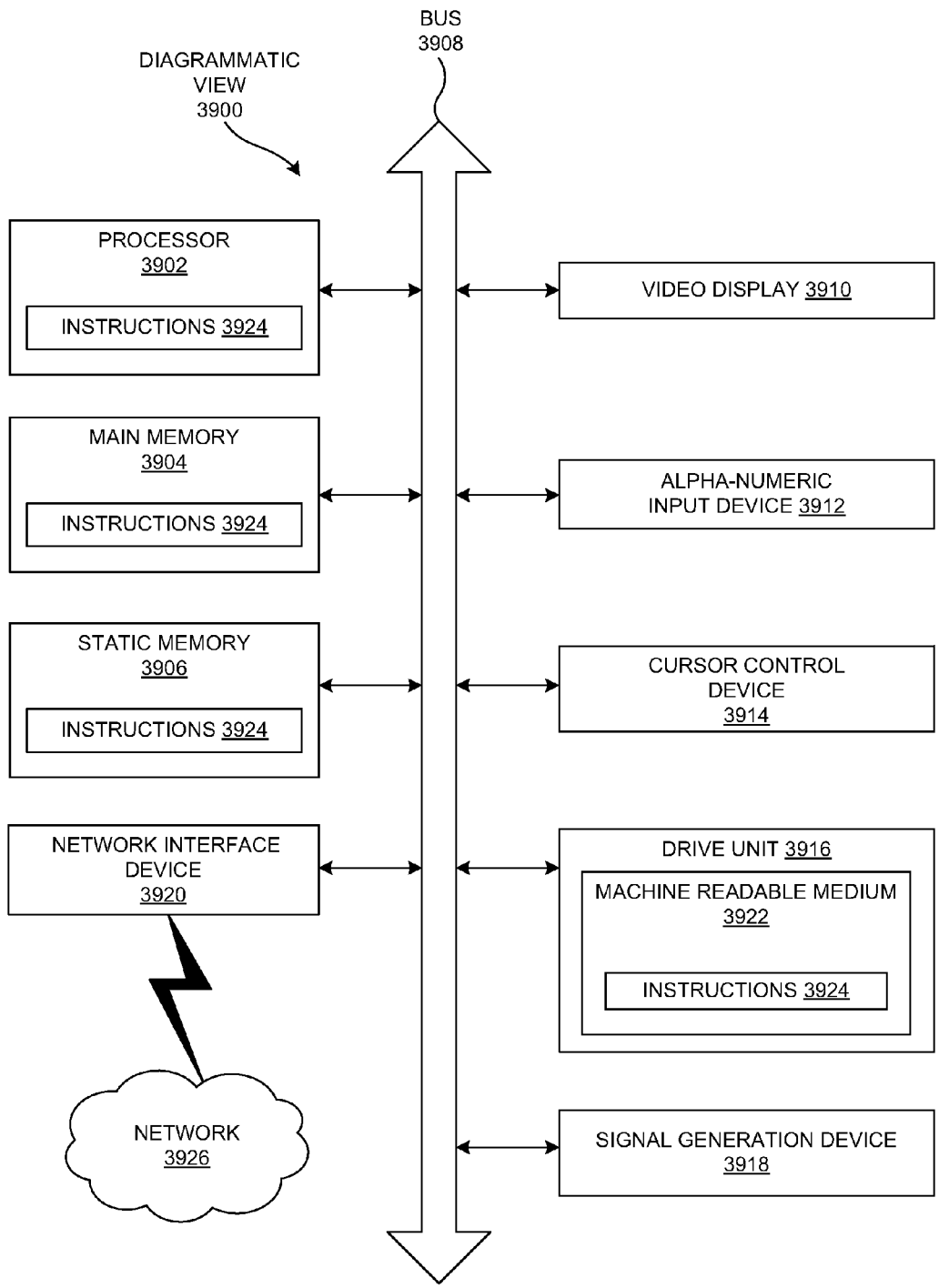
FIG. 39 is a diagrammatic system view of a data processing system in which any of the embodiments disclosed herein may be performed, according to one embodiment.

FIG. 39 is a diagrammatic system view, according to one embodiment. FIG. 39 is a diagrammatic system view 3900 of a data processing system 4204 in which any of the embodiments disclosed herein may be performed, according to one embodiment. Particularly, the system view 3900 of FIG. 39 illustrates a processor 3902, a main memory 3904, a static memory 3906, a bus 3908, a video display 3910, an alpha-numeric input device 3912, a cursor control device 3914, a drive unit 3916, a signal generation device 3918, a network interface device 3920, a machine readable medium 3922, instructions 3924, and a network 3926, according to one embodiment.

The diagrammatic system view 3900 may indicate a personal computer and/or a data processing system 4204 in which one or more operations disclosed herein are performed. The processor 3902 may be microprocessor, a state machine, an application specific integrated circuit, a field programmable gate array, etc. (e.g., Intel® Pentium® processor). The main memory 3904 may be a dynamic random access memory and/or a primary memory of a computer system.

The static memory 3906 may be a hard drive, a flash drive, and/or other memory information associated with the data processing system 4204. The bus 3908 may be an interconnection between various circuits and/or structures of the data processing system 4204. The video display 3910 may provide graphical representation of information on the data processing system 4204. The alpha-numeric input device 3912 may be a keypad, keyboard and/or any other input device of text (e.g., a special device to aid the physically handicapped). The cursor control device 3914 may be a pointing device such as a mouse.

The drive unit 3916 may be a hard drive, a storage system, and/or other longer term storage subsystem. The signal generation device 3918 may be a bios and/or a functional operating system of the data processing system 4204. The machine readable medium 3922 may provide instructions on which any of the methods disclosed herein may be performed. The instructions 3924 may provide source code and/or data code to the processor 3902 to enable any one/or more operations disclosed herein.

FIG. 40A is a user interface view of mapping a user profile 4000 of the geographic location 4004, according to one embodiment. In the example embodiment illustrated in FIG. 40A, the user profile 4000 may contain the information associated with the geographic location 4004. The user profile 4000 may contain the information associated with the registered user. The user profile 4000 may contain information such as address user of the specific geographic location, name of the occupant, profession of the occupant, details, phone number, educational qualification, etc.

The map 4002 may indicate the global neighborhood environment 1800 (e.g., the privacy server 2900 of FIG. 29) of the geographical location 4004, a claimable profile 4006 (e.g., the claimable profile 4102 of FIG. 41A, the claimable profile 1704 of FIG. 17), and a delisted profile 4008. The geographical location 4004 may be associated with the user profile

4000. The claimable profile 4006 may be the claimable profile 4006 associated with the neighboring property surrounding the geographic location 4004. The delisted profile 4008 illustrated in example embodiment of FIG. 40A, may be the claimable profile 4006 that may be delisted when the registered user claims the physical property. The tag 4010 illustrated in the example embodiment of FIG. 40A may be associated with hobbies, personal likes, etc. The block 4016 may be associated with events, requirements, etc. that may be displayed by the members of the global neighborhood environment 1800 (e.g., the privacy server 2900 of FIG. 29).

For example, a verified registered user (e.g., a verified registered user 4110 of FIG. 41A-B, a verified registered user 4110 of FIG. 16) may be associated with a user profile 4000. The user profile 4000 may be associated with a specific geographic location. A map concurrently displaying the user profile 4000 and the specific geographic location 4004 may be generated. Also, the claimable profiles 4006 associated with different geographic locations surrounding the specific geographic location associated with the user profile 4000 may be simultaneously generated in the map. In addition, a query of the user profile 4000 and/or the specific geographic location may be processed.

Similarly, a tag data (e.g., the tags 4010 of FIG. 40A) associated with the specific geographic locations, a particular geographic location, and the delisted geographic location may be processed. A frequent one of the tag data (e.g., the tags 4010 of FIG. 40A) may be displayed when the specific geographic location and/or the particular geographic location is made active, but not when a geographic location is delisted.

Figure 40B:
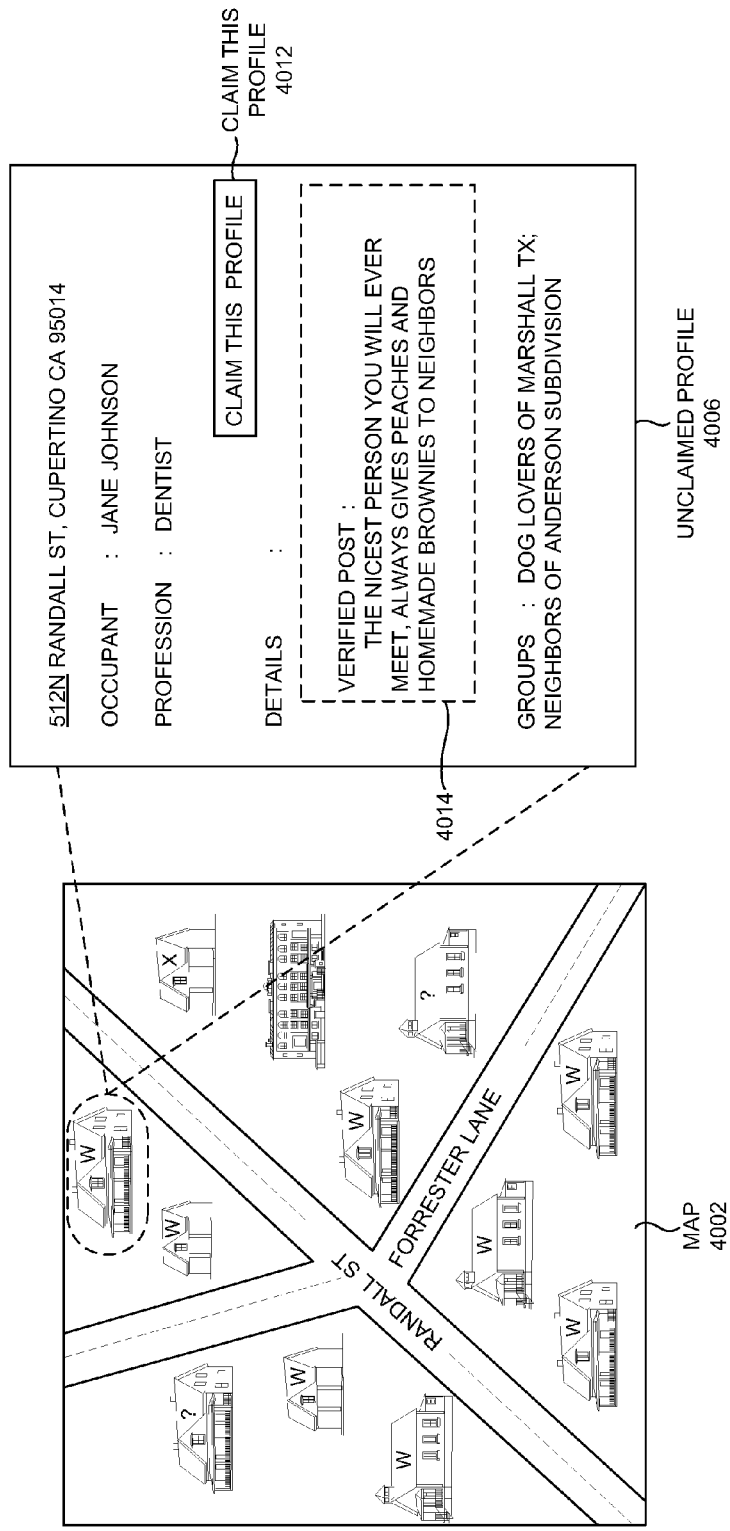
FIG. 40B is a user interface view of mapping of the claimable profile, according to one embodiment.

FIG. 40B is a user interface view of mapping of the claimable profile 4006, according to one embodiment. In the example embodiment illustrated in FIG. 40B, the map 4002 may indicate the geographic locations in the global neighborhood environment 1800 (e.g., the privacy server 2900 of FIG. 29) and/or may also indicate the geographic location of the claimable profile 4006. The claimable profile 4006 may display the information associated with the registered user of the global neighborhood environment 1800 (e.g., the privacy server 2900 of FIG. 29). The link claim this profile 4012 may enable the registered user to claim the claimable profile 4006 and/or may also allow the verified registered user (e.g., the verified registered user 4110 of FIG. 41A-B) to edit any information in the claimable profiles 4006. The block 4014 may display the information posted by any of the verified registered users (e.g., the verified registered user 4110 of FIG. 41A-B, the verified registered user 4110 of FIG. 16) of the global neighborhood environment 1800 (e.g., the privacy server 2900 of FIG. 29).

For example, a particular claimable profile (e.g., the particular claimable profile may be associated with a neighboring property to the specific property in the neighborhood) of the claimable profiles (e.g., the claimable profile 4102 of FIG. 41A, the claimable profile 1704 of FIG. 17) may be converted to another user profile (e.g., the user profile may be tied to a specific property in a neighborhood) when a different registered user (e.g., the user 2916 of FIG. 29) claims a particular geographic location to the specific geographic location associated with the particular claimable profile.

In addition, a certain claimable profile of the claimable profiles may be delisted when a private registered user claims a certain geographic location (e.g., the geographical location 4004 of FIG. 40A) adjacent to the specific geographic location and/or the particular geographic location. Also, the certain claimable profile in the map 4002 may be masked when the certain claimable profile is delisted through the request of the private registered user.

Furthermore, a tag data (e.g., the tags 4010 of FIG. 40A) associated with the specific geographic location, the particular geographic location, and the delisted geographic location may be processed. A frequent one of the tag data may be displayed when the specific geographic location and/or the particular geographic location are made active, but not when a geographic location is delisted.

Moreover, the verified registered user (e.g., the verified registered user 4110 of FIG. 41A-B, the verified registered user 4110 of FIG. 16) may be permitted to edit any information in the claimable profiles 4006 including the particular claimable profile 4006 and/or the certain claimable profile until the certain claimable profile may be claimed by the different registered user and/or the private registered user. In addition, a claimant of any claimable profile 4006 may be enabled to control what information is displayed on their user profile. Also, the claimant may be allowed to segregate certain information on their user profile 4000 such that only other registered users directly connected to the claimant are able to view data on their user profile 4000.

FIG. 41A is a user interface view of mapping of a claimable profile 4102 of the commercial user 4100, according to one embodiment. In the example embodiment illustrated in FIG. 41A, the commercial user 4100 may be associated with the customizable business profile 4104 located in the commercial geographical location. The claimable profile 4102 may contain the information associated with the commercial user 4100. The claimable profile 4102 may contain the information such as address, name, profession, tag, details (e.g., ratings), and educational qualification etc. of the commercial user 4100. The verified registered user 4110 may be user associated with the global neighborhood environment 1800 (e.g., the privacy server 2900 of FIG. 29) and may communicate a message to the neighborhood commercial user 4100. For example, a payment of the commercial user 4100 and the verified registered user 4110 may be processed.

FIG. 41B is a user interface view of mapping of customizable business profile 4104 of the commercial user 4100, according to one embodiment. In the example embodiment illustrated in FIG. 41B, the commercial user 4100 may be associated with the customizable business profile 4104. The customizable business profile 4104 may be profile of any business firm (e.g., restaurant, hotels, supermarket, etc.) that may contain information such as address, occupant name, profession of the customizable business. The customizable business profile 4104 may also enable the verified registered user 4110 to place online order for the products.

For example, the commercial user 4100 may be permitted to purchase a customizable business profile 4104 associated with a commercial geographic location. Also, the verified registered user 4110 may be enabled to communicate a message to the global neighborhood environment 1800 (e.g., the privacy server 2900 of FIG. 29) based on a selectable distance range away from the specific geographic location. In addition, a payment of the commercial user 4100 and/or the verified registered user 4110 may be processed.

A target advertisement 4106 may display the information associated with the offers and/or events of the customizable business. The display advertisement 4108 may display ads of the products of the customizable business that may be displayed to urge the verified registered user 4110 to buy the products of the customizable business. The verified registered user 4110 may be user associated with the global neighborhood environment 1800 (e.g., the privacy server 2900 of FIG. 29) that may communicate a message to the commercial user 4100 and/or may be interested in buying the products of the customizable business.

Figure 42:
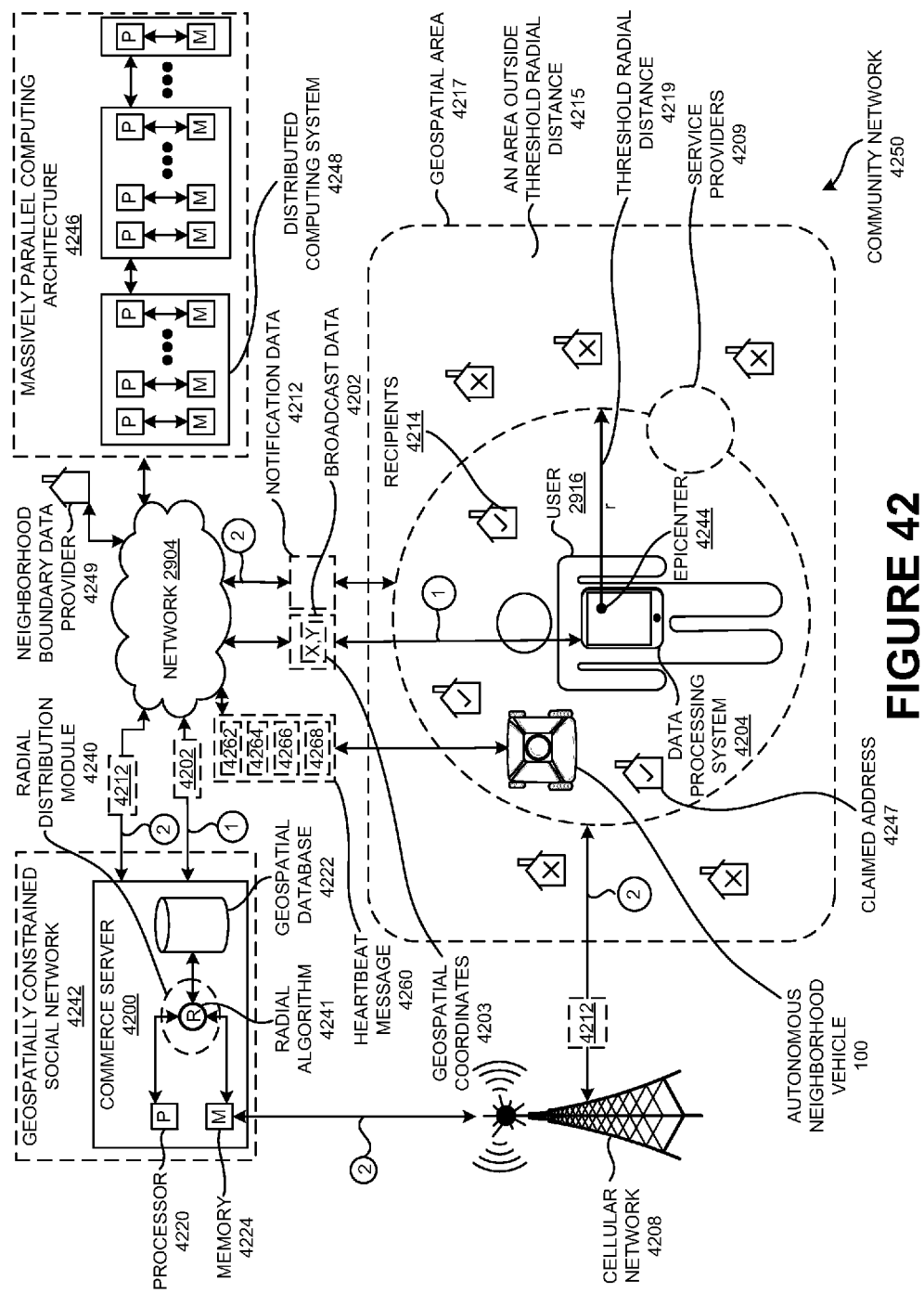
FIG. 42 is a neighborhood communication network view of a commerce server having a radial distribution module communicating with a data processing system that generates a radial broadcast through an internet protocol network using a radial algorithm of the radial distribution module of the commerce server, according to one embodiment.

FIG. 42 is a network view of a commerce server having a radial distribution module communicating with a data processing system that generates a radial broadcast through an internet protocol network using a radial algorithm of the radial distribution module of the commerce server, according to one embodiment.

Particularly, FIG. 42 illustrates a view of the community network view 4250, according to one embodiment. The embodiment of FIG. 42 describes a commerce server 4200, the network 2904, a broadcast data 4202, a set of geospatial coordinates 4203, a data processing system 4204 (e.g., a smart phone, a tablet, a laptop, a computer, and/or a personal electronic device), the user 2916, a cellular network 2908, service providers 4209 (including a repair service provider, an emergency response provider (e.g., a police station, a fire station, an ambulance), a retail establishment, a restaurant, a grocery store), a notification data 4212, a set of recipients 4214, an area outside the threshold radial distance 4219, a geospatial area 4217, a threshold radial distance 4219, a processor 4220, a geospatial database 4222, a memory 4224, a radial distribution module 4240 (e.g., that applies a radial algorithm 4241 of FIG. 2 using a series of modules working in concert as described in FIG. 2), a geospatially constrained social network 4242, an epicenter 4244, a massively parallel computing architecture 4246, the autonomous neighborhood vehicle 100, a distributed computing system 4248, a heartbeat message 4260, a current geo-spatial coordinates of the autonomous neighborhood vehicle 4262, a time stamp 4264, a date stamp 4266, and an operational status of the vehicle 4268.

The commerce server 4200 includes a processor 4220, a memory 4224, and a geospatial database 4222, according to the embodiment of FIG. 42. The commerce server 4200 may be one or more server side data processing systems (e.g., web servers operating in concert with each other) that operate in a manner that provide a set of instructions to any number of client side devices (e.g., the data processing system 4204 (e.g., a smart phone, a laptop, a tablet, a computer) communicatively coupled with the commerce server 4200 through the network 2904. For example, the commerce server 4200 may be a computing system (e.g., or a group of computing systems) that operates in a larger client-server database framework (e.g., such as in a social networking software such as Nextdoor.com, Fatdoor.com, Facebook.com, etc.).

The data processing system 4204 (e.g., a smartphone, a tablet, a laptop) may access the commerce server 4200 through the network 2904 using a browser application of the data processing system (e.g., Google® Chrome) and/or through a client-side application downloaded to the data processing system 4204 (e.g., a Nextdoor.com mobile application, a Fatdoor.com mobile application) operated by the user 2916. In an alternate embodiment, a non-mobile computing device, such as a desktop computer (not shown) may access the commerce server 4200 through the network 2904.

The broadcast data 4202 may be communicated from the data processing system 4204 to the commerce server 4200 through the network 2904. The broadcast data 4202 may include information about a garage sale offered by the user 2916 to recipients 4214 through the network 2904. For example, the work opportunity may relate to a paid position of regular employment offered by the user 2916 and/or a task, a casual/occasional garage sale offered by the user 2916 to the recipients 4214 and/or the service providers 4209.

The broadcast data 4202 may be generated and distributed through an application of the radial distribution module 4240 (e.g., that applies the radial algorithm 4241 using a series of modules working in concert) of the commerce server 4200.

The radial distribution module 4240 (e.g., that applies the radial algorithm 4241 using a series of modules working in concert) may be a series of software functions/processes that simulates the experience of transmitting and receiving local broadcasts for the verified user (e.g., the user 2916 that has claimed a geospatial location), according to one embodiment.

Using an internet protocol based network (e.g., the network 2904), the commerce server 4200 may be able to use the radial distribution module 4240 (e.g., that applies the radial algorithm 4241 using a series of modules working in concert) to simulate a radio frequency (RF) based communication network using an IP network topology of the network 2904. Therefore, the broadcast data 4202 can be distributed using the commerce server 4200 to a geo-constrained area (e.g., the recipients 4214 in the geospatial area 4217 and/or the service providers 4209 in a geo-constrained area around an area in which the data processing system 4204 operates without requiring expensive broadcast towers, transceivers, transmitters, amplifiers, antennas, tuners and/or wave generating and interpreting hardware (e.g., as may be required in local ham radio communication, frequency modulation (FM) audio systems, etc.). The radial distribution module 4240 (e.g., that applies the radial algorithm 4241 using a series of modules working in concert) may recreate an experience of communication between parties in a geospatially restricted area (e.g., for example in the same city, in the surrounding neighborhood, in the same zip code, in the same building, in the same claimed neighborhood) through the use of an Internet protocol network. The commerce server 4200 may overcome technical challenges of determining a user's geospatial location, calculating distance to other verified users based on relative geospatial locations, and/or coordinating information with a database of geo-coded information of interest (e.g., using the geospatial database 4222) using the radial distribution module 4240 (e.g., that applies the radial algorithm 4241 using a series of modules working in concert).

The radial distribution module 4240 (e.g., that applies the radial algorithm 4241 using a series of modules working in concert), as a function/module of the commerce server, may determine the location of the user 2916, the distance between the user 2916 and other verified users, and the distance between the user 2916 and locations of interest. With that information, the radial distribution module 4240 (e.g., that applies the radial algorithm 4241 using a series of modules working in concert) may further determine which verified users are within a predetermined vicinity of a user 2916. This set of verified users within the vicinity of another verified user may then be determined to be receptive to broadcasts transmitted by the user 2916 and to be available as transmitters of broadcasts to the user 2916.

The radial distribution module 4240 (e.g., that applies the radial algorithm 4241 using a series of modules working in concert) in effect may create a link between verified users of the network 2904 that allows the users to communicate with each other, and this link may be based on the physical distance between the users as measured relative to a current geospatial location of the data processing system 4204 with a claimed and verified (e.g., through a verification mechanism such as a postcard verification, a utility bill verification, and/or a vouching of the user with other users) non-transitory location (e.g., a home location, a work location) of the user and/or other users. In an alternate embodiment, the transitory location of the user (e.g., their current location, a current location of their vehicle and/or mobile phone) and/or the other users may also be used by the radial algorithm 4241 to determine an appropriate threshold distance for broadcasting a message.

Furthermore, the radial distribution module 4240 (e.g., that applies the radial algorithm 4241 using a series of modules working in concert) may automatically update a set of pages associated with profiles of individuals and/or businesses that have not yet joined the network based on preseeded address information. In effect, the radial distribution module 4240 (e.g., that applies the radial algorithm 4241 using a series of modules working in concert) may update preseeded pages in a geo-constrained radial distance from where a broadcast originates (e.g., using an epicenter 4244 calculated from the current location of the data processing system 4204) with information about the broadcast data 4202. In effect, through this methodology, the radial distribution module 4240 (e.g., that applies the radial algorithm 4241 using a series of modules working in concert) may leave 'inboxes' and/or post 'alerts' on pages created for users that have not yet signed up based on a confirmed address of the users through a public and/or a private data source (e.g., from Infogroup®, from a white page directory, etc.).

The radial distribution module 4240 (e.g., that applies the radial algorithm 4241 using a series of modules working in concert) of the commerce server 4200 may be different from previous implementations because it is the first implementation to simulate the experience of local radio transmission between individuals using the internet and non-radio network technology by basing their network broadcast range on the proximity of verified users to one another, according to one embodiment.

FIG. 42 illustrates a number of operations between the data processing system 4204 and the recipients 4214 and/or the service providers 4209. Particularly, circle 1' of FIG. 42 illustrates that the user of the data processing system 4204 communicates the broadcast data 4202 to the commerce server 4200 using the network 2904. Then, after applying the radial algorithm 4241 utilizing the radial distribution module 4240, the commerce server 4200 generates and communicates an appropriate notification data (e.g., the notification data 4212) associated with the broadcast data 4202 to a geospatially distributed set of recipients 4214 in a radial area (radius represented as 'r' of FIG. 42) in a geospatial vicinity from an epicenter 4244 associated a present geospatial location with the data processing system 4204 as illustrated as circle '2' in FIG. 42.

The radial algorithm 4241 may operate as follows, according to one embodiment. The radial algorithm may utilize a radial distribution function (e.g., a pair correlation function)

$$g(r)$$

in the view of the community network 4250. The radial distribution function may describe how density varies as a function of distance from a user 2916, according to one embodiment.

If a given user 2916 is taken to be at the origin O (e.g., the epicenter 4244), and if $$\rho = N/V$$

is the average number density of recipients 4214 in the view of the community network view 4250, then the local time-averaged density at a distance v from O is $$\rho g(r)$$

according to one embodiment. This simplified definition may hold for a homogeneous and isotropic type of recipients 4214, according to one embodiment of the radial algorithm 4241.

A more anisotropic distribution (e.g., exhibiting properties with different values when measured in different directions) of the recipients 4214 will be described below, according to one embodiment of the radial algorithm 4241. In simplest terms it may be a measure of the probability of finding a recipient at a distance of T away from a given user 2916, relative to that for an ideal distribution scenario, according to one embodiment. The anisotropic algorithm involves determining how many recipients 4214 are within a distance of r and r+dr away from the user 2916, according to one embodiment. The radial algorithm 4241 may be determined by calculating the distance between all user pairs and binning them into a user histogram, according to one embodiment.

The histogram may then be normalized with respect to an ideal user at the origin o, where user histograms are completely uncorrelated, according to one embodiment. For three dimensions (e.g., such as a building representation in the geospatially constrained social network 4242 in which there are multiple residents in each floor), this normalization may be the number density of the system multiplied by the volume of the spherical shell, which mathematically can be expressed as $$g(r)_I = 4\pi r^2 \rho dr,$$

where ρ may be the user density, according to one embodiment of the radial algorithm 4241.

The radial distribution function of the radial algorithm 4241 can be computed either via computer simulation methods like the Monte Carlo method, or via the Ornstein-Zernike equation, using approximate closure relations like the Percus-Yevick approximation or the Hypernetted Chain Theory, according to one embodiment This may be important because by confining the broadcast reach of a verified user in the view of the community network view 4250 to a specified range, the radial distribution module 4240 (e.g., that applies the radial algorithm 4241 using a series of modules working in concert) may replicate the experience of local radio broadcasting and enable verified users to communicate information to their immediate neighbors as well as receive information from their immediate neighbors in areas that they care about, according to one embodiment. Such methodologies can be complemented with hyperlocal advertising targeted to potential users of the commerce server 4200 on preseeded profile pages and/or active user pages of the commerce server 4200. Advertisement communications thus may become highly specialized and localized resulting in an increase in their value and interest to the local verified users of the network through the commerce server 4200.

The radial distribution module 4240 (e.g., that applies the radial algorithm 4241 using a series of modules working in concert) may solve the problem of trying to locate a receptive audience to a verified user's broadcasts, whether that broadcast may be one's personal music, an advertisement for a car for sale, a solicitation for a new employee, and/or a recommendation for a good restaurant in the area. This radial distribution module 4240 (e.g., that applies the radial algorithm 4241 using a series of modules working in concert) may eliminate unnecessarily broadcasting that information to those who are not receptive to it, both as a transmitter and as a recipient of the broadcast. The radial algorithm 4241 saves both time and effort of every user involved by transmitting information only to areas that a user cares about, according to one embodiment.

In effect, the radial algorithm 4241 of the commerce server 4200 enables users to notify people around locations that are cared about (e.g., around where they live, work, and/or where they are physically located). In one embodiment, the user 2916 can be provided 'feedback' after the broadcast data 4202 may be delivered to the recipients 4214 and/or to the service providers 4209 using the radial distribution module 4240

(e.g., that applies the radial algorithm 4241 using a series of modules working in concert) of the commerce server 4200. For example, after the broadcast data 4202 may be delivered, the data processing system 4204 (e.g., a data processing system 504) may display a message saying: "3256 neighbors around a 1 mile radius from you have been notified on their profile pages of your delivery notification in Menlo Park" and/or "8356 neighbors around a 1 mile radius from you have been notified of your request to rent an autonomous neighborhood vehicle."

The various embodiments described herein of the commerce server 4200 using the radial distribution module 4240 (e.g., that applies the radial algorithm 4241 using a series of modules working in concert) may solve a central problem of internet radio service providers (e.g., Pandora) by retaining cultural significance related to a person's locations of association. For example, the radial distribution module 4240 (e.g., that applies the radial algorithm 4241 using a series of modules working in concert) may be used to 'create' new radio stations, television stations, and/or mini alert broadcasts to a geospatially constrained area on one end, and provide a means for those 'tuning in' to consume information posted in a geospatial area that the listener cares about and/or associates themselves with. The information provided can be actionable in that the user 2916 may be able to secure new opportunities through face to face human interaction and physical meeting not otherwise possible in internet radio scenarios.

The radial algorithm 4241 may be a set of instructions that may enable users (e.g., verified users, non-verified users) of the Nextdoor.com and Fatdoor.com websites and applications to broadcast their activities (e.g., deliveries, pick-ups, errands, garage sale, t-shirt sale, crime alert) to surrounding neighbors within a claimed neighborhood and to guests of a claimed neighborhood, according to one embodiment. The radial algorithm 4241 may be new because current technology does not allow for users of a network (e.g., Nextdoor.com, Fatdoor.com) to locally broadcast their activity to a locally defined geospatial area. With the radial algorithm 4241, users of the network may communicate with one another in a locally defined manner, which may present more relevant information and activities, according to one embodiment. For example, if a verified user of the network broadcasts a task for the autonomous neighborhood vehicle, locally defined neighbors of the verified user may be much more interested in the tasks and needs of individuals in their neighborhood compared to if the task was for someone or something in a different town or city, according to one embodiment. The radial distribution module 4240 may solve the problem of neighbors living in the locally defined geospatial area who don't typically interact, and allows them to connect within a virtual space that did not exist before, according to one embodiment. Prior to this invention of the radial algorithm 4241 operating through the radial distribution module 4240, community boards (e.g., job boards, for sale boards) were the only method of distributing content in a surrounding neighborhood effectively. However, there was no way to easily distribute content related to exigent circumstances and/or with urgency in a broadcast-like manner to those listening around a neighborhood through data processing systems until the various embodiments applying the radial distribution module 4240 as described herein.

A radial algorithm 4241 may be a method of calculating a sequence of operations, and in this case a sequence of radio operations, according to one embodiment. Starting from an initial state and initial input, the radial algorithm 4241 describes a computation that, when executed, proceeds through a finite number of well-defined successive states, eventually producing radial patterned distribution (e.g., simulating a local radio station), according to one embodiment.

The commerce server 4200 may solve technical challenges through the radial distribution module 4240 (e.g., that applies the radial algorithm 4241 using a series of modules working in concert) by implementing a vigorous screening process to screen out any lewd or vulgar content in one embodiment. For example, what may be considered lewd content sometimes could be subjective, and verified users could argue that we are restricting their constitutional right to freedom of speech through a crowd-moderation capability enabled by the radial distribution module 4240 (e.g., that applies the radial algorithm 4241 using a series of modules working in concert), according to one embodiment. In one embodiment, verified users may sign an electronic agreement to screen their content and agree that the view of the community network view 4250 may delete any content that it deems inappropriate for broadcasting, through the radial distribution module 4240 (e.g., that applies the radial algorithm 4241 using a series of modules working in concert) according to one embodiment.

The radial distribution module 4240 (e.g., that applies the radial algorithm 4241 using a series of modules working in concert) may allow verified users to create and broadcast their own radio show, e.g., music, talk show, commercial, instructional contents, etc., and to choose their neighborhood(s) for broadcasting based on a claimed location, according to one embodiment. The radial distribution module 4240 (e.g., that applies the radial algorithm 4241 using a series of modules working in concert) may allow users to choose the neighborhoods that they would want to receive the broadcasts, live and recorded broadcasts, and/or the types and topics of broadcasts that interest them.

The radial distribution module 4240 (e.g., that applies the radial algorithm 4241 using a series of modules working in concert) based approach of the commerce server 4200 may be a completely different concept from the currently existing neighborhood (e.g. geospatial) social networking options. The radial distribution module 4240 (e.g., that applies the radial algorithm 4241 using a series of modules working in concert) may also allow the user to create his/her own radio station, television station and/or other content such as the broadcast data 4202 and distribute this content around locations to users and preseeded profiles around them. The radial distribution module 4240 (e.g., that applies the radial algorithm 4241 using a series of modules working in concert) can allow verified users to create their content and broadcast in the selected geospatial area. It also allows verified listeners to listen to only the relevant local broadcasts of their choice.

The radial distribution module 4240 (e.g., that applies the radial algorithm 4241 using a series of modules working in concert) may be important because it may provide any verified user the opportunity to create his/her own radial broadcast message (e.g., can be audio, video, pictorial and/or textual content) and distribute this content to a broad group. Radial distribution module 4240 (e.g., that applies the radial algorithm 4241 using a series of modules working in concert) may also allow verified listeners to listen to any missed live broadcasts through the prerecorded features, according to one embodiment. Through this, the radial distribution module 4240 (e.g., that applies the radial algorithm 4241 using a series of modules working in concert) changes the way social networks (e.g., Nextdoor, Fatdoor, Facebook, Path, etc.) operate by enabling location centric broadcasting to regions that a user cares about, according to one embodiment. Radial distribution module 4240 (e.g., that applies the radial algorithm 4241 using a series of modules working in concert) may solve a technical challenge by defining ranges based on a type of job posting, a type of neighborhood, and/or boundary condition of a neighborhood by analyzing whether the broadcast data 4202 may be associated with a particular kind of job, a particular neighborhood, a temporal limitation, and/or through another criteria.

By using the radial distribution module 4240 (e.g., that applies the radial algorithm 4241 using a series of modules working in concert) of the commerce server 4200 the verified user 2916 may be able to filter irrelevant offers and information provided by broadcasts. In one embodiment, only the broadcasting user (e.g., the user 2916) may be a verified user to create accountability for a particular broadcast and/or credibility of the broadcaster. In this embodiment, recipients 4214 of the broadcast may not need to be verified users of the garage sale network. By directing traffic and organizing the onslaught of broadcasts, the radial distribution module 4240 (e.g., that applies the radial algorithm 4241 using a series of modules working in concert) of the commerce server 4200 may able to identify the origins and nature of each group of incoming information and locate recipients 4214 that are relevant/interested in the broadcast data 4202, maximizing the effective use of each broadcast.

The radial distribution module 4240 (e.g., that applies the radial algorithm 4241 using a series of modules working in concert) of the commerce server 4200 may process the input data from the data processing system 4204 in order to identify which notification(s) to broadcast to which individual(s). This may be separate from a traditional radio broadcast as it not only geographically constrains broadcasters and recipients 4214 but also makes use of user preferences in order to allow broadcasters to target an optimal audience and allow recipients 4214 to alter and customize what they consume. The user 2916 may associate himself/herself with a non-transitory address in order to remain constantly connected to their neighborhood and/or neighbors even when they themselves or their neighbors are away. The radial algorithm 4241 may be also unique from a neighborhood social network (e.g., the geospatially constrained social network 4242) as it permits users to broadcast offers, information, audio, video etc. to other users, allowing users to create their own stations.

In order to implement the radial distribution module 4240 (e.g., that applies the radial algorithm 4241 using a series of modules working in concert), geospatial data may need to be collected and amassed in order to create a foundation on which users may sign up and verify themselves by claiming a specific address, associating themselves with that geospatial location. The radial distribution module 4240 (e.g., that applies the radial algorithm 4241 using a series of modules working in concert) may then be able to utilize the geospatial database 4222 to filter out surrounding noise and deliver only relevant data to recipients 4214. In order to accomplish this, the radial distribution module 4240 (e.g., that applies the radial algorithm 4241 using a series of modules working in concert) may be able to verify the reliability of geospatial coordinates, time stamps, and user information associated with the data processing system 4204 (e.g., a data processing system 504). In addition, threshold geospatial radii, private neighborhood boundaries, and personal preferences may be established in the commerce server 4200 and accommodated using the radial distribution module 4240 (e.g., that applies the radial algorithm 4241 using a series of modules working in concert). The geospatial database 4222 may work in concert with the radial distribution module 4240 (e.g., that applies the radial algorithm 4241 using a series of modules working in concert) to store, organize, and manage broadcasts, pushpins, user profiles, preseeded user profiles, meta-data, and epicenter 4244 locations associated with the geospatially constrained social network 4242 (e.g., a neighborhood social network such as Fatdoor.com, Nextdoor.com).

The radial algorithm 4241 may be used to calculate relative distances between each one of millions of records as associated with each placed geo-spatial coordinate in the geospatially constrained social network 4242 (e.g., a neighborhood social network such as Fatdoor.com, Nextdoor.com). Calculations of relative distance between each geospatial coordinate can be a large computational challenge because of the high number of reads, writes, modifies, and creates associated with each geospatial coordinate added to the geospatially constrained social network 4242 and subsequent recalculations of surrounding geospatial coordinates associated with other users and/or other profile pages based a relative distance away from a newly added set of geospatial coordinates (e.g., associated with the broadcast data 4202 and/or with other pushpin types). To overcome this computational challenge, the radial algorithm may leverage a massively parallel computing architecture 4246 through which processing functions are distributed across a large set of processors accessed in a distributed computing system 4248 through the network 2904.

In order to achieve the utilization of the massively parallel computing architecture 4246 in a context of a radial distribution function of a geospatially constrained social network 4242, a number of technical challenges have been overcome in at least one embodiment. Particularly, the radial distribution module 4240 constructs a series of tables based on an ordered geospatial ranking based on frequency of interaction through a set of 'n' number of users simultaneously interacting with the geospatially constrained social network 4242, in one preferred embodiment. In this manner, sessions of access between the commerce server 4200 and users of the commerce server 4200 (e.g., the user 2916) may be monitored based on geospatial claimed areas of the user (e.g., a claimed work and/or home location of the user), and/or a present geospatial location of the user. In this manner, tables associated with data related to claimed geospatial areas of the user and/or the present geospatial location of the user may be anticipatorily cached in the memory 4224 to ensure that a response time of the geospatially constrained social network 4242 may be not constrained by delays caused by extraction, retrieval, and transformation of tables that are not likely to be required for a current and/or anticipated set of sessions between users and the commerce server 4200.

In a preferred embodiment, an elastic computing environment may be used by the radial distribution module 4240 to provide for increase/decreases of capacity within minutes of a database function requirement. In this manner, the radial distribution module 4240 can adapt to workload changes based on number of requests of processing simultaneous and/or concurrent requests associated with broadcast data 4202 by provisioning and deprovisioning resources in an autonomic manner, such that at each point in time the available resources match the current demand as closely as possible.

The radial distribution module 4240 (e.g., that applies the radial algorithm 4241 using a series of modules working in concert) may be a concept whereby a server communicating data to a dispersed group of recipients 4214 over a network 2904, which may be an internet protocol based wide area network (as opposed to a network communicating by radio frequency communications) communicates that data only to a geospatially-constrained group of recipients 4214. The radial distribution module 4240 (e.g., that applies the radial algorithm 4241 using a series of modules working in concert) may apply a geospatial constraint related to a radial distance away from an origin point, or a constraint related to regional, state, territory, county, municipal, neighborhood, building, community, district, locality, and/or other geospatial boundaries.

The radial distribution module 4240 (e.g., that applies the radial algorithm 4241 using a series of modules working in concert) may be new as applied to data traveling over wide area networks using internet protocol topology in a geospatial social networking and commerce context, according to one embodiment. While radio broadcasts, by their nature, are transmitted in a radial pattern surrounding the origin point, there may be no known mechanism for restricting access to the data only to verified users of a service subscribing to the broadcast. As applied to wired computer networks, while techniques for applying geospatial constraints have been applied to search results, and to other limited uses, there has as yet been no application of geospatial constraint as applied to the various embodiments described herein using the radial distribution module 4240 (e.g., that applies the radial algorithm 4241 using a series of modules working in concert).

The radial distribution module 4240 (e.g., that applies the radial algorithm 4241 using a series of modules working in concert) may be roughly analogous to broadcast radio communications such as a) in broadcast radio, b) in wireless computer networking, and c) in mobile telephony. However, all of these systems broadcast their information promiscuously, making the data transmitted available to anyone within range of the transmitter who may be equipped with the appropriate receiving device. In contrast, the radial distribution module 4240 (e.g., that applies the radial algorithm 4241 using a series of modules working in concert) herein describes a system in which networks are used to transmit data in a selective manner in that information may be distributed around a physical location of homes or businesses in areas of interest/relevancy.

The radial distribution module 4240 (e.g., that applies the radial algorithm 4241 using a series of modules working in concert) may solve a problem of restricting data transmitted over networks to specific users who are within a specified distance from the individual who originates the data. In a broad sense, by enabling commerce and communications that are strictly limited within defined neighborhood boundaries, the radial distribution module 4240 (e.g., that applies the radial algorithm 4241 using a series of modules working in concert) may enable the geospatially constrained social network 4242 (e.g., a neighborhood social network such as Fatdoor.com, Nextdoor.com) communications, attacking the serious social conditions of anonymity and disengagement in community that afflict the nation and, increasingly, the world.

The radial distribution module 4240 (e.g., that applies the radial algorithm 4241 using a series of modules working in concert) may comprise one or more modules that instruct the commerce server 4200 to restrict the broadcasting of the broadcast data 4202 to one or more parts of the geospatial area 4217. For example, in the embodiment of FIG. 42, the radial distribution module 4240 (e.g., that applies the radial algorithm 4241 using a series of modules working in concert) may instruct the commerce server 4200 to broadcast the broadcast data 4202 to the recipients 4214 but not to the area outside the threshold radial distance 4219.

In one or more embodiments, the radial distribution module 4240 (e.g., that applies the radial algorithm 4241 using a series of modules working in concert) may allow the commerce server 4200 to function in manner that simulates a traditional radio broadcast (e.g., using a radio tower to transmit a radio frequency signal) in that both the commerce server 4200 and the radio broadcast are restricted in the geospatial scope of the broadcast transmission. In one or more embodiments, the radial distribution module 4240 (e.g., that applies the radial algorithm 4241 using a series of modules working in concert) may prevent the broadcast of the broadcast data 4202 to any geospatial area to which the user 2916 does not wish to transmit the broadcast data 4202, and/or to users that have either muted and/or selectively subscribed to a set of broadcast feeds.

The radial distribution module 4240 (e.g., that applies the radial algorithm 4241 using a series of modules working in concert) may analyze the broadcast data 4202 to determine which recipients 4214 may receive notification data 4212 within a threshold radial distance 4219 (e.g., set by the user 2916 and/or auto calculated based on a type of broadcast). The radial distribution module 4240 (e.g., that applies the radial algorithm 4241 using a series of modules working in concert) may use a variety of parameters, including information associated with the broadcast data to determine the threshold radial distance 4219.

The radial distribution module 4240 (e.g., that applies the radial algorithm 4241 using a series of modules working in concert) may also determine which verified addresses associated with recipients 4214 having verified user profiles are located within the threshold radial distance 4219. The radial distribution module 4240 (e.g., that applies the radial algorithm 4241 using a series of modules working in concert) may then broadcast the notification data 4212 to the profiles and/or data processing systems of the verified users having verified addresses within the threshold radial distance 4219.

The radial distribution module 4240 (e.g., that applies the radial algorithm 4241 using a series of modules working in concert) may therefore simulate traditional radio broadcasting (e.g. from a radio station transmission tower) over the IP network. Thus, the radial distribution module 4240 (e.g., that applies the radial algorithm 4241 using a series of modules working in concert) may allow the broadcast to include information and data that traditional radio broadcasts may not be able to convey, for example geospatial coordinates and/or real-time bi-directional communications. Additionally, the radial distribution module 4240 (e.g., that applies the radial algorithm 4241 using a series of modules working in concert) may allow individual users low-entry broadcast capability without resort to expensive equipment and/or licensing by the Federal Communications Commission (FCC).

Another advantage of this broadcast via the radial distribution module 4240 (e.g., that applies the radial algorithm 4241 using a series of modules working in concert) may be that it may bypass obstructions that traditionally disrupt radio waves such as mountains and/or atmospheric disturbances. Yet another advantage of the radial distribution module 4240 (e.g., that applies the radial algorithm 4241 using a series of modules working in concert) may be that it may expand the physical distance of broadcast capability without resort to the expense ordinarily associated with generating powerful carrier signals. In yet another advantage, the radial distribution module 4240 (e.g., that applies the radial algorithm 4241 using a series of modules working in concert) may allow for almost unlimited channels and/or stations as compared to traditional radio where only a narrow band of electromagnetic radiation has been appropriated for use among a small number of entities by government regulators (e.g. the FCC).

The user 2916 may be an individual who operates the data processing system 4204 (e.g., a data processing system 504) to generate the broadcast data 4202. It will be understood by those skilled in the art that the verified nature of the user may be an optional characteristic in an alternate embodiment. This means that in an alternate embodiment, any user (whether verified or not) may generate the broadcast data 4202 through the data processing system 4204. In another alternative embodiment, the user 2916 may be an electronic sensor, such as a detection sensor device (e.g., a sensory detection sensor device such as a motion detector, a chemical detection device, etc.), and/or an appliance (e.g., such as a refrigerator, a home security network, and/or a motion detector). It should also be noted that the 'mobile' nature of the data processing system 4204 may be optional in yet another alternative embodiment. In such an alternate embodiment, any computing device, whether mobile/portable or fixed in location may generate the broadcast data 4202.

The cellular network 2908 may be associated with a telephone carrier (e.g., such as AT&T, Sprint, etc.) that provides an infrastructure through which communications are generated between the commerce server 4200 and the service providers 4209 using the radial algorithm 4241. For example, the cellular network 2908 may provide a communication infrastructure through which the broadcast data 4202 may be communicated as voice and/or text messages through telephones (e.g., standard telephones and/or smart phones) operated by at least some of the service providers 4209 of FIG. 42. It should be understood that in one embodiment, the service providers 4209 are paid subscribers/customers of the geospatially constrained social network 4242 in a manner such that each of the service providers 4209 may pay a fee per received broadcast data 4202, and/or each hired engagement to the geospatially constrained social network 4242. The service providers 4209 may pay extra to be permitted access to receive the broadcast data 4202 even when they do not have a transitory and/or non-transitory connection to a neighborhood if they service that neighborhood area though operating their business outside of it. For this reason, FIG. 42 visually illustrates that the service providers 4209 may be located (e.g., principal business address) outside the threshold radial distance 4219.

The cellular network 2908 (e.g., a mobile network) may be a wireless network distributed over land areas called cells, each served by at least one fixed-location transceiver, known as a cell site or base station through which the broadcast data 4202 is distributed from the commerce server 4200 to telephones of the service providers 4209 using the radial distribution module 4240 (e.g., that applies the radial algorithm 4241 using a series of modules working in concert), according to one embodiment. The cellular network 2908 may use a set of frequencies from neighboring cells, to avoid interference and provide guaranteed bandwidth within each cell, in one embodiment.

When joined together these cells of the cellular network 2908 may provide radio coverage over a wide geographic area through the cellular network 2908 in a manner that ensures that the broadcast data 4202 may be simultaneously communicated via both IP networks (e.g., to the recipients 4214) and/or to the service providers 4209 through the cellular network 2908. It will be appreciated that the radial distribution module 4240 (e.g., that applies the radial algorithm 4241 using a series of modules working in concert) in effect permits simultaneous updates to claimed user pages, unclaimed (preseeded) user pages in a geospatially constrained social network 4242 (e.g., neighborhood social network) based on a geospatial location of the data processing system 4204 in a manner that simulates a radio (RF) based network separately from the concepts described in conjunction with the cellular network 2908. However, it will be understood that the radial distribution module 4240 (e.g., that applies the radial algorithm 4241 using a series of modules working in concert) may be not restricted to such topology and can multimodally communicate through different networks, such as through the cellular network 2908 described in FIG. 42.

The service providers 4209 may be locations, devices, and/or mobile phones associated with individuals and/or agencies. The service providers 4209 may be notified when a garage sale in a local area including a non-transitory location (e.g., around where they live and/or work, regardless of where they currently are) and a transitory location (e.g., where they currently are) is posted using the data processing system 4204 as the broadcast data 4202.

The service providers 4209 may include the businesses 2922, emergency services (e.g., police, firefighters, and/or medical first responders), food related establishments, retail establishments, and/or repair services). In this manner, data processing systems 4304 and/or desktop computers operated by the service providers 4209 may be alerted whenever the broadcast data 4202 is posted in and/or around their neighborhood through a push notification (e.g., an alert popping up on their phone), through an email, a telephone call, and/or a voice message delivered to the particular data processing system operated by each of the service providers 4209 using the radial distribution module 4240 (e.g., that applies the radial algorithm 4241 using a series of modules working in concert).

The broadcast data 4202 may be delivered as notification data 4212 from the commerce server 4200 to the recipients 4214 and/or to the service providers 4209 using the radial distribution module 4240 (e.g., that applies the radial algorithm 4241 using a series of modules working in concert) of the commerce server 4200.

The recipients 4214 may be individuals that have claimed a profile (e.g., verified their profile through a postcard, a telephone lookup, a utility bill) associated with a particular non-transitory address (e.g., a home address, a work address) through a geospatial social network (e.g., a geospatially constrained social network 4242 (e.g., a neighborhood social network such as Fatdoor.com, Nextdoor.com)) through which the commerce server 4200 operates. The recipients 4214 may be in a geo-fenced area, in that an epicenter 4244 of a broadcast message from the data processing system 4204 (e.g., a data processing system 504) may be a center through which a radial distance is calculated based on a characteristic of the broadcast data 4202. For example, a short term job (e.g., moving furniture) may be delivered only to an immediate 0.1 mile radius, and a permanent job opening may be automatically delivered to a broader 0.6 mile radius either automatically and/or through a user defined preference (e.g., set by the user 2916).

It should be appreciated that individuals in an area outside the threshold radial distance 4219 may not receive the broadcast data 4202 because their geospatial address may be outside a radial boundary surrounding an epicenter 4244 in which the broadcast data 4202 originates. Additionally, the threshold radial distance 4219 may be confined on its edges by a geospatial polygon at a juncture between area defined by recipients 4214 and the area outside the threshold radial distance 4219, according to one embodiment. In one embodiment, the autonomous neighborhood vehicle 100 may periodically transmit the heartbeat message 4260 to the commerce server 4200. The heartbeat message may include the current geo-spatial coordinates of the autonomous neighborhood vehicle 4262, a time stamp 4264, a date stamp 4266, and/or an operational status of the vehicle 4268.

Figure 43A:
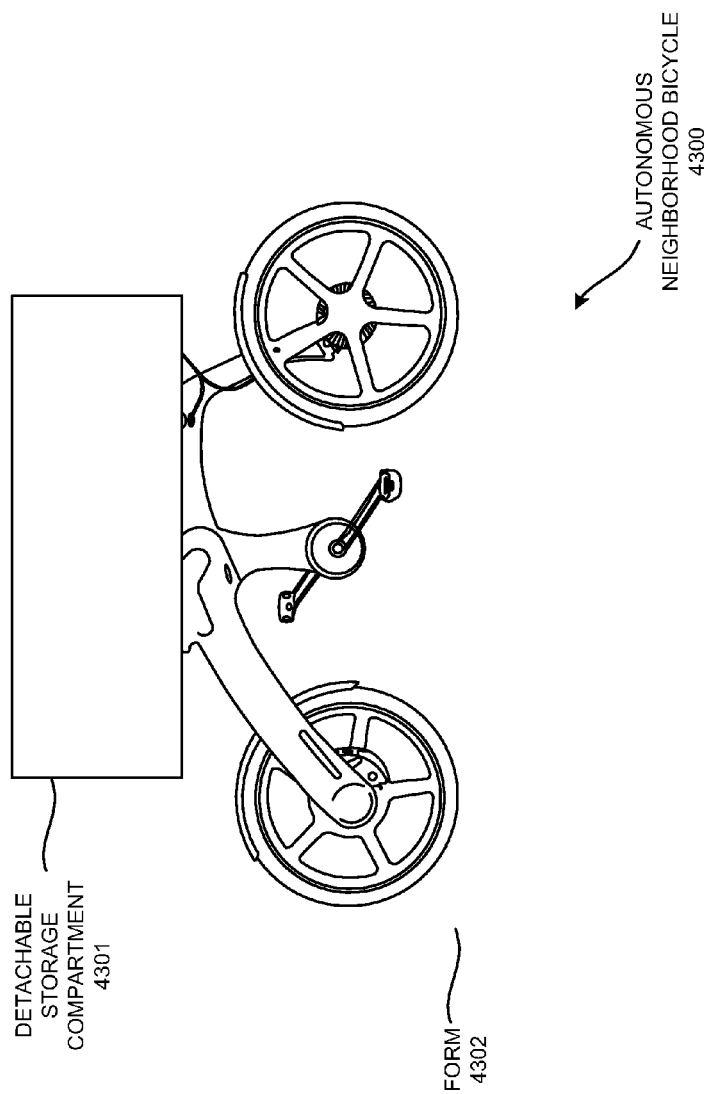
FIG. 43A shows an autonomous neighborhood bicycle, according to one embodiment.

FIG. 43A shows a form 4302 of an autonomous neighborhood bicycle 4300, according to one embodiment. The autonomous neighborhood bicycle 4300 may be comprised of the same systems or similar systems as illustrated in FIG.

1A and FIG. 2. The autonomous neighborhood bicycle 4300 may have the same capabilities as the autonomous neighborhood vehicle 100. In one embodiment, the autonomous neighborhood vehicle may have a detachable storage compartment 4301 physically associated with it. The storage compartment 101 may be detachable from the autonomous neighborhood bicycle 4300 and/or may be the same as or similar to the storage compartment discussed in FIG. 1A. In one embodiment, the autonomous neighborhood bicycle 4300 may have a maximum speed similar to that of electric bicycles known in the art. The autonomous neighborhood bicycle 4300 may be able to travel in the bike lane 304.

The autonomous neighborhood bicycle 4300 may have a balancing system that enables the autonomous neighborhood bicycle 4300 to remain upright when stationary and/or to compensate for unequal distribution of weight of the storage compartment 101. In one embodiment, the autonomous neighborhood bicycle 4300 may have a suspension system and/or wheels that enables the autonomous neighborhood bicycle 4300 to traverse any terrain (e.g., snow, grass, mud, rocks, sidewalk curbs, and/or potholes) without disturbing and/or damaging the contents of the storage compartment 101. In one embodiment, the pedals may not be part of the autonomous neighborhood bicycle 4300.

Figure 43B:
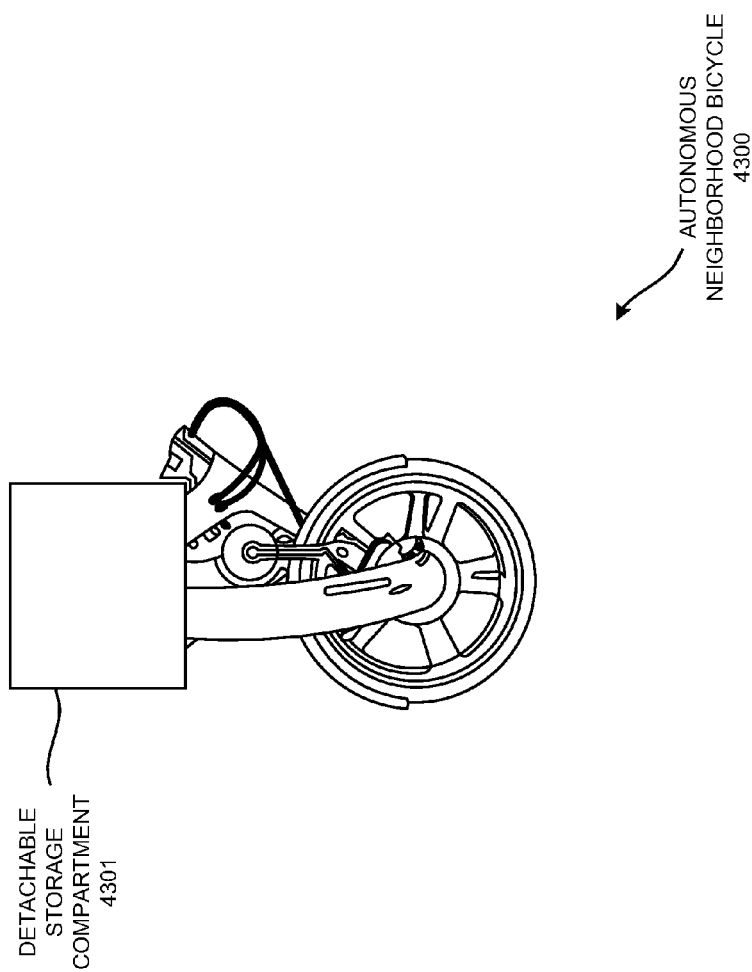
FIG. 43B shows the autonomous neighborhood bicycle of FIG. 43A after being collapsed, according to one embodiment.

FIG. 43B shows the autonomous neighborhood bicycle 4300 of FIG. 43A, according to one embodiment. The autonomous neighborhood bicycle 4300 may be capable of being collapsed (e.g., compacted and/or folded). This collapsing may enable the autonomous neighborhood bicycle to be more efficiently stored and/or transported. The storage compartment 101 may be detached. In one embodiment, the autonomous neighborhood bicycle 4300 may be capable of being collapsed without detaching the storage compartment 101, as shown in FIG. 43B. In one embodiment, the autonomous neighborhood bicycle 4300 may be portable (e.g., able to fit in the trunk of a car) when collapsed and/or not collapsed.

In one embodiment, the autonomous neighborhood bicycle 4300 may be able to be deployed (e.g., given an assignment (e.g., a pick-up and/or delivery) and/or able to execute the assignment) remotely when stored in the trunk of an autonomous vehicle. For example, an individual may have an autonomous car and an autonomous neighborhood vehicle 4300. The individual may store their autonomous neighborhood bicycle 4300 in the trunk of their autonomous car. The individual may be out to dinner and realize they left their wallet at home. Rather than having their significant other drive all the way to the restaurant to deliver the wallet or risk losing their parking spot and having to leave the dinner, the individual may be able to send an order to their autonomous neighborhood bicycle 4300 through their mobile device (either communicating directly to the autonomous neighborhood vehicle 4300 and/or the autonomous car) to retrieve their wallet from their house.

The autonomous car may open its trunk and the autonomous neighborhood bicycle 4300 may be able to situate itself (e.g., unfold and/or configure itself into an operational condition) complete the pick-up, delivering the wallet to the restaurant, re-collapse itself, and return to the trunk of the autonomous car. Rather than missing the dinner or burdening another individual, the individual may be able to retrieve their wallet by simply walking outside the restaurant and removing their wallet from the storage compartment.

Figure 44:
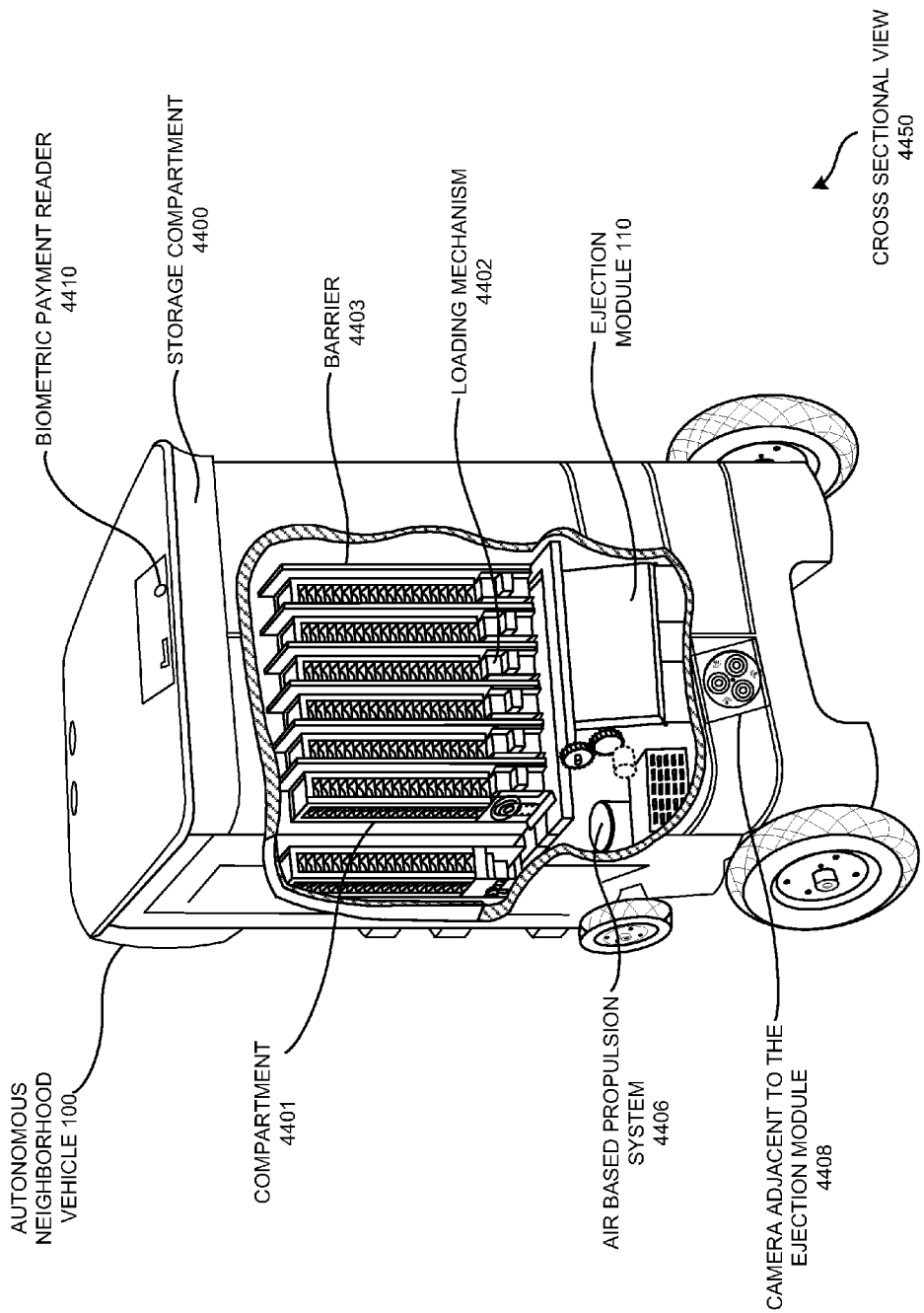
FIG. 44 is a cross sectional view of a storage compartment showing separate compartments and an ejection module, according to one embodiment.

FIG. 44 is a cross sectional view 4450 of a storage compartment 4400 of the autonomous neighborhood vehicle 100, according to one embodiment. The storage compartment 4400 may have separate compartments 4401 capable of keeping their contents separate from other compartments 4401 and/or other items 4502 in the same compartment 4401. The compartment(s) 4401 may have a suspension system capable of keeping the contents of the compartment(s) 4401 stable and/or protected. In one embodiment, the compartments 4401 may be able to be kept at different temperatures and/or humidity levels via the temperature control module 246. In one embodiment, the compartments 4401 may be separated by barriers 4403 capable of absorbing, deflecting, canceling etc. temperatures and able to keep humidity levels and temperatures separate between compartments 4401.

In one embodiment, the autonomous neighborhood vehicle 100 and/or the storage compartment 4400 may have a loading mechanism 4402 capable of loading items 4502 from any number and/or combination of compartments 4401 to the ejection module 110. An air based propulsion system 4406 may work in concert with the camera adjacent to the ejection module 4408 to eject the object from the ejection module 110 to a targeted destination. In one embodiment, the autonomous neighborhood vehicle 100 and/or the storage compartment 4400 may possess multiple ejection modules 110, air based propulsion systems 4406 and/or cameras adjacent to the ejection module 4408. The user (e.g., recipient 4214) may be able to make a payment via a biometric payment reader 4410 on the autonomous neighborhood vehicle 100.

Figure 45:
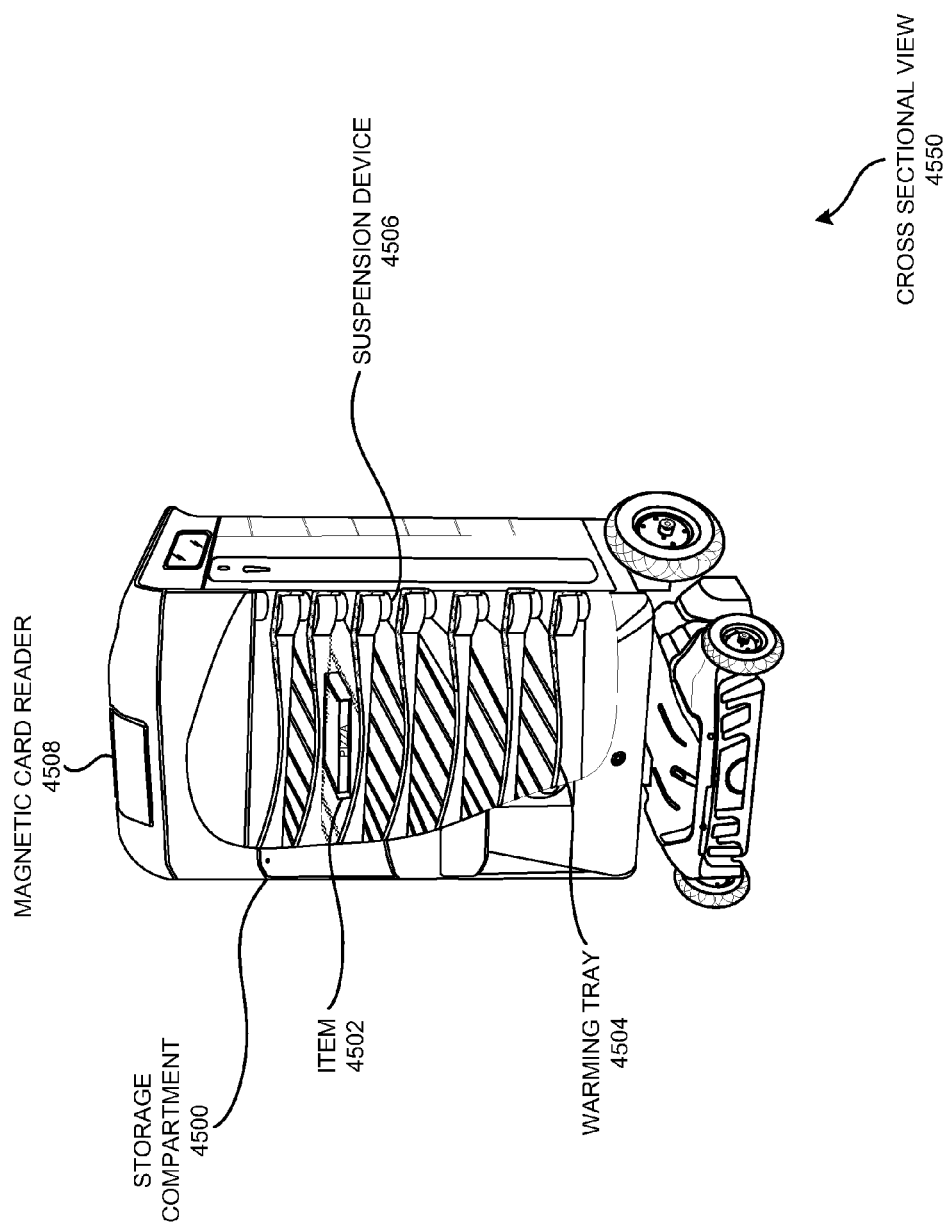
FIG. 45 is a cross sectional view of a storage compartment showing an item and warming trays, according to one embodiment.

FIG. 45 is a cross sectional view 4550 of a storage compartment 4500 of the autonomous neighborhood vehicle 100, according to one embodiment. Particularly, FIG. 45 shows the storage compartment 4500, an item 4502, and warming trays 4504. In one embodiment, the storage compartment 4500 may have several trays capable of storing items 4502 on separate levels. The trays may be warming trays 4504 capable of warming items (e.g., pizza boxes) placed on the tray and/or cooling trays capable of cooling items 4502 placed on the tray (not shown). A suspension device 4506 may keep the item 4502 stable in transit and/or may absorb shocks and/or correct for forces acting on the interior of the storage compartment 101. The recipient 4214 may be able to pay using a magnetic card reader 4508 on the autonomous neighborhood vehicle 100.

Figure 46A:
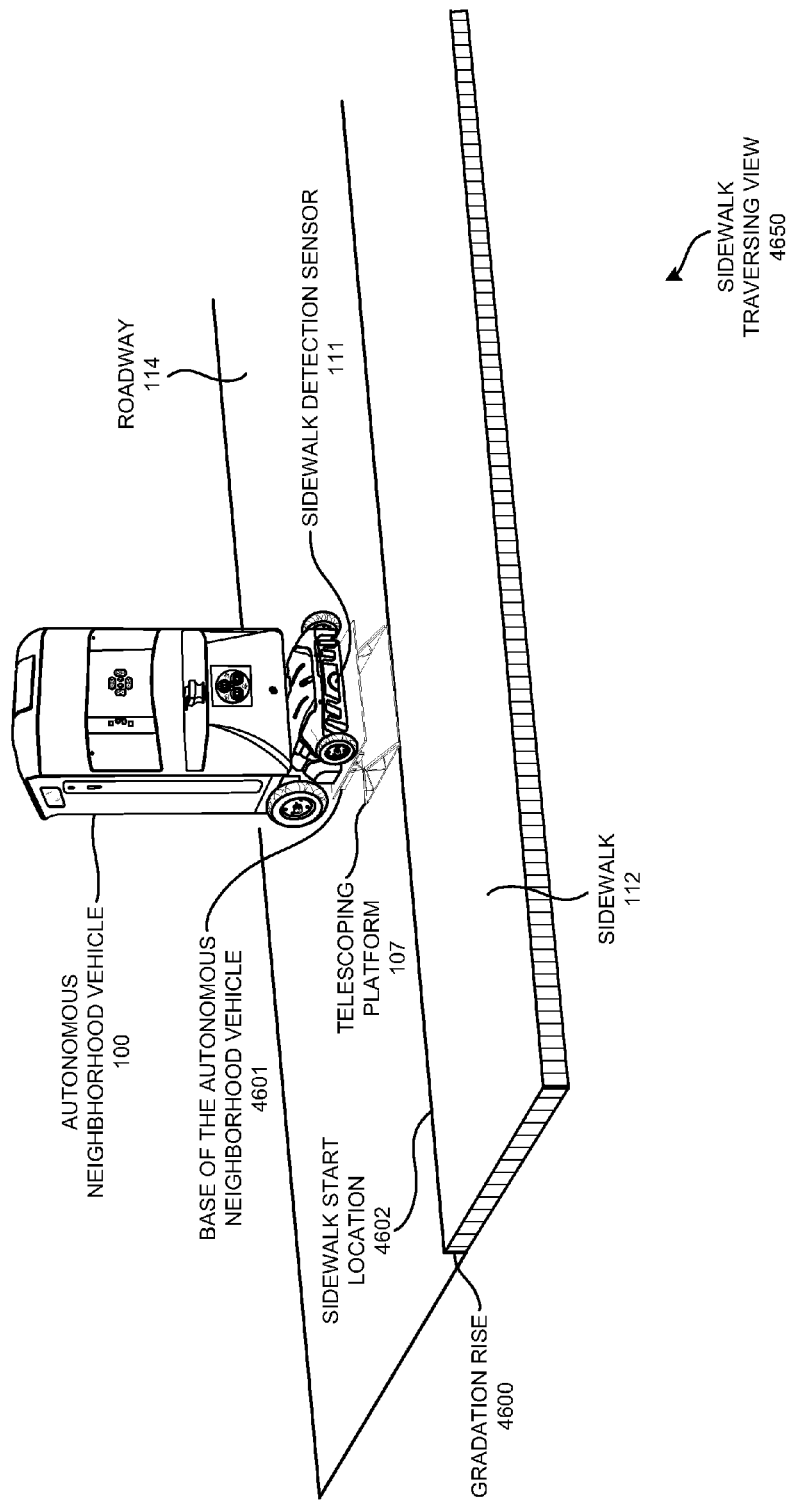
FIG. 46A is a sidewalk traversing view of the autonomous neighborhood vehicle mounting a sidewalk, according to one embodiment.

FIG. 46A is a sidewalk traversing view 4650 of the autonomous neighborhood vehicle using the telescoping platform to mount a sidewalk, according to one embodiment. The sidewalk detection sensor 111 may detect that a sidewalk is present (e.g., blocking the path of the autonomous neighborhood vehicle 100) by sensing a gradation rise 4600 of a sidewalk start location 4602. The telescoping platform 107 may elevate the autonomous neighborhood vehicle 100 from the roadway 114 so that the wheels are level with the surface of the sidewalk 112. The telescoping platform may shift the autonomous neighborhood vehicle 100 in such a way that the wheels meet the sidewalk 112 surface.

Once the rest of the autonomous neighborhood vehicle 100 is securely on the surface of the sidewalk 112, the telescoping platform 107 may return (e.g., re-ascend and/or collapse) itself to its original position and/or orientation (e.g., at the base of the autonomous neighborhood vehicle 4601 now located on the sidewalk 112). In one embodiment, the telescoping platform may be capable of rotating 360 degrees around a vertical axis, allowing the autonomous neighborhood vehicle 100 to mount the sidewalk 112 at a 90 degree angle from where it was facing on the roadway 114. It will be appreciated by one with skill in the art that other methods for raising and/or lowering the autonomous neighborhood vehicle 100 so as to traverse a gradation change are possible.

Figure 46B:
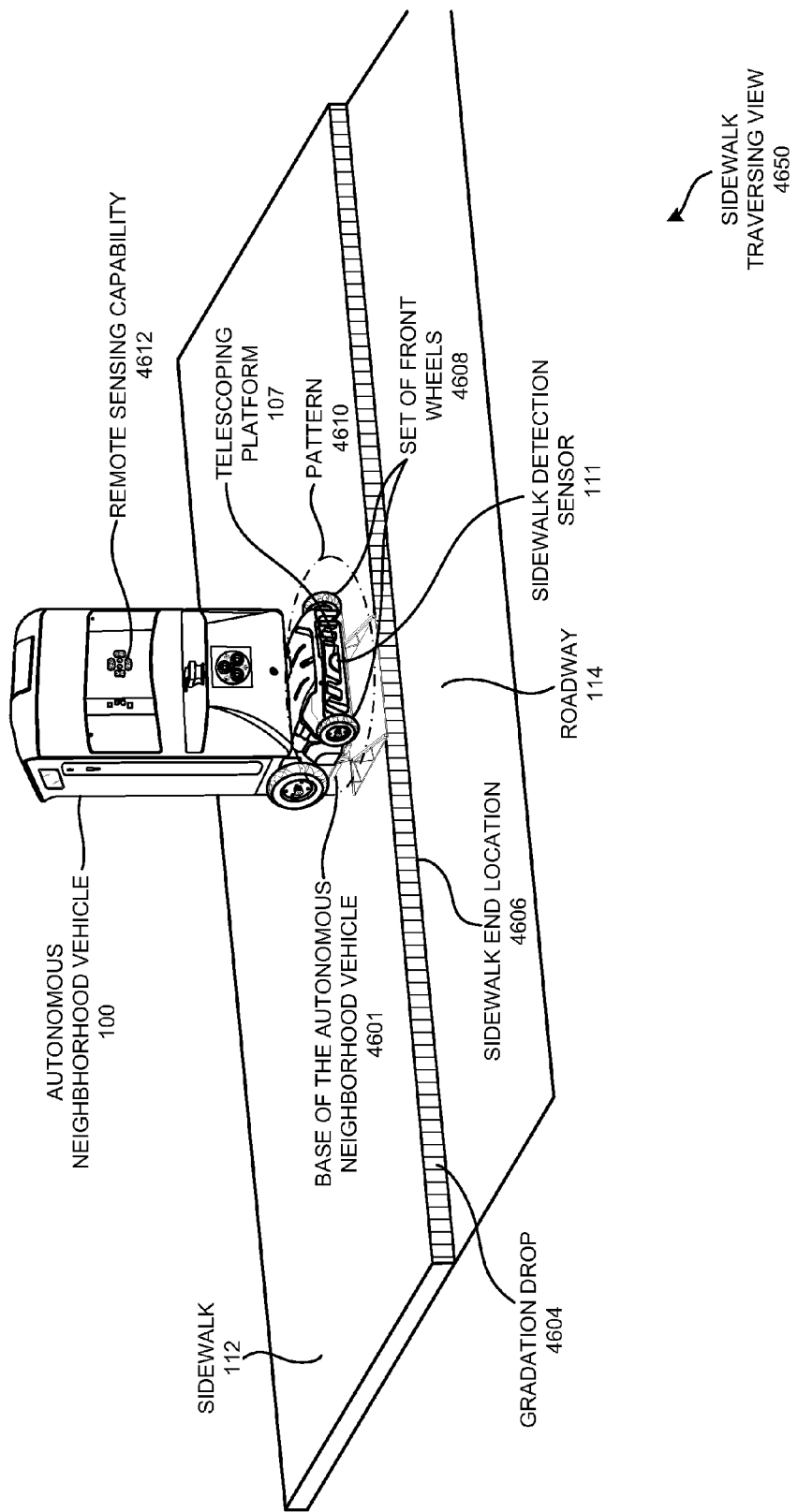
FIG. 46B is a sidewalk traversing view of the autonomous neighborhood vehicle dismounting a sidewalk, according to one embodiment.

FIG. 46B is a sidewalk traversing view 4651 of the autonomous neighborhood vehicle using the telescoping platform to dismount a sidewalk, according to one embodiment. The sidewalk detection sensor 111 may detect that a sidewalk is ending by sensing a gradation drop 4604 of a sidewalk end location 4606. In one embodiment, the telescoping platform 107 may first lower a set of front wheels 4608 to the roadway 114. The autonomous neighborhood vehicle 100 may move itself forward off the sidewalk 112 with its set of front wheels 4608 on the roadway 114 and its rear wheels on the sidewalk 112. Once the rear wheels reach the sidewalk end location 4606, the rear wheels may seamlessly be lowered to the roadway in a manner such that the contents of the autonomous neighborhood vehicle 100 are not disturbed by the change in elevation. Other methods for raising and/or lowering the autonomous neighborhood vehicle to traverse gradation changes are possible. FIG. 46B also shows a pattern 4608 of the wheels allowing the autonomous neighborhood vehicle to traverse obstacles and/or different terrains. A remote sensing capability 4612 of the autonomous neighborhood vehicle 100.

Figure 47:
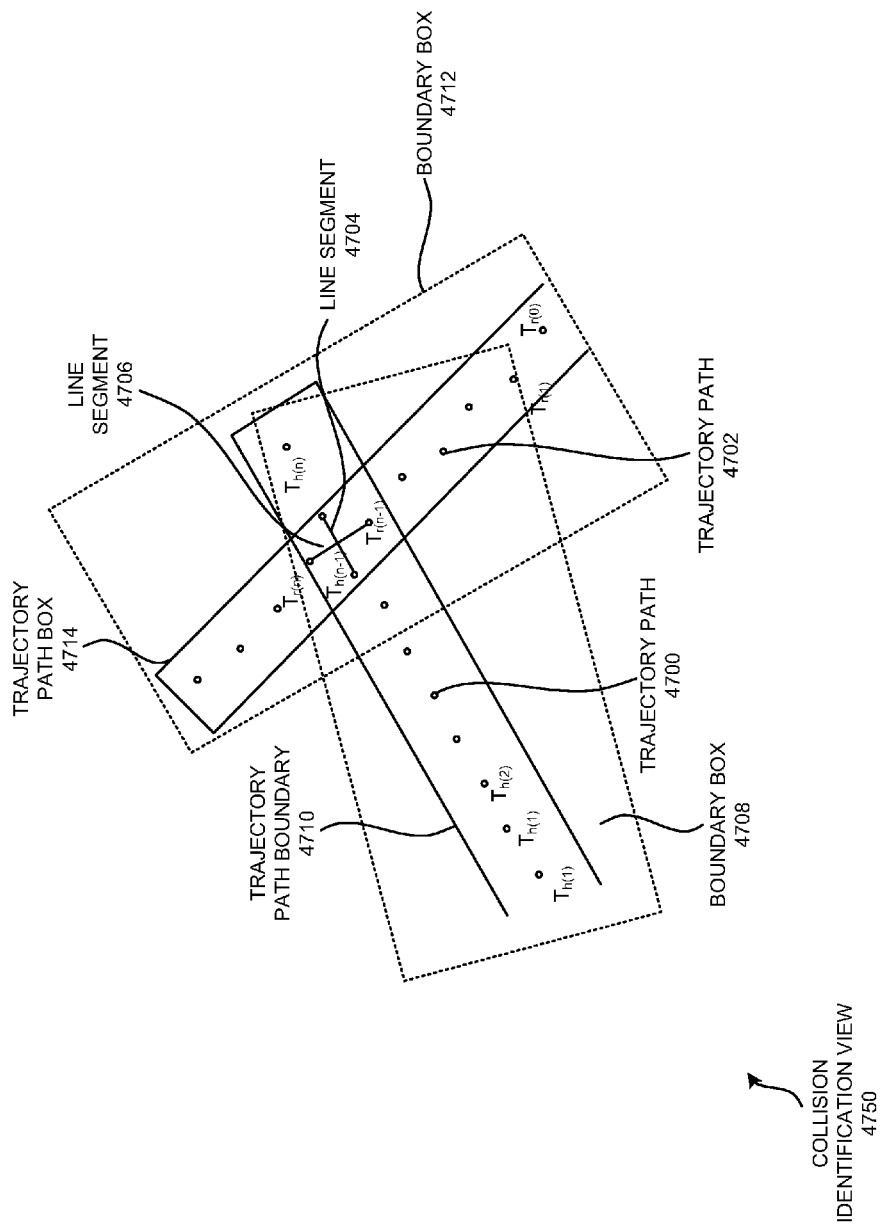
FIG. 47 is a collision identification view of trajectory paths, according to one embodiment.

FIGS. 47-51 illustrate collision identification view 4750, 4850, 4950, 5050, and 5150 of exemplary steps for rapidly identifying the location of the potential collision. FIG. 47 illustrates the trajectory path 4700 (e.g., the optimal route 802) of the autonomous neighborhood vehicle 100 and the trajectory path 4702 of another entity (e.g., a car, another autonomous neighborhood vehicle 100, a bicycle, an animal). The trajectory path 4700 of the autonomous neighborhood vehicle 100 is viewed as a plurality of line segments with each line segment constructed between positions of time.

For example, a first line segment is represented by a line constructed between $t_{h(0)}$ and $t_{h(1)}$, a second line segment is represented by a line constructed between $t_{h(1)}$ and $t_{h(2)}$, and so forth. The trajectory path of another entity is also viewed as line segments constructed between time positions. For example, a first line segment is represented by a line constructed between $t_{r(0)}$ and $t_{r(1)}$, a second line segment is represented by a line constructed between $t_{r(1)}$ and $t_{r(2)}$, and so forth. The location of the potential intersection of the trajectory path 4700 of the autonomous neighborhood vehicle 100 and the trajectory path 4702 of the another entity is at a location where the line segment of the autonomous neighborhood vehicle 100 represented by $t_{h(n-1)}$ and $t_{h(n)}$, hereinafter referred to as line segment 4704, intersects with line segment of the another, entity represented by $t_{r(n-1)}$ and $t_{r(n)}$ $t_{h(n)}$, hereinafter referred to as line segment 4706. A determination of where the intersection is located can be computationally extensive if all line segments of the autonomous neighborhood vehicle 100 and the line segments of the another entity required intersecting analysis. That is, a comprehensive analysis would require that the first line segment of the trajectory path 4700 of the autonomous neighborhood vehicle 100 and the first line segment of the trajectory path 4702 of the another entity are analyzed to determine if an intersection is present.

If no intersection exists, then the first line segment of the trajectory path 4700 of the autonomous neighborhood vehicle 100 is sequentially checked for an intersection with all the remaining line segments of the trajectory path 4702 of the another entity. If no intersection is detected, then a second line segment of the trajectory path would be sequentially analyzed for an intersection with all the line segments of the trajectory path 4702 of another entity. Each remaining line segment of the trajectory path 4700 of the autonomous neighborhood vehicle 100 would be sequentially analyzed with the each line segment of the trajectory path 4702 of the another entity until an intersection is detected. Depending on the number of line segments, such an assessment could be time consuming and computationally extensive.

The advantage of the embodiments described herein provides for a rapid assessment for determining the intersection of the two trajectory paths. As illustrated in FIG. 47, a boundary box 4708 is constructed around the trajectory path boundary 4710, and a boundary box 4712 is constructed around the trajectory path boundary 4714. Boundary boxes 4708 and 4712, in the shape of rectangles, form envelopes (separate from the envelope 900) around the entire trajectory path boundary of each vehicle and/or entity.

Figure 48:
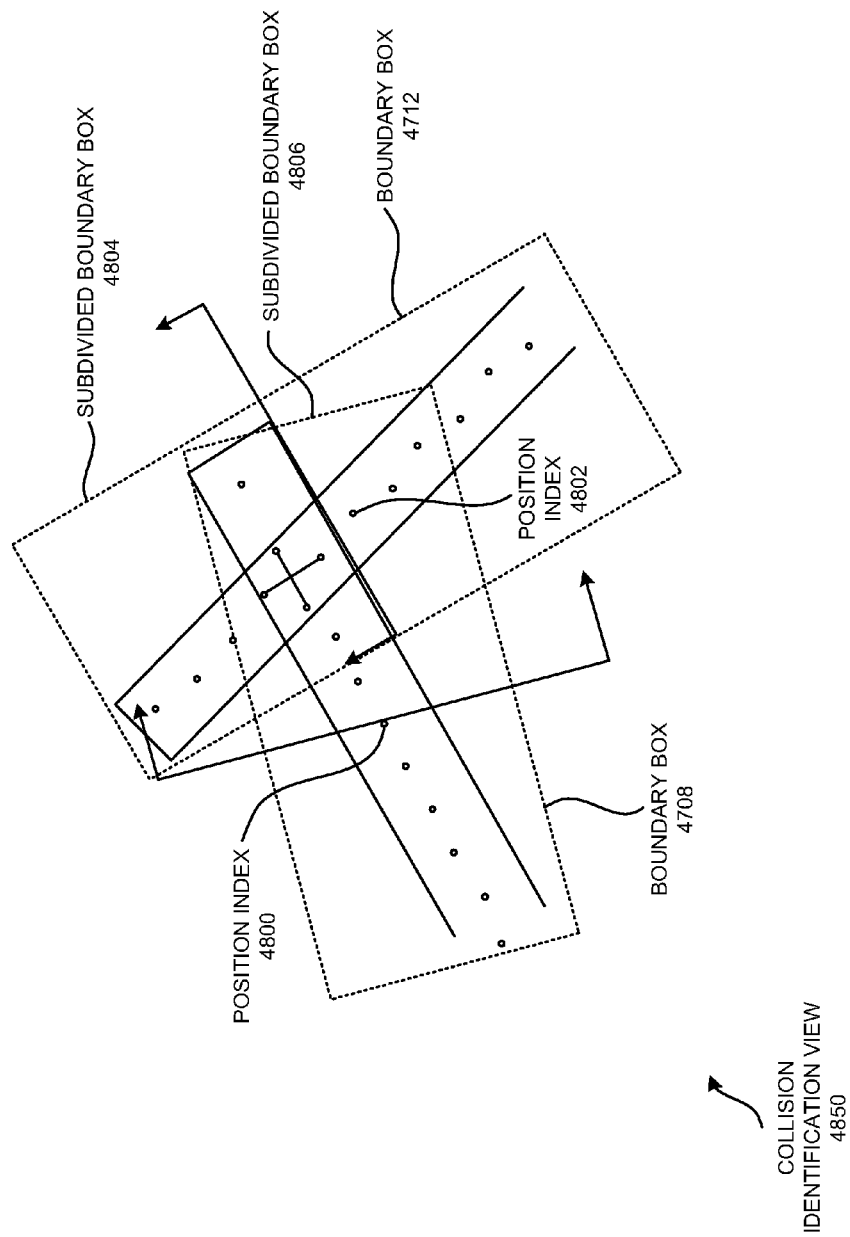
FIG. 48 is a collision identification view of identification of midway position index locations of each boundary box, according to one embodiment.

In FIG. 48, midway position index locations of each boundary box 4708 and 4712 are identified as represented by position indexes 4800 and 4802, respectively. It should be understood that the midway of the index locations that contain the boundary box is used to divide the boundary box into portions, which may not be the midway point of the boundary box itself. Therefore, the subdivided boundary boxes may not be equal halves. Position indexes containing the boundary box 4708 and 4712 are each subdivided into two portions at the position indexes 4800 and 4802. The subdivided boundary boxes of each respective trajectory path that contain the intersecting line segments 4704 and 4706 are selected as represented by 4804 and 4806.

Figure 49:
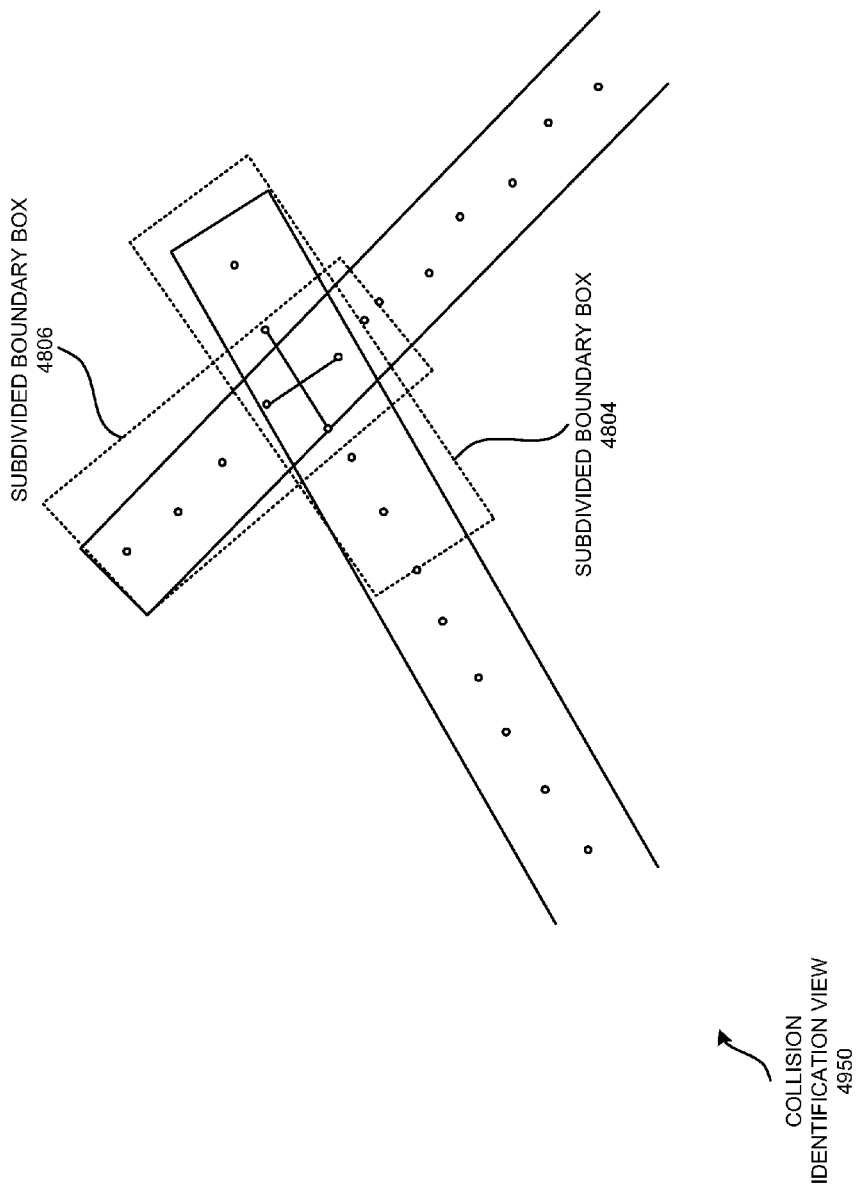
FIG. 49 is a collision identification view of subdivided boundary box regeneration, according to one embodiment.

In FIG. 49, subdivided boundary boxes 4804 and 4806 are regenerated. The boundary boxes may be regenerated by either the length and/or width based on the trajectory path of each entity (e.g., the autonomous neighborhood vehicle 100 and/or the another entity). The regenerated boxes are not required to align to a same axis the previous boundary boxes were positioned. Rather, the routine allows each boundary box to be configured to the targeted portion of the trajectory path that the routine is analyzing. As a result, the boundary box can be repositioned to accommodate to varying change of directions along the trajectory path. For each regeneration, the boundary boxes are configured adapt to the trajectory paths at the location of the collision.

Figure 50:
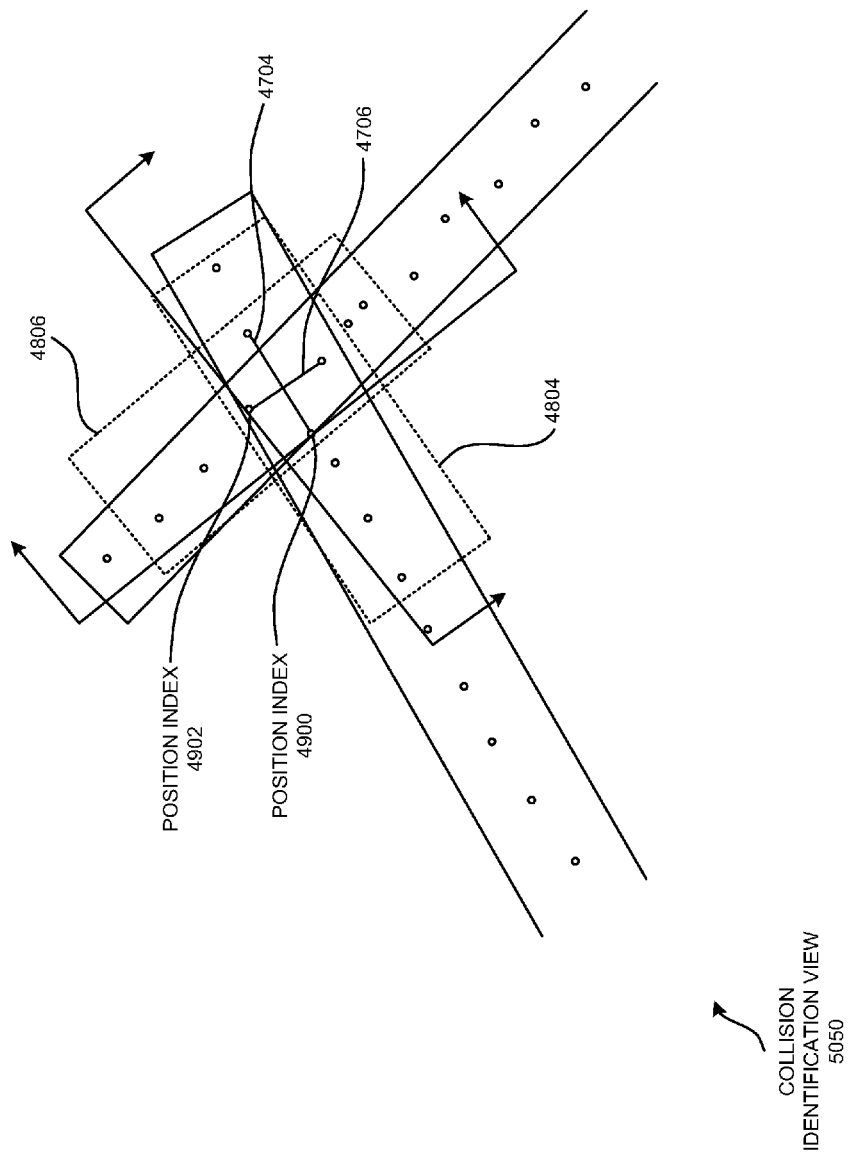
FIG. 50 is a collision identification view showing the identification of the midway position index locations of each regeneration boundary box, according to one embodiment.

In FIG. 50, the midway position index locations of each regenerated boundary box 4804 and 4806 are identified. Boundary boxes 4804 and 4806 are further subdivided into portions using the position indexes 4900 and 4902. The intersection of the subdivided portions is determined and a next set of intersecting boundary boxes are regenerated. The next set of regenerated boundary boxes includes the intersection of the trajectory paths. The routine repeatedly subdivides and regenerates the boundary boxes until only the respective intersecting line segments 4704 and 4706 are contained within the final boundary boxes. It should be understood that the subdividing of the boundary boxes may require more or less subdividing than what is shown. The subdividing of the boundary box ends when a respective remaining boundary box contains only two of the position index locations. The two positions will form line segment.

Figure 51:
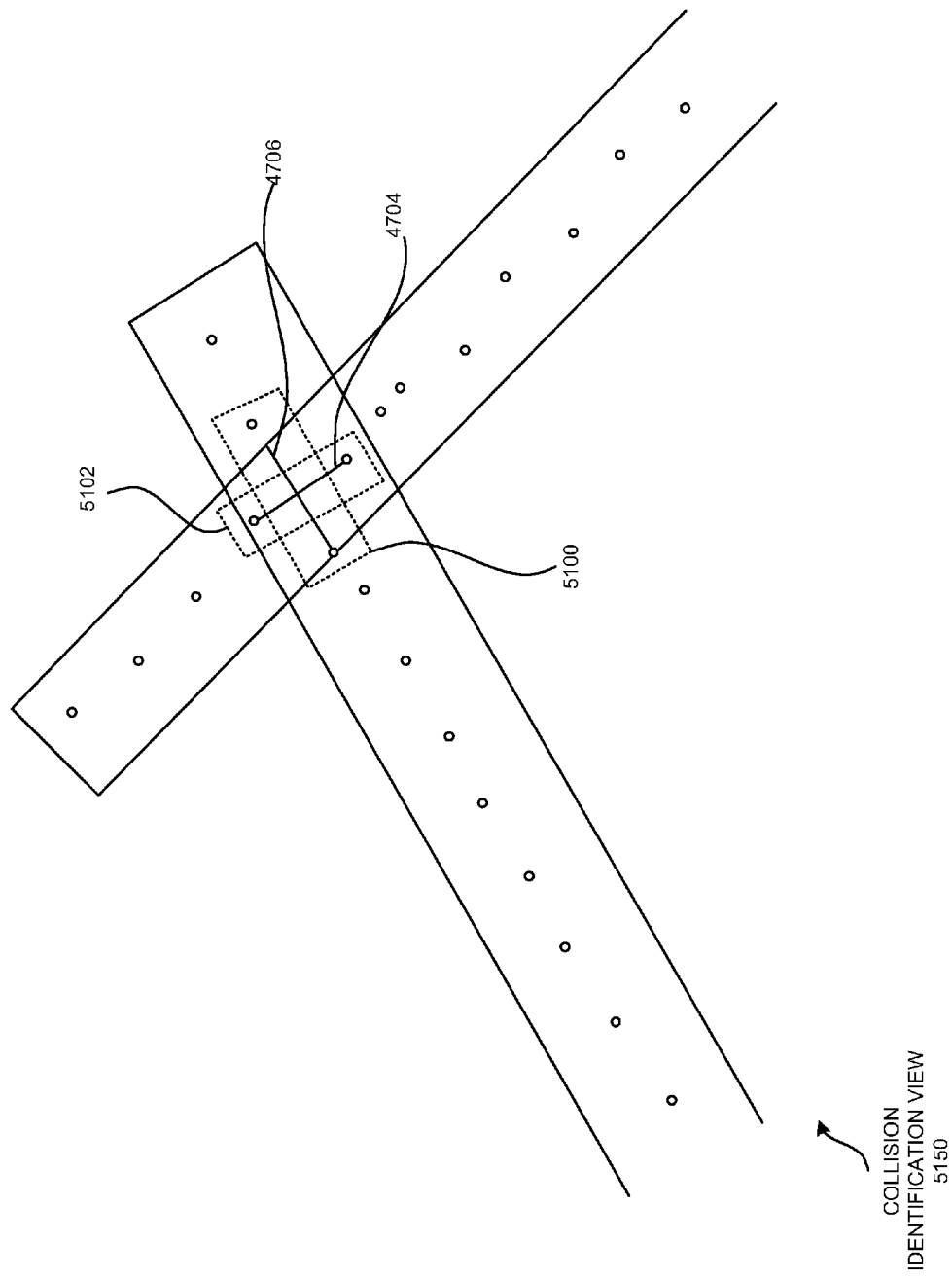
FIG. 51 is a collision identification view of a final set of regenerated boundary boxes, according to one embodiment.

FIG. 51 illustrates a final set of regenerated boundary boxes 5100 and 5102 where the line segments 4704 and 4706 intersect within their respective margins. As is shown, the only line segments that are disposed within each respective boundary box are their respective line segments. It should be understood that the technique described can used a set of index positions for identifying the intersection as opposed to the line segments. For example, it is determined that the intersection occurs between $t_{h(n-1)}$ and $t_{h(n)}$ for the autonomous neighborhood vehicle 100, and that the respective boundary box for the autonomous neighborhood vehicle 100 could be subdivided and regenerated based on the boundary box containing the set of point indexes $t_{h(n-1)}$ and $t_{h(n)}$ in contrast to a line segment.

Figure 52:
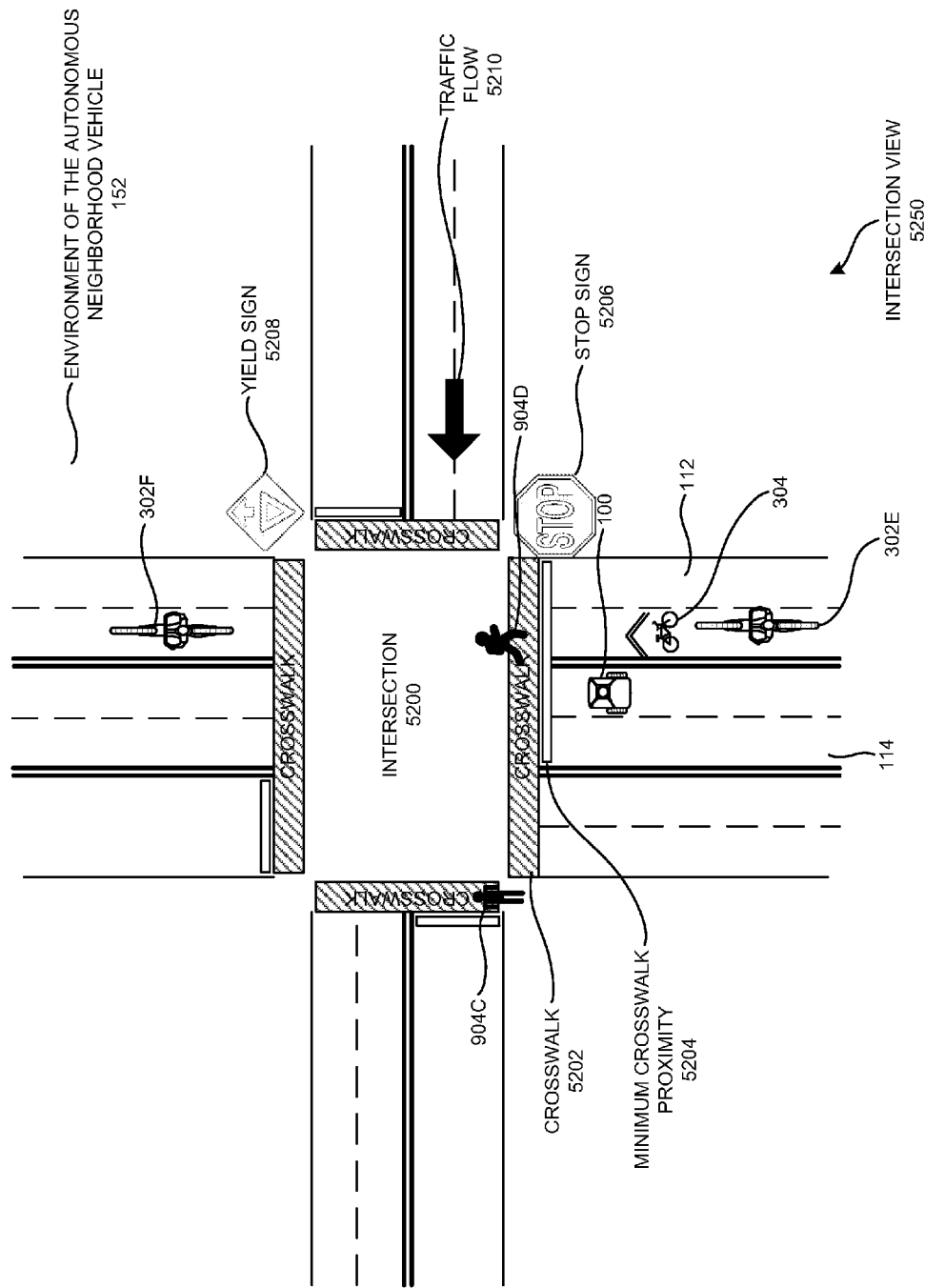
FIG. 52 is an intersection view of the autonomous neighborhood vehicle of FIG. 1A at an intersection, according to one embodiment.

FIG. 52 is an intersection view of the autonomous neighborhood vehicle 100 functioning at an intersection, according to one embodiment. As the autonomous neighborhood vehicle 100 approaches an intersection, it may use its various components (e.g., sensor system 102) to detect the vehicle's location as well as objects external to the vehicle. For example, autonomous neighborhood vehicle 100 may use data from the geographic position component (e.g., the global positioning system 218) to identify location coordinates or an address associated with the current location of the autonomous neighborhood vehicle 100. The autonomous neighborhood vehicle 100 may then access road-graph data corresponding to this location.

The autonomous neighborhood vehicle's 100 computer system 200 may use data from the sensor system 102 to detect objects in the autonomous neighborhood vehicle's 100 surroundings (e.g., the environment of the autonomous neighborhood vehicle 152). As the sensor (e.g., laser, camera 226, ultrasound unit 228) moves along, it may collect range (distance) and intensity information for the same location (point or area) from several directions and/or at different times. FIG. 52 depicts an exemplary display of sensor data collected as the autonomous neighborhood vehicle 100 approaches an intersection 5200. For example, the autonomous neighborhood vehicle 100 may be able to detect lane lines, a crosswalk 5202, traffic signs and/or lights etc. as well as their locations relative to the current location of the autonomous neighborhood vehicle 100. This relative location information may be used to identify an actual location of the object. In some examples, the computer system 200, sensor fusion algorithm 238 and/or sensor system 102 may use the road-graph and data from the sensor system 102 to increase the accuracy of the current location of the autonomous neighborhood vehicle 100, for example by comparing lane lines of intersection 5200 to lane lines of the road-graph, etc. In one embodiment, the autonomous neighborhood vehicle 100 may be able to navigate autonomously without use of and/or need for lane lines. In one embodiment, the autonomous neighborhood vehicle 100 may stop at a minimum crosswalk proximity 5304. The autonomous neighborhood vehicle may identify (e.g., sense and/or identify) a stop sign 5206, a yield sign 5208 and/or a traffic light) and proceed appropriately.

In addition to detecting fixed objects, the computer system 200, sensor fusion algorithm 238 and/or sensor system 102 may also detect the existence and geographic location of moving objects (e.g., the bicyclist 302, the car 310, the pedestrian 804 and/or an animal). The computer system 200, sensor fusion algorithm 238 and/or sensor system 102 may determine whether an object is moving or not based on the autonomous neighborhood vehicle's 100 own speed and acceleration, etc., and the data received from the sensor. For example, as shown in FIG. 52, the sensor data may be used to detect objects 610,611, and 620, corresponding to the pedestrians and bicyclist of FIG. 48, as well as their locations relative to the current location of the vehicle. This relative location information may be used to identify an actual location of the object. After some short period of time where the bicyclist and pedestrians have moved, computer 110 may determine that these features are moving based on a change in their location relative to intersection 5200.

Once the various objects in the environment of the autonomous neighborhood vehicle 152 have been detected, they may be compared to the road-graph in order to identify what the objects are. For example, the autonomous neighborhood vehicle 100 may identify lane lines from the laser data as lane lines of the road-graph. However, objects (e.g., a bicyclist 302E, a bicyclist 302F, a pedestrian 904C and/or a pedestrian 904D) will not appear on the road-graph as they are not static objects expected to reappear each time the autonomous neighborhood vehicle 100 drives through intersection 5200.

These moving (or non-static) objects may also be compared to the road-graph data for identification. Objects which are located completely or partly within a pre-defined area of the road-graph may be identified based on the area identifier. The geographic locations of the objects may be compared to the corresponding geographic locations in the road-graph. Objects may be identified by the autonomous neighborhood vehicle 100 as pedestrians based on their location (e.g., in the crosswalk 5202). Similarly, bicyclists 302E and 302F appear within bike lane 304, and the autonomous neighborhood vehicle 100 may identify the objects as a bicyclists based on their location in the bicycle lane 304 identifier, shape and/or speed.

Not every object observed in the pre-defined areas will necessarily be a pedestrian (or bicyclist). For example, other vehicles (e.g. scooters, cars, trucks) may also pass through crosswalks or move into bicycle lanes. In this regard, the identifier associated with a pre-defined area may be a hint or indication that objects in these areas may be more likely to be pedestrians or bicyclists. For example, the autonomous neighborhood vehicle's 100 computer system 200 and/or sensor fusion algorithm 238 may consider a variety of sensor data and map data which may indicate a moving object's type. These indications may include laser point cloud density, surface normal distribution, object height, object radius, camera image color, object shape, object moving speed, object motion in the past N seconds, etc. The autonomous neighborhood vehicle 100 may then consider the object's type based on the sum of these indications, for example, by using a machine learning algorithm which classifies the type of object. In one example, the machine learning algorithm may include various decision trees. The pre-defined regions may therefore allow the computer to identify certain objects, such as pedestrians and bicyclists, faster.

If the moving object cannot be identified based on the area identifiers, other identification methods may be used. For example, image and pattern matching techniques involving comparing one or more images (or laser data) of the moving object to a set of pre-identified images (or laser data), may be used to identify the moving object.

Once the moving objects have been identified, the computer system 200 may use this information to control the autonomous neighborhood vehicle 100. The computer system 200 may operate the autonomous neighborhood vehicle 100 in order to avoid injury to nearby people or the autonomous neighborhood vehicle 100 by maintaining a safe minimum distance, for example several yards, from pedestrians or bicyclists while the autonomous neighborhood vehicle is moving. For example, an autonomous neighborhood vehicle 100 may stop where the pedestrian 904D is identified in the crosswalk 5250 in front of the autonomous neighborhood vehicle 100, or the autonomous neighborhood vehicle 100 may not pass the bicyclist 302F unless the autonomous neighborhood vehicle 100 is able to maintain the minimal distance (e.g., in compliance with the envelope 900). In another example, the type of action may be based on the object detected by the autonomous neighborhood vehicle 100 and/or the conditions in which the autonomous neighborhood vehicle operates (e.g., the state of the environment of the autonomous neighborhood vehicle 152).

For example, the autonomous neighborhood vehicle may have a larger minimum distance at which it may stop at crosswalks 5202 when it is raining and/or may have a larger minimum distance that must be maintained between the autonomous neighborhood vehicle 100 and a pedestrian than between the autonomous neighborhood vehicle 100 and a traffic cone. In one embodiment, before the autonomous neighborhood vehicle 100 may continue along its route (e.g., enter the intersection, make a turn, continue to move), the pedestrian 904D may have to clear the crosswalk 5202 and/or the roadway 114. The bicyclist 302E may be required to exit the intersection 5200 before the autonomous neighborhood vehicle 100 may continue along its route.

Figure 53:
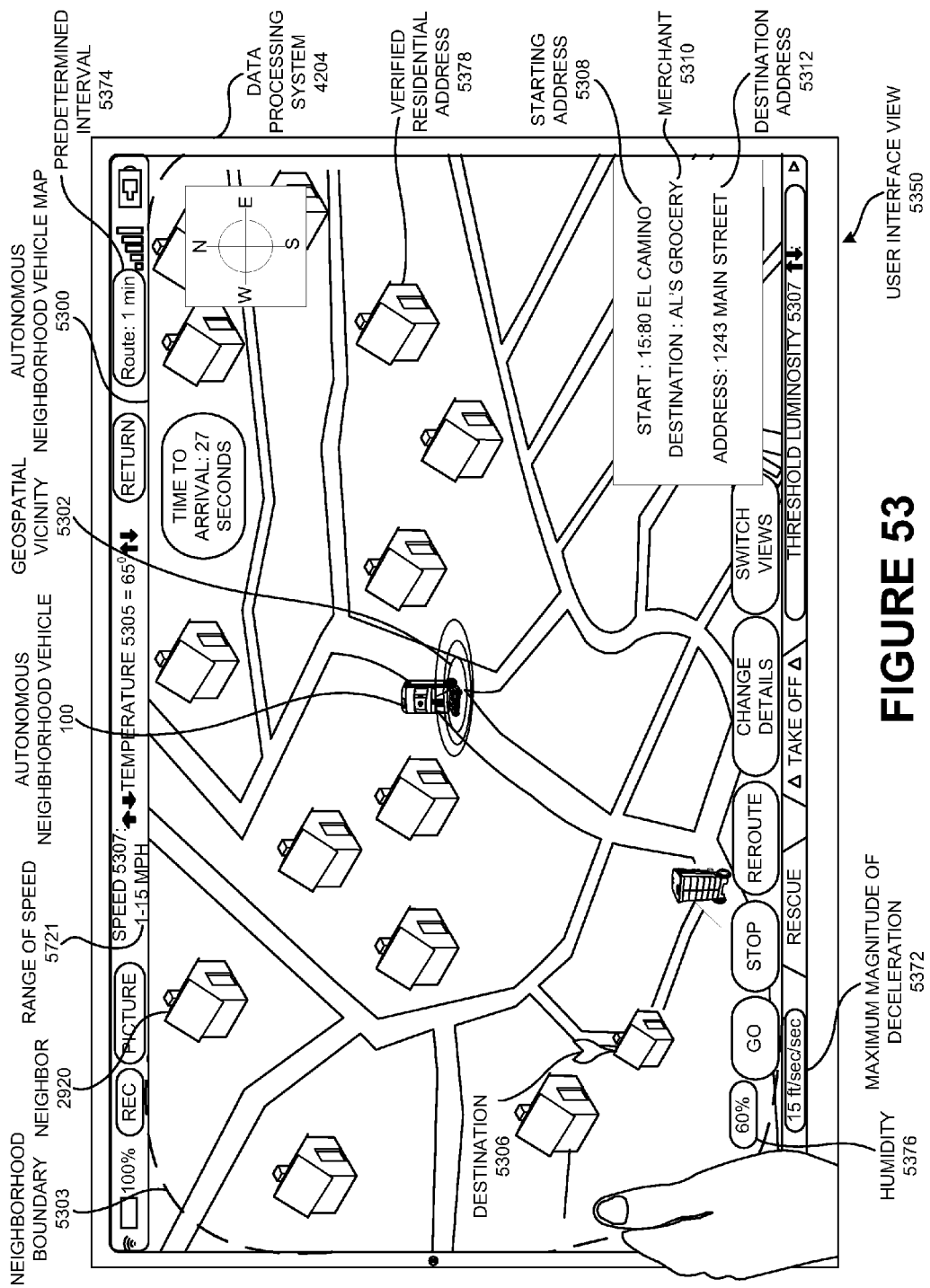
FIG. 53 is a user interface view of the data processing system of FIG. 42 displaying an autonomous neighborhood vehicle map, according to one embodiment.

FIG. 53 is a user interface view 5350 of the data processing system 4204 showing the autonomous neighborhood vehicle in a neighborhood, according to one embodiment. The user of the autonomous neighborhood vehicle 100 (e.g., the user 2916, a renter and/or an owner) may be able to view the location of the autonomous neighborhood vehicle 100 on a neighborhood map on the data processing system 4204. The user (e.g., the user 2916) may be able to select options on the data processing system 4204. A stop function may allow the user to remotely stop the autonomous neighborhood vehicle 100, a go function may allow the user to remotely make the autonomous neighborhood vehicle 100 move and/or begin a deliver and/or pick-up submitted by the user.

The user may be able to change the route taken by the autonomous neighborhood vehicle, the destination and/or return location by selecting a reroute function. A change details function may allow the user to alter aspects of the task (e.g., pick-up and/or delivery). The user may be able to update a shopping list, alter a desired pick-up and/or drop-off time, alter humidity levels, alter temperature, alter constrains of the autonomous neighborhood vehicle (e.g., the envelope 900 and/or a maximum speed). In one embodiment, the autonomous neighborhood vehicle may have set constraints that may not be altered and/or have set ranges that allow users to alter constraints within the set ranges. The user may be able to select a switch views function that may enable the user to switch between an aerial view (shown in FIG. 53), a street view (e.g., a view through the camera 226), a view through any other sensor and/or a rear view). A "take off" function may enable the user to signal to the autonomous neighborhood vehicle 100 to begin its task. A rescue function may contact repair services and/or notify the owner of the autonomous neighborhood vehicle if there is an issue (e.g., breakdown, blown tire, the autonomous neighborhood vehicle gets stuck).

The user interface may show an autonomous neighborhood vehicle map 5300 with a current location of the autonomous neighborhood vehicle 5406 (shown in FIG. 54), a geospatial vicinity 5302, a neighborhood boundary 5303, the neighbor 2902, a destination 5306, and/or other autonomous neighborhood vehicles 100. In one embodiment the user may be able to view the profile of the neighbor 2902 and/or create bi-directional communication with the neighbor 2902 (e.g., request to use their autonomous neighborhood vehicle 100) by selecting the neighbor's icon on the map of the neighborhood 1402A (e.g., the autonomous neighborhood vehicle map 5300. The user may be able to view a starting address 5308 of the autonomous neighborhood vehicle 100, a destination address 5312, and/or a merchant 5310 and/or destination 5306.

In one embodiment, the user (e.g., user 2916) may be able to record a video and/or audio (e.g., using the sensor system 102 of the autonomous neighborhood vehicle 100), take pictures, alter the speed, alter the temperature of the storage compartment 101 (e.g., using the temperature control module 246), and/or order the autonomous neighborhood vehicle to return (e.g., to the start location (e.g., start address 5308) or the user location 5408). The user may be able to view the amount of energy of the autonomous neighborhood vehicle 100 that remains. In one embodiment, the user may be able to view a radius (e.g., maximum distance) the autonomous neighborhood vehicle is able to travel. In one embodiment, the user may be able to view a time to arrival 5412 (shown in FIG. 54). Altering the speed may include increasing and/or decreasing the speed 5307. In one embodiment, a range of speed 5721 may be a minimum and/or a maximum speed at which the autonomous neighborhood vehicle 100 may travel. A predetermined interval 5374 may be set automatically or by the user for when the autonomous neighborhood vehicle 100 determines is a different route that is more efficient than the optimal route exists. The autonomous neighborhood vehicle 100 may calculate the route and travel along the route once it is determined to exist.

Figure 54:
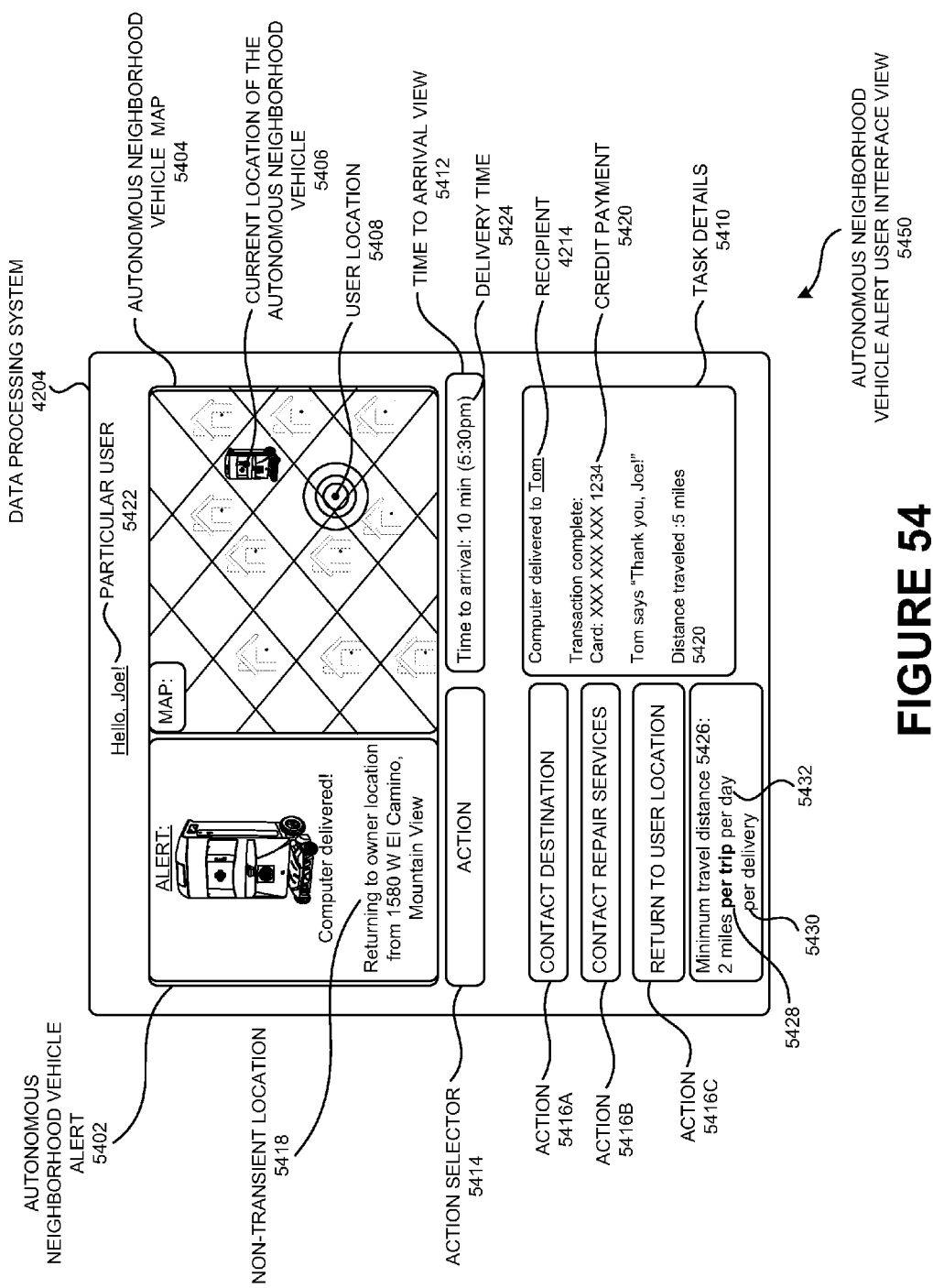
FIG. 54 is an autonomous neighborhood vehicle alert user interface view of the data processing system of FIG. 42 receiving an autonomous neighborhood vehicle alert, according to one embodiment.

FIG. 54 is an autonomous neighborhood vehicle user interface view 5450 of a data processing system 4204 receiving an autonomous neighborhood vehicle alert, according to one embodiment. Particularly, FIG. 49 shows an autonomous neighborhood vehicle alert 1302, the autonomous neighborhood vehicle map 5300, the autonomous neighborhood vehicle's current location 5406, a user location 5408, a delivery details 5410, the recipient 4214, a time to arrival view 5412, an action selector 5414, action 5416A, action 5416B, action 5416C, a non-transient location 5418, a credit payment 5420, a particular user 5422, a delivery time 5412, a minimum travel distance 5426, a minimum travel distance per trip 5428, minimum travel distance per day 5432, and minimum travel distance per delivery 5439.

In one embodiment, the user 2916 (e.g., owner of the autonomous neighborhood vehicle, user of the autonomous neighborhood vehicle) may be able to receive autonomous neighborhood vehicle alerts 5402 on the data processing system 4204 associated with the user 2916. The autonomous neighborhood vehicle alert 5402 may alert the user 2916 when the autonomous neighborhood vehicle 100 arrives at the destination 5306, departs from the destination 5306, when items 4502 (shown in FIG. 45) have been removed and/or added, when stuck (e.g., at a traffic light, in traffic, in a ditch), when a breakdown occurs, when a certain amount of time has elapsed, when a threshold distance traveled has elapsed, when energy levels reach a threshold level, when another user requests to use (e.g., rent) the autonomous neighborhood vehicle 100, when the lock 1218 has been tampered with, when there is an attempted theft etc.

The user 2916 (e.g., the owner of the autonomous neighborhood vehicle) may be able to view the autonomous neighborhood vehicle map 5300 via the dat processing system 4204. In one embodiment, the autonomous neighborhood vehicle map 5404 may display the current autonomous neighborhood vehicle location 5406 and/or the user location 5408 (e.g., the user's current location and/or the claimed geospatial location 700). The autonomous neighborhood vehicle map 5300 may also display the destination 5306, according to one embodiment. In another embodiment, other users of the geospatially constrained social network 4242 may be able to view the current location of the autonomous neighborhood vehicle 5406 and/or may be able to request use of the autonomous neighborhood vehicle 100 if the autonomous neighborhood vehicle 100 (e.g., autonomous neighborhood bicycle 4300) is within a threshold radial distance 4219 from the location of the other users (e.g., current location and/or claimed location(s)).

The delivery details 5410 may allow the user to view confirmation that a task (e.g., a delivery and/or a pick-up) has been completed, that the item 4502 (shown in FIG. 45) has been placed in the autonomous neighborhood vehicle 100, to indicate a status of the autonomous neighborhood vehicle 100 etc. In one embodiment, a financial transaction may be completed through the commerce server 4200. The user 2916 (e.g., owner of the autonomous neighborhood vehicle and/or sender of the items delivered by the autonomous neighborhood vehicle) may be able to see account information and/or the profile of the recipient 4214 and/or alter their own account information via the data processing system 4204. The other user (e.g., the recipient of the delivery) may be able to submit comments to the user 2916 (e.g., information about the delivery, a thank you, a request for further deliveries, a request for use of the autonomous neighborhood vehicle etc.).

The time to arrival view 5412 may indicate the time (e.g., time remaining, estimated time of arrival) until the autonomous neighborhood vehicle 100 arrives at its destination 5306 and/or returns from its destination 5306. The action selector 5414 may allow the user to select an action in response to the autonomous neighborhood vehicle alert 5402. In one embodiment, the user may select any number of actions (e.g., action 5416A and/or action 5416B and/or action 5416C). Action 5416A may enable the user to contact the destination (e.g., the individual, the shop, the company) and/or establish bi-directional communication. Action 5416B may allow the user to contact repair services (e.g., in the case of a break down). Action 5416C may allow the user to command the autonomous neighborhood vehicle 100 to return to the user's location (e.g., the owner's current location and/or the owner's claimed geospatial location(s), the user's (e.g., renter's) current location). In one embodiment, the user may be able to allow other users to user (e.g., rent) the autonomous neighborhood vehicle 100 via the action selector 5414, change a destination, and/or add additional destinations to the route.

Figure 55:
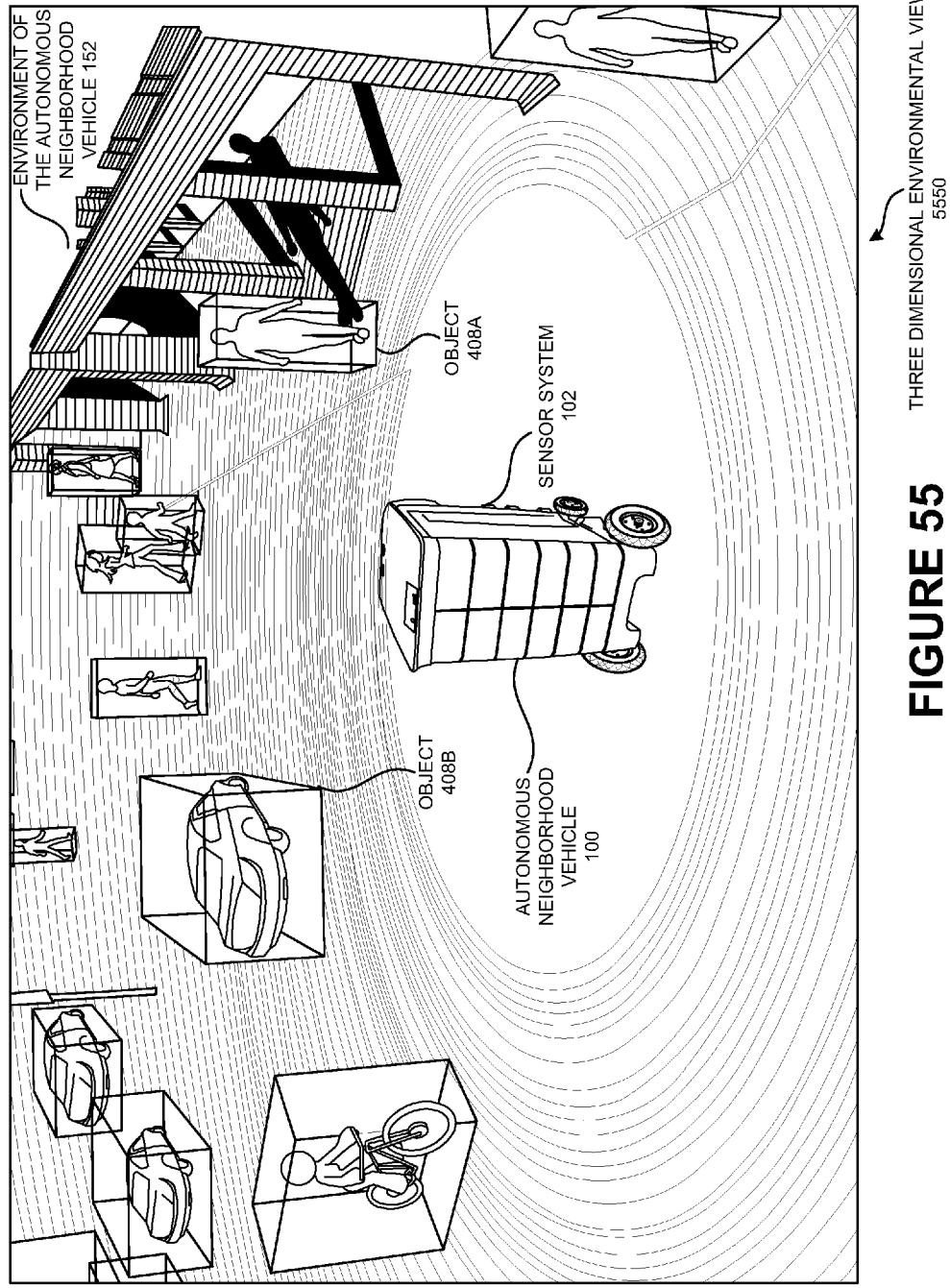
FIG. 55 is a three dimensional environmental view of the autonomous neighborhood vehicle of FIG. 1A using a LIDAR sensor to scan its environment, according to one embodiment.

FIG. 55 is a three dimensional environmental view 5500 of the laser rangefinder/LIDAR unit of the sensor system creating a map of the environment of the autonomous neighborhood vehicle, according to one embodiment. The laser rangefinder/LIDAR unit 224 of the autonomous neighborhood vehicle's 100 sensor system 102 may use multiple lasers to map its surroundings, measuring a time-to-distance correlation of each laser in a series to capture the distance data from each point. The multiple lasers may be emitted in such a way that a 360 degree scan may be gathered. This may allow the autonomous neighborhood vehicle to gather very large amounts of data in a short amount of time, creating detailed scans of its surroundings.

In the embodiment illustrated in FIG. 55, the sensor system 102 autonomous neighborhood vehicle 100 detects multiple objects in its environment. The autonomous neighborhood vehicle 100 may, using the sensor fusion algorithm 238, be able to identify an object 408A as a pedestrian based on its shape, speed and/or location (e.g., on the sidewalk). An object 408B may be identified as a car based on similar criteria. In one embodiment, the autonomous neighborhood vehicle 100 may have multiple laser rangefinder/LIDAR units 224 so that a 360 degree scan can be achieved. In one embodiment, the three dimensional environmental view 5500 may be captured and/or created by multiple sensors working in concert.

Figure 56:
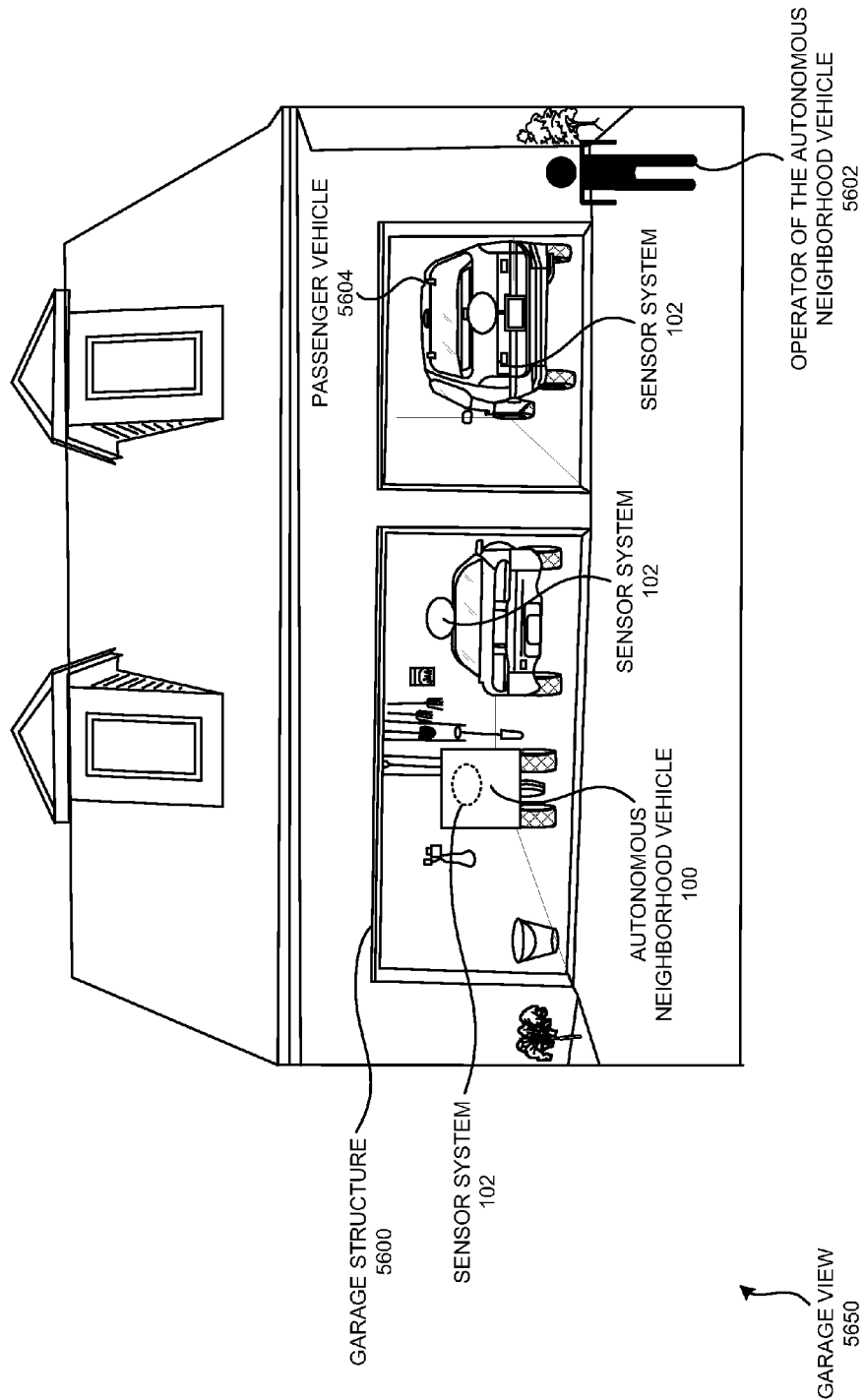
FIG. 56 is a garage view of a family garage with the autonomous neighborhood vehicle of FIG. 1A and two autonomous cars, according to one embodiment.

FIG. 56 is a garage view 5650 of a garage structure 5600 contacting two passenger vehicles 5604 (autonomous cars), an operator of the autonomous neighborhood vehicle 5602, and an autonomous neighborhood vehicle 100, according to one embodiment. Individuals may be able to purchase the autonomous neighborhood vehicle 100 and/or store it in their garage. Families may have multiple autonomous cars for personnel transportation along with the autonomous neighborhood vehicle 100 for running errands. In the shown embodiment of FIG. 56, the autonomous neighborhood vehicle 100 has an internal sensor system (e.g., no sensors mounted on top of or on the surface of the autonomous neighborhood vehicle). The autonomous cars are shown with one having a top mounted sensor system 102 (e.g., a LIDAR sensor) and one having an internal sensor system (e.g., a non-surface mounted sensor system).

Figure 57:
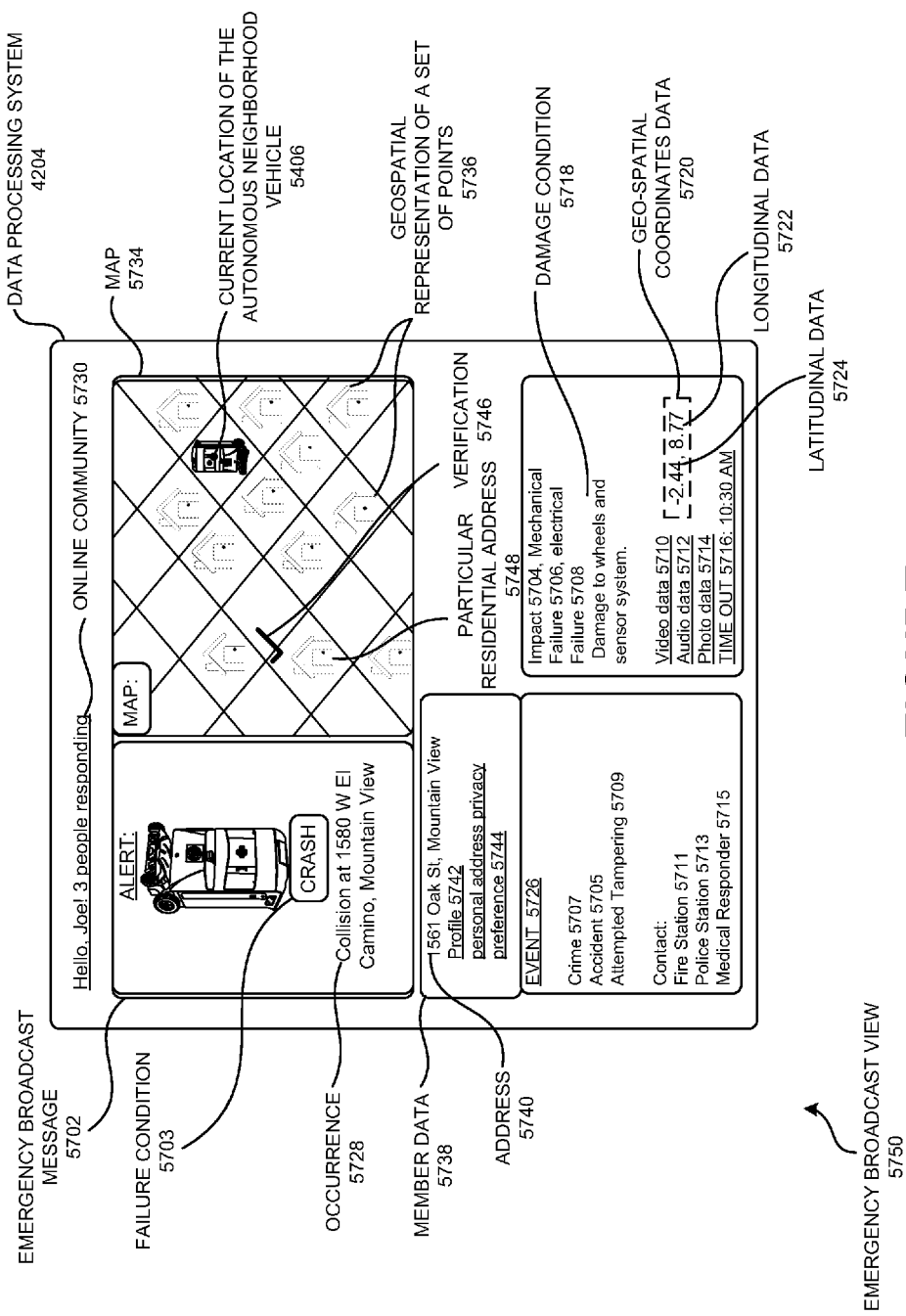
FIG. 57 is an emergency broadcast view of the data processing system of FIG. 42 receiving an emergency broadcast message, according to one embodiment.

FIG. 57 is an emergency broadcast view of the data processing system of FIG. 42 receiving an emergency broadcast message, according to one embodiment. Particularly, FIG. 57 shows an emergency broadcast message 5702, a failure condition 5703, an impact 5704, an accident 5705, a mechanical failure 5706, a crime 5707, an electrical failure 5708, an attempted tampering 5709, a video data 5710, a fire station 5711, an audio data 5712, a police station 5713, a photo data 5714, a medical responder 5715, a time out 5716, a damage condition 5718, a geo-spatial coordinates data 5720, a longitudinal data 5722, a latitudinal data 5724, an event 5726, an occurrence 5728, an online community 5730, a map 5734, a geospatial representation of a set of points 5736, a member data 5738, an address 5740, a profile 5742, a personal address privacy preference 5744, a verification 5746, and a particular residential address 5748.

In one embodiment, the emergency broadcast message 5702 may be sent to the data processing system 4204 of a recipient 4214 having a verified address in a threshold distance from the event (e.g., the occurrence 5728 of the failure condition 5703). In one embodiment, the emergency broadcast message 5702 may be sent to a service provider 4209 (e.g., the fire station 5711, the police station 5713, and/or the medical responder 5715). The recipient 4214 of the emergency broadcast message 5702 may be able to respond to the message, see the location of the event 5726 on the map 5734 (e.g., the current location of the autonomous neighborhood vehicle 5406), view video data 5710, audio data 5712, photo data 5714 and/or the geo-spatial coordinates data 5720. In one embodiment, the user (e.g., the recipient 4214) may be able to view and/or alter their profile and/or information (e.g., address 5740 and/or personal address privacy preference 5744) on the data processing system 4204.

People in suburbia and urban cities now may not even know who their neighbors are. Communities have become more insular. There may be a few active people in each neighborhood who know about their neighborhood and are willing to share what they know with others. They should be able to share this information with others through the Internet. Many people want to know who their neighbors are and express themselves and their families through the internet. People want to also know about recommendations and what kind of civic and cultural things are in the neighborhood. What is contemplated includes: A social network for people who want to get to know their neighbors and/or neighborhoods. Particularly, one in which a set of maps of neighborhoods (e.g., such as those on Zillow.com or provided through Google® or Microsoft®) are used as a basis on which a user can identify themselves with a particular address. This address may be verified through one or more of the modules on FIG. 29. Particularly, this address may be the current address of the user is living, a previous address where the user used to live, etc.

The address may be verified through a credit check of the user, or a copy of the user's drivers license. Once the user is approved in a particular home/location, the user can leave their comments about their home. They can mark their home information proprietary, so that no one else can contribute to their info without their permission. They can have separate private and public sections, in which the private section is shared with only verified addresses of neighbors, and the public section is shared with anybody viewing their profile. The user can then create separate social networking pages for homes, churches, locations, etc. surrounding his verified address. As such, the user can express him/herself through their profile, and contribute information about what they're neighborhood is like and who lives there. Only verified individuals or entities might be able to view information in that neighborhood.

The more information the user contributes, the higher his or her status will be in the neighborhood through a marker (e.g., a number of stars), or through additional services offered to the neighbor, such as the ability to search a profiles of neighbors in a larger distance range from a verified address of the user. For example, initially, the user may only be able to search profiles within 1 mile on their principal, current home after being verified as living in there. When they create a profiles for themselves and/or contribute profiles of other people, they may widen their net of private profiles they may be allowed to search (e.g., because they become a trusted party in the neighborhood by offering civic information). Neighbors can leave feedback for each other, and arrange private block parties, etc. through their private profile. All these features may possible through one or more of the embodiments and/or modules illustrated in FIGS. 1A-57. Through their public profile, neighbors can know if there is a doctor living down the street, or an attorney around the corner. The FIGS. 1A-57 illustrate various embodiments that may be realized. While a description is given here, a self-evident description can be derived for the software and various methods, software, and hardware directly from the attached Figures.

A neighborhood expression and user contribution system is disclosed. In one aspect, the technology allows users to see the value of millions of homes across the United States and/or the world, not just those that the user themselves own or live in, because they can share information about their neighbors. People living in apartments or condos can use the apartment/condo modeler wizard (e.g., as illustrated in FIG. 29) to create models (e.g. 2 or 3d) of their building and share information about their apartment/home and of their neighbors with others. The technology has an integrated targeted advertising system for enabling advertisers to make money through the social community module 2900 by delivering targeted and non-targeted advertisements.

Aside from giving user generated content of information of homes, the system may also provide value estimates of homes it may also offers several unique features including value changes of each home in a given time frame (e.g. 1, 5, or 10 years) and aerial views of homes as well as the price of the surrounding homes in the area. It may also provides basic data of a given home such as square footage and the number of bedrooms and bathrooms. Users may can also obtain current estimates of homes if there was a significant change made such as recently modeled kitchen.

In the example systems and methods illustrated in FIGS. 1A-57, neighbors may get to know each other and their surrounding businesses more easily through the Internet. The user interface view of the social community module may include a searchable map interface and/or a social networking page on the right when one clicks a particular home/location. The map interface may/may not include information about prices of a home, or information about the number of bedrooms of a home, etc. In essence, certain critical input information may be divided as follows:

Residential location: (1) name of the persons/family living in that residence (2) Their profession if any 3) Their educational background if any (4) Their recreational interests (5) About their family description box (6) Anything else people want to post about that person including their interests, hobbies, etc. (7) An ability for users to leave endorsements.

Business location or civic location (e.g., park, govt. building, church, etc.): (1) name of the business/location (2) email of the manager of the business/location (3) phone number of the business/location if known (4) anything else people want to say about the business (good or bad), for example, contributable through a claimable.

These two will be the primary types. Various features differentiate example embodiments of the social community module from other social networks. These differentiators include (1) interface driven by address (2) maps that can be viewed, zoomed in on, tied to a parcel #, etc. (3) Anyone can populate anyone's social network page. (4) Anybody can post in one of the boxes. They can post anonymously or publicly (5) If someone wants to override information that already has been established, they will need to have an identity (e.g., user name), to override published posting information.

However, according to one embodiment, if an owner of an entity location wishes to mark their location private, and uneditable by the public without their permission, they will need to pay (e.g., a monthly fixed fee) through the social community module. Alternatively, the owner of the entity location may not need to pay to mark the location as private and uneditable by the public without the owner's permission. Example embodiments of the social community module may feature info about businesses. They may also feature info about people that live in the homes, and may/may not display information on prices, number of bedrooms, etc.

The social community module (e.g., as described in FIG. 29) may be a search engine (e.g., Google®, Yahoo®, etc.) that uses maps (e.g., satellite map views) instead of text displays to show information, user profiles, reviews, promotions, ads, directions, events, etc. relevant to user searches.

The example systems and methods illustrated in FIGS. 1A-57 may facilitate a social network membership that spreads virally by users inviting their friends. For example, every person that registers has their own profile, but registration may not be required to contribute content. However, registration may be required to "own" content on your own home, and have override permission to delete things that you don't like about yourself listed about you by others. In one embodiment, the social community module may need to confirm the user's identity and address (e.g., using digital signature tools, drivers license verification, etc.), and/or the user may need to pay a monthly fixed fee (e.g., through a credit card) to control their identity.

For example, they can get a rebate, and not have to pay the monthly fee for a particular month, if they invite at least 15 people that month AND contribute information about at least 10 of their neighbors, friends, civic, or business locations in their neighborhood. People can post pics of their family, their business, their home, etc. on their profile once they 'own' their home and register. In another embodiment, endorsements for neighbors by others will be published automatically. People can search for other people by descriptors (e.g., name, profession, distance away from me, etc.)

Profiles of users may be created and/or generated on the fly, e.g., when one clicks on a home.

People may be able to visually see directions to their neighborhood businesses, rather than reading directions through text in a first phase. After time, directions (e.g., routes) can be offered as well. Users can leave their opinions on businesses, but the social community module also enables users to leave opinions on neighbors, occupants or any entity having a profile on the map display. The social community module may not attempt to restrict freedom of speech by the users, but may voluntarily delete slanderous, libelous information on the request of an owner manually at any time.

In one embodiment, the methods and systems illustrated in FIGS. 1A-57 enable people to search for things they want e.g. nearby pizzas etc. (e.g., by distance away). Advertisers can 'own' their listing by placing a display ad on nextdoor.com. Instead of click-through revenues when someone leaves the site, revenues will be realized when the link is clicked and someone views a preview html on the right of the visual map. Targeted advertisements may also be placed when someone searches a particular street, name, city, etc.

In another example embodiment, the social community module may enable users of the social network to populate profiles for apartments, buildings, condos, etc. People can create floors, layout, etc. of their building, and add social network pages on the fly when they click on a location that has multiple residents, tenants, or lessees.

A user interface associated with the social community module 2900 may be clean, simple, and uncluttered (e.g., Simple message of "get to know your neighbors"). For example, the map interface shows neighbors. Methods and systems associated with the features described may focus on user experience, e.g., ensuring a compelling message to invite friends and/or others to join. A seed phase for implementation of the methods and systems illustrated in FIGS. 1A-57 may be identified for building a membership associated with the social community module.

For example, a user having extensive networks in a certain area (e.g., a city) may seed those communities as well. The social network may encourage user expression, user content creation, ease of use on site to get maximum users/distribution as quickly as possible. In another embodiment, the social community module may ensure that infrastructure associated with operation of the social community module (e.g., servers) are able to handle load (e.g., data traffic) and keep up with expected growth.

For example, the user interface view illustrated in the various figures shows an example embodiment of the social community module of FIG. 29. The user interface view may include a publicly editable profile wall section allowing public postings that owners of the profile can edit. For example, any user may be able to post on an empty profile wall, but a user must claim the location to own the profile (e.g., may minimize barriers to users posting comments on profile walls).

Names featured on the profile wall may be links to the user profiles on the map (e.g., giving an immediate sense for the location of admirers (or detractors) relative to user location). In one embodiment, an action (e.g., mouse-over) on a comment would highlight the comment user's house on the map and names linking to user profiles. The user interface view may also utilize the mapping interface to link comments to locations.

For example, the various embodiments illustrate a comment announcing a garage sale, that is tied to a mappable location on the mapping interface. (e.g., allows people to browse references directly from people's profiles). In the various figures, an example display of the mapping interface is illustrated. In this example display, houses are shown in green, a church is shown in white, the red house shows the selected location and/or the profile owner's house, question marks indicate locations without profile owners, blue buildings are commercial locations, and the pink building represents an apartment complex.

Houses with stars indicate people associated with (e.g., "friends") of the current user. In one embodiment, a user action (e.g., mouse-over) on a commercial property displayed in the mapping interface may pull up a star (e.g., "\*\*\*") rating based on user reviews, and/or a link to the profile for the property. A mouse-over action on the apartment complex may pull up a building schematic for the complex with floor plans, on which the user can see friends/profiles for various floors or rooms. Question marks indicated in the display may prompt users to own that profile or post comments on the wall for that space. A user action on any house displayed in the mapping interface may pull up a profile link, summary info such as status, profession, interests, etc. associated with the profile owner, a link to add the person as a friend, and/or a link to send a message to the user (e.g., the profile owner).

In another embodiment, a default profile view shown is that of the current user (e.g., logged in), and if the user clicks on any other profile, it may show their profile in that space instead (with few text changes to indicate different person). The events in your area view of the profile display in may have a default radius for notification of events (e.g., by street, by block, by neighborhood, county, etc.) Events are associated with user profiles and may link to locations displayed on the mapping interfaces. The hot picks section may be an ad/promotional zone, with default settings for radius of alerts also configurable.

For example, the "Find a Friend" section may permit users to search by name, address, interests, status, profession, favorite movies/music/food etc. Users are also able to search within a given radius of their location. In one embodiment, the user interface view may include a link for the user to invite other people to join the network (e.g., may encourage users who see a question-mark on a house or a location on the mapping interface that corresponds to a real location associated with someone they know to contact that person and encourage them to join and own that profile through the social community module).

Some of the reasons we believe these embodiments are unique include:

Search engine that provides a visual map (e.g., rather than text) display of information relevant to user queries.

Users can search on the map for other people having certain professional, educational, personal, extracurricular, cultural, political and/or family etc. profiles or interests, within any location range.

Users can search for information on the map, that is accessible directly through profile displays. For example, the user may search for information about a certain subject and be directed to a profile of another user having information about the subject. Alternatively, the user may view the search subject itself as a visible item (e.g., if applicable to the search query) having a profile on the map display, along with additional information associated with the item (e.g., contributed by other users).

Allows users to search, browse and view information posted by other users about an entity location such as a home, a business property, a condo, an apartment complex, etc. directly on a map display Allows users to browse, form and join groups and communities based on location, preferences, interests, friend requests, etc.

Users can send messages to other people through their profiles within the map display Users can find friends, business associates, vendors, romantic partners, etc. on the map within any location range (e.g., in their neighborhood, street, subdivision, etc.) by browsing the map display or searching for people with certain profile characteristics and/or similar interests.

Users can view, browse and post comments/information/reviews about entity locations and/or people associated with those locations (e.g., occupants of a house, families, apartment residents, businesses, non-governmental entities, etc.), even for locations that do not have a profile owner. For example, all entity locations visible on the map display may link to a profiles on which any user can post comments. To own the profile and edit the information posted about an entity location or the occupant(s), the occupant(s) would have to join the network associated with the social community module and become the owner of the profile. The profile owner would then become visible in the map display (e.g., entity locations without profile owners may only be visible as questions marks on the map, having blank profiles but public comment sections).

Users can share their comments and opinions about locations, preferences and/or interests on their profiles that are visible and searchable on the map display Automatically notifies users of events and promotions in an area (e.g., scope of area can be selected by the user), and highlights venues and user profiles on the map.

Users can post reviews about entity locations (e.g., businesses) such that ratings for entity locations are visible on the map. Other users can trace the location of the users that posted the comments on the map.

Users who post comments on other profiles can be traced directly on the map through their comments. Alternatively, users can choose to submit anonymous postings or comments on other user/entity profiles, and/or may choose not to be traceable on the map through their comments.

For entity locations having more than one residency unit (e.g., apartment complexes), people can create and post on profiles for any room/floor of the location (e.g., by entering information on a schematic view of the location that is visible on the map).

Users can visually determine routes/directions/orientation to locations that they can browse within the map display. Additionally, users can generate written driving, walking or public transit directions between points of interest (e.g., from the user's house to a friend's house) within the map display.

Users can communicate (e.g., through live chat) directly with other users in the area based on an association determined through their profiles Business entity locations can generate targeted ads and promotions within locations on the map display (e.g., virtual billboards).

The social community module can realize revenue based on ad clickthroughs by users, without the users being directed away from the interface. For example, when a user clicks on any targeted ad/promotion displayed on the map, the profile of the entity associated with the ad/promotion may be generated alongside the map display.

Neighborhood or neighborhood (see spelling differences) is a geographically localized community located within a larger city or suburb. The residents of a given neighborhood are called neighbors (or neighbors), although this term may also be used across much larger distances in rural areas.

Traditionally, a neighborhood is small enough that the neighbors are all able to know each other. However in practice, neighbors may not know one another very well at all. Villages aren't divided into neighborhoods, because they are already small enough that the villagers can all know each other.

The system however may work in any country and any geography of the world. In Canada and the United States, neighborhoods are often given official or semi-official status through neighborhood associations, neighborhood watches, or block watches. These may regulate such matters as lawn care and fence height, and they may provide such services as block parties, neighborhood parks, and community security. In some other places the equivalent organization is the parish, though a parish may have several neighborhoods within it depending on the area.

In localities where neighborhoods do not have an official status, questions can arise as to where one neighborhood begins and another ends, such as in the city of Philadelphia, Pa. Many cities may use districts and wards as official divisions of the city, rather than traditional neighborhood boundaries.

In the mainland of the People's Republic of China, the term is generally used for the urban administrative unit usually found immediately below the district level, although an intermediate, sub-district level exists in some cities. They are also called streets (administrative terminology may vary from city to city). Neighborhoods encompass 2,000 to 10,000 families. Within neighborhoods, families are grouped into smaller residential units or quarters of 2900 to 3400 families and supervised by a residents' committee; these are subdivided into residents' small groups of fifteen to forty families. In most urban areas of China, neighborhood, community, residential community, residential unit, residential quarter have the same meaning: 社区 or 小区 or 居民区 or 居住区 , and is the direct sublevel of a subdistrict (街道办事处), which is the direct sublevel of a district (区), which is the direct sublevel of a city (市). (See Political divisions of China.

The system and methods may be distributed through neighborhood associations. A neighborhood or neighborhood (see spelling differences) is a geographically localized community located within a larger city or suburb. The residents of a given neighborhood are called neighbors (or neighbors), although this term may also be used across much larger distances in rural areas.

Traditionally, a neighborhood is small enough that the neighbors are all able to know each other. However in practice, neighbors may not know one another very well at all. Villages aren't divided into neighborhoods, because they are already small enough that the villagers can all know each other. Each of the technologies and concepts disclosed herein may be embodied in software and/or hardware through one or more of the modules/embodiments discussed in FIGS. 1A-57.

A block party is a large public celebration in which many members of a single neighborhood congregate to observe a positive event of some importance. Many times, there will be celebration in the form of playing music and dance. Block parties gained popularity in the United States during the 1970s. Block Parties were often held outdoors and power for the DJ's sound system was taken illegally from street lights. This was famously referenced in the song "South Bronx" by KRS-One with the line:

"Power from a street light made the place dark. But yo, they didn't care, they turned it out." It is also interesting to note that many inner city block parties were actually held illegally, as they might be described as loitering. However, police turned a blind eye to them, reasoning that if everyone from the neighborhood was gathered in one place there was less chance of crime being committed elsewhere.

In the suburbs, block parties are commonly held on holidays such as Fourth of July or Labor Day. Sometimes the occasion may be a theme such a "Welcome to the Neighborhood" for a new family or a recent popular movie. Often block parties involve barbecuing, lawn games such as Simon Says and group dancing such as the Electric Slide, the Macarena or line dancing.

In other usage, a block party has come to mean any informal public celebration. For example, a block party can be conducted via television even though there is no real block in the observance. The same is true for the Internet. The block party is closely related to the beach party. The British equivalent is the street party.

The systems and methods illustrated in FIGS. 1A-57 may have software to emulate a block party or a neighborhood watch. A neighborhood watch (also called a crime watch or neighborhood crime watch) is a citizens' organization devoted to crime and vandalism prevention within a neighborhood. It is not a vigilante organization, since members are expected not to directly intervene in possible criminal activity. Instead, neighborhood watch members are to stay alert to unusual activity and contact the authorities. It builds on the concept of a town watch from Colonial America.

The current American system of neighborhood watches began developing in the late 1960s as a response to the rape and murder of Kitty Genovese in Queens, N.Y. People became outraged that three dozen witnesses did nothing to save Genovese or to apprehend her killer. Some locals formed groups to watch over their neighborhoods and to look out for any suspicious activity in their areas. Shortly thereafter, the National Sheriffs' Association began a concerted effort in 1972 to revitalize the "watch group" effort nationwide.

A neighborhood watch (also called a crime watch or neighborhood crime watch) is a citizens' organization devoted to crime and vandalism prevention within a neighborhood. It is not a vigilante organization, since members are expected not to directly intervene in possible criminal activity. Instead, neighborhood watch members are to stay alert to unusual activity and contact the authorities. It builds on the concept of a town watch from Colonial America.

The current American system of neighborhood watches began developing in the late 1960s as a response to the rape and murder of Kitty Genovese in Queens, N.Y. People became outraged that three dozen witnesses did nothing to save Genovese or to apprehend her killer. Some locals formed groups to watch over their neighborhoods and to look out for any suspicious activity in their areas. Shortly thereafter, the National Sheriffs' Association began a concerted effort in 1972 to revitalize the "watch group" effort nationwide.

The various methods, systems, and apparatuses disclosed herein and illustrated and described using the attached FIGS. 1A-57 can be applied to creating online community organizations of neighborhoods of any form. During human growth and maturation, people encounter sets of other individuals and experiences. Infants encounter first, their immediate family, then extended family, and then local community (such as school and work). They thus develop individual and group identity through associations that connect them to life-long community experiences.

As people grow, they learn about and form perceptions of social structures. During this progression, they form personal and cultural values, a world view and attitudes toward the larger society. Gaining an understanding of group dynamics and how to "fit in" is part of socialization. Individuals develop interpersonal relationships and begin to make choices about whom to associate with and under what circumstances.

During adolescence and adulthood, the individual tends to develop a more sophisticated identity, often taking on a role as a leader or follower in groups. If associated individuals develop the intent to give of themselves, and commit to the collective well-being of the group, they begin to acquire a sense of community.

Socialization: The process of learning to adopt the behavior patterns of the community is called socialization. The most fertile time of socialization is usually the early stages of life, during which individuals develop the skills and knowledge and learn the roles necessary to function within their culture and social environment. For some psychologists, especially those in the psychodynamic tradition, the most important period of socialization is between the ages of 1 and 10. But socialization also includes adults moving into a significantly different environment, where they must learn a new set of behaviors.

Socialization is influenced primarily by the family, through which children first learn community norms. Other important influences include school, peer groups, mass media, the workplace and government. The degree to which the norms of a particular society or community are adopted determines one's willingness to engage with others. The norms of tolerance, reciprocity and trust are important "habits of the heart," as de Tocqueville put it, in an individual's involvement in community.

Continuity of the connections between leaders, between leaders and followers, and among followers is vital to the strength of a community. Members individually hold the collective personality of the whole. With sustained connections and continued conversations, participants in communities develop emotional bonds, intellectual pathways, enhanced linguistic abilities, and even a higher capacity for critical thinking and problem-solving. It could be argued that successive and sustained contact with other people might help to remove some of the tension of isolation, due to alienation, thus opening creative avenues that would have otherwise remained impassable.

Conversely, sustained involvement in tight communities may tend to increase tension in some people. However, in many cases, it is easy enough to distance oneself from the "hive" temporarily to ease this stress. Psychological maturity and effective communication skills are thought to be a function of this ability. In nearly every context, individual and collective behaviors are required to find a balance between inclusion and exclusion; for the individual, a matter of choice; for the group, a matter of charter. The sum of the creative energy (often referred to as "synergy") and the strength of the mechanisms that maintain this balance is manifest as an observable and resilient sense of community.

McMillan and Chavis (1986) identify four elements of "sense of community": 1) membership, 2) influence, 3) integration and fulfillment of needs, and 4) shared emotional connection. They give the following example of the interplay between these factors: Someone puts an announcement on the dormitory bulletin board about the formation of an intramural dormitory basketball team. People attend the organizational meeting as strangers out of their individual needs (integration and fulfillment of needs). The team is bound by place of residence (membership boundaries are set) and spends time together in practice (the contact hypothesis). They play a game and win (successful shared valent event). While playing, members exert energy on behalf of the team (personal investment in the group). As the team continues to win, team members become recognized and congratulated (gaining honor and status for being members). Someone suggests that they all buy matching shirts and shoes (common symbols) and they do so (influence).

A Sense of Community Index (SCI) has been developed by Chavis and his colleagues (1986). Although originally designed to assess sense of community in neighborhoods, the index has been adapted for use in schools, the workplace and a variety of types of communities.

Communitarianism as a group of related but distinct philosophies (or ideologies) began in the late 20th century, opposing classical liberalism, capitalism and socialism while advocating phenomena such as civil society. Not necessarily hostile to social liberalism, communitarianism rather has a different emphasis, shifting the focus of interest toward communities and societies and away from the individual. The question of priority, whether for the individual or community, must be determined in dealing with pressing ethical questions about a variety of social issues, such as health care, abortion, multiculturalism, and hate speech.

Effective communication practices in group and organizational settings are important to the formation and maintenance of communities. How ideas and values are communicated within communities are important to the induction of new members, the formulation of agendas, the selection of leaders and many other aspects. Organizational communication is the study of how people communicate within an organizational context and the influences and interactions within organizational structures. Group members depend on the flow of communication to establish their own identity within these structures and learn to function in the group setting. Although organizational communication, as a field of study, is usually geared toward companies and business groups, these may also be seen as communities. The principles can also be applied to other types of communities.

If the sense of community exists, both freedom and security exist as well. The community then takes on a life of its own, as people become free enough to share and secure enough to get along. The sense of connectedness and formation of social networks comprise what has become known as social capital.

Azadi Tower is a town square in modern Iran. Social capital is defined by Robert D. Putnam as "the collective value of all social networks (who people know) and the inclinations that arise from these networks to do things for each other (norms of reciprocity)." Social capital in action can be seen in groups of varying formality, including neighbors keeping an eye on each others' homes. However, as Putnam notes in Bowling Alone: The Collapse and Revival of American Community (30000), social capital has been falling in the United States. Putnam found that over the past 25 years, attendance at club meetings has fallen 58 percent, family dinners are down 33 percent, and having friends visit has fallen 45 percent.

Western cultures are thus said to be losing the spirit of community that once were found in institutions including churches and community centers. Sociologist Ray Oldenburg states in The Great Good Place that people need three places: 1) The home, 2) the workplace, and, 3) the community hangout or gathering place.

With this philosophy in mind, many grassroots efforts such as The Project for Public Spaces are being started to create this "Third Place" in communities. They are taking form in independent bookstores, coffeehouses, local pubs and through many innovative means to create the social capital needed to foster the sense and spirit of community.

Community development is often formally conducted by universities or government agencies to improve the social well-being of local, regional and, sometimes, national communities. Less formal efforts, called community building or community organizing, seek to empower individuals and groups of people by providing them with the skills they need to effect change in their own communities. These skills often assist in building political power through the formation of large social groups working for a common agenda. Community development practitioners must understand both how to work with individuals and how to affect communities' positions within the context of larger social institutions.

Formal programs conducted by universities are often used to build a knowledge base to drive curricula in sociology and community studies. The General Social Survey from the National Opinion Research Center at the University of Chicago and the Saguaro Seminar at the John F. Kennedy School of Government at Harvard University are examples of national community development in the United States. In The United Kingdom, Oxford University has led in providing extensive research in the field through its Community Development Journal, used worldwide by sociologists and community development practitioners.

At the intersection between community development and community building are a number of programs and organizations with community development tools. One example of this is the program of the Asset Based Community Development Institute of Northwestern University. The institute makes available downloadable tools to assess community assets and make connections between non-profit groups and other organizations that can help in community building. The Institute focuses on helping communities develop by "mobilizing neighborhood assets"—building from the inside out rather than the outside in.

Community building and organizing: M. Scott Peck is of the view that the almost accidental sense of community which exists at times of crisis, for example in New York City after the attacks of Sep. 11, 2001, can be consciously built. Peck believes that the process of "conscious community building" is a process of building a shared story, and consensual decision making, built upon respect for all individuals and inclusivity of difference. He is of the belief that this process goes through four stages:

Pseudo-community: Where participants are "nice with each other", playing-safe, and presenting what they feel is the most favorable sides of their personalities. Chaos: When people move beyond the inauthenticity of pseudo-community and feel safe enough to present their "shadow" selves. This stage places great demands upon the facilitator for greater leadership and organization, but Peck believes that "organizations are not communities", and this pressure should be resisted.

Emptying: This stage moves beyond the attempts to fix, heal and convert of the chaos stage, when all people become capable of acknowledging their own woundedness and brokenness, common to us all as human beings. Out of this emptying comes Authentic community: the process of deep respect and true listening for the needs of the other people in this community. This stage Peck believes can only be described as "glory" and reflects a deep yearning in every human soul for compassionate understanding from one's fellows.

More recently Scott Peck has remarked that building a sense of community is easy. It is maintaining this sense of community that is difficult in the modern world. The Ithaca Hour is an example of community-based currency. Community building can use a wide variety of practices, ranging from simple events such as potlucks and small book clubs to larger-scale efforts such as mass festivals and construction projects that involve local participants rather than outside contractors.

Some communities have developed their own "Local Exchange Trading Systems" (LETS) and local currencies, such as the Ithaca Hours system, to encourage economic growth and an enhanced sense of community.

Community building that is geared toward activism is usually termed "community organizing." In these cases, organized community groups seek accountability from elected officials and increased direct representation within decision-making bodies. Where good-faith negotiations fail, these constituency-led organizations seek to pressure the decision-makers through a variety of means, including picketing, boycotting, sit-ins, petitioning, and electoral politics. The ARISE Detroit! coalition and the Toronto Public Space Committee are examples of activist networks committed to shielding local communities from government and corporate domination and inordinate influence.

Community organizing is sometimes focused on more than just resolving specific issues. Organizing often means building a widely accessible power structure, often with the end goal of distributing power equally throughout the community. Community organizers generally seek to build groups that are open and democratic in governance. Such groups facilitate and encourage consensus decision-making with a focus on the general health of the community rather than a specific interest group.

The three basic types of community organizing are grassroots organizing, coalition building, and faith-based community organizing (also called "institution-based community organizing," "broad-based community organizing" or "congregation-based community organizing").

Community service is usually performed in connection with a nonprofit organization, but it may also be undertaken under the auspices of government, one or more businesses, or by individuals. It is typically unpaid and voluntary. However, it can be part of alternative sentencing approaches in a justice system and it can be required by educational institutions.

The most common usage of the word "community" indicates a large group living in close proximity. Examples of local community include: A municipality is an administrative local area generally composed of a clearly defined territory and commonly referring to a town or village. Although large cities are also municipalities, they are often thought of as a collection of communities, due to their diversity.

A neighborhood is a geographically localized community, often within a larger city or suburb. A planned community is one that was designed from scratch and grew up more or less following the plan. Several of the world's capital cities are planned cities, notably Washington, D.C., in the United States, Can berra in Australia, and Brasilia in Brazil. It was also common during the European colonization of the Americas to build according to a plan either on fresh ground or on the ruins of earlier Amerindian cities. Identity: In some contexts, "community" indicates a group of people with a common identity other than location. Members often interact regularly. Common examples in everyday usage include: A "professional community" is a group of people with the same or related occupations. Some of those members may join a professional society, making a more defined and formalized group.

These are also sometimes known as communities of practice. A virtual community is a group of people primarily or initially communicating or interacting with each other by means of information technologies, typically over the Internet, rather than in person. These may be either communities of interest, practice or communion. (See below.) Research interest is evolving in the motivations for contributing to online communities.

Some communities share both location and other attributes. Members choose to live near each other because of one or more common interests. A retirement community is designated and at least usually designed for retirees and seniors—often restricted to those over a certain age, such as 55. It differs from a retirement home, which is a single building or small complex, by having a number of autonomous households.

An intentional community is a deliberate residential community with a much higher degree of social interaction than other communities. The members of an intentional community typically hold a common social, political or spiritual vision and share responsibilities and resources. Intentional communities include Amish villages, ashrams, cohousing, communes, ecovillages, housing cooperatives, kibbutzim, and land trusts.

Special nature of human community Music in Central Park, a public space. Definitions of community as "organisms inhabiting a common environment and interacting with one another," while scientifically accurate, do not convey the richness, diversity and complexity of human communities. Their classification, likewise is almost never precise. Untidy as it may be, community is vital for humans. M. Scott Peck expresses this in the following way: "There can be no vulnerability without risk; there can be no community without vulnerability; there can be no peace, and ultimately no life, without community." This conveys some of the distinctiveness of human community.

Embodiments described herein in FIGS. 14-41B govern a new kind of social network for neighborhoods, according to one embodiment (e.g., may be private and/or wiki-editable search engine based). It should be noted that in some embodiments, the address of an user may be masked from the public search (but still may be used for privacy considerations), according to one embodiment. Some embodiments have no preseeded data, whereas others might. Embodiments described herein may present rich, location specific information on individual residents and businesses.

A user can "Claim" one or more Business Pages and/or a Residential Pages, according to one embodiment. In order to secure their Claim, the user may verify their location associated with the Business Page and/or Residential page within 30 days, or the page becomes released to the community, according to one embodiment. A user can only have a maximum of 3 unverified Claims out at any given time, according to one embodiment. When a user clicks on "Claim this Page" on Business Profile page and/or a Residential Profile page, they can indicate the manner in which they intend to verify their claim, according to one embodiment. Benefits of Claiming a Business Page and/or Residential page may enable the user to mark their page 'Self-Editable only' from the default 'Fully Editable' status, and see "Private" listings in a claimed neighborhood around the verified location, according to one embodiment. Each edit by a user on a Residential Profile page and/or a Business Profile page may be made visible on the profile page, along with a date stamp, according to one embodiment.

Browse Function:

Based on the user's current location, the browse function may display a local map populated with pushpins for location-specific information, and a news feed, made up of business page edits, public people page edits, any recent broadcasts, etc., according to one embodiment. The news feed may show up on each Business Page and each Residential Page, based on activity in the surrounding area, according to one embodiment. Secure a Neighborhood function: May allow the user to identify and "secure" a neighborhood, restricting certain types of access to verified residents, according to one embodiment. Add a Pushpin function: May allow any registered or verified user to add any type of Pushpin (as described in FIG. 36), to one embodiment.

In addition to the map, the search results page may display a news feed, made up of business page edits, public people page edits, any recent broadcasts, and autogenerated alerts who has moved into the neighborhood, who has moved out of the neighborhood, any recent reviews in the neighborhood, any pushpins placed in the immediate area, etc., according to one embodiment. The news feed may prioritize entries relating to the search results, and will take into account privacy policies and preferences, according to one embodiment.

Example Newsfeeds may include:

Joe Smith moved into the neighborhood in September 2013. Welcome Joe! Like Share; 43 neighbors (hyperlink) moved in to the Cupertino library neighborhood in July 2013. Like Share; 12 neighbors (hyperlink) verified in to the Cupertino library neighborhood in July 2013. Like Share; Raj Abhyanker invited Paul Smith, a guest to the Cupertino neighborhood. Raj indicates Paul is a friend from college looking to move into the neighborhood. Welcome Paul!: Raj Abhyanker posted a Nissan Leaf for rent $35 a day, in mountain view Rent now. Like Share This content may feed each Profile Page and helps to increase Search Engine value for content on the site, according to one embodiment. Alerts may be created and curated (prioritized, filtered) automatically and/or through crowdsourcing, to keep each page vibrant and actively updating on a regular basis (ideally once a day or more), according to one embodiment.

A Multi-Family Residence page will display a list of residents in the entire building, according to one embodiment. Clicking on any resident will display a Single Family Residence page corresponding to the individual living unit where that person resides, according to one embodiment.

For example, suppose that John Smith and Jane Smith live in apartment 12 of a large building. Their names are included in the list of residents. When a user clicks on either John Smith or Jane Smith, we will display a "Single Family Residence" page showing both John and Jane, just as if apartment 12 was a separate structure, according to one embodiment.

The broadcast feature (e.g., associated with the neighborhood broadcast data and generated by the Bezier curve algorithm 3040 of the social community module 2906) may be a "Radio" like function that uses the mobile device's current geospatial location to send out information to neighbors around the present geospatial location of the user, according to one embodiment. Broadcasts may be posted to neighbor pages in the geospatial vicinity (e.g., in the same neighborhood) on public and private pages in the geospatial social network, according to one embodiment. These broadcasts may enable any user, whether they live in a neighborhood or not to communicate their thoughts to those that live or work (or have claimed) a profile in the neighborhood around where the broadcaster is physically at, regardless of where the broadcaster lives, according to one embodiment. Broadcasts can be audio, video, pictures, and or text, according to one embodiment. For accountability, the broadcaster may be a verified user and their identity made public to all users who receive the broadcast in one embodiment.

This means that the broadcast feature may be restricted to be used only by devices (e.g., mobile phones) that have a GPS chip (or other geolocation device) that an identify a present location of where the broadcast is originating from, according to one embodiment. The broadcast may be sent to all users who have claimed a profile in the geo spatial vicinity where the broadcast originates, according to one embodiment. This can either be broadcast live to whoever is "tuned" in to a broadcast of video, audio, picture, and text in their neighborhood, or can be posted on each users profile if they do not hear the broadcast to the neighborhood in a live mode in one embodiment.

When a broadcast is made neighbors, around where the broadcast is made, they may receive a message that says something like:

Raj Abhyanker, a user in Menlo Park just broadcast "Japanese cultural program" video from the Cupertino Union church just now. Watch, Listen, View This broadcast may be shared with neighbors around Menlo park, and or in Cupertino. This way, Raj's neighbors and those in Cupertino can know what is happening in their neighborhoods, according to one embodiment. In one embodiment, the broadcast only goes to one area (Cupertino or Menlo park in the example above).

Broadcasts could be constrained to devices that have geospatial accuracy of present location and a current only (mobile devices for example). Otherwise, broadcasts won't mean much, according to one embodiment (would otherwise be just like thoughts/video upload without this). Broadcasts shouldn't be confused with 'upload videos', according to one embodiment. Different concepts. Why? Broadcasts have an accuracy of time and location that cannot be altered by a user, according to one embodiment. Hence, mobile is the most likely medium for this not desktop computer, according to one embodiment. We should not let the user set their own location for broadcasts (like other pushpin types), according to one embodiment. Also time is fixed, according to one embodiment. Fixing and not making these two variables editable give users confidence that the broadcast was associated with a particular time and place, and creates a very unique feature, according to one embodiment. For example, it would be not useful if the broadcast is untrusted as to location of origination, according to one embodiment. E.g., I broadcast when I am somewhere only about the location I am at, according to one embodiment.

Broadcasts are different that other pushpins because location of where a broadcast, and time of broadcast is

*current location* and *current time*, according to one embodiment. They are initiated wherever a broadcaster is presently at, and added to the news feed in the broadcasters neighborhood and in the area wherever a broadcaster is presently at, according to one embodiment.

Broadcast rules may include:

1. If I post a Broadcast in my secured neighborhood, only my neighbors can see it, according to one embodiment.

2. If I post a Broadcast in different secured neighborhood then my own, my neighbors can see it (e.g., unless I turn this off in my privacy setting) and neighbors in the secured neighborhood can see it (e.g., default not turn-offable, but I can delete my broadcast), according to one embodiment.

3. If I post a Broadcast in different unsecured neighborhood then my own, my neighbors can see it (unless I turn this off in my privacy setting) and the broadcast is publicly visible on user pages of public user profiles in the unsecured neighborhood until profiles are claimed and/or the neighborhood is secured, according to one embodiment.

4. If an outsider in a secure neighborhood posts a broadcast in my secure neighborhood, it's not public, according to one embodiment.

5. If an outsider in a unsecure neighborhood posts a broadcast in my secure neighborhood, the system does not post on profiles in his unsecure neighborhood (to prevent stalking, burglary), but does post in my secure neighborhood, according to one embodiment.

Privacy settings. For each verified residential or business location, the user may set Privacy to Default, Public, Private, or Inactive, according to one embodiment. The Default setting (which is the default) means that the profile will be public, until the neighborhood is secured; in a secured neighborhood, the profile will be Private, according to one embodiment. By changing this setting, the user may force the profile to be Public or Private, regardless of whether the neighborhood is secured, according to one embodiment.

For each verified residential location, the user may set edit access to Group Editable or Self Editable, according to one embodiment.

Residential Privacy example. The residential profiles can be: Public: anyone can search, browse, or view the user profile, according to one embodiment. This is the default setting for unsecured neighborhoods (initially, all the content on the site), according to one embodiment. Private: only people in my neighborhood can search, browse, or view the user's profile, according to one embodiment. This is the default for secured neighborhoods, according to one embodiment. Inactive: nobody can search, browse, or view the profile, even within a secured neighborhood, according to one embodiment. A user may have at least one active (public or private), verified profile in order to have edit capabilities, according to one embodiment; if the user makes all profiles inactive, that user is treated (for edit purposes) as an unverified user, according to one embodiment.

Verified users can edit the privacy setting for their profile and override the default, according to one embodiment. Group Editable: anyone with access to a profile based on the privacy roles above can edit the profile, according to one embodiment. This is the default setting, according to one embodiment Self Editable, only the verified owner of a profile can edit that profile, according to one embodiment.

Exceptions Guest User. A verified user in another neighborhood is given "Guest" access to a neighborhood for a maximum of 340 days by a verified user in the neighborhood in which the guest access is given, according to one embodiment. In effect, the guest becomes a member of the neighborhood for a limited period, according to one embodiment. Friend. When a user has self-elected being friends with someone in a different neighborhood, they can view each other's profiles only (not their neighbors), according to one embodiment. One way for a user to verify a location is to submit a scanned utility bill, according to one embodiment.

When a moderator selects the Verify Utility Bills function, the screen will display a list of items for processing, according to one embodiment. Accept the utility bill as a means of verification, according to one embodiment. This will verify the user's location, and will also generate an e-mail to the user, according to one embodiment. Or Decline the utility bill as a means of verification, according to one embodiment. There will be a drop-down list to allow the moderator to select a reason, according to one embodiment; this reason will be included in an e-mail message to the user. Reasons may include: Name does not match, address does not match, name/address can't be read, not a valid utility bill, according to one embodiment.

In one embodiment, a method includes associating a verified registered user (e.g., a verified registered user 4110 of FIG. 41A-B, a verified registered user 4110 of FIG. 16) with a user profile, associating the user profile (e.g., the user profile 4000 of FIG. 40A) with a specific geographic location, generating a map (e.g., a map 1701 of FIG. 17) concurrently displaying the user profile and/or the specific geographic location and simultaneously generating, in the map (e.g., the map 1701 of FIG. 17), claimable profiles (e.g., a claimable profile 4006 of FIG. 40A-12B, a claimable profile 4102 of FIG. 41A, a claimable profile 1704 of FIG. 17) associated with different geographic locations surrounding the specific geographic location associated with the user profile (e.g., the user profile 4000 of FIG. 40A).

In another embodiment, a system includes a plurality of neighborhoods (e.g., the neighborhood(s) 2902A-N Of FIG. 29) having registered users and/or unregistered users of a global neighborhood environment 1800 (e.g., a privacy server 2900 of FIG. 29), a social community module (e.g., a social community module 2906 of FIG. 29, a social community module 2906 of FIG. 30) of the global neighborhood environment 1800 (e.g., the privacy server 2900 of FIG. 29) to generate a building creator (e.g., through building builder 3000 of FIG. 30) in which the registered users may create and/or modify empty claimable profiles (e.g., the claimable profile 4006 of FIG. 40A-12B, the claimable profile 4102 of FIG. 41A, the claimable profile 1704 of FIG. 17), building layouts, social network pages, and/or floor levels structures housing residents and businesses in the neighborhood (e.g., the neighborhood 2900 of FIG. 29), a claimable module (e.g., a claimable module 2910 of FIG. 29, a claimable module 2910 of FIG. 32) of the global neighborhood environment 1800 (e.g., the privacy server 2900 of FIG. 29) to enable the registered users to create a social network page of themselves, and/or to edit information associated with the unregistered users identifiable through a viewing of physical properties in which the unregistered users reside when the registered users have knowledge of characteristics associated with the unregistered users.

In addition, the system may include search module (e.g., a search module 2908 of FIG. 29, a search module 2908 of FIG. 31) of the global neighborhood environment 1800 (e.g., the privacy server 2900 of FIG. 29) to enable a people search (e.g., information stored in people database 3016 of FIG. 30), a business search (e.g., information stored in business database 3020 of FIG. 30), and a category search of any data in the social community module (a social community module 2906 of FIG. 29, a social community module 2906 of FIG. 30) and/or to enable embedding of any content in the global neighborhood environment 1800 (e.g., the privacy server 2900 of FIG. 29) in other search engines, blogs, social networks, professional networks and/or static websites, a commerce module (e.g., a commerce module 4212 of FIG. 29, a commerce module 4212 of FIG. 33) of the global neighborhood environment 1800 (e.g., the privacy server 2900 of FIG. 29).

The system may also provide an advertisement system to a business (e.g., through business display advertisement module 3302 of FIG. 33) who purchase their location in the global neighborhood environment 1800 (e.g., the privacy server 2900 of FIG. 29) in which the advertisement is viewable concurrently with a map indicating a location of the business, and in which revenue is attributed to the global neighborhood environment 1800 (e.g., the privacy server 2900 of FIG. 29) when the registered users and/or the unregistered users click-in on a simultaneously displayed data of the advertisement along with the map indicating a location of the business, a map module (a map module 2914 of FIG. 29) of the global neighborhood environment 1800 (e.g., the privacy server 2900 of FIG. 29) to include a map data associated with a satellite data which serves as a basis of rendering the map in the global neighborhood environment 1800 (e.g., the privacy server 2900 of FIG. 29) and/or which includes a simplified map generator (e.g., simplified map generator module 3402 of FIG. 34) which can transform the map to a fewer color and location complex form using a parcel data which identifies at least some residence, civic, and/or business locations in the satellite data.

In yet another embodiment, a global neighborhood environment 1800 (e.g., a privacy server 2900 of FIG. 29) includes a first instruction set to enable a social network to reside above a map data, in which the social network may be associated with specific geographical locations identifiable in the map data, a second instruction set integrated with the first instruction set to enable the users (e.g., the user 2916 of FIG. 29) of the social network to create profiles of other people through a forum which provides a free form of expression of the users sharing information about any entities and/or people residing in any geographical location identifiable in the satellite map data, and/or to provide a technique of each of the users (e.g., the user 2916 of FIG. 29) to claim a geographic location (a geographic location 4004 of FIG. 40A) to control content in their respective claimed geographic locations and a third instruction set integrated with the first instruction set and/or the second instruction set to enable searching of people in the global neighborhood environment 1800 (e.g., the privacy server 2900 of FIG. 29) by indexing each of the data shared by the users (e.g., the user 2916 of FIG. 29) of any of the people and entities residing in any geographic location (a geographic location 4004 of FIG. 40A).

Disclosed are a method, a device and/or a system for autonomous neighborhood vehicle 100 commerce through a commerce server 4200 of a neighborhood communication network, according to one embodiment.

In one aspect, an autonomous neighborhood vehicle 100 comprising a set of wheels 301 aligned in a pattern 4610 to provide the autonomous neighborhood vehicle 100 stability when traversing a sidewalk 112, a bike lane 304, and a roadway 114. The autonomous neighborhood vehicle 100 also comprises of a storage compartment 101 of the autonomous neighborhood vehicle 100 in which items are storable, an electronic locking mechanism 106 of the storage compartment, a computer system 200 of the autonomous neighborhood vehicle 100 that is communicatively coupled to a commerce server 4200 of a neighborhood communication system 2950 through a wireless network 2904 to autonomously navigate the autonomous neighborhood vehicle 100 to a destination 5306 specified by the commerce server 4200, and a navigation server 242 of the autonomous neighborhood vehicle 100 to provide a remote sensing capability 4612 to the autonomous neighborhood vehicle 100 such that the autonomous neighborhood vehicle 100 is autonomously navigable to the destination 5306.

In one embodiment, the autonomous neighborhood vehicle 100 may utilize a sensor fusion algorithm 238 through which at least some of an ultrasound unit 228, a radar unit 222, a path lighting device 108, a LIDAR unit 224, a wheel encoding sensor 223, an accelerometer sensor 219, a gyroscopic sensor 221, a compass sensor 225, and/or a stereo optical sensor 227 to operate in concert to provide a three dimensional environmental view 5550 of an environment surrounding the autonomous neighborhood vehicle 152 to the autonomous neighborhood vehicle 100. The autonomous neighborhood vehicle 100 may include a sidewalk detection sensor 111 through which the autonomous neighborhood vehicle 100 may detect a gradation rise 4600 caused by a sidewalk start location 4602 and/or a gradation drop 4604 caused by a sidewalk end location 4606. A telescoping platform 107 coupled to a base of the autonomous neighborhood vehicle 4601 may automatically displace a set of front wheels 4608 to rise and/or fall based on the detected one of the gradation rise 4600 caused by the sidewalk start location 4602 and/or the gradation drop 4604 caused by the sidewalk end location 4606 to provide mechanical stability for contents in the storage compartment of the autonomous neighborhood vehicle 100.

The autonomous neighborhood vehicle 100 may periodically transmit a heartbeat message 4260 to the commerce server 4200 having a set of current geo-spatial coordinates of the autonomous neighborhood vehicle 4262, a time stamp 4264, a date stamp 4266, and/or an operational status of the vehicle 4268. In one embodiment, the autonomous neighborhood vehicle 100 automatically may generate an emergency broadcast message 5702 to a set of neighbors 2902 in a geo-spatial vicinity 5302 of the autonomous neighborhood vehicle 100 when the autonomous neighborhood vehicle 100 detects a failure condition 5703 comprising an impact 5704, a mechanical failure 5706, an electrical failure 5708, and/or a damage condition 5718. The emergency broadcast message 5702 may include a photo data 5714, a geo-spatial coordinates data 5720, a video data 5710, an audio data 5712, a timeout condition of the heartbeat message receipt 5716 at the commerce server 4200, and/or a textual data associated with the failure condition 5703. The autonomous neighborhood vehicle 100 may automatically park itself in a garage structure 5600 associated with an operator of the autonomous neighborhood vehicle 100 5602 adjacent to a passenger vehicle 5604, wherein the operator is at least one an individual, a family, a business, an owner, and/or a lease, according to one embodiment.

The storage compartment may be temperature regulated to maintain a temperature 5305 of an item 4502 in transit between a starting address 5308 associated with a merchant 5310 and/or a neighbor 2902 in a neighborhood 2902 in a geospatial vicinity 5302 of the autonomous neighborhood vehicle 100, and/or a destination 5306 address associated with a recipient 4214 of the item 4502 in the neighborhood 2902 in the geospatial vicinity 5302 of the autonomous neighborhood vehicle 100, wherein a neighborhood boundary 5303 is defined through a neighborhood boundary data provider 4249. In one embodiment, the autonomous neighborhood vehicle 100 may be in a form 4302 of an autonomous neighborhood bicycle 4300 having a detachable storage compartment 4301 thereon, and/or having an ability 303 to driverlessly traverse through bicycle lanes adjacent to a roadway 114 based on commands from the commerce server 4200.

In another aspect, a method of an autonomous neighborhood vehicle 100 comprising associating the autonomous neighborhood vehicle 100 with a non-transient location 5418 and determining, through a commerce server 4200 of a neighborhood communication system 2950, that a destination 5306 in a threshold radial distance 4219 from the non-transient location 5418 is received by the autonomous neighborhood vehicle 100 through a wireless network 2904. The method also includes determining an optimal route 802 from the current location of the autonomous neighborhood vehicle 5406 to the destination 5306 and traveling autonomously on the optimal route 802 to the destination 5306.

In one embodiment, the method may include periodically determining, through a processor 202, a current location of the autonomous neighborhood vehicle 5406, communicating the current location of the autonomous neighborhood vehicle 5406 to the commerce server 4200, and automatically activating a set of light emitting diodes 270 encompassing the autonomous neighborhood vehicle 100 when a light sensor 272 detects that an environmental brightness 117 is below a threshold luminosity 5307. The method may include creating an envelope 900 around the autonomous neighborhood vehicle 100, wherein the envelope 900 includes a set of minimum ranges 902. The set of minimum ranges 902 may include a minimum distance that must be kept in a direction in front 916, a direction behind 918, a direction to a left 913, a direction to a right 914, above, and/or below the autonomous neighborhood vehicle 100.

The method may include establishing a range of speed 5721 the autonomous vehicle may reach and establishing a distance traveled 5420 range by the autonomous neighborhood vehicle 100, wherein the distance traveled 5420 range by the autonomous neighborhood vehicle 100 is set for a per trip, per day and/or a per delivery distance traveled 5420. In one embodiment, the method may include establishing a maximum magnitude of deceleration 5372, wherein the maximum magnitude of deceleration 5372 is measured in feet per second squared, and establishing a minimum crosswalk proximity 5204 at which the autonomous neighborhood vehicle 100 is permitted to stop.

The method may include determining at a predetermined interval 5374 if a different route 804 that is more efficient than the optimal route 802 exists based on a delivery time 5424, a pendency of time, and/or a minimal travel distance 5426. The predetermined interval 5374 for determining if a different route 804 is more efficient than the optimal route 802 exists may include constantly determining, determining every minute, determining different route 804 every one hundred yard, when the autonomous neighborhood vehicle 100 encounters traffic, when the autonomous neighborhood vehicle 100 encounters the object 408. The method may include calculating the different route 804 and traveling along the different route 804 as long as the different route 804 remains a most efficient route. In one embodiment, the method may include determining when an alternate field of view 502 is needed, prioritizing established constraints of the envelope 900, the speed 5307, the distance traveled 5420, the maximum magnitude of deceleration 5372 and/or the minimum crosswalk proximity 5204 in respect to the need to establish the alternate field of view 502, determining an optimal alternate field of view 504 that does not violate established constraints prioritized above obtaining the alternate field of view 502, and obtaining the optimal alternate field of view 504 without violating constraints prioritized above obtaining the alternate field of view 502.

In one embodiment, obtaining the optimal alternate field of view 504 without violating constraints prioritized above obtaining the alternate field of view 502 involves switching sensors, moving the autonomous neighborhood vehicle 100 and/or moving sensors. The set of minimum ranges 902 of the envelope 900 may depend on a speed 5307 of the autonomous neighborhood vehicle 100, a set of weather conditions 119, an environment of the autonomous neighborhood vehicle 152, the item 4402, and/or a nature of the object 409 that is in close proximity with the autonomous neighborhood vehicle 100. The storage compartment may be temperature regulated to maintain a temperature 5305 and/or a humidity 5376 of an item 4502 in transit between a starting address 5308 associated with a merchant 5310 and/or a neighbor 2920 in a neighborhood 2902 in a geospatial vicinity 5302 of the autonomous neighborhood vehicle 100, and/or a destination 5306 location associated with a recipient 4214 of the item 4502 in the neighborhood 2902 in the geospatial vicinity 5302 of the autonomous neighborhood vehicle 100. In one embodiment, the neighborhood boundary 5303 may be defined through a neighborhood boundary data provider 4249, and/or the storage compartment 101 may be equipped with a suspension device 4506 to protect the item 4502 while in transit.

The method may include automatically generating an emergency broadcast message 5702 to a set of neighbors 2902 in a geo-spatial vicinity 5302 of the autonomous neighborhood vehicle 100 when the autonomous neighborhood vehicle 100 detects a failure condition 5703 comprising an impact 5704, a mechanical failure 5706, an electrical failure 5708, and/or a damage condition 5718, wherein the emergency broadcast message 5702 includes a photo data 5714, a geo-spatial coordinates data 5720, a video data 5710, an audio data 5712, a timeout condition of a heartbeat message 4260 receipt 5716 at the commerce server 4200, and/or a textual data associated with the failure condition 5703. In one embodiment, the method may include periodically transmitting a heartbeat message 4260 to the commerce server 4200 having a set of current geo-spatial coordinates 4262 of the autonomous neighborhood vehicle 100, a time stamp 4264, a date stamp 4266, and/or an operational status 4268 of the vehicle. The method may include automatically contacting emergency response services when the autonomous neighborhood vehicle 100 detects a crime 5707, an accident 5705 involving third parties and/or an attempted tampering 5709 with the autonomous neighborhood vehicle 100.

The contacting may include a time stamp 4264, the geo-spatial coordinates data 5720, the photo data 5714, the video data 5710, the audio data 5712, and/or the textual data, and/or wherein emergency response services include a police station 5713, a fire station 5711 and/or a medical responder 5715. In one embodiment, the method may include calculating a set of predicted behaviors 305 of detected objects within a threshold distance 4214 from the autonomous neighborhood vehicle 100 and determining confidence levels 307 for the predicted behaviors 305, wherein the confidence levels 307 are a number and/or a percentage 313 of the probability of each predicted behavior occurring. The method may include adjusting confidence levels 307 for the predicted behaviors 305 based on a change in location 311, a change in speed 306, a change of direction 309, a change in angle 308 and/or observed behavior, according to one embodiment. The method may include vending an item 4502 from the storage compartment and ejecting the item 4502 from an ejection module 110, wherein the item 45012 is ejected through an air based propulsion system 4406 aligned through a camera adjacent to the ejection module 4408.

In one embodiment, the method may include detecting a stop sign 5206 and/or automatically stopping the autonomous neighborhood vehicle 100 at the appropriate point when the stop sign 5206 is detected, detecting a yield sign 5208 and/or automatically monitoring and/or yielding to a traffic flow 5210 at an intersection 5200 in the neighborhood 2902, detecting when a pedestrian 904 is walking in a path 903 proximate to the autonomous neighborhood vehicle 100, and/or detecting when a bicyclist 302 is biking in a path 903 proximate to the autonomous neighborhood vehicle 100. The method may include accepting a credit payment 5420 using a magnetic card reader 4508 of the autonomous neighborhood vehicle 100, a near-field credit scanner of the autonomous neighborhood vehicle 100, and/or a biometric payment reader 4410 of the autonomous neighborhood vehicle 100. The commerce server 4200 may be in a privacy server 2900 of the neighborhood communication system 2950 that may be wirelessly coupled with the autonomous neighborhood vehicle 100.

The privacy server 2900 may be a community network 4250 comprising verifying that each user of the community network 4250 lives at a residence 2918 associated with a claimable residential address 115 of the community network 4250 formed through a social community module 2906 of a privacy server 2900 using a processor 202 and/or a memory. The privacy server 2900 may be a community network 4250 comprising obtaining from each user of the community network 4250, using the processor 202 of a data processing system 4204, member data 5738 associated with each user, the member data 5738 including an address 5740, and associating the address with a profile 5742 of each user. In one embodiment, the privacy server 2900 may be a community network 4250 comprising determining a location of each user based on the member data 5738, storing the member data 5738 in a database 4222, and obtaining a personal address privacy preference 5744 from each user, the personal address privacy preference 5744 specifying if the address should be displayed to other users.

The method may include generating, using a mapping server 2926 associated with the privacy server 2900 through a network 2904, a geospatial representation of a set of points 5732 on a map 5734 defining residences 2918 associated with each user of the community network 4250 having the member data 5738, and authenticating, using a verify module 3006 of the privacy server 2900, a particular user 5422 of a third-party application as being a verified user 4110 of the neighborhood communication system 2950 having a verified residential address 5378 in the neighborhood communication system 2950. In one embodiment, the method may include communicating, using the verify module 3006 of the privacy server 2900, a social graph of the particular user 5422 based on the personal address privacy preference 5744 of the particular user 5422 to the third-party application. The method may include providing, using the verify module 3006 of the privacy server 2900, the verified residential address 5378 to the third-party application based on the authentication of the particular user 5422 of the third-party application as being the verified user 4110 of the neighborhood communication system 2950.

The privacy server 2900 communicatively coupled with the mapping server 2926 through the network 2904 may apply an address verification algorithm 2903 associated with each user of the online community 5730 to verify that each user lives at a residence 2918 associated with a claimable residential address 115 of an online community 5730 formed through a social community module 2906 of the privacy server 2900 using the processor 4220 and/or the 4224 memory. The mapping server 2926 may generate a latitudinal data 5724 and/or a longitudinal data 5722 associated with each claimable residential address 115 of the online community 5730 associated with each user of the online community 5730. The privacy server 2900 may automatically determine a set of access privileges in the online community 5730 associated with each user of the online community 5730 by constraining access in the online community 5730 based on a neighborhood boundary 5303 determined using a Bezier curve algorithm 3040 of the privacy server 2900. The privacy server 2900 may transform the claimable residential address 115 into a claimed address 4247 upon an occurrence 5728 of an event 5726.

The privacy server 2900 may instantiate the event when a particular user 5422 is associated with the claimable residential address 115 based on a verification 5746 of the particular user 5422 as living at a particular residential address 5748 associated with the claimable residential address 115 using the privacy server 2900. The privacy server 2900 may constrain the particular user 5422 to communicate through the online community 5730 only with a set of neighbors 2920 having verified residential addresses 5378 using the privacy server 2900. The privacy server 2900 may define the set of neighbors 2920 as other users of the online community 5730 that have each verified their addresses in the online community 5730 using the privacy server 2900 and/or which have each claimed residential addresses that are in a threshold radial distance 4219 from the claimed address of the particular user 5422.

In yet another aspect, a neighborhood communication system 2950 comprising a commerce server 4200, a wireless network 2904, and a set of autonomous neighborhood vehicles 100 that are communicatively coupled to the commerce server 4200 of the neighborhood communication system 2950 through the wireless network 2904 to autonomously travel to destinations 5306 specified by the commerce server 4200. Each of the set of autonomous neighborhood vehicles 100 periodically transmits heartbeat messages 5700 to the commerce server 4200 having a set of current geospatial coordinates 4262 of each of the autonomous neighborhood vehicles 100, a time stamp 4264, a date stamp 4266, and an operational status 4268 of each of the autonomous neighborhood vehicles 100. At least some of the autonomous neighborhood vehicles 100 are in a form 4302 of autonomous neighborhood bicycles 4300 each having a detachable storage compartment 4301 thereon, and having an ability 303 to driverlessly traverse through bicycle lanes adjacent to a roadway 114 based on commands from the commerce server 4200.

In one embodiment, each of the autonomous neighborhood vehicle 100 utilizes a sensor fusion algorithm 238 through which at least some of an ultrasound unit 228, a radar unit 222, a light sensor 272, a LIDAR unit 224, a wheel encoding sensor 223, an accelerometer sensor 219, a gyroscopic sensor 221, a compass sensor 225, and/or a stereo optical sensor 227 to operate in concert to provide a three dimensional environmental view 5550 to the autonomous neighborhood vehicle 100 of an environment surrounding each of the autonomous neighborhood vehicle 152. A particular autonomous neighborhood vehicles 100 may automatically generate an emergency broadcast message 5702 to a set of neighbors 2920 in a geo-spatial vicinity of the particular autonomous neighborhood vehicle 5302 when the particular autonomous neighborhood vehicle 100 detects a failure condition 5703 comprising an impact 5704, a mechanical failure 5706, an electrical failure 5708, and/or a damage condition 5718, wherein the emergency broadcast message 5702 includes a photo data 5714, a geo-spatial coordinates data 5720, a video data 5710, an audio data 5712, a timeout condition of the heartbeat message 4260 receipt 5716 at the commerce server 4200, and/or a textual data associated with the failure condition 5703.

Each of the autonomous neighborhood vehicles 100 automatically may be able to park themselves in a garage structure 5600 associated with an operator of the autonomous neighborhood vehicle 5602 adjacent to a passenger vehicle 5604, wherein the operator 5602 is at least one an individual, a family, a business, an owner, and/or a leasee. The storage compartment may be temperature regulated to maintain a temperature 5305 of an item 4502 in transit between a starting address 5308 associated with a merchant 5310 and/or a neighbor 2920 in a neighborhood 2902 in a geospatial vicinity 5302 of the autonomous neighborhood vehicle 100, and/or a destination 5306 address associated with a recipient 4214 of the item 4502 in the neighborhood 2902 in the geospatial vicinity 5306 of the autonomous neighborhood vehicle 100, wherein the neighborhood boundary 5303 is defined through a neighborhood boundary data provider 4249.

An example embodiment will now be described. In an example embodiment, Jenny may wish to sell some items in her home. She may alert her neighbors and/or inform them about the items for sale via the garage sale server 100. Many of her neighbors may attend her garage sale. However, some neighbors who may be interested in certain items may be unable to travel to Jenny's house. These neighbors may be busy during the time of the garage sale and/or may not have access to transportation. Jenny may still be able to deliver items to these neighbors by using the autonomous neighborhood vehicle 100 (e.g., the autonomous delivery box drone).

Jenny's neighbor, Joe, may want to purchase her old computer that was listed through the garage sale server 100 as being included in the garage sale. Joe may be unable to attend the garage sale in person. Jenny may be able to place the computer in and/or on the autonomous neighborhood vehicle 100 and enter a destination directly through the autonomous neighborhood vehicle 100 and/or using the data processing system 104. The autonomous neighborhood vehicle 100 may be able to autonomously deliver the computer to Joe's location using the multidirectional camera(s) 1202 and/or the GPS device while keeping the item safe in transit (e.g., using the lock 1204). The autonomous neighborhood vehicle 100 may be able to travel on sidewalks, the side of the road, in bike paths etc. and/or navigate traffic, redirect to an optimal route, and/or obey traffic laws while making the delivery. Once the autonomous neighborhood vehicle 100 reaches the destination, a text may be sent to Joe containing the passcode to the lock 1204. Joe may be able to open the lock 1204 and retrieve his new computer without leaving his home.

In another example embodiment, Jenny may have broken her leg and be unable to get out of bed. Her family may be out of town and she may have nobody to help her get groceries. Jenny may be able to use the autonomous neighborhood vehicle 100 (e.g., use her own, rent one from a neighbor, a company and/or the geospatially constrained social network 4242) to receive food from a local grocery store. Jenny may be able to use the geospatially constrained social network 4242 to send the autonomous neighborhood vehicle 100 to the store. She may be able to send the store (e.g., employee working at the store, the store's profile on the geospatially constrained network etc.) a shopping list and/or may instruct the autonomous neighborhood vehicle 100 to relay the list to the store.

An employee at the store may load the requested items into the autonomous neighborhood vehicle 100 and the vehicle may travel autonomously in the manor detailed above to Jenny's location, delivering the groceries. In one embodiment, a financial transaction may be carried out through the garage sale server 100. Similar pick-ups and/or deliveries may be conducted with other entities such as Target©, Amazon©, retail stores, etc.

In another embodiment, a neighbor 'Sam' may wish to sell his old iPhone to a neighbor Phil. Sam may use the Fatdoor app on his mobile phone to sell his iPhone to neighbor Phil. Sam may summon the Fatdoor rover (e.g., an autonomous neighborhood vehicle 100 in Sam's neighborhood) to come and pick up his old iPhone. The Fatdoor rover may be dispatched from a central location near City Hall, and come and pick up Sam's iPhone. When the Fatdoor rover is arriving in a few minutes, Sam's phone may get a text alert, notifying that Sam should load the rover once it arrives near his home in a few minutes. The text message may include an 'unlock' code to a storage chest (e.g., the storage compartment 101) of the autonomous Fatdoor rover. Sam may us the unlock code (e.g., using a near-field communication technology such as iBeacon, NFC and/or a keypad unlock code) to unlock the storage chest of the autonomous Fatdoor Rover (e.g., the autonomous neighborhood vehicle 100). Once loaded, Sam may secure the cavity of the Fatdoor rover, and the rover may travel to a location of Phil's home to deliver the iPhone. Once near Phil's home, Phil may also receive a text message notifying that the autonomous rover is near his front porch and a unique unlock code (e.g., which may expire after a period of time). Once Phil receives the iPhone, Sam may get paid by Phil. Until then, money may be held in an escrow account with Fatdoor, Inc. In an alternate embodiment, Sam may get paid earlier as soon as he enters into a contract with Phil. The Fatdoor rover may know how to get to Sam's house and/or Phil's house based on a 'pick up' address of Sam and a 'delivery' address of Phil entered during the transaction. Further, an optimal pickup time may guide the Fatdoor rover to pick up and deliver items at desired times in the neighborhood. The Fatdoor rover may be an electric vehicle with a limited 25 to 40 mile round trip range. Further, the Fatdoor rover may travel on sidewalks and/or bicycle lanes at a maximum speed of 30 miles per hour. The Fatdoor rover may have upon it a camera (e.g., a LIBOR camera), infrared sensors, laser sensors, and on board navigation.

In another embodiment, Phil may purchase a pizza from the neighborhood 'Famiglia Pizzaria', the best pizza this side of Texas through his desktop computer using Fatdoor (e.g., and/or another website such as familiapizzariaofHouston.com having the Fatdoor Connect API integration). Famiglia Pizzaria may have purchased two Fatdoor rovers for pizza deliveries in the neighborhood. Once Phil places an order for pizza, the Fatdoor rovers (branded on the side with Famiglia Pizzaria) may deliver pizza's to Phil's house once the pizzas come out of the oven. Phil may be able to track and view the progress and estimated delivery time of his pizzas through his mobile device, and may even see the current location of the Fatdoor rover assigned to deliver his pizza to him. The storage compartment of the Fatdoor rovers used by Famiglia pizza may be heated to keep the pizzas warmth while in route. The Fatdoor rovers (e.g., the autonomous neighborhood vehicle 100) may keep a log and centrally store the video that they capture to ensure that there is no theft and/or breach of security of the storage compartment during transit. Further, the Fatdoor rovers may be able to safely be able to navigate over sidewalks, yield signs, stop signs, people, bikes, and cars in the roads as they navigate from Famiglia Pizzaria to Phil's home. Once the pizzas are delivered, the Fatdoor rovers purchased by Famiglia may automatically make their way back to Famiglia's pizza headquarters for the next delivery.

An example embodiment will now be described. A person confronted with an emergency situation (e.g. the user 2916, the verified user 3506) may send a broadcast on a geospatially constrained social network 4200 (e.g. Fatdoor.com, Nextdoor.com). To accomplish this broadcast the person may generate the broadcast data 2902 which will be sent to the privacy server 2900 to generate the notification data 4212. The notification data 4212 may include any information contained in the broadcast data 2902 such as the geospatial location, time, date, a textual description and live broadcast of audio and/or video generated by the user 2916. The notification data 4212 may then be radially distributed in the area with a threshold radial distance 4219 of the epicenter 4244 that may be the location of the device observing the emergency. The person may be hoping for immediate assistance from other people living nearby (e.g. the recipients (e.g., other users of the neighborhood communication system 2950 2950 such as neighbors 2928 of FIG. 29)) to help confront the emergency situation. Rather than attempt to contact those living nearby individually, the person experiencing the emergency may broadcast the notification 4212 to proximate neighbors simultaneously, maximizing the chance that a relevant person will appreciate, view and/or respond to the broadcast.

Additionally, for example, the broadcast may even occur automatically upon the dialing of neighborhood services as to allow concurrent notification of nearby recipients (e.g., other users of the neighborhood communication system 2950 2950 such as neighbors 2928 of FIG. 29) without detracting from a conventional mode of contacting emergency services (e.g. the emergency call 4000). The emergency call 4000 may be monitored by the privacy server 2900 to automatically generate the neighborhood broadcast data, including live audio of the call which the privacy server 2900 may use to create a transcript 4004. The transcript 4004, along with metadata from the call that may include the geospatial location of the mobile device on which the call was made may then be broadcast according to the social community module 2906 to nearby recipients (e.g., other users of the neighborhood communication system 2950 2950 such as neighbors 2928 of FIG. 29). The recipients (e.g., other users of the neighborhood communication system 2950 2950 such as neighbors 2928 of FIG. 29) may then be notified of the emergency situation and/or prompted to respond without detracting from a call to the neighborhood services.

For example, in an elementary school setting (e.g., the threshold radial distance 4219 may be set to a boundaries of the elementary school using the Bezier curve algorithm 3040 of the social community module 2906). A principal of the Sacred Brooks Elementary School Mr. Higgins may hear gunshots that he believes are coming from an on-campus location. Screams of panicked teachers and children may soon follow. Mr. Higgins may use his mobile device (e.g., his cellular phone) to call an emergency number '911'. Calling this emergency number '911' may also trigger an automatic alert to the privacy server 2900 to generate the neighborhood broadcast data (or alternatively Mr. Higgins may separately send an emergency broadcast (e.g., a neighborhood broadcast using the Bezier curve algorithm 3040 of the social community module 2906) using the Fatdoor mobile application). All teachers at the school and parents in adjacent neighborhoods may be instantly notified (e.g., through the creation of the neighborhood broadcast data distributed as the notification data 4212).

Wilson Brighton at the Fatdoor Emergency Center may receive a message that there is an emergency at the Sacred Brooks Elementary school. Wilson Brighton may open up a communication channel with Mr. Brighton and invite adjacent neighborhoods and medical professionals having claimed profiles and/or living in the area to help. In addition, Wilson may merge the emergency transmissions into a single session so that Mr. Higgins initial emergency broadcast (e.g., a neighborhood broadcast using the Bezier curve algorithm 3040 of the social community module 2906) is automatically merged with related other broadcasts by teachers, parents, staff, and children at the school. This single thread of broadcasts related to the Sacred Brooks Elementary school may be provided as live-feed emergency broadcast (e.g., a neighborhood broadcast using the Bezier curve algorithm 3040 of the social community module 2906) is to all users of Fatdoor.com having a claimed profile (e.g., a home address and/or a work address) within the threshold radial distance 4219 from Mr. Higgins (e.g., the epicenter 4244 of the broadcast). Even when parents are at work, they may still receive the broadcast live on their mobile devices because they have downloaded the Fatdoor application and have claimed their home/business address around a location of the emergency.

As a result, local neighborhood parents may arrive from their work locations, even when they work at a different location than where they live. This may save lives at the Sacred Brooks elementary school because help may arrive sooner.

For example, one recipient of Mr. Higgin's broadcast may be Samuel Wilson ("Sam"), who has two children at Sacred Brooks Elementary School: John, a bright kindergartener 6, and Samantha, a talented artist of age 10. Sam may be alerted even when he is at work on a construction site 6 miles away from the Sacred Brooks Elementary School where John and Samatha are located. Sam may receive an alert on his mobile phone that there is an emergency in his neighborhood. Jumping into his truck, Sam may drive to the school to render assistance, tuning in to the live broadcast as events unfold. Others may join in and as well and communicate and provide instructions and reassurance to Mr. Higgins and other broadcasters.

Nearby resident Chen Su, whose backyard fence adjoins the playground of Sacred Brooks, may also receive the broadcast. Chen may run outside and unlock his gate, opening it so that children may not be trapped in the playground area. Chen may then send a separate broadcast a new escape route has been established. Mr. Higgins may gather as many nearby children as he can and lead them safety through Chen's gate.

Henry Stewart, a decorated army veteran who lives a few blocks away from Sacred Brooks Elementary, may also receive the broadcast. Alarmed for the safety of the children, and knowing that it may take the police several minutes to arrive at the school, Henry may decide that it will maximize the children chance at survival if he is the first responder. Equipping his .22 caliber rifle, he may run to the school and distract or defeat the shooter in time to save many lives.

Similarly, Dr. Juan Sanchez, M.D. may have an office in the neighborhood immediately adjacent to Sacred Brooks. Dr. Sanchez and his team of medical professionals may rush to the scene, engaging in bi-directional communications with the school staff during the live broadcast event so that he knows exactly which building to arrive at. Calming victims and putting pressure on wounds until ambulances arrive, Dr. Sanchez and his team may save the lives of wounded children.

When the incident is over, many people may want to recreate the events for journalistic or evidentiary purposes. They may also want to study generally the flow of information during emergencies in their neighborhood, and decide how their school could better prepare. Similarly, they may want to ensure they are part of the broadcast system in cast there are future incidents. Persons who have not yet claimed their verified profiles in the area surrounding Sacred Brooks Elementary School on Fatdoor may go online and find profiles pre-seeded with data associated with their address. Those pre-seeded profiles may have been updated with local broadcasts. These people may be able to claim their profile and have access to previous broadcasts, including those associated with the school shootings. This may help them to better prepare for the safety of their children.

Because of the technologies described herein, the neighborhood, city, and country is a better place because emergency response teams are supplemented with information from those who have a claimed geo-spatial location around a neighborhood in which there is trouble. In addition, evidence may be formed that is admissible to prove guilt of the gunmen, defeat a defense of insanity, or impose a maximum sentence.

In another example, a user Bob Jones may be walking around Menlo Park, Calif. when he observes a robber pull out a knife and threaten to harm Paula Nelson in a parking lot if she does not give the robber her car keys. Bob may take out his mobile device and select the emergency listing criteria "major violent crime" in the user interface of the mobile application that communicates with the emergency response server. Bob may center his viewfinder on the unfolding robbery and select the "broadcast live" indicator on the user interface, as well as entering the brief description "Car jacking in progress" in a small data field. The broadcast data, including live video and audio, may be generated and sent to the emergency response server where it may be radially distributed to user profiles at a threshold radial distance 4219 from the epicenter 4244 centered on Bob's mobile device. Because Bob specified the emergency as a "major violent crime" its threshold radial distance 4219 may be larger than if Bob had selected mere "vandalism."

To further illustrate, several relevant parties may receive the broadcast. Patrick Sloan, an off-duty police detective, is alerted to Bob Jones' broadcast data by a notification sent to his mobile device. Patrick, looks his mobile device to read Bob's brief description, and notices that the event is only "0.3 miles away." Patrick selects the "respond indicator" to let Bob know he is on his way, and also selects "dial broadcaster" to establish a bi-directional communication with Bob. A map on Patrick's mobile device and a set of directions may show Patrick the fastest way to travel to the epicenter 4244, along with warning Patrick when he is within 2900 yards of the emergency.

Jason Steinbrenner, a retired surgeon, also receives Bob's broadcast. Jason opts to view Bob's live video feed. Jason notices that the robber severely lacerates Paula with his knife as he grabs Paula's keys away. Jason sees that he is only 0.7 miles away from the emergency and also selects the "respond indicator" to let Bob know he will arrive shortly. Through his user interface he sends Bob a text message "I'm a doctor."

Jane Doe, a resident living within the threshold radial distance 4219 also receives Bob's broadcast. Jane, while viewing Bob's live feed, takes note of the vehicle make, model and color. As the robber gets in Paula's car and drives away, out of Bob's view, Jane goes to her apartment window and looks outside. A minute later, Jane sees the woman's car, driven by the robber, headed down her street, trying to keep a low profile. Jane generates her own broadcast including a video feed of the car stopped at a stoplight. Patrick Sloan, driving his car to reach Bob's location, receives Jane's broadcast. Patrick, now using Jane's epicenter 4244, redirects his path to intercept the robber. Using Jane's live video broadcast to remotely view the intersection, Patrick is able to safely approach the robber from behind and surprise him at the stoplight, capturing him.

Emergency services, which may subscribe to all emergency broadcast (e.g., a neighborhood broadcast using the Bezier curve algorithm 3040 of the social community module 2906) is within the threshold radial distance 4219 of the epicenter 4244, may also have been notified. The police department and an ambulance arrive after Patrick catches the robber and Jason stabilizes the woman.

Bob and Jane may receive a summary of their broadcast data that shows them how many recipients received his broadcast, the emergency services contacted, and who was responding. Their broadcast submissions may also include a unique identifies such that the live video, recorded by the emergency response server, which may be later retrieved to provide evidence against the robber with a unique identification code.

Because of the emergency response sever described in FIGS. 1-11, Jason was able to arrive on the scene faster than emergency services, putting pressure on Paula's wound to prevent detrimental bleeding. The broadcast system also allowed Patrick to catch the perpetrator both because he was a concerned local resident and because other nearby residents, such as Jane, were alerted by Bob's original broadcast and were therefore prepared to provide additional helpful broadcasts.

Bob and Jane may live in the Lorelei neighborhood of Menlo Park, and for this reason receive the emergency broadcast data (e.g., a neighborhood broadcast generated by the social community module 2906). If Bob creates an emergency broadcast, Bob may choose to restrict dissemination of his emergency broadcast just to the Lorelei neighborhood because it is an 'active' neighborhood around where Bob lives. Particularly, a minimum number of Bob's neighbors in the Lorelei neighborhood, such as 10 neighbors in the Lorelei neighborhood, may have signed up and verified their profiles through an online neighborhood social network (e.g., Fatdoor.com). If Bob is the first user that creates a private network for his neighborhood (e.g., a 'founding member'), he may need to draw geospatial boundaries and/or claim geospatial boundaries around his neighborhood and invite a threshold number of neighbors (e.g., 10 neighbors) to activate it. An amount of time for Bob to invite and activate his neighborhood may be limited (e.g., 21 days). However, Bob may request an extension of time from the privacy server 2900 if Bob needs more time to invite users, and the privacy server 2900 may grant this extra time. In other words, if Bob is a founding member, he may have the ability to define the neighborhood boundary and choose the neighborhood name.

The privacy server 2900 may internally make corrections to either the boundaries or name that Bob set based on feedback from other neighbors and/or based on internal policies. These internal policies may include a preference for a use of official names for a community (e.g., based on local thoroughfares, a nearby park, or landmark for inspiration), a neighborhood name that is short and sweet (e.g., eliminating unnecessary words like city, state, neighbors, neighborhood, HOA, friends, etc.), with correct capitalization (e.g., to ensure that a first letter of each word is capitalized), and/or use of spaces between each word in a neighborhood name. In one embodiment, Bob may designate neighborhood 'leads' who can adjust boundaries of their neighborhood through an adjust boundaries tool. Bob may be part of an elite group of neighborhood 'leads' who keep the privacy server 2900 operating smoothly by organizing information and posting neighborhood-wide information. The neighborhood leads like Bob may have special privileges such as removing inappropriate messages, adjusting neighborhood boundaries, verifying unverified members, editing the about section on a neighborhood feed, and/or promoting other members to become neighborhood leads.

Bob and his neighbors may have each verified their addresses through a postcard verification system in which they received a postcard at their home with an access code that permits each of them to access their private Lorelei neighborhood community information including emergency broadcast alerts in the online neighborhood social network (e.g., the Fatmail postcard system through which an access code may have been received at a respective Lorelei home that uniquely identifies and verifies a home in the Lorelei neighborhood). Bob may have invited a threshold number (e.g., 10) of his Lorelei neighbors prior to the Lorelei neighborhood becoming active. Bob may choose to disseminate his emergency broadcast data to a neighborhood adjacent to Lorelei, such as Menlo Park downtown (e.g., using the Bezier curve algorithm 3040 of the social community module 2906). Optionally, Bob may choose to restrict his emergency broadcast data just to Lorelei neighbors (e.g., using the Bezier curve algorithm 3040 of the social community module 2906). In other words, users of the neighborhood social network in an entirely different neighborhood, such as the Financial District neighborhood of San Francisco (about 20 miles away) may not be able to access the emergency broadcast data that Bob generates.

For example, the emergency broadcast data may be disseminated to adjacent neighborhoods that have been claimed by different users in a manner such that the emergency broadcast data is optionally disseminated to the surrounding claimed neighborhoods based on Bob's preference.

It will be understood with those skill in the art that in some embodiments, the social community module 2906 may restrict dissemination of broadcast data by verified users to claimed neighborhoods in a private neighborhood social network (e.g. the privacy server 2900 may be a private social network, the neighborhood curation system described herein may also be part of the private neighborhood social network) in which the broadcaster resides (e.g., has a home) using the radial algorithm 4241 (e.g., the Bezier curve algorithm 3040 of FIG. 30). The privacy server 2900 may include online communities designed to easily create private websites to facilitate communication among neighbors and build stronger neighborhoods (e.g., to help neighbors build stronger and safer neighborhoods).

Further, it follows that the threshold radial distance 4219 generated through the Bezier curve algorithm 3040 of FIG. 30 may take on a variety of shapes other than purely circular and is defined to encompass a variety of shapes based on associated geographic, historical, political and/or cultural connotations of associated boundaries of neighborhoods and/or as defined by a city, municipality, government, and/or data provider (e.g., Maponics®, Urban Mapping®), in one embodiment. For example, the threshold radial distance 4219 may be based on a particular context, such as a school boundary, a neighborhood boundary, a college campus boundary, a subdivision boundary, a parcel boundary, and/or a zip code boundary. In an alternate embodiment, a first claiming user 2916 in a particular neighborhood may draw a polygon to indicate a preferred boundary.

In an alternative embodiment, the threshold radial distance 4219 generated using the Bezier curve algorithm 3040 by the privacy server 2900 may be restricted to a shared apartment building (e.g., and/or an office building). In addition, it will be understood with those skilled in the art that the privacy server 2900 may be operate as a function of the privacy server 2900 (e.g., a neighborhood social network).

In addition, it will be understood that in some embodiments, the neighborhood broadcast data is generated by the police department (e.g., and/or others of the neighborhood services) in the form of crime alerts, health alerts, fire alerts, and other emergency alerts and provided as a feed (e.g., a Real Simple Syndication (RSS) feed) to the privacy server 2900 for distribution to relevant ones of the claimed neighborhoods in the privacy server 2900. It will be understood that the neighborhood broadcast data may appear in a 'feed' provided to users of the privacy server 2900 (e.g., a private social network for neighbors) on their profile pages based on access control privileges set by the social community module using the Bezier curve algorithm 3040. For example, access to the neighborhood broadcast data may be limited to just a claimed neighborhood (e.g., as defined by neighborhood boundaries) and/or optionally adjacent neighborhoods.

In one embodiment, the privacy server 2900 may provide police departments and other municipal agencies with a separate login in which they can invite neighbors themselves, provide for a virtual neighborhood watch and emergency preparedness groups, and conduct high value crime and safety related discussions from local police and fire officials without requiring any technical integration. This may provide police departments and municipalities with a single channel to easily broadcast information across neighborhoods that they manage, and receive and track neighborhood level membership and activity to identify leaders of a neighborhood.

For example, communications defined from one broadcasting user to an adjacent neighborhood o may involve sharing information about a suspicious activity that might affect several neighborhoods, explaining about a lost pet that might have wandered into an adjoining neighborhood, to rally support from neighbors from multiple neighborhoods to address civic issues, to spread the word about events like local theater production or neighborhood garage sales, and/or to ask for advice or recommendations from the widest range of people in a community). In one embodiment, the privacy server 2900 may prevent self-promotional messages that are inappropriate (e.g., a user sending such messages may be suspended from the geospatially constrained social network 4242 using the crowd sourced moderation algorithm 3004. In one embodiment, the user 2916 may personalize nearby neighborhoods so that the user can choose exactly which nearby neighborhoods (if any) they wish to communicate with. The user 2916 may be able to flag a neighborhood feeds from adjacent neighborhoods. In addition, leaders from a particular neighborhood may be able to communicate privately with leaders of an adjoining neighborhood to plan and organize on behalf of an entire constituency. Similarly, users 2906 may be able to filter feeds to only display messages from the neighborhood that they reside in. The user 2916 may be able to restrict posts (e.g., pushpin placements) only in the neighborhood they are presently in. In one embodiment, nearby neighbors may (or may not) be able to access profiles of adjacent neighborhoods.

It will also be understood that in some embodiments, that users may be 'verified through alternate means, for example through a utility bill verification (e.g., to verify that a user's address on a utility bill matches the residential address they seek to claim), a credit card verification (e.g., or debit card verification), a phone number verification (e.g., reverse phone number lookup), a privately-published access code (e.g., distributed to a neighborhood association president, and/or distributed at a neighborhood gathering), and a neighbor vouching method (e.g., in which an existing verified neighbor 'vouches' for a new neighbor as being someone that they personally know to be living in a neighborhood.

In one embodiment, the privacy server 2900 ensures a secure and trusted environment for a neighborhood website by requiring all members to verify their address. In this embodiment, verification may provide assurance the assurance that new members are indeed residing at the address they provided when registering for an account in the privacy server 2900. Once a neighborhood has launched out of pilot status, only members who have verified their address may be able access to their neighborhood website content.

It will be understood that among the various ways of verifying an address, a user of the privacy server 2900 may uses the following methods to verify the address of every member:

A. Postcard. The privacy server 2900 can send a postcard to the address listed on an account of the user 2916 with a unique code printed on it (e.g., using the Fatmail postcard campaign). The code may allow the user 2916 to log in and verify their account.

B. Credit or debit card. The privacy server 2900 may be able to verify a home address through a credit or debit card billing address. In one embodiment, billing address may be confirmed without storing personally identifiable information and/or charging a credit card.

C. Home phone. If a user 2916 has a landline phone, the user may receive an automated phone call from the privacy server 2900 that may provide with a unique code to verify an account of the user 2916.

D. Neighborhood leader. A neighborhood leader of the geo-spatially constrained social network can use a verify neighbors feature of the privacy server 2900 to vouch for and verify neighbors.

E. Mobile phone. A user 2916 may receive a call to a mobile phone associated with the user 2916 to verify their account.

F. Neighbor invitations. A neighbor who is a verified member of the privacy server 2900 can vouch for, and may invite another neighbor to join the privacy server 2900. Accepting such an invitation may allow the user 2916 to join the privacy server 2900 as a verified member, according to one embodiment.

H. Social Security Number (SSN). The privacy server 2900 can verify a home address when the user 2916 provides the last 4 digits of a SSN (e.g., not stored by the privacy server 2900 for privacy reasons).

It will be also understood that in a preferred embodiment neighborhood boundaries are defined by the social community module 2906 using the Bezier curve algorithm 3040 of FIG. 30 may be constrained to work in neighborhoods having a threshold number of homes (e.g., 10 homes, alternatively 2900 homes in a neighborhood) and more (e.g., up to thousands of homes) as this may be needed to reach the critical mass of active posters that is needed to help the privacy server 2900 succeed. In one embodiment, 'groups' may be creatable in smaller neighborhoods having fewer than the threshold number of homes for communications in micro-communities within a claimed neighborhood.

It will also be appreciated that in some embodiments, a mobile device (e.g., the device 1806, the device 1808 of FIG. 18) may be a desktop computer, a laptop computer, and/or a non-transitory broadcasting module. In addition, it will be understood that the prepopulated data (e.g., preseeded data) described herein may not be created through data licensed from others, but rather may be user generated content of organically created profiles in the geo-spatial social network created by different users who have each verified their profiles.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

For example, the social community module 2906, the search module 2908, the claimable module 2910, the commerce module 4212, the map module 2914, the building builder module 3000, the $N^{th}$ degree module, the tagging module 3004, the verify module 3006, the groups generator module 3008, the pushpin module 3010, the profile module 3012, the announce module 3014, the friend finder module 3022, the neighbor-neighbor help module 3024, the business search module 3102, the communicate module 3106, the directory assistance module 3108, the embedding module 3110, the no-match module 3112, the range selector module 3114, the user-place claimable module, the user-user claimable module 3202, the user-neighbor claimable module 3204, the user-business claimable module 3206, the reviews module 3208, the defamation prevention module 3210, the claimable social network conversion module 3212, the claim module 3214, the data segment module 3216, the dispute resolution module 3218, the resident announce payment module 3300, the business display advertisement module 3302, the geo-position advertisement ranking module 3304, the content syndication module 3306, the text advertisement module 3308, the community market place module 3310, the click-in tracking module 3312, the satellite data module 3400, the cartoon map converter module 3404, the profile pointer module 3406, the parcel module 3408 and the occupant module 3410 of FIGS. 1A-57 may be embodied through the social community circuit, the search circuit, the claimable circuit, the commerce circuit, the map circuit, the building builder circuit, the $N^{th}$ degree circuit, the tagging circuit, the verify circuit, the groups circuit, the pushpin circuit, the profile circuit, the announce circuit, the friends finder circuit, the neighbor-neighbor help circuit, the business search circuit, the communicate circuit, the embedding circuit, the no-match circuit, the range selector circuit, the user-place claimable circuit, the user-user claimable circuit, the user-neighbor claimable circuit, the user-business circuit, the reviews circuit, the defamation prevention circuit, the claimable social network conversion circuit, the claim circuit, the data segment circuit, the dispute resolution circuit, the resident announce payment circuit, the business display advertisement circuit, the geo-position advertisement ranking circuit, the content syndication circuit, the text advertisement circuit, the community market place circuit, the click-in tracking circuit, the satellite data circuit, the cartoon map converter circuit, the profile pointer circuit, the parcel circuit, the occupant circuit using one or more of the technologies described herein.

In addition, it will be appreciated that the various operations, processes, and methods disclosed herein may be embodied in a machine-readable medium and/or a machine accessible medium compatible with a dat processing system 4204 (e.g., a computer system), and may be performed in any order. Accordingly, the specification and drawings are to be regarded in an illustrative rather than a restrictive sense.

What is claimed is:

1. An autonomous neighborhood vehicle comprising:
   a computer system of the autonomous neighborhood vehicle that is communicatively coupled to a commerce server of a neighborhood communication system through a wireless network to autonomously navigate the autonomous neighborhood vehicle to a destination specified by the commerce server; and
   a navigation server of the autonomous neighborhood vehicle to provide a remote sensing capability to the autonomous neighborhood vehicle such that the autonomous neighborhood vehicle is autonomously navigable to the destination,
   wherein the autonomous neighborhood vehicle periodically transmits a heartbeat message to the commerce server having a set of current geo-spatial coordinates of the autonomous neighborhood vehicle, a time stamp, a date stamp, and an operational status of the autonomous neighborhood vehicle,
   wherein the autonomous neighborhood vehicle is in a form of autonomous neighborhood bicycle having a detachable storage compartment thereon, and having an ability to driverlessly traverse through bicycle lanes adjacent to a roadway based on commands from the commerce server, wherein the autonomous neighborhood vehicle utilizes a sensory fusion algorithm through which at least some of an ultrasound, a radar unit, a light sensor, a LIDAR unit, a wheel encoding sensor, an accelerometer sensor, a gyroscopic sensor, a compass sensor, and a stereo optical sensor operate in concert to provide a three dimensional environmental view of an environment surrounding the autonomous neighborhood vehicle to the autonomous neighborhood vehicle, wherein the autonomous neighborhood vehicle automatically generates an emergency broadcast message to a set of neighbors in a geo-spatial vicinity of the autonomous neighborhood vehicle when the autonomous neighborhood vehicle detects a failure condition comprising at least one of an impact, a mechanical failure, an electrical failure, and a damage condition, wherein the emergency broadcast message includes at least one of a photo data, a geo-spatial coordinates data, a video data, an audio data, a timeout condition of a heartbeat message receipt at the commerce server, and a textual data associated with the failure condition, wherein the autonomous neighborhood vehicle automatically parks itself in a garage structure associated with an operator of the autonomous neighborhood vehicle adjacent to a passenger vehicle, wherein the operator is at least one of an individual, a family, a business, an owner, and a lessee, wherein a storage compartment is temperature regulated to maintain a temperature of an item in transit between a starting address associated with at least one of a merchant and a neighbor in a neighborhood in a geospatial vicinity of the autonomous neighborhood vehicle, and a destination address associated with a recipient of the item in the neighborhood in the geospatial vicinity of the autonomous neighborhood vehicle, wherein a neighborhood boundary is defined through a neighborhood boundary data provider, wherein the commerce server:

to generate, using a mapping server associated with a privacy server through the wireless network, a geospatial representation of a set of points on a map defining residences associated with each user of a community network having the member data, to authenticate, using a verify module of the privacy server, a particular user of a third-party application as being a verified user of the community network having a verified residential address in the neighborhood system, to communicate, using the verify module of the privacy server, a social graph of the particular user based on a personal address privacy preference of the particular user, to provide, using the verify module of the privacy server, the verified residential address to the third-party application based on the authentication of the particular user of the third-party application as being the verified user of the neighborhood communication system, wherein the privacy server communicatively coupled with the mapping server through a network to apply an address verification algorithm associated with each user of an online community to verify that each user lives at a residence associated with a claimable residential address of the online community formed through a social community module of the privacy server using the processor and the memory, wherein the mapping server to generate a latitudinal data and a longitudinal data associated with each claimable residential address of the online community associated with each user of the online community, wherein the privacy server to automatically determine a set of access privileges in the online community associated with each user of the online community by constraining access in the online community based on a neighborhood boundary determined using a Bezier curve algorithm of the privacy server, wherein the privacy server to instantiate the event when the particular user is associated with the claimable residential address based on a verification of the particular user as living at a particular residential address associated with the claimable residential address using the privacy server, wherein the privacy server to constrain the particular user to communicate through the online community only with the set of neighbors having verified residential addresses using the privacy server, and wherein the privacy server to define the set of neighbors as other users of the online community that have each verified their addresses in the online community using the privacy server and which have each claimed residential addresses that are in a threshold radial distance from a claimed address of the particular user.

2. The autonomous neighborhood vehicle of claim 1 further comprising:

a set of wheels aligned in a pattern to provide the autonomous neighborhood vehicle stability when traversing at least one of a sidewalk, a bike lane, and a roadway;

an electronic locking mechanism of the storage compartment;

wherein items are storable in the storage compartment.

3. The autonomous neighborhood vehicle of claim 1 further comprising:

a sidewalk detection sensor to detect a gradation rise caused by a sidewalk start location and a gradation drop caused by a sidewalk end location; and a telescopic riser coupled to a base of the autonomous neighborhood vehicle automatically displace a set of front wheels to rise and fall based on the detected one of the gradation rise caused by the sidewalk start location and the gradation drop caused by the sidewalk end location to provide mechanical stability for the item in the storage compartment of the autonomous neighborhood vehicle.

4. A method comprising:

associating an autonomous neighborhood vehicle with a non-transient location;

determining, through a commerce server of a neighborhood communication system, that a destination in a threshold radial distance from the non-transient location is received by the autonomous neighborhood vehicle through a wireless network;

determining an optimal route from a current location of the autonomous neighborhood vehicle to the destination;

traveling autonomously on the optimal route to the destination, periodically determining, through a processor, the current location of the autonomous neighborhood vehicle;

communicating the current location of the autonomous neighborhood vehicle to the commerce server;

automatically activating a set of light emitting diodes encompassing the autonomous neighborhood vehicle when a light sensor detects that an environmental brightness is below a threshold luminosity;
creating an envelope around the autonomous neighborhood vehicle, wherein the envelope includes a set of minimum ranges, wherein the set of minimum ranges includes at least one of a minimum distance that must be kept in at least one of a direction in front, behind, to a left, to a right, above, and below the autonomous neighborhood vehicle;
establishing at least one of a range of a speed the autonomous vehicle may reach;
establishing at least one of a minimum and a maximum distance traveled by the autonomous neighborhood vehicle,
    wherein the minimum and the maximum distance traveled by the autonomous neighborhood vehicle is set for at least one of a per trip, a per day and a per delivery distance traveled;
establishing a maximum magnitude of deceleration, wherein the maximum magnitude of deceleration is measured in feet per second squared;
establishing a minimum crosswalk proximity at which the autonomous neighborhood vehicle is permitted to stop;
determining at a predetermined interval if a different route that is more efficient than the optimal route exists based on at least one of a delivery time, a pendency of time, and a minimal travel distance,
    wherein the predetermined interval for determining if the different route is more efficient than the optimal route exists includes at least one of constantly determining, determining every minute, determining every one hundred yard, when the autonomous neighborhood vehicle encounters traffic, when the autonomous neighborhood vehicle encounters an object;
calculating the different route;
traveling along the different route as long as the different route remains the most efficient route;
determining when an alternate field of view is needed;
prioritizing established constraints of at least one of the envelope, the speed, the distance traveled, a magnitude of deceleration and a minimum crosswalk proximity in respect to the need to establish the alternate field of view;
determining an optimal alternate field of view that does not violate established constraints prioritized obtaining the alternate field of view;
obtaining the optimal alternate field of view without violating constraints prioritized obtaining the alternate field of view,
    wherein obtaining the optimal alternate field of view without violating constraints prioritized obtaining the alternate field of view involves at least one of switching sensors, moving the autonomous neighborhood vehicle and moving sensors, and wherein the set of minimum ranges of the envelope depends on at least one of the speed of the autonomous neighborhood vehicle, a set of weather conditions, an environment of the autonomous neighborhood vehicle, an item, and a nature of the object that is in close proximity with the autonomous neighborhood vehicle,
    wherein a storage compartment is temperature regulated to maintain at least one of a temperature and a humidity of an item in transit between a starting address associated with at least one of a merchant and a neighbor in a neighborhood in a geospatial vicinity of the autonomous neighborhood vehicle, and a destination location associated with a recipient of the item in the neighborhood in the geospatial vicinity of the autonomous neighborhood vehicle, wherein a neighborhood boundary is defined through a neighborhood boundary data provider, and wherein the storage compartment is equipped with a suspension device to protect the item in the storage compartment while in transit;
automatically generating an emergency broadcast message to a set of neighbors in a geo-spatial vicinity of the autonomous neighborhood vehicle when the autonomous neighborhood vehicle detects a failure condition comprising at least one of an impact, a mechanical failure, an electrical failure, and a damage condition, wherein the emergency broadcast message includes at least one of a photo data, a geo-spatial coordinates data, a video data, an audio data, a timeout condition of a heartbeat message receipt at the commerce server, and a textual data associated with the failure condition;
periodically transmitting a heartbeat message to the commerce server having a set of current geo-spatial coordinates of the autonomous neighborhood vehicle, a time stamp, a date stamp, and an operational status of the vehicle;
automatically contacting emergency response services when the autonomous neighborhood vehicle detects at least one of a crime, an accident involving third parties and an attempted tampering with the autonomous neighborhood vehicle, wherein the contacting includes at least one of the time stamp, the geo-spatial coordinates data, the photo data, the video data, the audio data, and the textual data, and wherein emergency response services include at least one of a police station, a fire station and a medical responder;
calculating a set of predicted behaviors of detected objects within a threshold distance from the autonomous neighborhood vehicle;
determining confidence levels for the predicted behaviors, wherein the confidence levels are at least one of a number and a percentage of the probability of each predicted behavior occurring;
adjusting confidence levels for the predicted behaviors based on at least one of a change in location, a change in the speed, a change of direction, a change in angle and observed behavior;
vending the item from the storage compartment;
ejecting the item from an ejection module, wherein the item is ejected through an air based propulsion system aligned through a camera adjacent to the ejection module;
detecting a stop sign and automatically stopping the autonomous neighborhood vehicle at an appropriate point when the stop sign is detected;
detecting a yield sign and automatically monitoring and yielding to a traffic flow at an intersection in the neighborhood;
detecting when a pedestrian is walking in a path proximate to the neighborhood vehicle;
detecting when a bicyclist is biking in the path proximate to the neighborhood vehicle,
accepting a credit payment using at least one of a magnetic card reader of the autonomous neighborhood vehicle, a near-field credit scanner of the autonomous neighborhood vehicle, and a biometric payment reader of the autonomous neighborhood vehicle,
    wherein the commerce server is in a privacy server of the neighborhood communication system that is wirelessly coupled with the autonomous neighborhood vehicle, and wherein the privacy server is a community network comprising:

verifying that each user of the community network lives at a residence associated with a claimable residential address of the community network formed through a social community module of the privacy server using the processor and a memory, obtaining from each user of the community network, using the processor of a data processing system, a member data associated with each user, the member data including an address, associating an address with a profile of each user, determining a location of each user based on the member data, storing the member data in a database, and obtaining a personal address privacy preference from each user, the personal address privacy preference specifying if the address should be displayed to other users;

generating, using a mapping server associated with the privacy server through a network, a geospatial representation of a set of points on a map defining residences associated with each user of the community network having the member data;

authenticating, using a verify module of the privacy server, a particular user of a third-party application as being a verified user of the neighborhood communication system having a verified residential address in the neighborhood communication system;

communicating, using the verify module of the privacy server a social graph of the particular user based on the personal address privacy preference of the particular user to the third party application; and providing, using the verify module of the privacy server, the verified residential address to the third-party application based on the authentication of the particular user of the third-party application as being the verified user of the neighborhood communication system, wherein the privacy server communicatively coupled with the mapping server through the network is configured to apply an address verification algorithm associated with each user of an online community to verify that each user lives at the residence associated with the claimable residential address of the online community formed through the social community module of the privacy server using the processor and the memory, wherein the mapping server is configured to generate a latitudinal data and a longitudinal data associated with each claimable residential address of the online community associated with each user of the online community, wherein the privacy server is configured to automatically determine a set of access privileges in the online community associated with each user of the online community by constraining access in the online community based on a neighborhood boundary determined using a Bezier curve algorithm of the privacy server, wherein the privacy server is configured to instantiate the event when the particular user is associated with the claimable residential address based on a verification of the particular user as living at a particular residential address associated with the claimable residential address using the privacy server, wherein the privacy server is configured to constrain the particular user to communicate through the online community only with a set of neighbors having verified residential addresses using the privacy server, and wherein the privacy server is configured to define the set of neighbors as other users of the online community that have each verified their addresses in the online community using the privacy server and which have each claimed residential addresses that are in the threshold radial distance from a claimed address of the particular user.

5. A neighborhood communication system comprising:

a commerce server;

a wireless network; and a set of autonomous neighborhood vehicles that are communicatively coupled to the commerce server of the neighborhood communication system through the wireless network to autonomously travel to destinations specified by the commerce server, wherein each of the set of autonomous neighborhood vehicles to periodically transmit heartbeat messages to the commerce server having a set of current geo-spatial coordinates of each of the autonomous neighborhood vehicles, a time stamp, a date stamp, and an operational status of each of the autonomous neighborhood vehicles lanes adjacent to a roadway based on commands from the commerce server, wherein at least some of the autonomous neighborhood vehicles are in a form of autonomous neighborhood bicycles each having a detachable storage compartment thereon, and having an ability to driverlessly traverse through bicycle, wherein each of the autonomous neighborhood vehicle utilizes a sensory fusion algorithm through which at least some of an ultrasound unit, a radar unit, a light sensor, a LIDAR unit, a wheel encoding sensor, an accelerometer sensor, a gyroscopic sensor, a compass sensor, and a stereo optical sensor operate in concert to provide a three dimensional environmental view to the autonomous neighborhood vehicle of an environment surrounding each of the autonomous neighborhood vehicle, wherein a particular autonomous neighborhood vehicles to automatically generate an emergency broadcast message to a set of neighbors in a geo-spatial vicinity of the particular autonomous neighborhood vehicle when the particular autonomous neighborhood vehicle detects a failure condition comprising at least one of an impact, a mechanical failure, an electrical failure, and a damage condition, wherein the emergency broadcast message includes at least one of a photo data, a geo-spatial coordinates data, a video data, an audio data, a timeout condition of the heartbeat message receipt at the commerce server, and a textual data associated with the failure condition, wherein each of the autonomous neighborhood vehicles automatically park themselves in a garage structure associated with an operator of the autonomous neighborhood vehicle adjacent to a passenger vehicle, wherein the operator is at least one of an individual, a family, a business, an owner, and a lessee, wherein a storage compartment is temperature regulated to maintain a temperature of an item in transit between a starting address associated with at least one of a merchant and a neighbor in a neighborhood in a geospatial vicinity of the autonomous neighborhood vehicle, and a destination address associated with a recipient of the item in the neighborhood in the geospatial vicinity of the autonomous neighborhood vehicle, wherein the neighborhood boundary is defined through a neighborhood boundary data provider, wherein the commerce server:
- to generate, using a mapping server associated with a privacy server through the wireless network, a geo spatial representation of a set of points on a map defining residences associated with each user of a community network having the member data,
- to authenticate, using a verify module of the privacy server, a particular user of a third-party application as being a verified user of the neighborhood communication system having a verified residential address in the neighborhood communication system,
- to communicate, using the verify module of the privacy server, a social graph of the particular user based on a personal address privacy preference of the particular user to the third-party application,
- to provide, using the verify module of the privacy server, the verified residential address to the third-party application based on the authentication of the particular user of the third-party application as being the verified user of the neighborhood communication system, wherein the privacy server communicatively coupled with the mapping server through a network to apply an address verification algorithm associated with each user of an online community to verify that each user lives at a residence associated with a claimable residential address of the online community formed through a social community module of the privacy server using the processor and the memory;

wherein the mapping server to generate a latitudinal data and a longitudinal data associated with each claimable residential address of the online community associated with each user of the online community, wherein the privacy server to automatically determine a set of access privileges in the online community associated with each user of the online community by constraining access in the online community based on a neighborhood boundary determined using a Bezier curve algorithm of the privacy server, wherein the privacy server to instantiate the event when the particular user is associated with the claimable residential address based on a verification of the particular user as living at a particular residential address associated with the claimable residential address using the privacy server, wherein the privacy server to constrain the particular user to communicate through the online community only with the set of neighbors having verified residential addresses using the privacy server, wherein the privacy server to define the set of neighbors as other users of the online community that have each verified their addresses in the online community using the privacy server and which have each claimed residential addresses that are in a threshold radial distance from a claimed address of the particular user.

* * * * *